US012732401B2

(12) United States Patent
Howe et al.

(10) Patent No.: US 12,732,401 B2
(45) **Date of Patent: *Sep. 8, 2026**

(54) DIGITAL PULSE-POSITION NOISE SHIFT KEYING TO COMMUNICATE INFORMATION

(71) Applicant: The Boeing Company, Arlington, VA (US)

(72) Inventors: Wayne Richard Howe, Irvine, CA (US); Jeffrey H. Hunt, Thousand Oaks, CA (US)

(73) Assignee: The Boeing Company, Arlington, VA (US)

(*) Notice: Subject to any disclaimer, the term of this patent is extended or adjusted under 35 U.S.C. 154(b) by 317 days.

This patent is subject to a terminal disclaimer.

(21) Appl. No.: 18/475,548

(22) Filed: Sep. 27, 2023

(65) Prior Publication Data

US 2024/0205058 A1 Jun. 20, 2024

Related U.S. Application Data

(63) Continuation-in-part of application No. 18/361,036, filed on Jul. 28, 2023, which is a continuation-in-part (Continued)

(51) Int. Cl.
*H04L 25/49* (2006.01)
*H04B 10/50* (2013.01)
*H04B 10/524* (2013.01)

(52) U.S. Cl.
CPC ....... *H04L 25/4902* (2013.01); *H04B 10/503* (2013.01); *H04B 10/524* (2013.01); *H04B 2210/006* (2013.01)

(58) Field of Classification Search
CPC .. H04B 10/503; H04B 10/524; H04L 25/4902

(Continued)

(56) References Cited

U.S. PATENT DOCUMENTS

| | | | |
|---|---|---|---|
| 1,309,031 | A | 7/1919 | Hettinger |
| 3,404,403 | A | 10/1968 | Vallese et al. |

(Continued)

FOREIGN PATENT DOCUMENTS

| | | | | |
|---|---|---|---|---|
| CA | 3077841 | A1 | 10/2020 | |
| CN | 111756470 | A * | 10/2020 | ............ H04W 12/02 |

(Continued)

OTHER PUBLICATIONS

Budinger et al; Quaternary Pulse Position Modulation Electronics for Free-Space Laser Communication; 1991; NASA Techincal Memorandum 104502; pp. 1-21. (Year: 1991).*

(Continued)

*Primary Examiner* — Amritbir K Sandhu
(74) *Attorney, Agent, or Firm* — Yee & Associates, P.C.

(57) ABSTRACT

A method, apparatus, and system for communicating information. A communications system comprises a computer system and a communications manager. The communications manager is in the computer system. The communications manager is configured to identify digital information for transmission. The communications manager is configured to transmit noise pulses having different time periods between the noise pulses. The different time periods correspond to symbols representing the digital information.

20 Claims, 64 Drawing Sheets

Related U.S. Application Data of application No. 18/334,739, filed on Jun. 14, 2023, now Pat. No. 12,476,710, which is a continuation-in-part of application No. 18/067,516, filed on Dec. 16, 2022, now Pat. No. 12,401,425, and a continuation-in-part of application No. 18/067,547, filed on Dec. 16, 2022, now Pat. No. 12,407,420.

(58) Field of Classification Search
USPC .......................................................... 398/115
See application file for complete search history.

(56) References Cited

U.S. PATENT DOCUMENTS

| | | | | |
|---|---|---|---|---|
| 3,719,829 | A | 3/1973 | Vaill | |
| 6,087,992 | A | 7/2000 | Anderson | |
| 6,087,993 | A | 7/2000 | Anderson et al. | |
| 6,377,436 | B1 | 4/2002 | Margolin | |
| 6,650,297 | B2 | 11/2003 | Anderson et al. | |
| 6,657,594 | B2 | 12/2003 | Anderson | |
| 6,674,970 | B1 | 1/2004 | Anderson | |
| 7,456,791 | B2 | 11/2008 | Pellet | |
| 7,613,074 | B1 | 11/2009 | Blackmon et al. | |
| 7,965,241 | B2 | 6/2011 | Marquis | |
| 8,922,436 | B2 | 12/2014 | Stone et al. | |
| 10,069,564 | B2 | 9/2018 | Hening et al. | |
| 10,211,522 | B2 | 2/2019 | Anderson | |
| 10,601,517 | B1 | 3/2020 | Kim et al. | |
| 10,630,383 | B2 | 4/2020 | Zhang et al. | |
| 10,763,963 | B2 | 9/2020 | Jia et al. | |
| 11,024,950 | B2 | 6/2021 | Hening et al. | |
| 12,580,650 | B2 | 3/2026 | Barnwell et al. | |
| 2007/0215946 | A1 | 9/2007 | Eastlund | |
| 2014/0288539 | A1* | 9/2014 | Bischoff | A61F 9/00825 606/4 |
| 2018/0167144 | A1 | 6/2018 | Howlader et al. | |
| 2018/0175936 | A1 | 6/2018 | Jia et al. | |
| 2018/0233876 | A1 | 8/2018 | Schulz et al. | |
| 2018/0263103 | A1* | 9/2018 | Exton | B64C 23/005 |
| 2019/0068413 | A1 | 2/2019 | Xu et al. | |
| 2019/0094185 | A1 | 3/2019 | Athanassiadis | |
| 2019/0379459 | A1* | 12/2019 | Kim | H04B 10/564 |
| 2020/0091994 | A1 | 3/2020 | Kalita et al. | |
| 2020/0191721 | A1 | 6/2020 | Morel et al. | |
| 2021/0364476 | A1 | 11/2021 | Safai | |
| 2021/0384981 | A1* | 12/2021 | Dolgin | H04B 10/25 |
| 2022/0390553 | A1* | 12/2022 | Englesbe | G01S 13/0209 |
| 2023/0198624 | A1 | 6/2023 | Franklin | |
| 2024/0146321 | A1 | 5/2024 | Miyata | |
| 2024/0204878 | A1 | 6/2024 | Howe et al. | |
| 2024/0204883 | A1* | 6/2024 | Howe | H04B 10/541 |
| 2024/0244738 | A1 | 7/2024 | Walczak et al. | |
| 2024/0244739 | A1* | 7/2024 | Widder | B25D 16/006 |
| 2024/0267126 | A1 | 8/2024 | Howe et al. | |
| 2025/0365074 | A1 | 11/2025 | Howe et al. | |
| 2026/0031913 | A1 | 1/2026 | Howe et al. | |

FOREIGN PATENT DOCUMENTS

| | | | |
|---|---|---|---|
| CN | 113489495 | A | 10/2021 |
| CN | 113534321 | A | 10/2021 |
| CN | 117529975 | A | 2/2024 |
| EP | 3370352 | A1 | 9/2018 |
| GB | 124833 | A | 4/1919 |
| JP | 3562029 | B2 | 9/2004 |
| WO | 2010111089 | A2 | 9/2010 |
| WO | 2017063662 | A1 | 4/2017 |
| WO | 2017210871 | A1 | 12/2017 |

OTHER PUBLICATIONS

Li; Design of Digital Pulse-Position Modulation System based on minimum distance method—2022; International conference on Neural networks; pp. 1-8. (Year: 2022).*

Budinger et al; Quaternary Pulse Position Modulation Electronics for Free-Space Laser Communication; 1991; NASA Technical Memorandum 104502, pp. 1-21. (Year: 1991).*

Office Action, dated Oct. 31, 2025, regarding U.S. Appl. No. 18/361,036, 111 pages.

Yu et al; Plasma optical modulators for intense lasers; Jun. 2016, Nature communications, pp. 1-7. (Year: 2016).

Office Action, dated Apr. 23, 2025, regarding U.S. Appl. No. 18/334,739, 87 pages.

Office Action, dated Apr. 4, 2025, regarding U.S. Appl. No. 18/067,547, 70 pages.

Extended European Search Report, dated Aug. 26, 2025, regarding EP Application No. 25159385.1, 10 pages.

Notice of Allowance, dated Aug. 18, 2025, regarding U.S. Appl. No. 18/334,739, 26 pages.

Zhao Yang et al: "Photoacoustic communication system based on detecting laser-generated sound by optical fiber underwater acoustic sensor", Optics and Lasers in Engineering, Elsevier, Amsterdam, NL, vol. 177, Feb. 29, 2024 (Feb. 29, 2024), XP087483956, ISSN: 0143-8166, DOI: 10.1016/J.OPTLASENG.2024.108134 [retrieved on Feb. 29, 2024] * the whole document *.

Alshershby et al., Reconfigurable Plasma Antenna Produced in Air by Laser-induced Filaments: Passive Radar Application, 2012 International Conference on Optoelectronics and Microelectronics (ICOM), Aug. 23-25, 2012, Changchun, China, 8 pages.

Brelet et al., "Radiofrequency plasma antenna generated by femtosecond laser filaments in air," Applied Physics Letters , vol. 101, Issue 26, Dec. 27, 2012, 4 pages.https://aip.scitation.org/doi/abs/10.1063/1.4773492.

Choe et al., "Radiation characteristics of femtosecond laser-induced plasma channel Vee antenna," Physics of Plasmas, vol. 22, Issue 6, 10.1063/1.4922083, Published Online Jun. 4, 2015, 10 pages.

Dai et al., "Demonstration of 17 Meter Standoff THz Wave Generation," Nonlinear Optics: Materials, Fundamentals and Applications 2009, Honolulu, Hawaii, Jul. 12-17, 2009, 4 pages.

Harilal et al., "Lifecycle of laser-produced air sparks," Physics of Plasmas, vol. 22, Issue 6, 10.1063/1.4922076, Published Online Jun. 3, 2015, 35 pages.https://aip.scitation.org/doi/10.1063/1.4922076.

Howe et al., "Analog Amplitude Noise Modulation to Communicate Information," filed Jun. 14, 2023, U.S. Appl. No. 18/334,739, 208 pages.

Howe et al., "Digital Amplitude Noise Shift Keying to Communicate Information," filed Jul. 28, 2023, U.S. Appl. No. 18/361,036, 237 pages.

Howe et al., "Pulse Noise Modulation to Encode Data," filed Dec. 16, 2022, U.S. Appl. No. 18/067,547, 98 pages.

Howe et al., "Radio Frequency Communications Using Laser Optical Breakdowns," filed Dec. 16, 2022, U.S. Appl. No. 18/067,516, 100 pages.

Kumar et al., "A reconfigurable plasma antenna," Journal of Applied Physics, vol. 107, Issue 5, 10.1063/1.3318495, Journal of Applied Physics > vol. 107, Issue 5, 10.1063/1.3318495, 10 pages. https://doi.org/10.1063/1.3318495.

Kumar et al., "Detection and analysis of low-frequency electromagnetic emissions from ns laser induced breakdown of air," Proceedings of SPIE—The International Society for Optical Engineering, May 2012, vol. 8434, 7 pages.

Kumar et al., "Effect of laser intensity on radio frequency emissions from laser induced breakdown of atmospheric air," Journal of Applied Physics, vol. 119, Issue 21, 214904, Jun. 7, 2016, 9 pages.https://doi.org/10.1063/1.4953211.

Kumar et al., "Radio frequency emissions from laser induced material breakdown," 10th Asia Plasma and Fusion Association Conference, International Conference Series, Journal of Physics, Conference Series 823, (2017), 012008, 7 pages.

Kumar et al., "RF emissions from laser breakdown of target materials," 2013 International Conference on Microwave and Photonics (ICMAP), Dec. 13-15, 2013, 4 pages.doi: 10.1109/ICMAP.2013.6733512.

Kumar et al., "Spectral selective radio frequency emissions from laser induced breakdown of target materials," Applied Physics

(56) References Cited

OTHER PUBLICATIONS

Letters, vol. 105, Issue 6, 10.1063/1.4893279, Published Online Aug. 13, 2014, 6 pages.https://doi.org/10.1063/1.4893279.
Mechain et al., "A virtual antenna produced in air by intense femtosecond laser pulses," European Symposium on Optics and Photonics for Defence and Security, Nov. 3, 2005, Bruges, Belgium, 7 pages.https://www.spiedigitallibrary.org/conference-proceedings-of-spie/5989/59890S/A-virtual-antenna-produced-in-air-by-intense-femtosecond-laser/10.1117/12.631202.short.
Pearlman et al., "Emission of rf radiation from laser-produced plasmas," Journal of Applied Physics, vol. 49, Issue 1, 457 (1978), Published Online Aug. 12, 2008, 4 pages.https://doi.org/10.1063/1.324360.
Stallings, "Spread Spectrum," Data and Computer Communications 7th Edition, Chapter 9, Feb. 2007, 28 pages. http://williamstallings.com/DCC/DCC7e.html.
Theberge et al., "Broadband and long lifetime plasma-antenna in air initiated by laser-guided discharge," Applied Physics Letters, vol. 111, Issue 7, Aug. 14, 2017, 5 pages.https://aip.scitation.org/doi/10.1063/1.4985045.
Wang et al., "Effect of laser energy and polarization on RF emission characteristics of laser induced air plasma," Eleventh International Conference on Information Optics and Photonics (CIOP 2019), 2019, Xi'an, China, Proceedings of SPIE vol. 11209, 8 pages.https://www.spiedigitallibrary.org/conference-proceedings-of-spie.
Antipov A A et al: "Microwave Generation in an Optical Breakdown Plasma Created By Modulated Laser Radiation", Soviet Journal of Quantum Electronics, American Institute of Physics, New York, NY, US, vol. 6, Jun. 1, 1990 (Jun. 1, 1990), pp. 664-666, XP000174924, ISSN: 0049-1748, DOI: 10.1070/QE1990V020N06ABEH006676.
European Patent Office Extended Search Report, dated Apr. 25, 2024, regarding Application No. EP23205184.7, 10 pages.
Griffiths et al., "Scalable visible light communications with a micro-LED array projector and high-speed smartphone camera," Optics Express, vol. 27, No. 11, May 27, 2019, pp. 15585-15594, https://opg.optica.org/oe/fulltext.cfm?uri=oe-27-11-15585&id=412698.
Li et al., "Optical Computing using hybrid encoded shadow casting," Rapid Communications, Applied Optics, vol. 25, No. 16, Aug. 15, 1986, 4 pages.
Zong Si-Guang et al: "Study of opto-acoustic communication between air and underwater carrier", Proceedings of SPIE; [Proceedings of SPIE ISSN 0277-786X vol. 10524], SPIE, US, vol. 10697, Feb. 20, 2018 (Feb. 20, 2018), pp. 106975S-106975S, XP060102900, DOI: 10.1117/12.2315446, ISBN: 978-1-5106-1533-5.
Office Action, dated May 14, 2025, regarding U.S. Appl. No. 18/067,516, 44 pages.
Antipov A A et al: "Microwave Generation in an Optical Breakdown Plasma Created by Modulated Laser Radiation", Soviet Journal of Quantum Electronics, American Institute of Physics, New York, NY I us, vol. 6, Jun. 1, 1990 (Jun. 1, 1990), pp. 664-666, XP000174924, ISSN: 0049-1748, DOI: 10.1070/QE1990V020N06ABEH006676.
European Patent Office, Extended Search Report, dated Nov. 11, 2024, regarding Application No. EP24180478.0, 12 pages.
European Patent Office, Extended Search Report, dated Oct. 25, 2024, regarding Application No. EP24180480.6, 10 pages.
Notice of Allowance, dated Feb. 23, 2026, regarding U.S. Appl. No. 18/361,036, 13 pages.
Office Action, dated Apr. 21, 2026, regarding U.S. Appl. No. 18/639,004, 77 pages.
Christian et al.; Analysis and Improvement of motion encoding in magnetic resonance encoding; 2018, Zurich Open Repository and Archive; pp. 1-20. (Year: 2018).
Gu et al.; Motion Matters: Motion-guided Modulation Network for Skeleton-based Micro-Action Recognition; Nov. 2025, Hefei University of Technology Hefei China, pp. 1-10. (Year: 2025).
Office Action, dated Jun. 16, 2026, regarding U.S. Appl. No. 18/639,130, 73 pages.
Office Action, dated May 28, 2026, regarding U.S. Appl. No. 18/639,069, 76 pages.

* cited by examiner

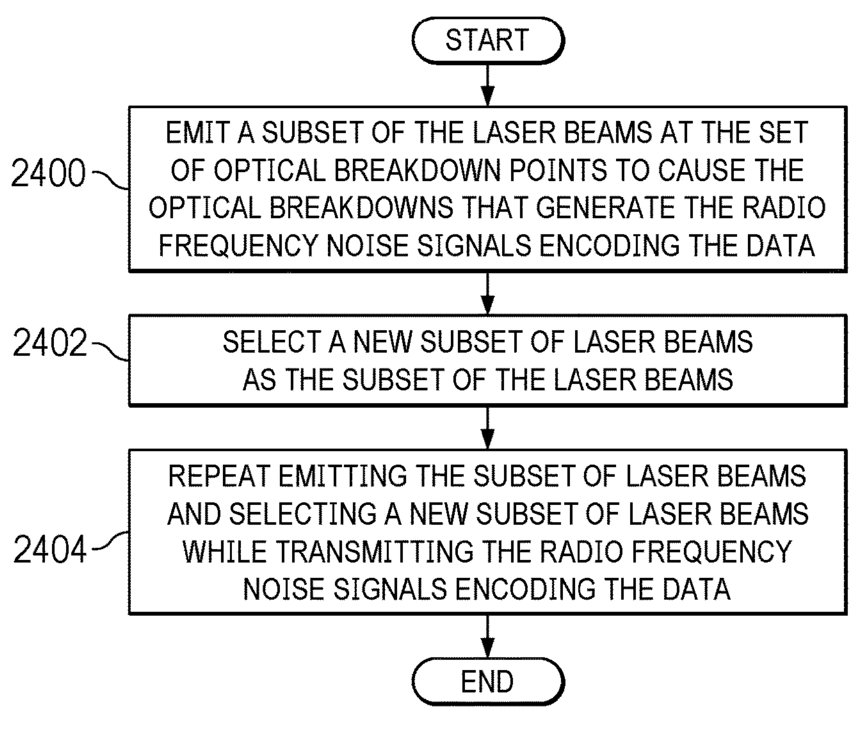

FIG. 24

START

EMIT THE SET OF LASER BEAMS FROM DIFFERENT LOCATIONS AT AN OPTICAL BREAKDOWN POINT, WHEREIN A PORTION OF THE SET OF LASER BEAMS INTERSECT AT THE OPTICAL BREAKDOWN POINT SUCH THAT A POWER FROM THE PORTION OF THE LASER BEAMS IS SUFFICIENT TO CAUSE THE OPTICAL BREAKDOWNS AT THE INTERSECTION POINT THAT GENERATE THE RADIO FREQUENCY NOISE SIGNALS ENCODING THE DATA

2500

END

FIG. 25

START

TRANSMIT NOISE PULSES WITH THE DIFFERENT NOISE PULSE TIME DURATIONS AND DIFFERENT TIME PERIODS BETWEEN THE NOISE PULSES, WHEREIN THE DIFFERENT NOISE PULSE TIME DURATIONS AND DIFFERENT TIME PERIODS BETWEEN NOISE PULSES CORRESPOND TO THE SYMBOLS REPRESENTING THE DIGITAL INFORMATION

5600

END

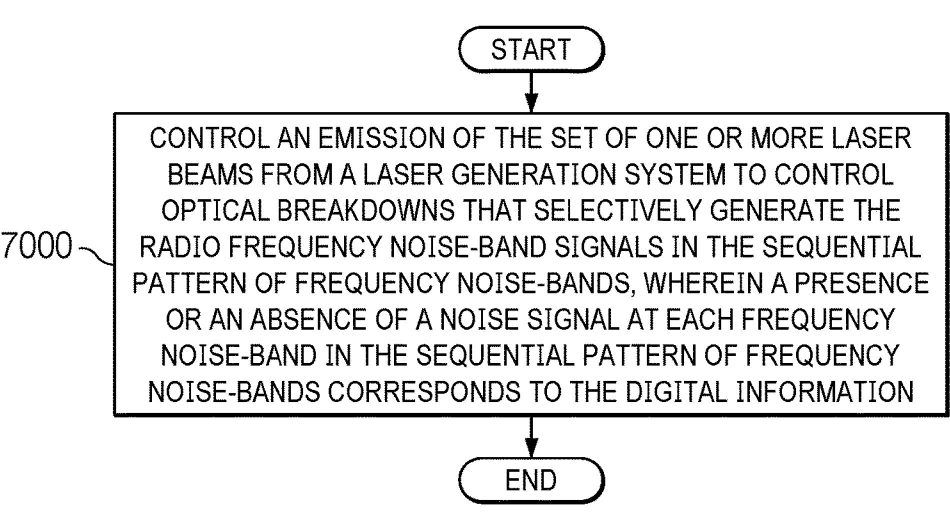

FIG. 70

START

CONTROL THE EMISSION OF THE SET OF ONE OR MORE LASER BEAMS FROM THE LASER GENERATION SYSTEM TO CONTROL THE OPTICAL BREAKDOWNS THAT SELECTIVELY GENERATE THE RADIO FREQUENCY NOISE-BAND SIGNALS BY VARYING A FREQUENCY LOCATION OF A CENTER POINT OF A FREQUENCY NOISE-BAND IN SELECTED FREQUENCY NOISE-BANDS IN THE SEQUENTIAL PATTERN OF FREQUENCY NOISE-BANDS WHICH CORRESPOND TO THE DIGITAL INFORMATION

7100

END

FIG. 71

CONTROL AN EMISSION OF A SET OF ONE OR MORE LASER BEAMS FROM A LASER GENERATION SYSTEM TO CONTROL OPTICAL BREAKDOWNS THAT GENERATE THE RADIO FREQUENCY NOISE PULSES IN THE SEQUENTIAL PATTERN OF FREQUENCY NOISE-BANDS THAT CORRESPOND TO THE SYMBOLS REPRESENTING THE DIGITAL INFORMATION, WHEREIN THE RADIO FREQUENCY NOISE PULSES HAVE AT LEAST ONE OF DIFFERENT TIME PERIODS BETWEEN THE RADIO FREQUENCY NOISE PULSES OR DIFFERENT PULSE TIME DURATIONS THAT CORRESPOND TO THE SYMBOLS REPRESENTING THE DIGITAL INFORMATION

8200

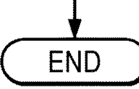

FIG. 82

START

CONTROL THE EMISSION OF THE SET OF ONE OR MORE LASER BEAMS FROM THE LASER GENERATION SYSTEM TO CONTROL THE OPTICAL BREAKDOWNS THAT GENERATE THE RADIO FREQUENCY NOISE PULSES BY VARYING A FREQUENCY LOCATION OF A CENTER POINT OF A FREQUENCY NOISE-BAND IN SELECTED FREQUENCY NOISE-BANDS CORRELATING TO THE SEQUENTIAL PATTERN OF FREQUENCY NOISE-BANDS WHICH CORRESPOND TO THE DIGITAL INFORMATION, WHEREIN THE RADIO FREQUENCY NOISE PULSES HAVE AT LEAST ONE OF DIFFERENT TIME PERIODS BETWEEN THE RADIO FREQUENCY NOISE PULSES OR DIFFERENT PULSE TIME DURATIONS THAT CORRESPOND TO THE SYMBOLS REPRESENTING THE DIGITAL INFORMATION

8300

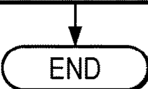

FIG. 83

DIGITAL PULSE-POSITION NOISE SHIFT KEYING TO COMMUNICATE INFORMATION

CROSS-REFERENCE TO RELATED APPLICATIONS

This application is a Continuation-in-Part (CIP) of U.S. Patent Application entitled "Digital Amplitude Noise Shift Keying to Communicate Information", Ser. No. 18/361,036, filed Jul. 28, 2023, which is a Continuation-in-Part (CIP) Analog Amplitude Noise Modulation to Communicate Information,", Ser. No. 18/334,739, filed Jun. 14, 2023, now U.S. Pat. No. 12,476,710, issued Nov. 18, 2025, which is a Continuation-in-Part (CIP) of U.S. Patent Application entitled "Radio Frequency Communications Using Laser Optical Breakdowns,", Ser. No. 18/067,516, filed Dec. 16, 2022, now U.S. Pat. No. 12,401,425, issued Aug. 26, 2025, and is a Continuation-in-Part (CIP) of U.S. Patent Application entitled "Pulse Noise Modulation to Encode Data,", Ser. No. 18/067,547, filed Dec. 16, 2022, now U.S. Pat. No. 12,407,420, issued Sep. 2, 2025, all of which are incorporated herein by reference in their entirety.

BACKGROUND INFORMATION

1. Field

The present disclosure relates generally to communications and in particular, to methods, apparatuses, systems, and computer program products for communicating information using radio frequency (RF), optical, and/or other signals within the electromagnetic spectrum without physical antenna structures.

2. Background

Wireless communications using radio frequency (RF) signals, optical, and/or other signals within the electromagnetic spectrum are common and widespread. Radio frequency signals are commonly used in computer networks, for example, in the form of Wi-Fi signals that provide communications links between various computing devices.

Radio frequency signals are also used for communications between various clients such as ships, aircraft, land vehicles, buildings, and other physical locations. These communications can include data and/or information such as position information, voice messages, voice communications, and other types of information and/or data. For example, other types of information and/or data can include digital and analog signaling.

Communications using radio frequency transmissions are facilitated using physical antennas. The transmission or reception of radio frequency signals occurs between antennas. The use of physical antennas can be less convenient or reliable than desired.

In addition, radio frequency communications can be implemented using a carrier signal or carrier wave modulated by at least one of a modulation signal, a message signal, or an information signal that modulates or digitally "shift keys" the carrier wave.

The terms "shift key," "shift keys," "shift keying" and similar terms are terms of art used in the communications technology field to describe digital modulation techniques that represent digital data as variations of a carrier wave or carrier signal. The terms de-"shift key" or de-"shift keying" are terms used to describe demodulation of digital data. In these examples, shift keying is a form of modulation. Classical carrier signals use at least one of periodic waves, repeating waveforms, pseudo-random waveforms, or other predictable waveforms such as sinusoidal, cosinusoidal, square-waves, sawtooth, or other repeatable carriers which are then modulated in various ways by the message signal, modulation signal, and/or information signal.

Communications have been attempted using lasers, gas-filled tubes, electric arcs, high-voltage electrodes, high-voltage fields, field exciter members, and other mechanisms to create and maintain "plasma antennas" including plasma columns, plasma filaments, plasma structures, plasma channels, laser-induced plasma filaments (LIPF), arrays of focusing and defocusing cycles of plasma, and/or bounded or unbounded ionized air or water columns to emulate the shapes and/or conductance of physical antennas. These devices may be continuous wave or pulsed devices. Previous communication approaches attempt to input, impel, induce, impute, impress upon, influence, and/or modulate an RF or other signal onto the plasma or conductive plasma column with a coupling device, such as an RF coupler, an electromagnetic or capacitive coupling device, an electro-optical crystal, electro-optic modulators such as beams of light, and/or other influencing device. In effect, previous approaches attempt to treat plasma or the plasma column as a conductor or a classical physical conducting antenna, such as a monopole or dipole device. These approaches use conventional modulation of periodic, repeating, sinusoidal, and/or pseudo-random carrier waveforms, such as amplitude-, frequency-, and/or phase-modulation, to generate, induce, impel, influence, and/or control the plasma's amplitude-, frequency-, or phase-modulated electromagnetic fields that radiate from the plasma or plasma column.

Therefore, it would be desirable to have methods, systems, and apparatuses that take into account at least some of the issues discussed above, as well as other possible issues. For example, it would be desirable to have methods and apparatus that overcome a technical problem with radio frequency communications using physical antennas. It would also be desirable to have systems, methods, and apparatuses that overcome the limitations of periodic and/or predictable carriers. It would also be desirable to have systems, methods, and apparatuses that overcome the limitations of plasma antennas and coupled modulation.

SUMMARY

An embodiment of the present disclosure provides a communications system comprises a computer system and a communications manager. The communications manager is located in the computer system. The communications manager is configured to identify digital information for transmission. The communications manager is configured to transmit noise pulses having different time periods between the noise pulses. The different time periods correspond to symbols representing the digital information.

Another embodiment of the present disclosure provides a communications system comprising a receiver configured to receive noise pulses; determine time periods between the noise pulses; and identify symbols representing digital information by using the time periods between the noise pulses.

Yet another embodiment of the present disclosure provides a method for communicating digital information. The digital information is identified for transmission. Noise pulses are transmitted having different time periods between the noise pulses. The different time periods correspond to symbols that represent the digital information.

Still another embodiment of the present disclosure provides a method for communicating digital information. Noise pulses are received. Time periods between the noise pulses are determined. Symbols representing digital information identified by using the time periods between the noise pulses.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

FIG. 24 is an illustration of a flowchart for controlling the emission of laser beams in points in accordance with an illustrative embodiment;

FIG. 25 is an illustration of a flowchart for controlling the emission of laser beams in points in accordance with an illustrative embodiment;

FIG. 70 is an illustration of flowchart of a process for selectively transmitting radio frequency noise-band signals in accordance with an illustrative embodiment;

FIG. 71 is an illustration of a flowchart of a process for controlling emission a set of one or more laser beams in accordance with an illustrative embodiment;

FIG. 82 is an illustration of a flowchart of a process for transmitting radio frequency noise pulses in accordance with an illustrative embodiment;

FIG. 83 is an illustration of a flowchart of a process for controlling emission of the set of one or more laser in accordance with an illustrative embodiment;

DETAILED DESCRIPTION

Figure 1A:
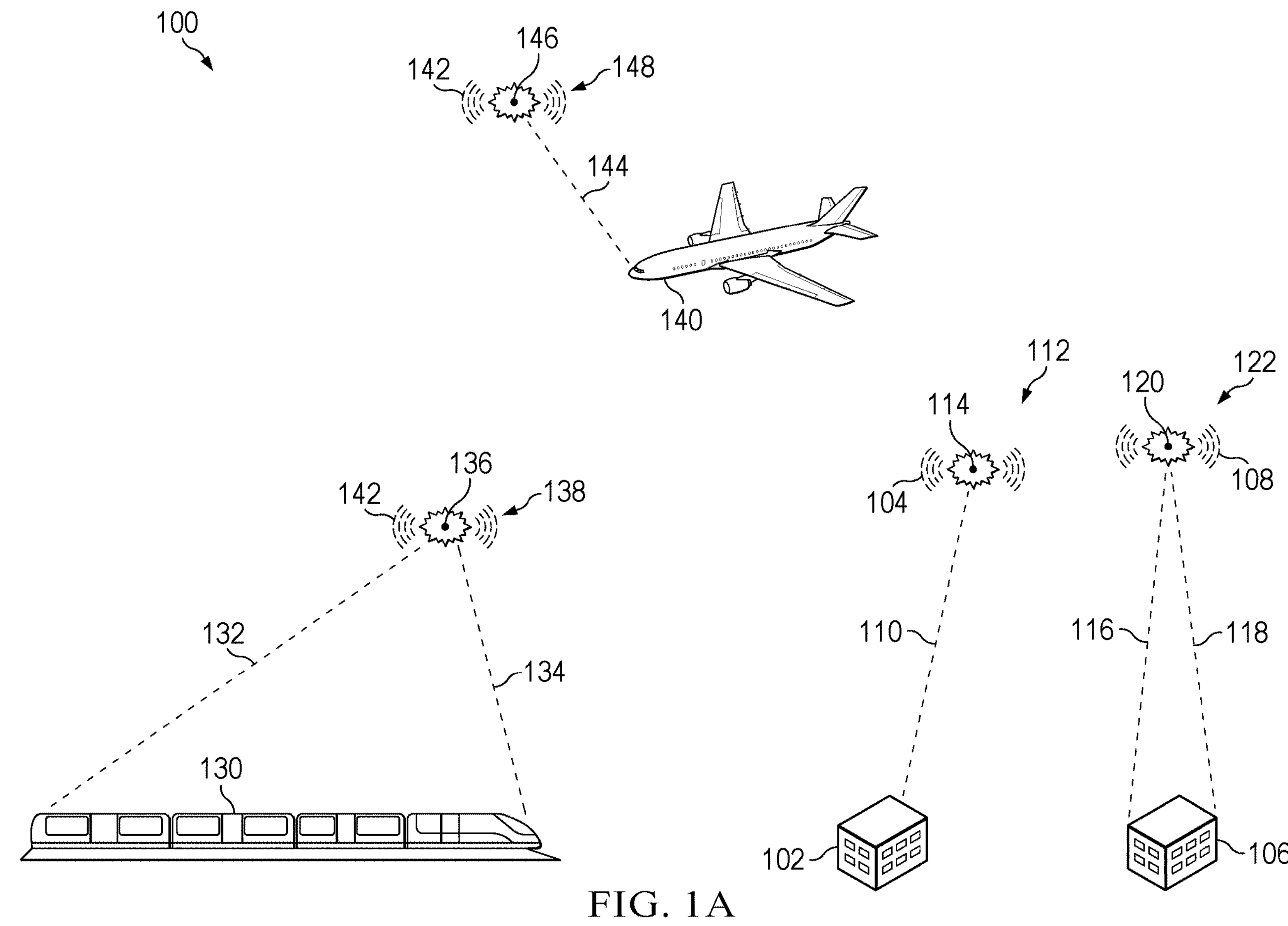
FIG. 1A is a pictorial representation of platforms that can transmit radio frequency signals using non-physical antennas in which illustrative embodiments may be implemented.

The illustrative embodiments recognize and take into account one or more different considerations as described herein. For example, currently used physical antennas for transmitting radio frequency signals are subject to damage or destruction from various causes. For example, adverse weather conditions such as a hurricane or tornado can damage or destroy antennas such as transmission towers for land-based communications. As another example, these physical antennas are also subject to damage or destruction from kinetic attacks.

In other considerations, currently used "plasma antennas" require an ionized column of air or water which is not readily relocatable or easily repositioned. Plasma antennas also require a coupling mechanism to modulate the ionized plasma column as if it were a traditional conductive antenna. Plasma antennas also must use traditional modulation techniques of sinusoidal, pseudorandom, and/or other repeating carrier signals which may be easily detected and decoded.

As used herein, the phrase "and/or" when used with a list of items means different combinations of one or more of the listed items can be used and only one of each item in the list can be needed. In other words, "and/or" when used with a list of items means any combination of items and number of items can be used from the list, but not all of the items in the list are required. The item can be a particular object, thing, or a category. For example, without limitation, item A, item B, and/or item C" can mean solely item A, solely item B, solely item C, both items A and B, both items B and C, both items A and C, or all three items A and B and C.

Thus, the illustrative embodiments provide a method, apparatus, system, and computer program product for transmitting radio frequency signals without hardware such as transmission towers and physical antenna structures. In one or more illustrative examples we provide a non-physical radio frequency antenna that is impervious to adverse environmental conditions and kinetic attack. These illustrative embodiments provide a method, apparatus, system, and computer program product for transmitting radio frequency signals without plasma antennas and/or ionized columns of air or water, without coupling mechanisms, and without the need for periodic, repeating, sinusoidal, and/or pseudorandom carrier waves with classical modulation schemes based on these periodic, repeating, sinusoidal, and/or pseudorandom carrier waves. Further, these non-physical radio frequency antennas can be more difficult to detect.

These transmitters can be positioned away from airplanes, transport, installations, buildings, or other physical locations that are subject to attack or undesired environmental conditions.

In the illustrative examples, radio frequency transmissions are transmitted by using laser beams that induce, cause, and/or control optical breakdowns to generate and control the radio frequency transmissions. In this illustrative example, the optical breakdowns create plasma that generates the radio frequency signals including radio frequency noise. These optical breakdown points where the optical breakdowns occur are the points of origination for transmitting the radio frequency signals and/or radio frequency noise. These optical breakdown points also may be used for transmission in the range of light frequencies, either visible and/or non-visible light.

With reference now to the figures and, in particular, with reference to FIG. 1A, a pictorial representation of platforms that can transmit radio frequency signals using non-physical antennas is depicted in which illustrative embodiments may be implemented. As depicted, radio frequency signals can be transmitted from various platforms as depicted in this figure.

As depicted, ground station 102 can transmit radio frequency signals 104 without using a physical antenna. In a similar fashion, ground station 106 can also transmit radio frequency signals 108 without using a physical antenna.

In this example, laser beams are used by these ground stations to transmit the radio frequency signals. For example, ground station 102 emits laser beam 110 in a manner that causes optical breakdown 112 at optical breakdown point 114. Radio frequency signals 104 are generated at and transmitted from optical breakdown point 114.

In this example, ground station 106 emits laser beam 116 and laser beam 118 at optical breakdown point 120 to cause optical breakdown 122. In this example, two laser beams are used to cause optical breakdown 122 that results in transmission of radio frequency signals 108.

This type of transmission can be used from other platforms such as train 130. In this example, train 130 emits laser beam 132 and laser beam 134 from different physical locations on train 130 at optical breakdown point 136. The intersection of these two laser beams at optical breakdown point 136 causes optical breakdown 138. As a result, radio frequency signals 142 are transmitted in response to optical breakdown 138 at optical breakdown point 136.

As another example, airplane 140 transmits radio frequency signals 142 using laser beam 144. As depicted, laser beam 144 is emitted from airplane 140 at optical breakdown point 146. Optical breakdown 148 occurs at optical breakdown point 146 which results in the transmission of radio frequency signals 142.

Figure 1B:
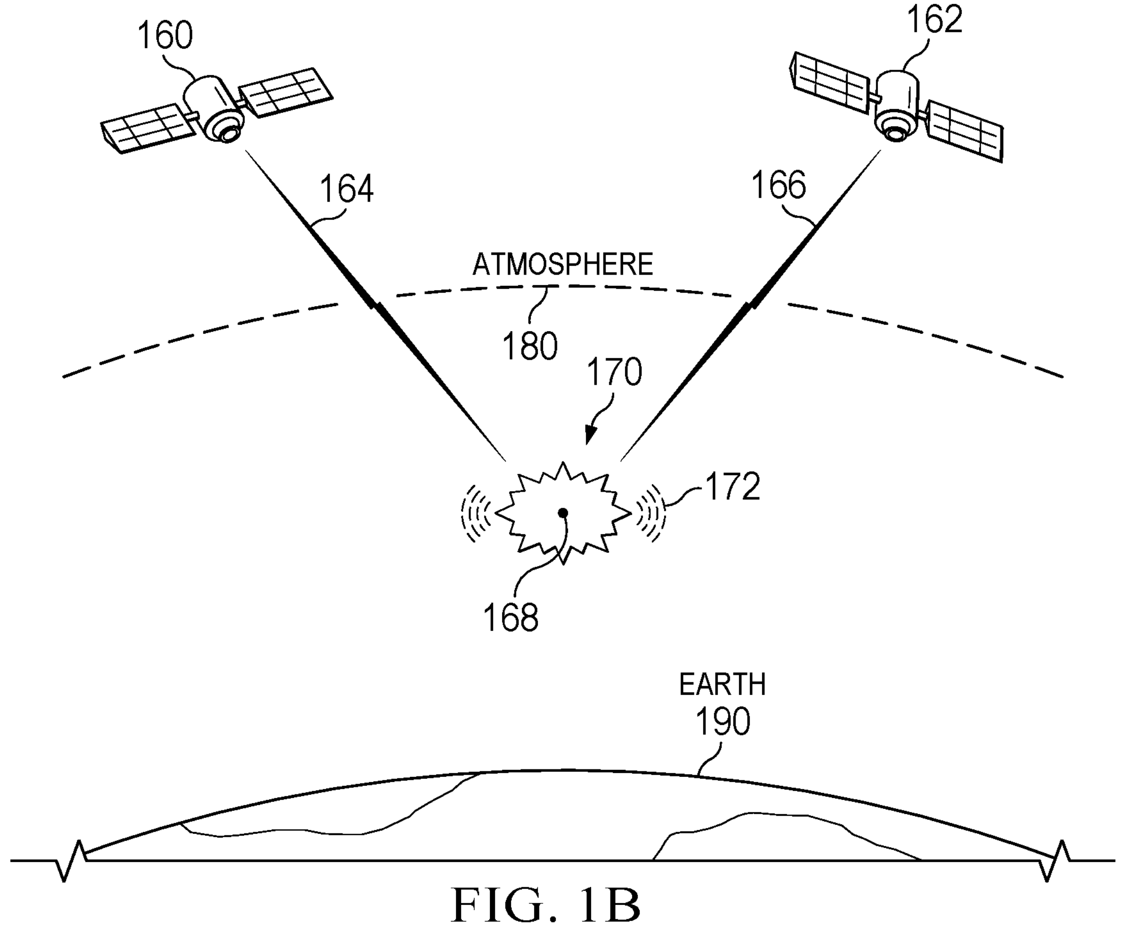
FIG. 1B is a pictorial representation of platforms that can transmit radio frequency signals using non-physical antennas from space in which illustrative embodiments may be implemented.

Turning now to FIG. 1B, a pictorial representation of platforms that can transmit radio frequency signals using non-physical antennas from space in which illustrative embodiments may be implemented. As another example, in FIG. 1B, satellite 160 emits laser 164 from space into the atmosphere 180 above earth 190 while satellite 162 emits laser 166 from space into the atmosphere 180 such that laser 164 and laser 166 intersect at optical breakdown point 168 causing optical breakdown 170 which results in radio frequency signals 172 originating and emanating from optical breakdown point 168.

Figure 1C:
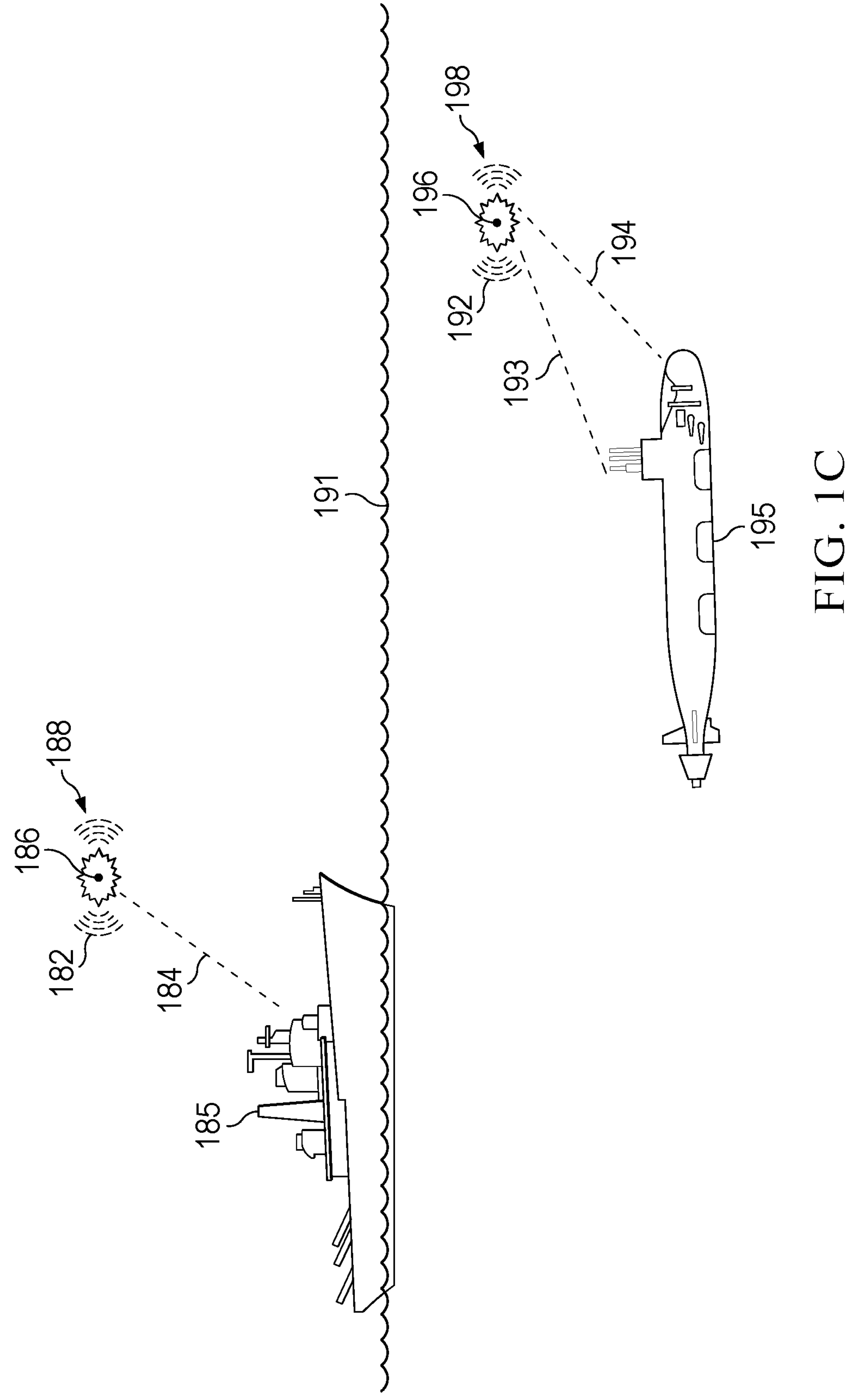
FIG. 1C is a pictorial representation of platforms that can transmit radio frequency signals using non-physical antennas on, in, or under water in which illustrative embodiments may be implemented.

Turning now to FIG. 1C, a pictorial representation of platforms that can transmit radio frequency signals using non-physical antennas on, in, or under water 191 in which illustrative embodiments may be implemented. In this example, ship 185 emits laser beam 184 from ship 185 in a manner that at least one of causes or controls optical breakdown 188 at optical breakdown point 186. As a result, radio frequency signals 182 as well as light emissions are transmitted in response to optical breakdown 188 at optical breakdown point 186.

As another example, submarine 195 emits laser beam 193 and laser beam 194 from different physical locations on submarine 195. The intersection of these two laser beams at optical breakdown point 196 causes optical breakdown 198 which results in the transmission of radio frequency signals 192 as well as underwater light emissions, including visible and non-visible light frequencies.

As depicted, these radio frequency signals are generated without using physical antennas to transmit signals. Further, these radio frequency signals are transmitted at physical locations away from the platforms. As a result, identifying the platforms generating these radio frequency signals can be more difficult because antennas for transmitting the radio frequency signals are not visible. Further, tracking the physical location of where the radio frequency signals are generated does not provide identification of the platform or the platform physical location, nor the physical location of the communications system, computer system, communications manager, or the laser origination points in these examples.

The physical locations of these optical breakdowns are considered radio frequency source emitters that can be in remote physical locations from the platforms emitting the laser beams. As a result, identifying the physical locations of the platforms becomes more difficult with the absence of physical antennas. Note that these optical breakdowns are distinguished from "plasma antennas" or ionized air or water columns.

Illustration of the different platforms in radio frequency communications environment 100 are only provided as examples of platforms that can implement this type of radio frequency signal transmission. In other illustrative examples, other platforms in addition to or in place of these platforms can be used. For example, this type of radio frequency generation can be implemented in a surface ship, a car or truck, a cruise missile, an aerial vehicle, a tank, a submersible sensor, or some other suitable type of platform in other illustrative examples.

Figure 2:
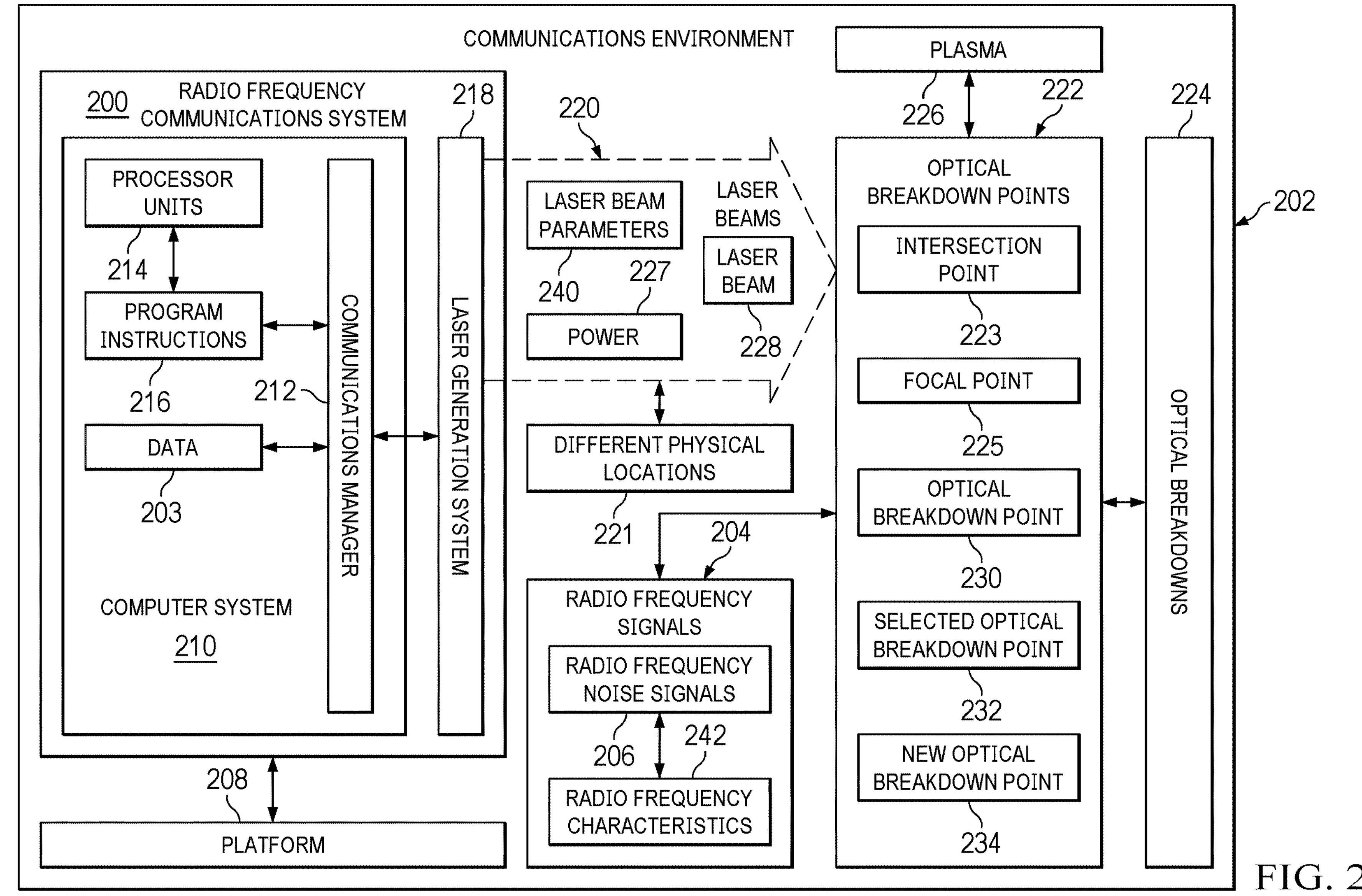
FIG. 2 is an illustration of a block diagram of a radio frequency communications environment in accordance with an illustrative embodiment.

With reference now to FIG. 2, an illustration of a block diagram of a radio frequency communications environment is depicted in accordance with an illustrative embodiment. In this illustrative example, radio frequency communications system 200 in communications environment 202 can communicate data 203 by using radio frequency signals 204 in the form of radio frequency noise signals 206.

Data 203 can take a number of different forms. For example, data 203 can be a document, a spreadsheet, sensor data, an image, a video, and email message, a text message, a webpage, a table, a data structure, serial data, commands, or other types of data that is to be transmitted or communicated. Data can also be analog or digital information and/or data. Analog and digital information and/or data can include, for example, music and audio.

In one illustrative example, a noise signal is a signal with irregular fluctuations that are or appear to be at least one of random, non-predictable, or non-deterministic.

Further, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combinations of these items can be present. In some illustrative examples, "at least one of" can be, for example, without limitation, two of item A; one of item B; and ten of item C; four of item B and seven of item C; or other suitable combinations.

A noise signal can be a signal that is statistically random. For example, a noise signal in these examples can be a signal that meets one or more standard tests for statistical randomness. A pseudorandom noise signal that seems to lack any definite pattern, although consisting of a deterministic sequence of pulses that repeats itself after its period is an example of a signal that is statistically random and considered a noise signal that can be used to encode data. Thus, a noise signal can be non-predictable.

In this example, radio frequency noise signals 206 are electromagnetic noise signals that can have a frequency from around 20 kHz to above the Terahertz range. Radio frequency noise signals can include signals with frequencies such as extremely low frequency (ELF), high frequency (HF), and other types of frequencies. These noise signals can also include microwave noise signals and Terahertz noise signals. Electromagnetic noise signals can also be optical noise in the visible range, infrared, ultraviolet X-rays and other types of noise signals that can be used as modulated noise. For example, lasers used at optical breakdown may also transmit various ranges of noisy light in addition to noisy broadband radio frequencies. Modulating this noisy light with different techniques such as pulse noise modulation is included in this disclosure.

In this illustrative example, radio frequency communications system 200 is associated with platform 208. Platform 208 is an object that can transmit radio frequency noise signals 206 using radio frequency communications system 200.

Platform 208 can take a number of different forms. For example, platform 208 can be one of a mobile platform, a stationary platform, a land-based structure, an aquatic-based structure, and a space-based structure. More specifically, the platform can be a surface ship, a tank, a personnel carrier, a train, an airplane, a commercial airplane, a spacecraft, a space station, a satellite, a submarine, an automobile, a ground station, a power plant, a bridge, a dam, a house, a manufacturing facility, a building, and other suitable platforms.

In this illustrative example, radio frequency communications system 200 comprises computer system 210 and communications manager 212. In this example, communications manager 212 is located in computer system 210.

As used herein, "a number of" when used with reference to items, means one or more items. For example, "a number of different forms" is one or more different forms.

Communications manager 212 can be implemented in software, hardware, firmware or a combination thereof. When software is used, the operations performed by communications manager 212 can be implemented in program instructions configured to run on hardware, such as a processor unit. When firmware is used, the operations performed by communications manager 212 can be implemented in program instructions and data and stored in persistent memory to run on a processor unit.

When hardware is employed, the hardware may include circuits that operate to perform the operations in communications manager 212. The circuits used to implement communications manager 212 can take other forms in addition to or in place of a processor unit.

In the illustrative examples, the hardware used to implement communications manager 212 can take a form selected from at least one of a circuit system, an integrated circuit, an application-specific integrated circuit (ASIC), a programmable logic device, or some other suitable type of hardware configured to perform a number of operations. With a programmable logic device, the device can be configured to perform a number of operations. The device can be reconfigured at a later time or can be permanently configured to perform the number of operations. Programmable logic devices include, for example, a programmable logic array, a programmable array logic, a field-programmable logic array, a field-programmable gate array, and other suitable hardware devices. Additionally, the processes can be implemented in organic components integrated with inorganic components and can be comprised entirely of organic components excluding a human being. For example, the processes can be implemented as circuits in organic semiconductors.

Computer system 210 is a physical hardware system and includes one or more data processing systems. In this illustrative example, the data processing systems are hardware machines that can be configured to perform a sequence of operations. These operations can be performed in response to receiving an input in generating and output based on performing the operations. This output can be data in the form of values, commands, or other types of data. When more than one data processing system is present in computer system 210, those data processing systems are in communication with each other using a communications medium. The communications medium may be a network. The data processing systems may be selected from at least one of a computer, a server computer, a tablet, or some other suitable data processing system.

As depicted, computer system 210 includes a number of processor units 214 that are capable of executing program instructions 216 implementing processes in the illustrative examples. In other words, program instructions 216 are computer-readable program instructions.

As used herein, a processor unit in the number of processor units 214 is a hardware device and is comprised of hardware circuits such as those on an integrated circuit that respond and process instructions and program code that operate a computer. When the number of processor units 214 executes program instructions 216 for a process, the number of processor units 214 can be one or more processor units that are on the same computer or on different computers. In other words, the process can be distributed between processor units 214 on the same or different computers in a computer system 210.

Further, the number of processor units 214 can be of the same type or different type of processor units. For example, a number of processor units 214 can be selected from at least one of a single core processor, a dual-core processor, a multi-processor core, a general-purpose central processing unit (CPU), a graphics processing unit (GPU), a digital signal processor (DSP), or some other type of processor unit.

As depicted, radio frequency communications system 200 can also include laser generation system 218. In other examples, laser generation system 218 can be considered a separate component controlled by radio frequency communications system 200.

In this example, laser generation system 218 is a hardware system that can emit a set of laser beams 220. The operation of laser generation system 218 can be controlled by communications manager 212.

In this example, the set of laser beams 220 can be emitted from different physical locations 221. For example, laser generation system 218 can be comprised of laser units that are positioned in different physical locations. Each physical location can have one or more laser units for laser generation system 218 in this illustrative example.

Communications manager 212 can identify data 203 for transmission using radio frequency noise signals 206. Communications manager 212 controls an emission of a set of laser beams 220. In this example, communications manager 212 directs or steers the set of laser beams 220 at a set of optical breakdown points 222. In this example, the set of optical breakdown points 222 can be selected from at least one of intersection point 223 or focal point 225.

As used herein, "a set of" when used with reference to items, means one or more items. For example, "a set of optical breakdown points 222" is one or more of optical breakdown points 222. In another example, a "set of laser beams" means one or more laser beams.

In this example, intersection point 223 can be a physical location where two or more laser beams intersect. This physical location can be where an optical breakdown occurs from the intersection of two or more laser beams when the power 227 of two or more intersecting laser beams is sufficient to cause an optical breakdown. Focal point 225 can be a physical location where the laser beam is focused to cause an optical breakdown to occur at that physical location.

This emission of the set of laser beams 220 is controlled by communications manager 212 to cause optical breakdowns 224 at the set of optical breakdown points 222 that generate radio frequency noise signals 206 encoding data 203. In this illustrative example, plasma 226 occurs at optical breakdown points 222 in response to optical breakdowns 224 by the set of laser beams 220. This plasma generated by optical breakdowns 224 causes radio frequency noise signals 206 to be transmitted at the set of optical breakdown points 222.

In this example, power 227 of laser beam 228 in the set of laser beams 220 at optical breakdown point 230 in the set of optical breakdown points 222 can be controlled using different mechanisms. For example, power 227 can be controlled by at least one of a shutter, a lens, a deformable lens, a microelectromechanical systems mirror, an attenuator, a controlling optics, an optical filter, an amplitude modulator in a laser beam generator, or other device.

In this illustrative example, communications manager 212 can control the emission of the set of laser beams 220 by laser generation system 218 in a number of different ways. For example, communications manager 212 can control laser generation system 218 to emit a first number of the set of laser beams 220 continuously at the set of optical breakdown points 222. Communications manager 212 can control laser generation system 218 to pulse a second number of the set of laser beams 220 at the set of optical breakdown points 222 to cause optical breakdowns 224 that generate radio frequency noise signals 206 encoding data 203. The laser beam can be pulsed by turning the laser beam on and off. In another example, a laser beam can be pulsed by varying the power of the laser beam. In other words, the power can be pulsed by increasing and decreasing the power of the laser beam.

In another illustrative example, communications manager 212 can control laser generation system 218 to emit the set of laser beams 220 at the set of optical breakdown points 222 causing optical breakdowns 224 that generate radio frequency noise signals 206 encoding data 203.

In this example, the emission of the set of laser beams 220 can be performed in a number of different ways. The set of laser beams can be emitted as at least one of pulsed or continuous. For example, one laser beam can be continuous while another laser beam is pulsed. Further, the laser beams can be originated from different directions at the set of optical breakdown points 222.

The direction at which a laser beam is emitted can move or sweep back such that an optical breakdown point is included during the movement of the laser beam. In other words, during the sweeping of the laser beam the laser beam can intersect with another laser beam. The intersection of this laser beam with another laser beam emitted the optical breakdown point can cause the optical breakdown at that optical breakdown point.

In another illustrative example, communications manager 212 can control laser generation system 218 to emit the set of laser beams 220 at selected optical breakdown point 232 in the set of optical breakdown points 222. Communications manager 212 can select new optical breakdown point 234 in the set of optical breakdown points as the selected optical breakdown point. Communications manager 212 can repeat emitting the set of laser beams 220 and selecting the new optical breakdown point while generating radio frequency noise signals 206 encoding data 203.

In yet another illustrative example, communications manager 212 can control laser generation system 218 to emit the set of laser beams 220 from different physical locations 221 at optical breakdown point 230. In this example, a portion of the set of laser beams 220 intersect at optical breakdown point 230 such that power 227 from the portion of the set of laser beams 220 is sufficient to cause optical breakdowns 224 at intersection point 223 that generate radio frequency noise signals 206 encoding data 203.

As another example, communications manager 212 can control laser generation system 218 to emit the set of laser beams 220 at optical breakdown point 230. In this example, optical breakdowns 224 occur in response to all of the set of laser beams 220 intersecting at optical breakdown point 230.

In controlling the emission of the set of laser beams 220, communications manager 212 can change a set of laser beam parameters 240 for the set of laser beams 220 to encode data 203 into radio frequency noise signals 206 or visible and/or non-visible light. Laser beam parameters 240 include but are not limited to pulse durations, pulse repetition rate, beam diameter, beam profile (temporal and spatial), optical focal length, pulse shape, power, frequency, wavelength, directivity, gain, efficiency, and physical properties of propagation media such as index of refraction. In this example, changing the set of laser beam parameters 240 changes a set of radio frequency characteristics 242 for radio frequency noise signals 206 or visible and/or non-visible light. The set radio frequency characteristics 242 for radio frequency noise signals 206 can be selected from at least one of a timing, an optical breakdown point, an amplitude of the radio frequency noise signals, a frequency band, a relative phase, or other characteristics for radio frequency noise signals 206.

In yet another illustrative example, communications manager 212 can control laser generation system 218 to emit a subset of the set of laser beams 220 at the set of optical breakdown points 222 to cause the optical breakdowns 224 that generates radio frequency noise signals 206 encoding data 203. Communications manager 212 can select a new subset of the set of laser beams 220 as the subset of laser beams 220. Communications manager 212 can repeat emitting of the subset of the set of laser beams 220 and selecting the new subset of the set of laser beams 220 while transmitting radio frequency noise signals 206 encoding the data 203.

Thus, one or more illustrative examples enable transmitting radio frequency noise signals using radio frequency source emitters that do not require physical structures. As a result, one or more illustrative examples can overcome an issue with the vulnerability present in using physical source emitters such as antennas. In the illustrative examples, the optical breakdown points for the optical breakdowns are radio frequency source emitters.

Further, these radio frequency source emitters can be moved almost instantaneously to different physical locations by repositioning the laser beams such that the laser beams point at different optical breakdown points. Attacks at these radio frequency source physical locations are attacks at the optical breakdown points where the plasma is generated. As a result, kinetic attacks against these physical locations are useless because the laser modulation sources are remote from the physical locations of these radio frequency source emitters.

The illustration of communications environment 202 to in FIG. 2 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, although communications manager 212 is shown as being implemented using program instructions 216 run on a number of processor units 214 in computer system 210, communications manager 212 can be implemented in other hardware instead of or in addition to the number of processor units 214. For example, computer system 210 may use other hardware in addition to or in place of the number of processor units 214.

For example, other types of hardware circuits capable of performing the operations for communications manager 212 can be used. This other hardware can be at least one of a circuit system, an integrated circuit, an application-specific integrated circuit (ASIC), a programmable logic device, or some other suitable type of hardware configured to perform a number of operations.

Figure 3:
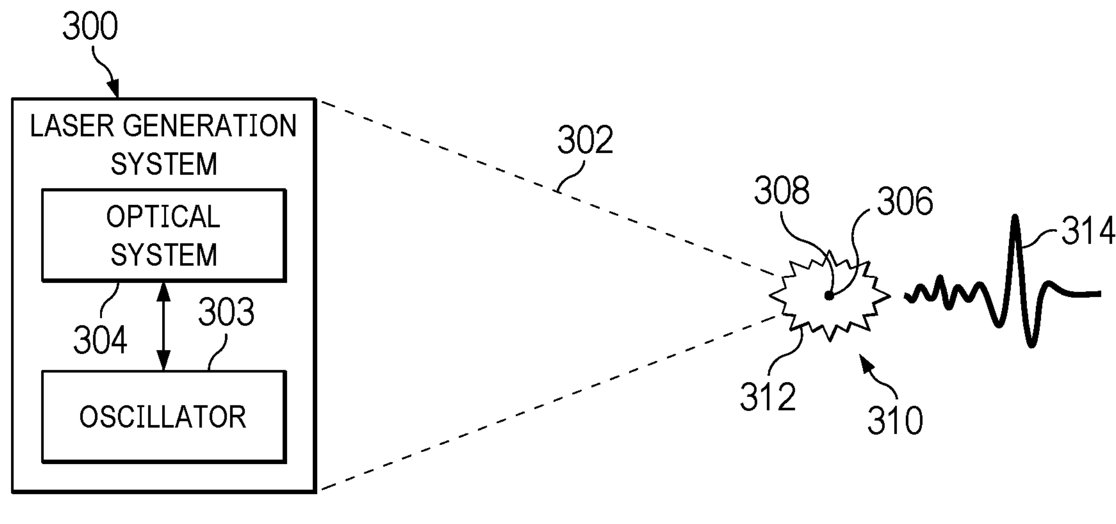
FIG. 3 is an illustration of radio frequency noise generation using a laser beam in accordance with an illustrative embodiment.

Turning next to FIG. 3, an illustration of radio frequency noise generation using a laser beam is depicted in accordance with an illustrative embodiment. This depicted example in FIG. 3 illustrates how a single laser beam can be used to generate radio frequency signals.

In this illustrative example, laser generation system 300 is an example of laser generation system 218 in FIG. 2. Laser generation system 300 emits laser beam 302.

As depicted, laser generation system 300 comprises a number of different components. In this example, laser generation system 300 includes oscillator 303 and optical system 304.

Oscillator 303 generates coherent light for emitting laser beam 302. In this example, optical system 304 can focus laser beam 302. Optical system 304 includes at least one of a lens, a mirror, or other optical element that can change the focus of laser beam 302.

In this example, the focus of laser beam 302 is controlled such that the power at focal point 306 is an optical breakdown point 308 where optical breakdown 310 occurs. As depicted in this example, optical breakdown 310 results in the generation of plasma 312. Plasma 312 resulting from optical breakdown 310 causes the generation of radio frequency noise signal 314. Thus, this example illustrates how a single laser beam can be used to generate radio frequency signals.

Figure 4:
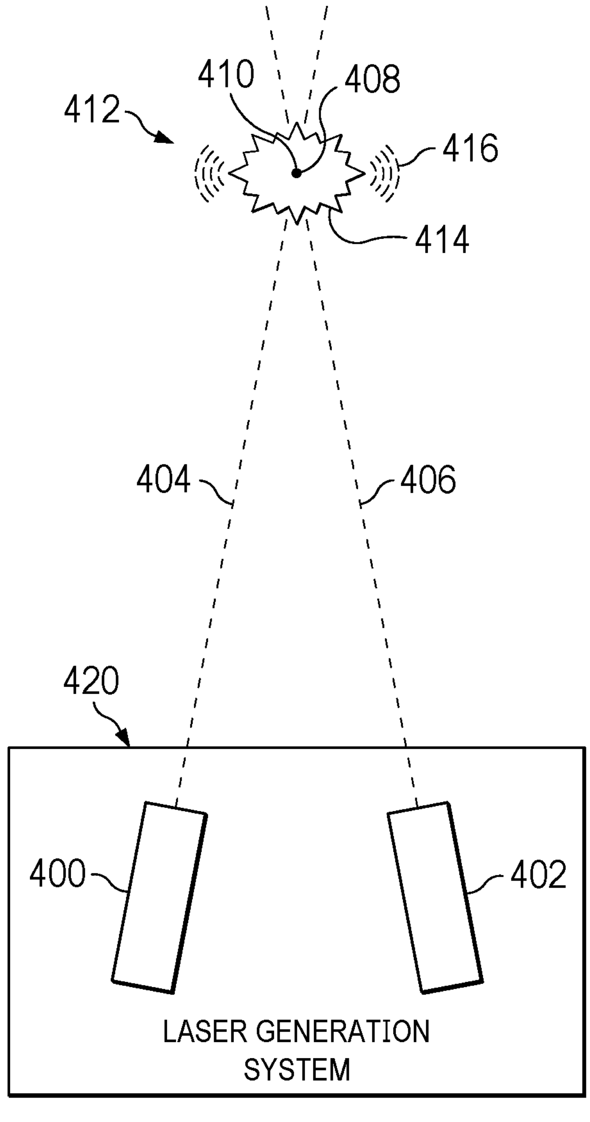
FIG. 4 is an illustration of radio frequency noise generation using a plurality of laser beams in accordance with an illustrative embodiment.

Turning next to FIG. 4, an illustration of radio frequency noise generation using a plurality of laser beams is depicted in accordance with an illustrative embodiment. In this illustrative example, laser generation system 420 comprises laser unit 400 and laser unit 402. Laser generation system 420 is an example of an implementation for laser generation system 218 in FIG. 2.

In this illustrative example, laser unit 400 generates first laser beam 404. Laser unit 402 generates second laser beam 406.

In this example, first laser beam 404 and second laser beam 406 are emitted in directions from these laser beam units to intersect at optical breakdown point 408. These two laser beams are emitted along different paths that intersect at optical breakdown point 408. This optical breakdown point where the two laser beams intersect each other is intersection point 410.

In this example, the intersection of first laser beam 404 and second laser beam 406 results in optical breakdown 412. This optical breakdown generates plasma 414. As depicted in this example, optical breakdown 412 results in radio frequency noise signals 416.

As depicted in the example, optical breakdown 412 occurs where first laser beam 404 and second laser beam 406 intersect at intersection point 410. In this example, the power for first laser beam 404 and second laser beam 406 individually is not sufficient to cause an optical breakdown.

The illustration of the two laser units for laser generation system 420 in FIG. 4 is provided as an example of one implementation for generating radio frequency noise signals. This illustration is not meant to limit the manner in which other illustrative examples can be implemented. In another example, one or more laser units in addition to laser unit 400 and laser unit 402 can be used to generate additional laser beams. The laser beams can also intersect at intersection point 410 to cause optical breakdown 412.

Figure 5:
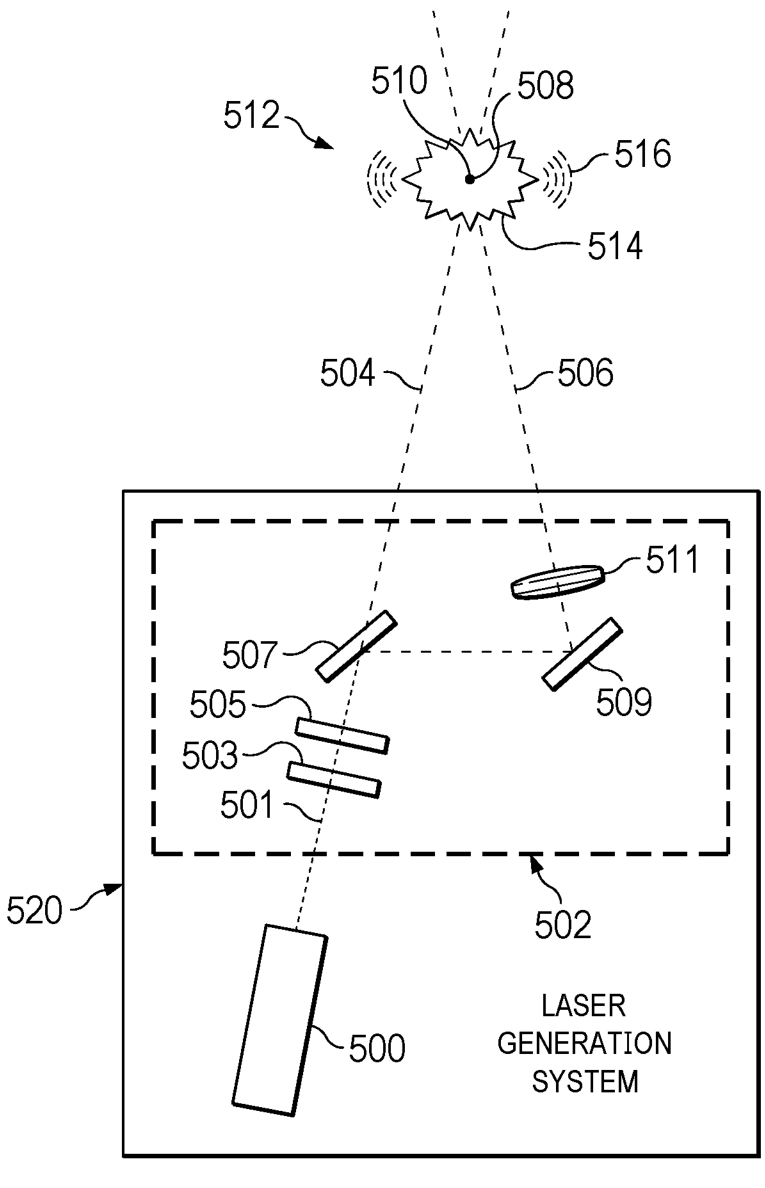
FIG. 5 is an illustration of radio frequency noise generation using a plurality of laser beams in accordance with an illustrative embodiment.

Turning next to FIG. 5, an illustration of radio frequency noise generation using a plurality of laser beams is depicted in accordance with an illustrative embodiment. In this illustrative example, laser generation system 520 comprises laser unit 500 and optical system 502. Laser generation system 520 is an example of an implementation for laser generation system 218 in FIG. 2.

In this example, laser unit 500 emits first laser beam 504 and second laser beam 506. In this example, laser unit 500 generates initial laser beam 501 that is split into two laser beams, first laser beam 504 and second laser beam 506 by optical system 502.

As depicted, optical system 502 comprises a number of different components. In this depicted example, optical system 502 comprises shutter 503, variable attenuator 505, beam splitter 507, mirror 509, and lens 511.

The components depicted are example components that can be used in optical system 502 and can change in other illustrative examples. For example, one or more of lens 511, variable attenuator 505, and shutter 503 may be omitted in other illustrative examples. In yet other illustrative examples, other components may be added such as a lens located before beam splitter 507.

As depicted, initial laser beam 501 is split into two laser beams by beam splitter 507. Mirror 509 can be used to direct second laser beam 506 in different directions. Further, mirror 509 can be used to provide focus to increase the power of second laser beam 506 at a focal point such as optical breakdown point 508. Lens 511 also can be used to provide focus to increase the power of second laser beam 506 at optical breakdown point 508.

In this example, first laser beam 504 and second laser beam 506 are emitted in directions to intersect at optical breakdown point 508, which is intersection point 510 in this example. Optical breakdown 512 occurs at this intersection of first laser beam 504 and second laser beam 506, generating plasma 514 that results in the generation of radio frequency noise signals 516.

In this example, the power of first laser beam 504 and second laser beam 506 are sufficient to cause optical breakdown 512 at the intersection of the laser beams. Optical breakdowns do not occur in other physical locations where these laser beams do not intersect each other in this example.

Figure 6:
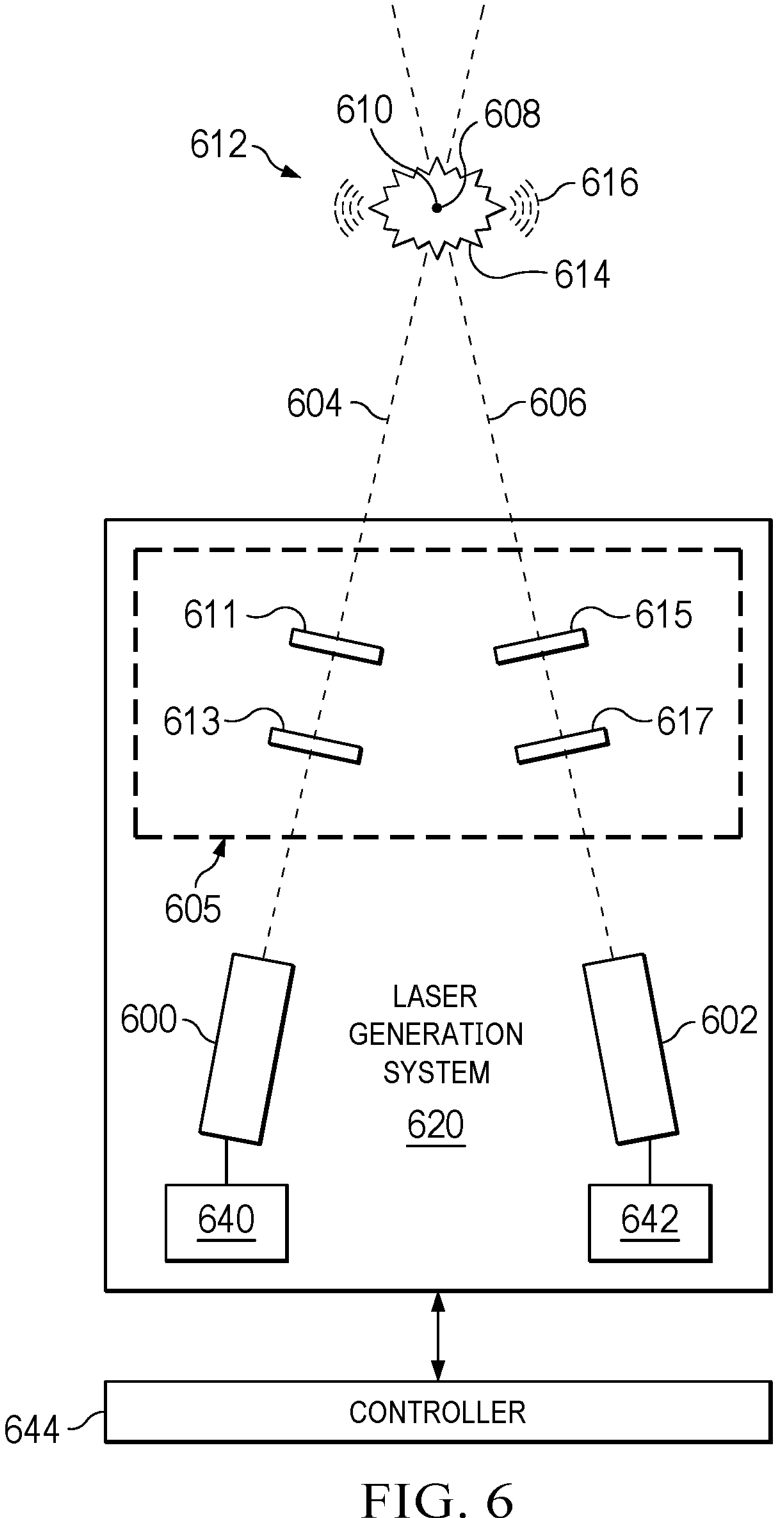
FIG. 6 is an illustration of a diagram for controlling radio frequency noise generation in accordance with an illustrative embodiment.

With reference now to FIG. 6, an illustration of a diagram for controlling radio frequency noise generation is depicted in accordance with an illustrative embodiment. In this illustrative example, the operation of laser generation system 620 is controlled by controller 644. As depicted, laser generation system comprises laser unit 600, laser unit 602, first power source 640, second power source 642, and optical system 605. In this example, controller 644 can control the operation of laser generation system 620.

In this example, laser generation system 620 is an example of an implementation for laser generation system 218 in FIG. 2. Controller 644 is an example a component that can be implemented in communications manager 212 in FIG. 2.

In this illustrative example, controller 644 can control the emission of first laser beam 604 and second laser beam 606 from laser generation system 620. In this illustrative example, laser unit 600 generates first laser beam 604 using power supplied by first power source 640. Laser unit 602 generates second laser beam 606 using power supplied by second power source 642.

In this example, first laser beam 604 and second laser beam 606 are emitted in directions that have paths that intersect at optical breakdown point 608, which is intersection point 610. Optical breakdown 612 occurs at this intersection of first laser beam 604 and second laser beam 606, generating plasma 614 that results in the transmission of radio frequency noise signals 616.

In this example, controller 644 can control the emission of these laser beams such that at least one of first laser beam 604 or second laser beam 606 is pulsed. This pulsing can include at least one of turning a laser beam on and off for increasing and decreasing the power of the laser beam. This pulsing of one or both of first laser beam 604 and second laser beam 606 can be controlled to control the timing of radio frequency noise generation.

When pulsed, optical breakdown 612 occurs when both laser beams intersect at intersection point 610. When one laser beam is turned off, and intersection is not present between both laser beams and optical breakdown 612 does not occur. By controlling the timing of when first laser beam 604 and second laser beam 606 intersect at intersection point 610, controller 644 can control the generation of radio frequency noise signals in a manner that encodes at least one of information or data.

For example, data can be encoded in radio frequency noise signals based on the timing of when radio frequency noise signals are generated. As another example, the timing of the laser beams can be used to control the duration of radio frequency noise signals. This duration can also be used to encode data into the radio frequency noise signals.

In this illustrative example, controller 644 can control whether a laser unit emits a continuous laser beam or a pulsed laser beam using components such as first power source 640 and second power source 642. These power sources can be turned on and off to turn the laser beams on and off. With this pulsing, optical breakdowns occur when both laser beams are on and intersect at intersection point 610.

In this example, the pulsing can also include increasing and decreasing the power in one or both of first laser beam 604 and second laser beam 606. In this example, decreasing the power of one or both laser beams can prevent the occurrence of an optical breakdown because of insufficient power being present when first laser beam 604 and second laser beam 606 intersect at intersection point 610. Optical breakdown 612 occurs when the power present from both laser beams intersecting at intersection point 610 is high enough for an optical breakdown.

As another example, the pulsing of the laser beams can also be controlled using optical elements in optical system 605. These optical elements can be controlled by controller 644 to pulse one or more of first laser beam 604 and second laser beam 606.

For example, variable attenuator 611 and shutter 613 can be operated to pulse first laser beam 604. For example, shutter 613 can be used to selectively emit first laser beam 604. Variable attenuator 611 can be used to change the power of first laser beam 604. In similar fashion, the emission of second laser beam 606 can also be pulsed using variable attenuator 615 and shutter 617.

Thus, the emission of first laser beam 604 and second laser beam 606 from laser generation system 620 can be controlled by controller 644 such that both laser beams are continuous, one laser beam is continuous while the other laser beam is pulsed, or both laser beams are pulsed. This control can be performed to achieve optical breakdowns to transmit radio frequency noise signals in a manner that encodes data into the radio frequency signals.

The illustration of laser generation system 620 is an example of one implementation and is not meant to limit the manner in which other illustrative examples can be implemented. For example, in other illustrative examples one or more laser units can be present in addition to laser unit 600 and laser unit 602.

Figure 7:
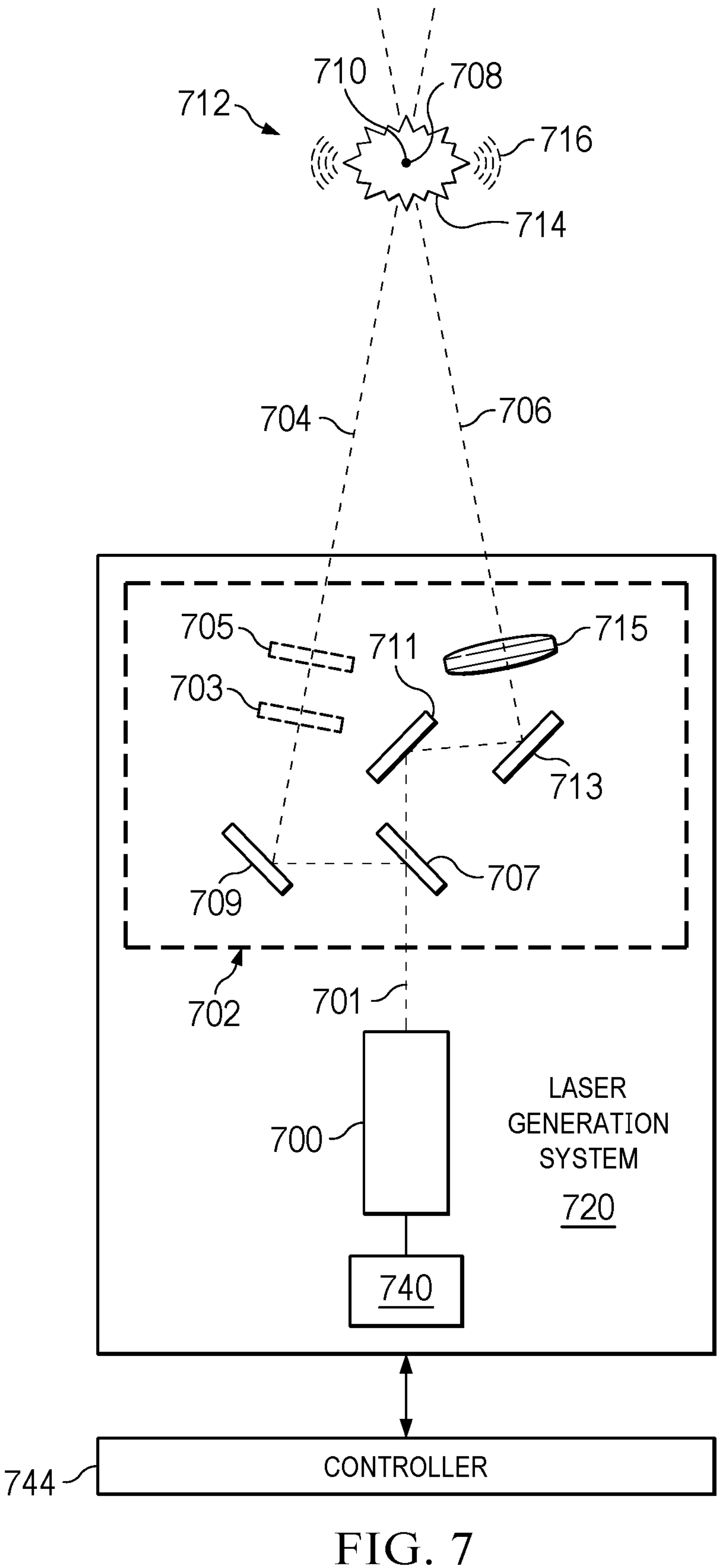
FIG. 7 is an illustration of a diagram for controlling radio frequency noise generation in accordance with an illustrative embodiment.

With reference next to FIG. 7, an illustration of a diagram for controlling radio frequency noise generation is depicted in accordance with an illustrative embodiment. In this illustrative example, laser generation system 720 is controlled by controller 744. As depicted, laser generation system 720 comprises laser unit 700, power source 740, and optical system 702.

Laser generation system 720 is an example of an implementation for laser generation system 218 in FIG. 2. Controller 744 is an example of the components that can be implemented in communications manager 212 in FIG. 2.

In this illustrative example, controller 744 controls the emission of first laser beam 704 and second laser beam 706 from laser generation system 720. In this illustrative example, laser unit 700 generates first laser beam 704 and second laser beam 706 using power supplied by power source 740. In this example, laser unit 700 generates initial laser beam 701 that is split into two laser beams, first laser beam 704 and second laser beam 706 by optical system 702.

As depicted, optical system 702 comprises a number of different components. In this example, optical system 702 comprises shutter 703, variable attenuator 705, beam splitter 707, mirror 709, mirror 711, mirror 713, and lens 715 as other components that can be located in optical system 702. The components depicted are example components that can be used in optical system 702 and these components can change in other illustrative examples. For example, one or more lens 715, variable attenuator 705, and shutter 703 may be omitted in other illustrative examples. In yet other illustrative examples, other components may be included such as a lens located before beam splitter 707.

As depicted, initial laser beam 701 is split into two laser beams by beam splitter 707. In this example, first laser beam 704 and second laser beam 706 are emitted in directions to intersect at optical breakdown point 708, which is intersection point 710 in this example. Optical breakdown 712 occurs at this intersection of first laser beam 704 and second laser beam 706. Optical breakdown 712 generates radio frequency signal 716 through plasma 714 occurring from optical breakdown 712.

In this example, the power of the first laser beam 704 and second laser beam 706 are sufficient to cause optical breakdown 712 at the intersection of the laser beams. Optical breakdowns do not occur in other physical locations where these laser beams do not intersect each other in this example.

In this example, controller 744 can control the emission of these laser beams such that at least one of first laser beam 704 or second laser beam 706 is pulsed. This pulsing can include at least one of turning a laser beam on and off for increasing and decreasing the power of the laser beam. This pulsing of one or both of first laser beam 704 and second laser beam 706 can be controlled to control the timing of radio frequency noise generation.

In this example, first laser beam 704 can be pulsed by controller 744 controlling the operation of at least one of variable attenuator 705 or shutter 703. Variable attenuator 705 can be used to change the power of first laser beam 704. Shutter 703 can turn laser beam on and off with respect to emissions of laser beams from laser generation system 720. In this example, both laser beams can be pulsed at the same time by controlling power source 740. In another illustrative example, components within laser unit 700 such as an amplitude modulator can be controlled to pulse the power of initial laser beam 701 resulting in a pulsing of both first laser beam 704 and second laser beam 706.

By controlling the timing of when first laser beam 704 and second laser beam 706 intersect at intersection point 710, controller 744 can control the generation of radio frequency noise signals in a manner that encodes data.

In yet another illustrative example, controller 744 can control the physical location of optical breakdown point 708 by moving one or both of first laser beam 704 and second laser beam 706. This movement of optical breakdown point 708 can be controlled using at least one of mirror 709 or mirror 713. By moving the physical location of optical breakdown point 708, the phase of radio frequency noise signal can be changed to encode data.

The illustration of example implementations for laser generation system 218 in FIG. 2 and in FIGS. 3-7 have been provided as an example of some illustrative examples and are not meant to limit the manner in which other laser generation systems can be implemented. For example, a laser generation system can include both a first laser unit and a second laser unit with an optical system. In yet another illustrative example, one or more laser units can be present that emit laser beams in addition to the ones depicted at different optical breakdown points. With this example, two or more optical breakdowns can occur from laser beams emitted from a laser generation system.

In yet another illustrative example, different laser beams can be emitted at different times at the same optical breakdown point. As a result, optical breakdowns can be generated from different combinations of laser beams at the same optical breakdown point.

The illustrative embodiments also recognize and take into account that current techniques for transmitting data involves the use of carrier wave forms. For example, many techniques use only periodic, sinusoidal, or other repetitive or predictable carrier wave forms that are modulated to encode data. These types of waveforms can be detected in noise through various techniques including the denoiser technology which can detect sinusoidal carriers at 20 dB to 40 dB below a noise floor.

As a result, interception and decoding of signals can occur using current transmission techniques. Further, when the sinusoidal carriers can be detected, security issues can arise. For example, information can be inserted into transmissions, jamming attacks can occur, or other issues with using single sinusoidal, periodic, or other repetitive carriers to transmit data.

Thus, the illustrative embodiments provide a method, apparatus, and system for transmitting data. In the illustrative examples, this data can be transmitted using various modulation techniques that modulate noise signals. The use of noise signals is in contrast to the use of a sinusoidal, periodic, repetitive, or predictable carrier that can be detected.

Figure 8:
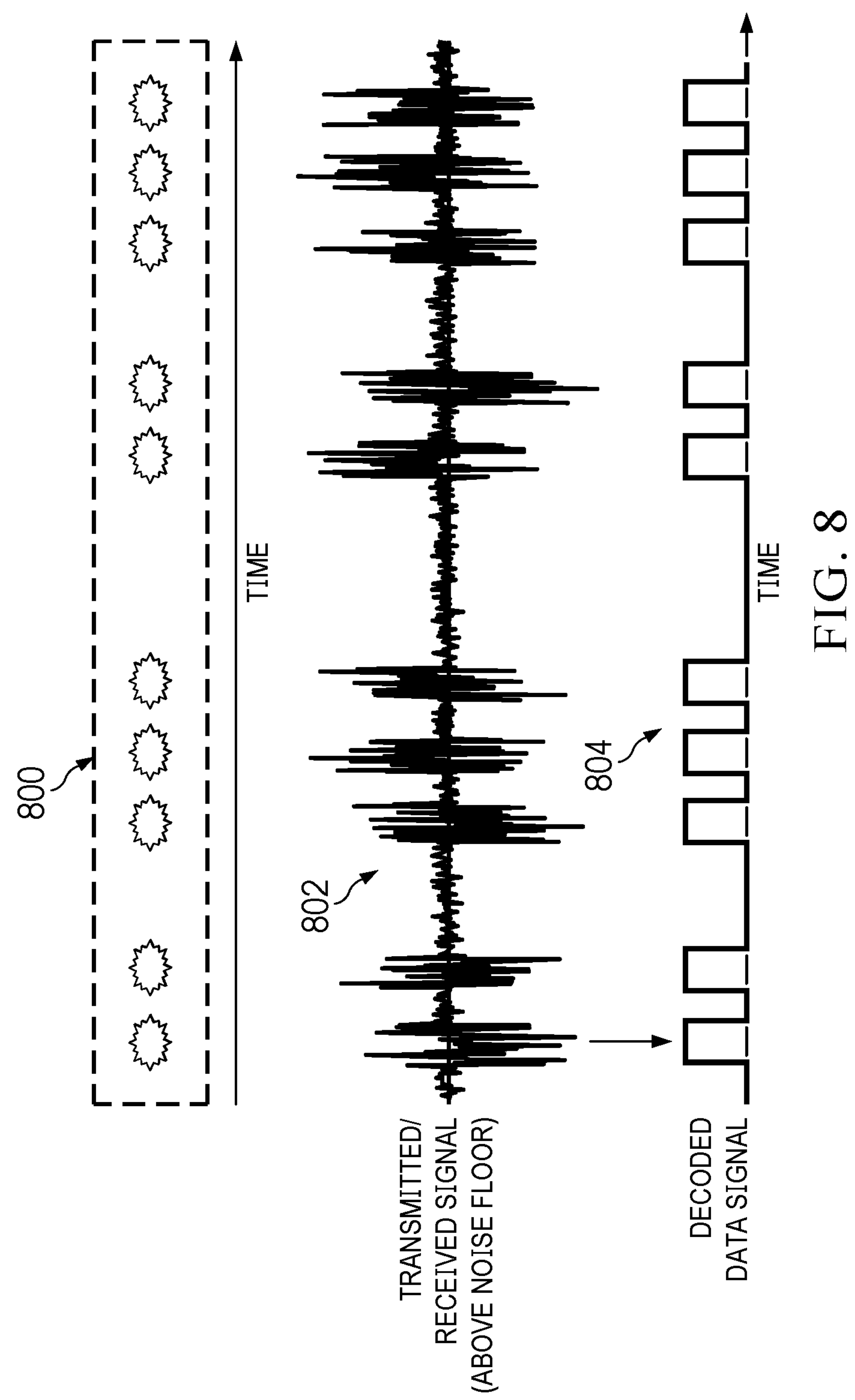
FIG. 8 is an illustration of data transmission using pulse code noise modulation or pulse noise modulation in accordance with an illustrative embodiment.

Turning to FIG. 8, an illustration of data transmission using pulse code noise modulation (also called pulse noise modulation) is depicted in accordance with an illustrative embodiment. In this illustrative example, pulse code noise modulation or pulse noise modulation can be performed using a radio frequency communication system such as radio frequency communications system 200 in FIG. 2.

In this illustrative example, optical breakdowns are generated over time. These optical breakdowns result in the generation of plasma 800 that causes radio frequency noise signals 802 to be transmitted.

The timing of these optical breakdowns can be selected to encode data such that the generation of radio frequency noise signals 802 encode the data. In this example, pulses are present in radio frequency noise signals 802 with timing that corresponds to the timing of optical breakdowns that generated plasma 800. These pulses of radio frequency noise signals 802 are timed to encode data. This type of encoding of data can be referred to as pulse noise modulation. As depicted, radio frequency noise signals 802 can be received and decoded to obtain decoded data signal 804.

This illustration of using radio frequency noise signals generated by optical breakdowns to communicate data is presented as one example of how pulses of radio frequency noise signals can encode data. This illustration is not meant to limit the manner in which other illustrative examples can be implemented.

For example, the pulses of radio frequency noise signals can be generated using other techniques in addition to or in place of laser-induced optical breakdowns. A transmitter system can use a noise signal as a carrier signal and a modulator to modulate the carrier signal such that pulses of radio frequency noise are transmitted that encode the data.

In still other illustrative examples, other types of noise signals in addition to or in place of radio frequency electromagnetic noise signals can be used. For example, noise signals can be used for transmitting data encoded in pulses and can be selected from at least one of electromagnetic frequency noise signals, radio frequency noise signals, microwave frequency signals, audio frequency noise signals, ultrasonic frequency noise signals, ultra-low frequency noise signals, very low frequency noise signals, underwater frequency noise signals, optical frequency noise signals, or other types of noise signals. These different types of noise signals can be used for various applications including speech communication, music, or other types of information for data that that are encoded in the noise signals.

Figure 9:
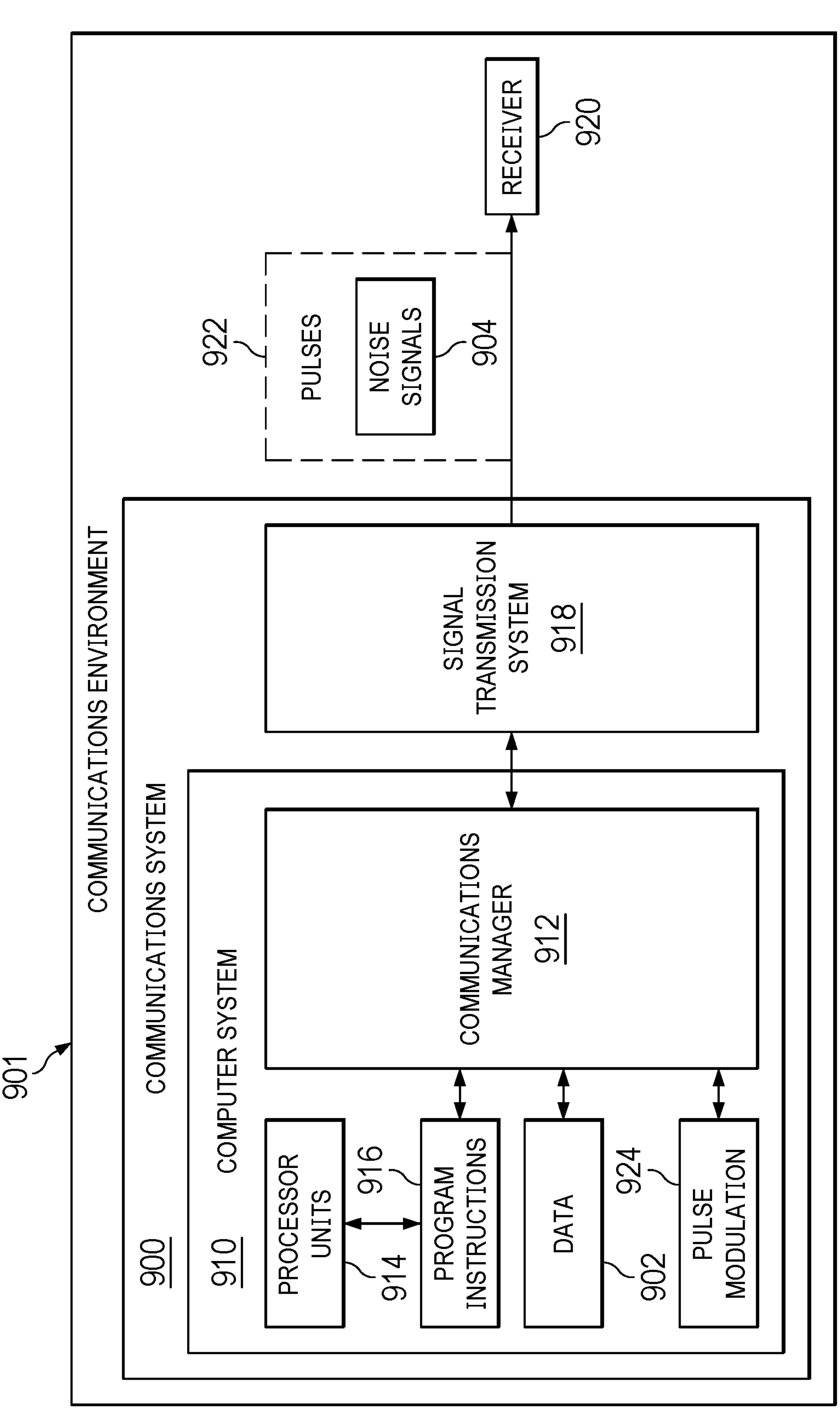
FIG. 9 is an illustration of a block diagram of a communication system in accordance with an illustrative embodiment.

With reference next to FIG. 9, an illustration of a block diagram of a communication system is depicted in accordance with an illustrative embodiment. In this illustrative example, communications system 900 in communications environment 901 operates to transmit data 902 encoded in noise signals 904.

In one illustrative example, a noise signal is a signal with irregular fluctuations that are or appear to be random, non-predictable, or non-deterministic. A noise signal can be a signal that is statistically random. For example, a noise signal in these examples can be a signal that meets one or more standard tests for statistical randomness. A pseudorandom noise signal that seems to lack any definite pattern, although consisting of a deterministic sequence of pulses that repeats itself after its period is an example of a signal that is statistically random and considered a noise signal that can be used to encode data. In this example, the noise in noise signals 904 can be selected from at least one of nondeterministic noise, pseudo random noise, or some other suitable type of noise signal.

In the illustrative example, signals can have characteristics selected from at least one of amplitude, frequency, bandwidth, timing, phase, or other characteristics. In this illustrative example, noise signals 904 can be noise signals in which at least one of these characteristics are not controlled to encode the data. In other words, at least one or more of these characteristics meet one or more standard tests for statistical randomness in noise signals 904.

In these examples, noise signals 904 do not include carrier waves that are periodic. These types of signals can be, for example, sinusoidal, sawtooth, square, or other types of signals. Noise signals 904 also do not include periodic or sinusoid-based carrier signals that employ spread spectrum, frequency-hopping signals, and radar "chirps" that are based on periodic signals such as sinusoids or sawtooths. These and other types of signals that do not meet one or more standard tests for statistical randomness are not considered noise signals 904 in this example. However, "spread noise spectrum", frequency-hopping noise signals, and noise-based radar bursts that use noise as the basis of their carrier signals are considered noise signals 904 in this example.

As depicted, communications system 900 comprises computer system 910 and communications manager 912 located in computer system 910.

Communications manager 912 can be implemented in software, hardware, firmware or a combination thereof. When software is used, the operations performed by communications manager 912 can be implemented in program instructions configured to run on hardware, such as a processor unit. When firmware is used, the operations performed by communications manager 912 can be implemented in program instructions and data and stored in persistent memory to run on a processor unit.

When hardware is employed, the hardware may include circuits that operate to perform the operations in communications manager 912.

The circuits used to implement communications manager 912 can take other forms in addition to or in place of a processor unit.

In the illustrative examples, the hardware used to implement communications manager 912 can take a form selected from at least one of a circuit system, an integrated circuit, an application-specific integrated circuit (ASIC), a programmable logic device, or some other suitable type of hardware configured to perform a number of operations. With a programmable logic device, the device can be configured to perform the number of operations. The device can be reconfigured at a later time or can be permanently configured to perform the number of operations. Programmable logic devices include, for example, a programmable logic array, a programmable array logic, a field-programmable logic array, a field-programmable gate array, and other suitable hardware devices. Additionally, the processes can be implemented in organic components integrated with inorganic components and can be comprised entirely of organic components excluding a human being. For example, the processes can be implemented as circuits in organic semiconductors.

Computer system 910 is a physical hardware system and includes one or more data processing systems. In this illustrative example, the data processing systems are hardware machines that can be configured to perform a sequence of operations. These operations can be performed in response to receiving an input in generating and output based on performing the operations. This output can be data in the form of values, commands, or other types of data. When more than one data processing system is present in computer system 910, those data processing systems are in communication with each other using a communications medium. The communications medium may be a network. The data processing systems may be selected from at least one of a computer, a server computer, a tablet, or some other suitable data processing system.

As depicted, computer system 910 includes a number of processor units 914 that are capable of executing program instructions 916 implementing processes in the illustrative examples. In other words, program instructions 916 are computer-readable program instructions.

As used herein, a processor unit in the number of processor units 914 is a hardware device and is comprised of hardware circuits such as those on an integrated circuit that respond and process instructions and program code that operate a computer. When the number of processor units 914 executes program instructions 916 for a process, the number of processor units 914 can be one or more processor units that are on the same computer or on different computers. In other words, the process can be distributed between processor units 914 on the same or different computers in a computer system 910.

Further, the number of processor units 914 can be of the same type or different type of processor units. For example, a number of processor units 914 can be selected from at least one of a single core processor, a dual-core processor, a multi-processor core, a general-purpose central processing unit (CPU), a graphics processing unit (GPU), a digital signal processor (DSP), or some other type of processor unit.

As depicted, communications system 900 can also include signal transmission system 918. In other examples, signal transmission system 918 can be considered a separate component controlled by communications system 900.

In this depicted example, signal transmission system 918 is a hardware system that can transmit noise signals 904. The operation of signal transmission system 918 can be controlled by communications manager 912.

In this illustrative example, noise signals 904 are received by receiver 920. Receiver 920 is also depicted as part of communications system 900. In yet other illustrative examples, receiver 920 may be a separate component from communications system 900.

Receiver 920 is a hardware system and can include processes implemented in hardware or software that decode data 902 that is encoded in pulses 922 of noise signals 904.

In this illustrative example, communications manager 912 identifies data 902 for transmission. In response to identifying data 902, communications manager 912 transmits pulses 922 of noise signals 904 encoding data 902. In one illustrative example, data 902 can be encoded in pulses 922 of noise signals 904 using at least one of a timing of the pulses 922, an amplitude of the pulses 922, duration of pulses 922, or other characteristic for pulses 922. In this manner, communications manager 912 can perform pulse noise modulation through the modulation of noise signals 904 to encode data 902.

For example, communications manager 912 can control the operation of signal transmission system 918 to perform pulse modulation 924. With pulse modulation 924, pulses 922 can encode data 902 through the timing of pulses 922 which are noise pulses or pulses of noise in this example.

For example, the presence of a noise pulse or pulse of noise can be considered a "1" and the absence of a noise pulse or pulse of noise can be considered a "0" which can be selected in time to encode data 902. The timing of the presence or absence of pulses 922 of noise can occur using various time periods.

For example, the timing can be based on whether a noise pulse or pulse of noise is present or absent at each period of time. The period of time can be, for example, a microsecond, a millisecond, two milliseconds, or some other period of time during which a pulse is absent or present for encoding data 902 in pulses 922 of noise.

Figure 10:
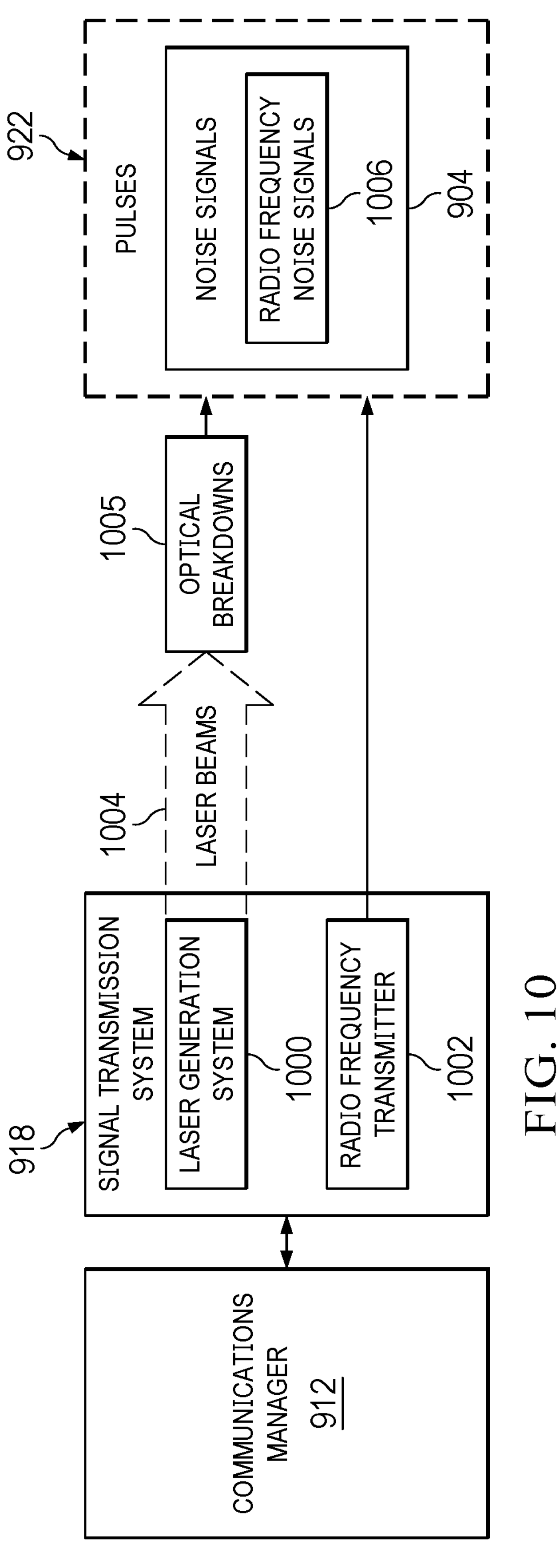
FIG. 10 is an illustration of a transmitter in accordance with an illustrative embodiment.

With reference next to FIG. 10, an illustration of a transmitter is depicted in accordance with an illustrative embodiment. In the illustrative examples, the same reference numeral may be used in more than one figure. This reuse of a reference numeral in different figures represents the same element in the different figures. In this illustrative example, examples of components that can be used to implement signal transmission system 918 in FIG. 9 are depicted.

As depicted in this illustrative example, signal transmission system 918 can include a number of different components that can be controlled to transmit noise signals 904. More specifically, these components can be controlled to generate pulses 922 of noise signals 904. These components can include at least one of laser generation system 1000 or radio frequency transmitter 1002.

In this illustrative example, laser generation system 1000 is a hardware system that emits a set of laser beams 1004. Communications manager 912 can control the emission of the set of laser beams 1004 from laser generation system 1000 to cause optical breakdowns 1005.

In this example, optical breakdowns 1005 result in the generation of noise signals 904 in the form of radio frequency noise signals 1006. In this example, pulses 922 of radio frequency noise signals 1006 can be generated based on the timing of optical breakdowns 1005. In this illustrative example, each optical breakdown in optical breakdowns 1005 can be a pulse in pulses 922 of radio frequency noise signals 1006.

In this example, radio frequency transmitter 1002 is a hardware system and can transmit pulses 922 of noise signals 904 in the form of radio frequency noise signals 1006. For example, radio frequency transmitter 1002 can transmit pulses 922 of noise signals 904 in the form of radio frequency noise signals 1006 transmitted from a physical hardware antenna instead of using lasers and optical breakdowns to produce the radio frequency noise signals 1006.

Figure 11:
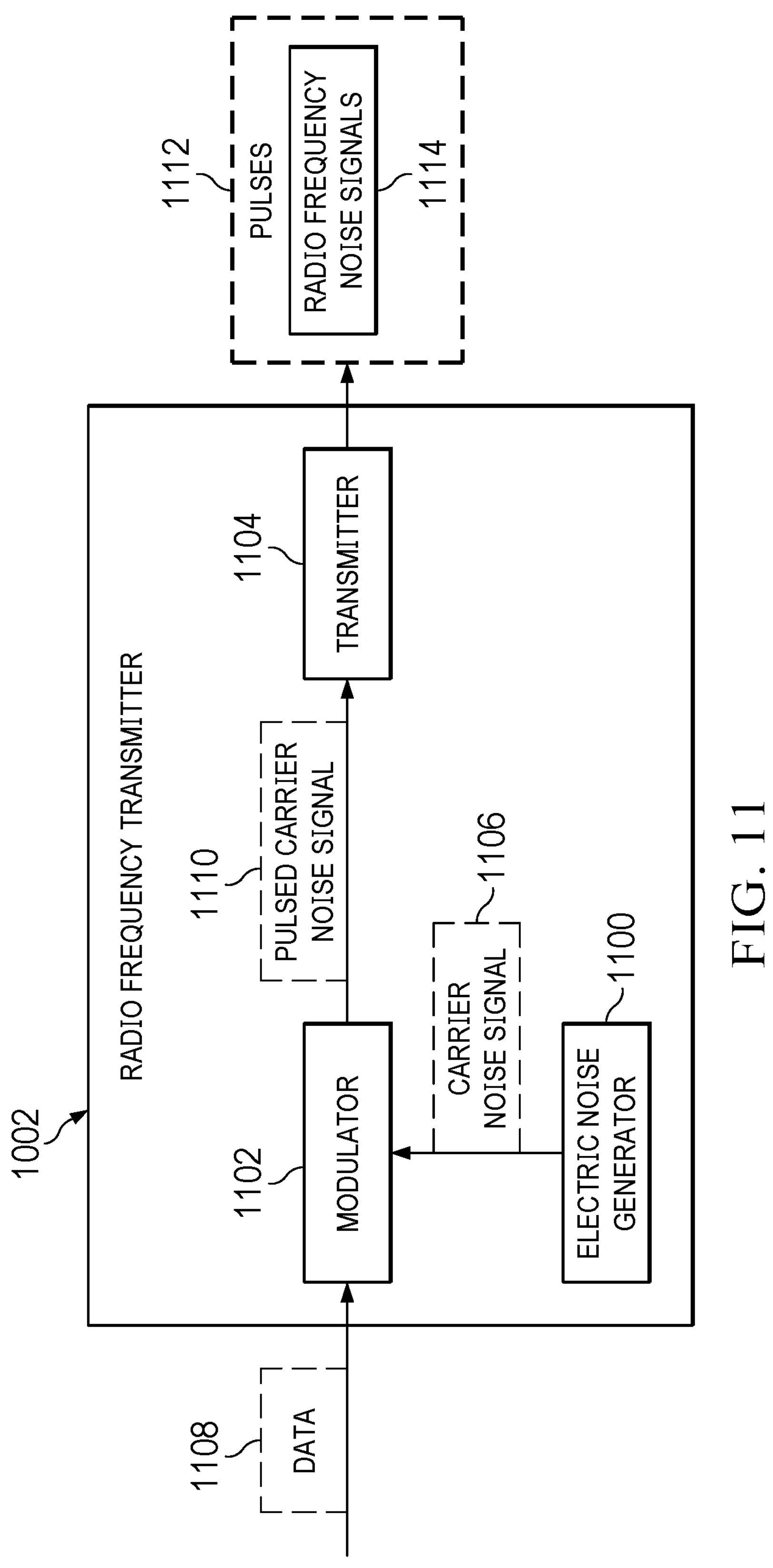
FIG. 11 is an illustration of a block diagram of a radio frequency transmitter in accordance with an illustrative embodiment.

Turning next to FIG. 11, an illustration of a block diagram of a radio frequency transmitter is depicted in accordance with an illustrative embodiment. This figure illustrates example components that can be used to implement radio frequency transmitter 1002. As depicted in this example, radio frequency transmitter 1002 comprises electric noise generator 1100, modulator 1102, and transmitter 1104.

As depicted, electric noise generator 1100 generates carrier noise signal 1106. Electric noise generator 1100 is connected to modulator 1102 and sends carrier noise signal 1106 to modulator 1102.

As depicted, modulator 1102 receives data 1108 that is to be transmitted. In this example, modulator 1102 modulates or digitally "shift keys" carrier noise signal 1106 to create pulsed carrier noise signal 1110 that encodes data 1108. This data is encoded in pulses in pulsed carrier noise signal 1110. In this example the modulation occurs by modulator 1102 turning carrier noise signal 1106 on and off to form pulsed carrier noise signal 1110.

Transmitter 1104 transmits pulsed carrier noise signal 1110 as pulses 1112 of radio frequency noise signals 1114. In this example, transmitter 1104 includes a physical antenna that is used to transmit pulses 1112 of radio frequency noise signals 1114. In other illustrative examples, the antenna can be a separate component from the hardware used to generate radio frequency noise signals 1114.

Figure 12:
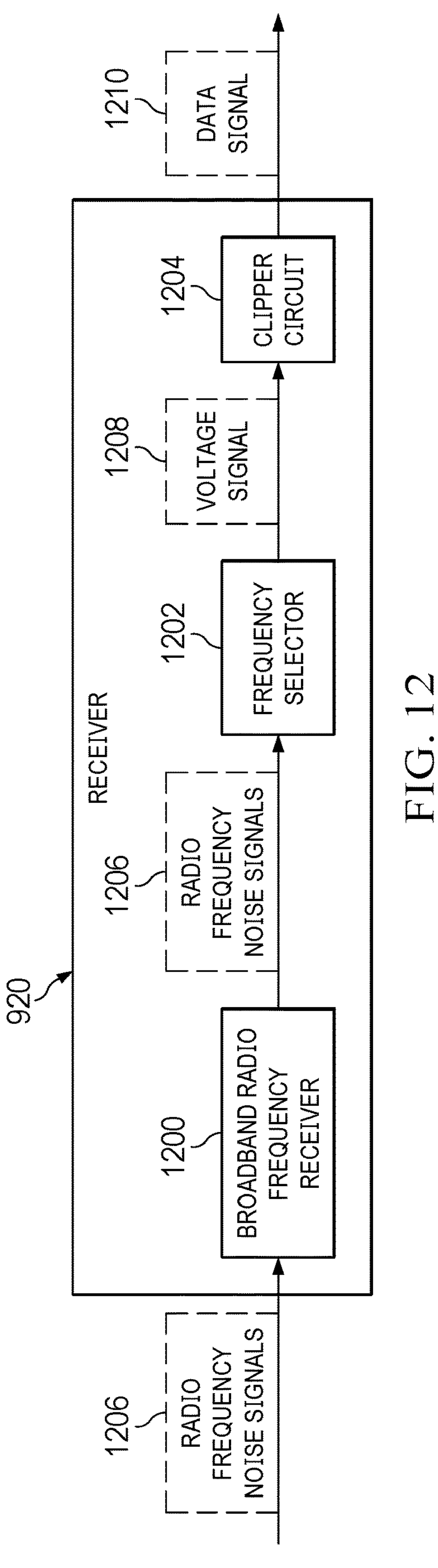
FIG. 12 is an illustration of a block diagram of a receiver in accordance with an illustrative embodiment.

Turning next to FIG. 12, an illustration of a block diagram of a receiver is depicted in accordance with an illustrative embodiment. An example of components that can be used to implement receiver 920 are shown in this figure. As depicted, receiver 920 is a hardware system. As depicted, receiver 920 comprises broadband radio frequency receiver 1200, frequency selector 1202, and clipper circuit 1204.

In this illustrative example, broadband radio frequency receiver 1200 receives radio frequency noise signals 1206. Broadband radio frequency receiver 1200 is connected to frequency selector 1202 and sends the received signals to frequency selector 1202.

Frequency selector 1202 outputs voltage signal 1208 from the frequencies selected in radio frequency noise signals 1206. In this illustrative example, the selection of frequencies by frequency selector 1202 can be performed using at least one of a bandpass filter, a band-reject filter, an envelope follower, an envelope detector, a low-pass filter, a rectified low pass filter, multiple bandpass filters tuned to different frequencies, or some other suitable type of circuit.

Frequency selector 1202 is connected to clipper circuit 1204. Voltage signal 1208 is received by clipper circuit 1204, which shapes voltage signal 1208. In this illustrative example, clipper circuit 1204 prevents voltage signal 1208 from exceeding a selected voltage level. Clipper circuit 1204 outputs data signal 1210. In this example, data signal 1210 is in an analog or digital signal and contains pulses that can be used re-create the data transmitted in radio frequency noise signals 1206.

Thus, one or more illustrative examples enable communicating data using noise carrier signals. In one illustrative example, these noise carrier signals or carrier noise signals can be modulated to encode data. The modulation can be pulse noise modulation or pulse code noise modulation in which a noise signal is transmitted in pulses. The timing of the pulses selected encodes data in these pulses of noise signals.

In this illustrative example, the modulation and demodulation of these pulses of noise signals do not depend on a single frequency or periodic waveform as the basis for the carrier wave as compared to current techniques that use a sinusoidal, periodic, or predictable carrier. As result, increased security can be present and interference with the sinusoidal carriers can be reduced.

In one illustrative example, the pulse code noise modulation or pulse noise modulation can be a broadband noise radio frequency carrier signal encoding the data. The generation of the pulses of radio frequency noise signals can be performed using a laser generation system that generates radio frequency signals through optical breakdowns. In another example, the generation of the radio frequency noise signals can be performed using a physical electromagnetic receipt transmitter having a physical antenna.

The illustration of communications environment 901 and the different components in FIGS. 9-12 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, although communications manager 912 is shown as being implemented using program instructions 916 run on a number of processor units 914 in computer system 910, communications manager 912 can be implemented in other hardware instead of or in addition to the number of processor units 914. For example, computer system 910 may use other hardware in addition to or in place of the number of processor units 914.

For example, other types of hardware circuits capable of performing the operations for communications manager 912 can be used. This other hardware can be at least one of a circuit system, an integrated circuit, an application-specific integrated circuit (ASIC), a programmable logic device, or some other suitable type of hardware configured to perform a number of operations.

As another example, the illustration of laser generation system 1000 and radio frequency transmitter 1002 are provided as examples of some implementations of components that can transmit pulses 922 of noise signals 904. As another example, radio frequency transmitter 1002 that generates electrical noise in electric noise generator 1100 as carrier noise signal 1106 to be modulated and transmitted as radio frequency noise signals 1114 in pulses 1112 can be transmitted on any type of physical, hardware antenna, or both. Examples of antenna types include, for example, whip antennas, dipole antennas, microwave antennas, metamaterial antennas, directional antennas, omnidirectional antennas, and any other type of physical antenna.

Figures 13, 14:
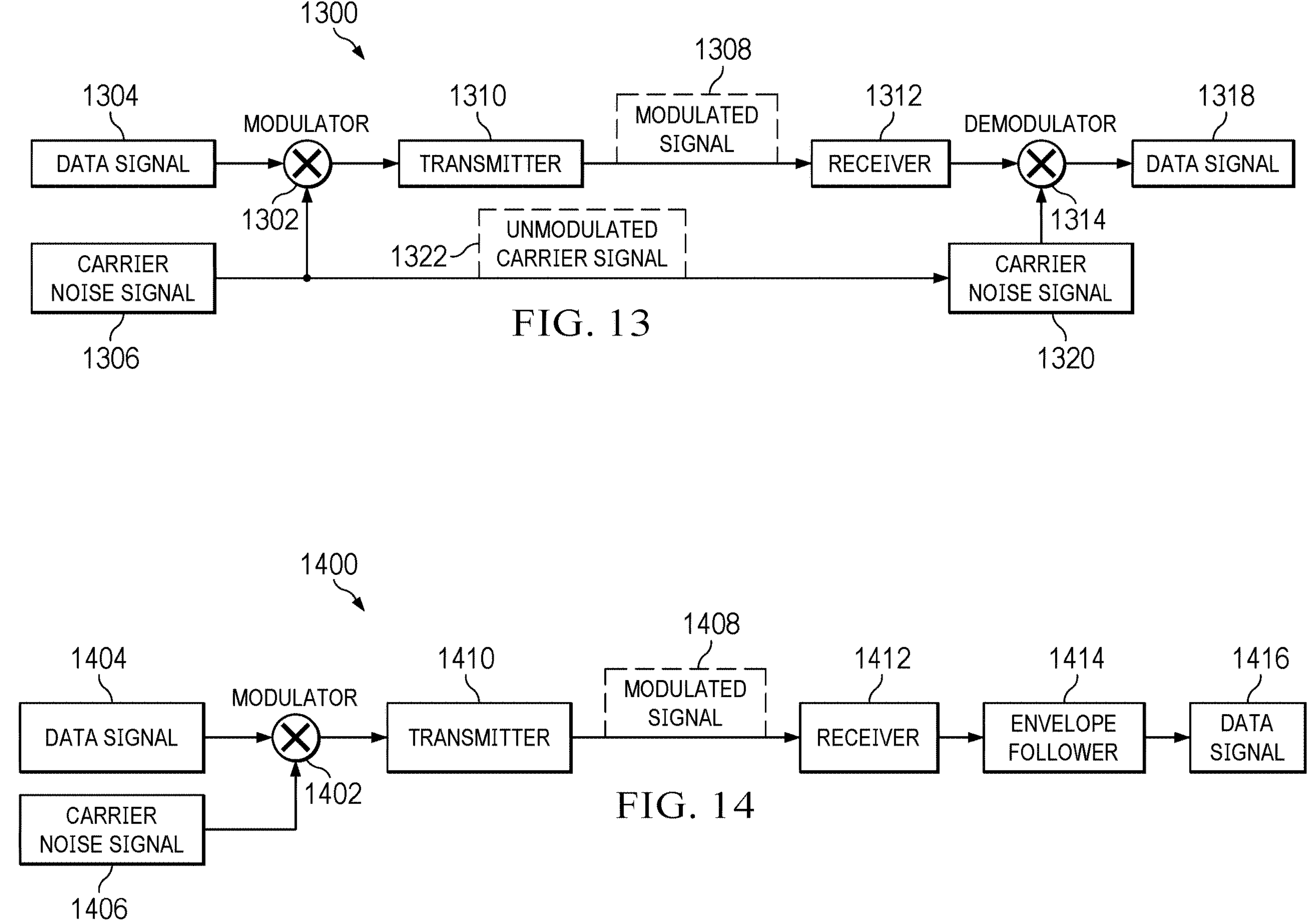
FIG. 13 is an illustration of a communications system for transmitting and receiving electromagnetic noise signals in accordance with an illustrative embodiment.
FIG. 14 is an illustration of a block diagram of a communications system for transmitting and receiving electromagnetic noise signals in accordance with an illustrative embodiment.

Turning next to FIG. 13, an illustration of a communications system for transmitting and receiving electromagnetic noise signals is depicted in accordance with an illustrative embodiment. In this illustrative example, communications system 1300 can transmit or receive electromagnetic noise signals encoding data using electromagnetic noise signals. Examples of electromagnetic noise signals may include electromagnetic ranges of ULF (Ultra Low Frequency), VLF (Very Low Frequency), 20 KHz to 300 KHz, HF (High Frequency), UHF (Ultra High Frequency), millimeter wave and microwave ranges, EHF (Extremely High Frequencies) up through Gigahertz frequencies and above Terahertz frequencies, and including the optical spectrum. Examples of applications or uses include noise carrier communications for modulation of audio, voice, and video communications, as well as noise-based radar, noise-based precision navigation and timing such as noise-based global positioning systems, noise-based spread spectrum using frequency bands of noise instead of sinusoidal-based carrier spread spectrum, noise-based frequency band-hopping using frequency-hopping of frequency bands of noise instead of using sinusoidal or periodic-based carrier frequency-hopping, as well as Signals Intelligence (SI) waveforms such as Low Probability of Intercept/Low Probability of Detect (LPI/LPD) and other clandestine signaling where detection and interception of messages using noise carriers will be difficult.

As depicted, modulator 1302 receives data signal 1304 and carrier noise signal 1306. In this illustrative example, carrier noise signal 1306 can be generated by an electric noise generator.

Modulator 1302 modulates or digitally "shift keys" carrier noise signal 1306 to generate modulated signal 1308. In this example, modulated signal 1308 comprises pulses of carrier noise signal 1306. For example, modulated signal 1308 can be generated by turning modulator 1302 on and off to send pulses of carrier noise signal 1306 to transmitter 1310 for transmission as modulated signal 1308. The generation of the pulses is based on the data in data signal 1304. In this manner, the data in data signal 1304 can be encoded in modulated signal 1308.

Transmitter 1310 transmits modulated signal 1308 to receiver 1312. In one illustrative example, receiver 1312 can be a broadband radio frequency receiver when modulated signal 1308 is a radio frequency signal. When other types of signals are used, receiver 1312 is selected to detect the signals transmitted by transmitter 1310.

Modulated signal 1308 detected by receiver 1312 is sent to demodulator 1314. In this example, demodulator 1314 demodulates or digitally de-"shift keys" the modulated or "shift keyed" signal 1308 using carrier noise signal 1320 to generate data signal 1318, which contains the same data in data signal 1304 in this depicted example.

As depicted, the demodulation of modulated signal 1308 is performed using carrier noise signal 1320. In this illustrative example, carrier noise signal 1306 is not predictable as compared to current techniques using sinusoidal wave forms for carrier signals.

As depicted, carrier noise signal 1320 can be obtained by demodulator 1314 in the form of unmodulated carrier noise signal 1322 being transmitted to demodulator 1314. In this manner, carrier noise signal 1320 used to demodulate modulated signal 1308 can be the same carrier signal as carrier noise signal 1306. Unmodulated carrier noise signal 1322 can be an in-band or out-of-band copy of carrier noise signal 1306.

With reference now to FIG. 14, an illustration of a block diagram of a communications system for transmitting and receiving electromagnetic noise signals is depicted in accordance with an illustrative embodiment. Communications system 1400 can transmit or receive electromagnetic noise signals encoding data using electromagnetic noise signals.

In this illustrative example, communications system 1400 can transmit or receive electromagnetic noise signals encoding data using electromagnetic noise signals.

As depicted, modulator 1402 receives data signal 1404 and carrier noise signal 1406. In this illustrative example, carrier noise signal 1406 can be generated by an electric noise generator.

Modulator 1402 modulates or digitally "shift keys" carrier noise signal 1406 to generate modulated signal 1408. In this example, modulator 1402 can be an on/off modulator. As an on/off modulator, modulator 1402 sends carrier noise signal 1406 to transmitter 1410 for transmission when modulator 1402 is turned on and does not send carrier noise signal 1406 to transmitter 1410 when modulator 1402 is turned off. As result, modulated signal 1408 comprises pulses of carrier noise signal 1406. These pulses are generated to encode data signal 1404. In other words, the timing of these pulses can be generated to encode the data. For example, the timing in these depicted examples can be time for pulses to perform pulse code noise modulation or pulse noise modulation.

For example, modulated signal 1408 can be generated by turning modulator 1402 on and off to send pulses of carrier noise signal 1406 to transmitter 1410 for transmission as modulated signal 1408.

Transmitter 1410 transmits modulated signal 1408 to receiver 1412. In one illustrative example, receiver 1412 can be a broadband radio frequency receiver when modulated signal 1408 is a radio frequency signal. When other types of signals are used, receiver 1412 is selected to detect the signals transmitted by transmitter 1410.

In this example, modulated signal 1408 detected by receiver 1412 is sent to envelope follower 1414. As depicted, envelope follower 1414 can also be referred to as an envelope detector. Envelope follower 1414 can detect amplitude variations in modulated signal 1408 and create a signal having a shape that resembles those variations. This example, modulated signal 1408 contains pulses of noise. As a result, envelope follower 1414 can generate a signal with the shape of the noise pulses to form data signal 1416. Envelope follower 1414 can be a selected from at least one of a low pass filter, a bandpass filter, an envelope detector, a peak detector, or a diode detector that follows and outputs the overall shape of at least one of the amplitudes or pulses as currently used.

The illustrative examples of communication systems in FIG. 13 and in FIG. 14 are presented as examples of some implementations for communications system 900 in FIG. 9. These illustrations are not meant to limit the manner in which other illustrative examples can be implemented. For example, a clipper circuit as is known in the art can be placed after envelope follower 1414 in FIG. 14 to convert rough envelopes of pulses into square wave pulses.

Figure 15A:
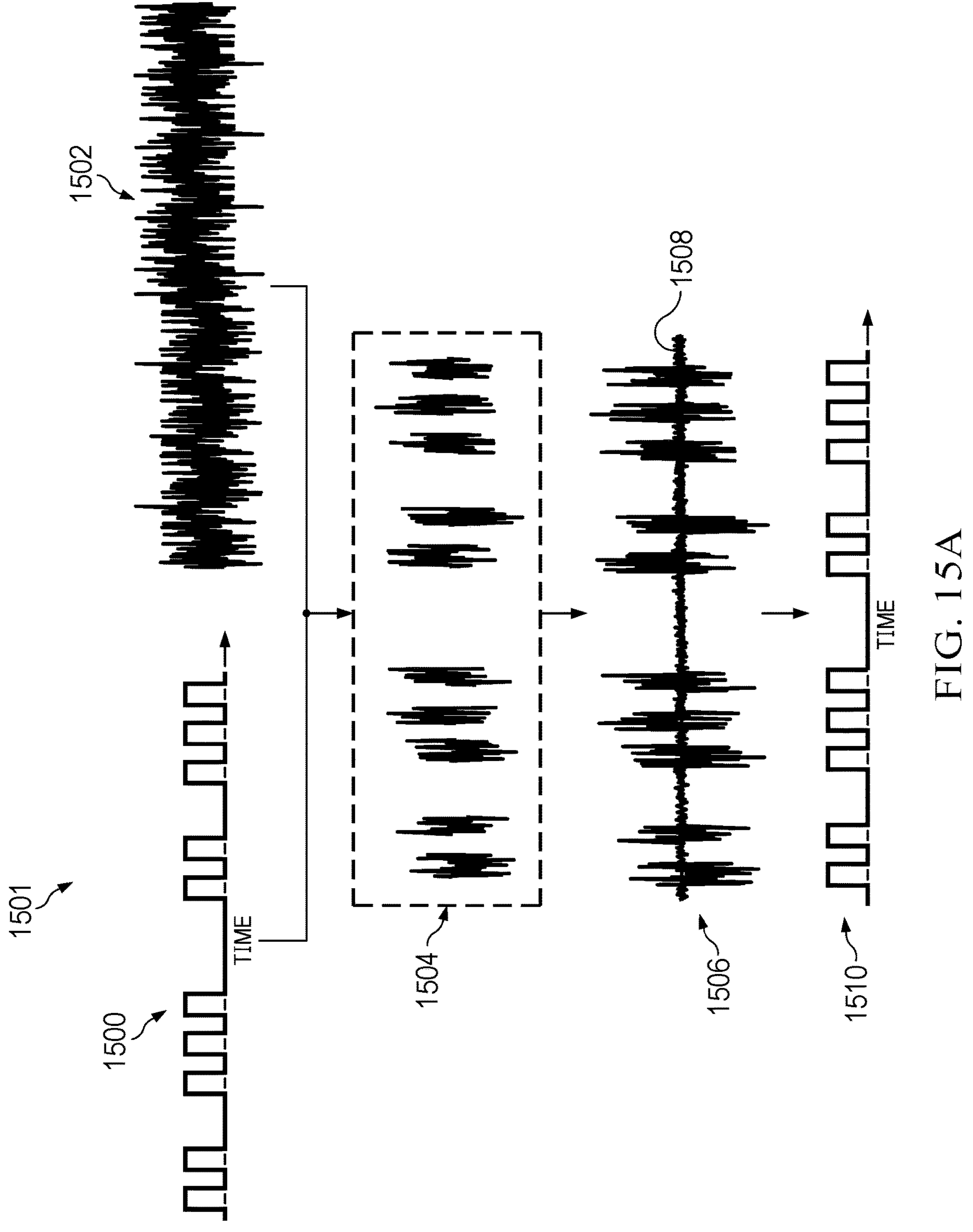
FIG. 15A is an illustration of a data flow of signals transmitting data using modulated noise signals in accordance with an illustrative embodiment.

Turning now to FIG. 15A, an illustration of a data flow of signals transmitting data using modulated noise signals is depicted in accordance with an illustrative embodiment. In this illustrative example, data signal 1501 is an example of signals in communications system 1400 in FIG. 14.

In this illustrative example, data signal 1500 is used to modulate carrier noise signal 1502. Data signal 1500 is an example of data signal 1404 and carrier noise signal 1502 is an example of carrier noise signal 1406 in FIG. 14.

The modulation of carrier noise signal 1502 forms modulated signal 1504, which encodes the data in data signal 1500. Modulated signal 1504 is an example of modulated signal 1408 in FIG. 14. As depicted in this example, modulated signal 1504 is a modulated noise signal comprising pulses of carrier noise signal 1502.

Received signal 1506 is an example of the signal received by a receiver. As depicted, received signal 1506 also includes noise 1508 in addition to the pulses of carrier noise signal 1502 in modulated signal 1504. In this example, noise 1508 is background noise or other noise in addition to the pulses in the carrier noise in modulated signal 1504.

As depicted, received signal 1506 can be processed and decoded using a component such as envelope follower 1414 in FIG. 14. Other components such as a bandpass filter, low-pass filter, band reject filter, clipper circuit, or other circuits can be used to generate output data signal 1510. In this example, output data signal 1510 is the same as or close enough to data signal 1500 such that the same data used to generate data signal 1500 can be obtained from output data signal 1510.

As discussed previously, the set of characteristics for noise signals can be selected from at least one of a timing, an amplitude, a frequency band, a relative phase, or other characteristics for carrier noise signals. For pulse noise modulation the carrier noise may be of different frequency characteristics that the transmitter and receiver will share. For pulse noise modulation the carrier noise signals will vary in amplitude, duration, and timing to modulate the message signal. For reception of these pulse noise modulated signals the receivers in FIG. 12 and FIG. 14 use various types of techniques to receive and demodulate the original data signal.

Figure 15B:
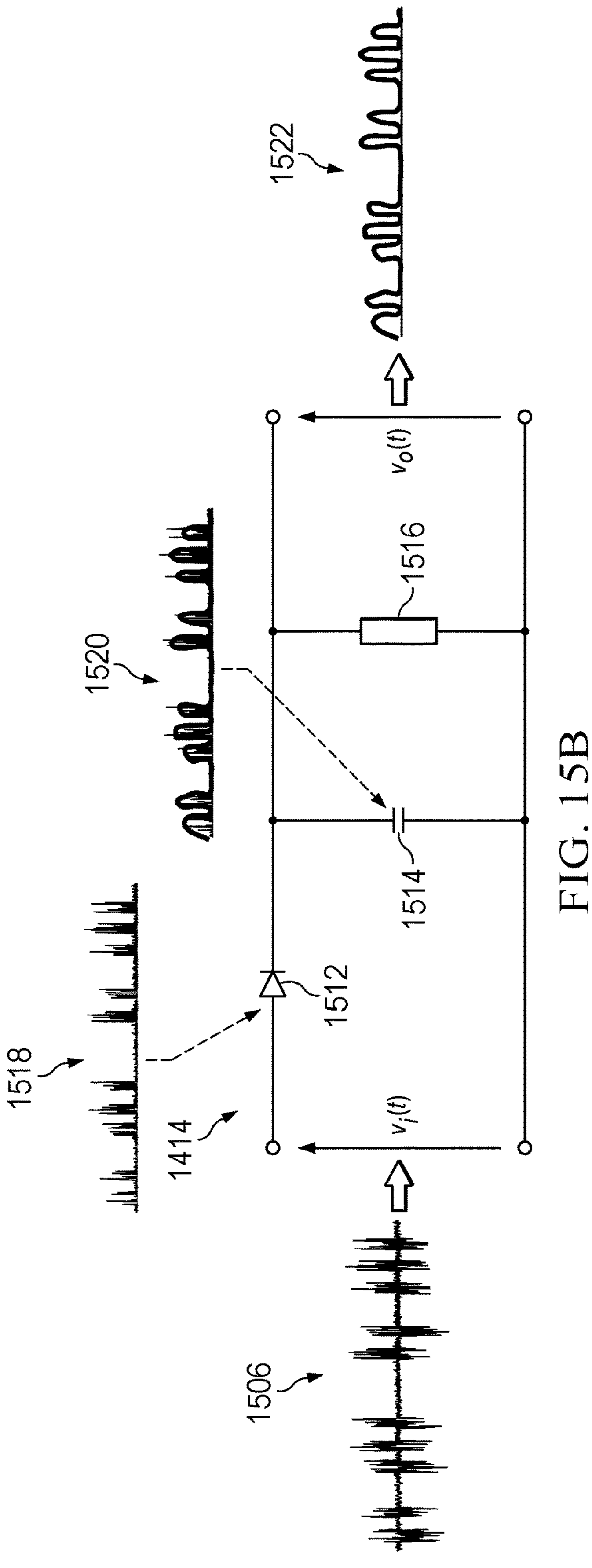
FIG. 15B is an illustration of an envelope follower circuit using a diode detector with a low pass filter in accordance with an illustrative embodiment.

Turning now to FIG. 15B, an illustration of an envelope follower circuit using a diode detector with a low pass filter in accordance with an illustrative embodiment. In this figure, an illustration of a simple circuit for envelope follower 1414 is shown. In this illustrative example, envelope follower 1414 is comprised of a diode 1512 to rectify the input signal, capacitor 1514 to provide a low pass filter to smooth out the noisy rectified signal and produce a lower frequency envelope. An optional resistor 1516 or inductive coil may be provided to affect the tuning or resonance of the circuit. Here, received signal 1506 of carrier pulses of noise is inputted to the envelope follower 1414 circuit. As received signal 1506 travels through diode 1512 the diode acts as a rectifier and converts the AC noise signal into a DC noise signal 1518 as shown by the dashed arrow from DC noise signal 1518 to the output of diode 1512. From there the rectified DC noise signal 1518 travels across capacitor 1514 which acts as a low pass filter to smooth the signal into an envelope signal 1520. The actual envelope signal, envelope signal 1520, is shown by the line the follows the outline or envelope of the noise bursts from DC noise signal 1518. The envelope signal 1520 then travels across optional resistor 1516 or coil and exits at the output as the envelope followed signal 1522.

In this illustrative example it is clear that the envelope followed signal 1522 is beginning to look like the received signal 1506.

Figure 15C:
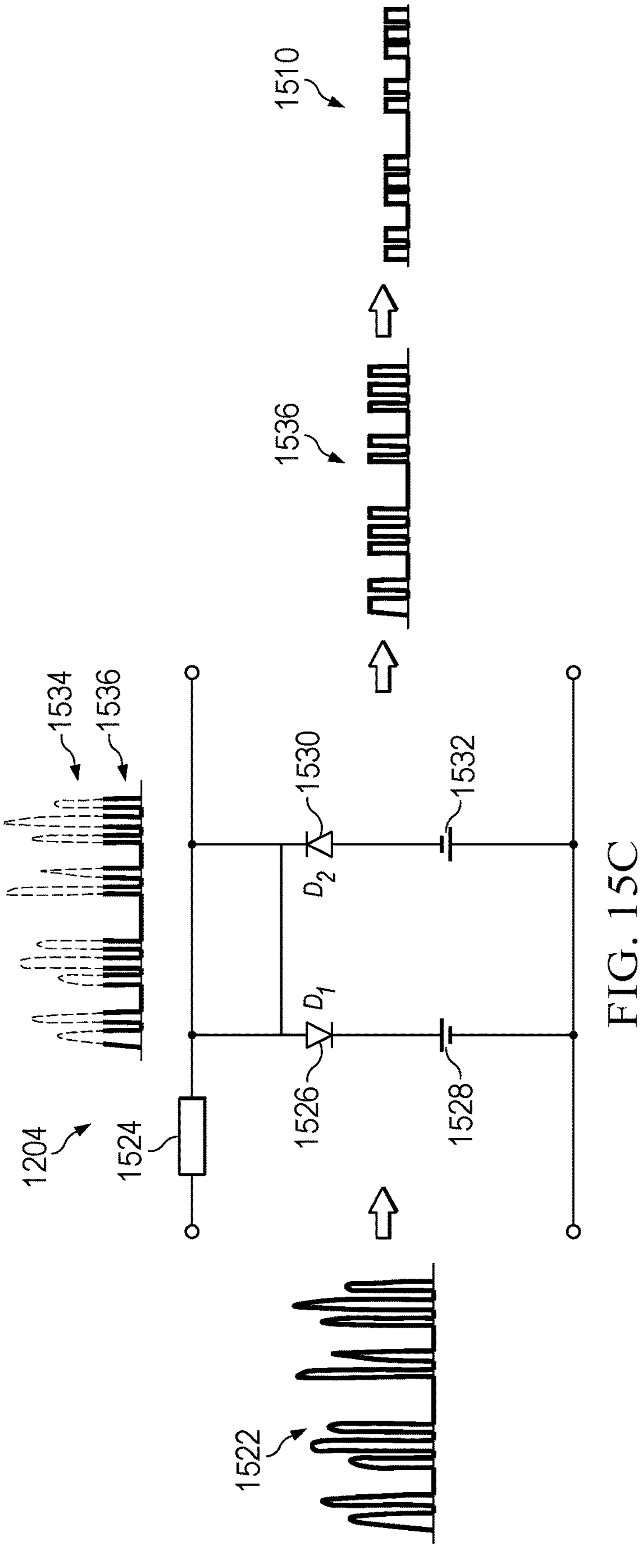
FIG. 15C is an illustration of a clipper circuit in accordance with an illustrative embodiment.

With reference to FIG. 15C, an illustration of a clipper circuit in accordance with an illustrative embodiment. In this figure, clipper circuit 1204 is also referred to as a slicer or amplitude selector. In this illustrative example, clipper circuit 1204 is comprised of optional input resistor 1524, and a bidirectional clipping circuit comprised of diode D1 1526, bias voltage 1528, diode D2 1530, and bias voltage 1532. This and many other known methods of clipping can be used. Single directional clipping may be used as well as bidirectional or any other type of clipping circuit.

In this illustrative example, envelope followed signal 1522 from FIG. 15B has been amplified to be a stronger signal and is inputted into clipper circuit 1204. Envelope followed signal 1522 travels through optional input resistor 1524 which may be an impedance matching circuit.

This signal then travels across one or more of illustrative diode D1 1526 and diode D2 1530. Various types of diodes may be used. A single diode may be used, or a transistor circuit may be used with the purpose of clipping off the top of envelope followed signal 1522 such that top part of signal 1534 is clipped off and bottom part of signal 1536 remains. The level at which top part of the signal 1534 is clipped off is determined by the diode D1 1526 and diode D2 1530 as well as by the bias voltage 1528 and 1532.

Thus, bottom part of signal 1536 remaining is output at the output. This bottom part of the signal 1536 can be transferred through another stage of clipping until it becomes output data signal 1510 which is extremely similar to the original data signal 1500.

As can be seen in this illustrative example, the pulses of carrier noise signal 1502 encode data in data signal 1500. In other words, the timing in generating pulses of carrier noise signal 1502 is used to encode the data.

Thus, the different illustrative examples use pulse modulation of a noise signal that can be generated using a laser generator or a transmitter. With a laser generator, optical breakdowns are used to create the pulses of noise signals. With a physical transmitter, an electronic noise source generates a carrier noise signal that is modulated to create pulses of the carrier noise signal based on the data to be transmitted. These pulses of the carrier noise signals form the pulses of noise signal encoding data that can be transmitted using a physical antenna.

In this illustrative example, FIGS. 16-27 are flowcharts illustrating operations that can be performed to generate radio frequency noise signals encoding data in which a physical antenna is unnecessary.

Figure 16:
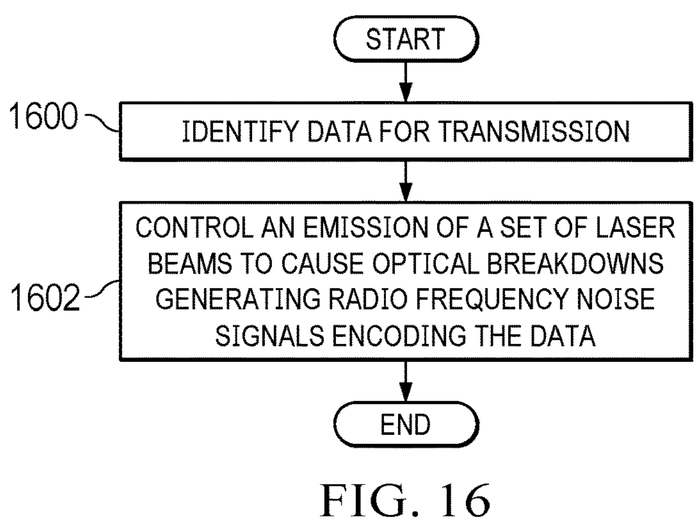
FIG. 16 is an illustration of a flowchart of a process for transmitting data in accordance with an illustrative embodiment.

With reference first to FIG. 16, a flowchart of a process for transmitting data is depicted in accordance with an illustrative embodiment. The process in FIG. 16 can be implemented in hardware, software, or both. When implemented in software, the process can take the form of program instructions that are run by one of more processor units located in one or more hardware devices in one or more computer systems. For example, the process can be implemented in communications manager 212 in computer system 210 in FIG. 2.

The process begins by identifying data for transmission (operation 1600). The process controls an emission of a set of laser beams to cause optical breakdowns generating radio frequency noise signals encoding the data (operation 1602). The process terminates thereafter.

In operation 1602, the emission of the set of laser beams can be controlled in number of different ways. For example, the laser beams can be emitted continuously or pulsed. Further, direction at which the laser beams are directed can also be changed. For example, the set of laser beams can be directed toward a set of optical breakdown points. The optical breakdown points can be selected from at least one of an intersection point or focal point. These optical breakdown points are physical locations where optical breakdowns occur. These optical breakdowns are physical locations where plasma is generated that generates the radio frequency noise signals.

The manner in which the optical breakdowns occur can be used to encode the data in the radio frequency noise signals. For example, the timing of the occurrence of optical breakdowns generates time pulses used to encode data. In this manner, different types of data encoding such as pulse noise modulation can be used to encode data based on when radio frequency noise signals are generated.

As another example, the set of laser beams can be moved or swept such that the optical breakdowns occur in different physical locations resulting in the frequency of a phase change in the optical breakdowns that can be used to encode data. As another example, the power of the laser beams can be changed to change the amplitude of the radio frequency noise signals two encode data. In this manner, different types of data encoding such as pulse noise modulation can be used to encode data based on when radio frequency noise signals are generated.

Figure 17:
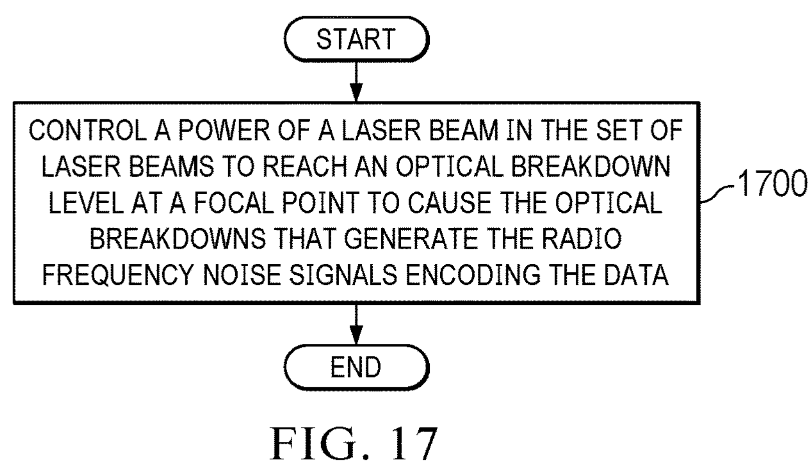
FIG. 17 is an illustration of a flowchart for controlling the emission of laser beams in points in accordance with an illustrative embodiment.

Turning next to FIG. 17, an illustration of a flowchart for controlling the emission of laser beams is depicted in points with an illustrative embodiment. The process illustrated in FIG. 17 is an example of one implementation for operation 1602 in FIG. 16.

The process controls a power of a laser beam in the set of laser beams to reach an optical breakdown level at a focal point to cause the optical breakdowns that generate the radio frequency noise signals encoding the data (operation 1700). The process terminates thereafter.

Figure 18:
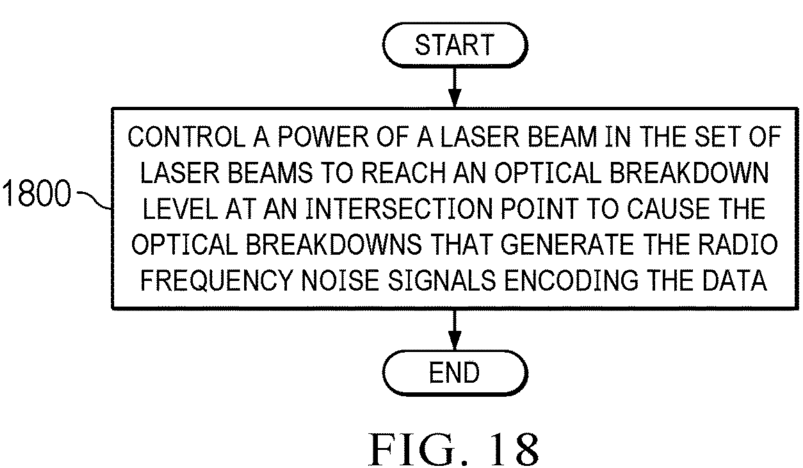
FIG. 18 is an illustration of a flowchart for controlling the emission of laser beams in intersecting points in accordance with an illustrative embodiment.

With reference next to FIG. 18, an illustration of a flowchart for controlling the emission of laser beams is depicted at intersecting points with an illustrative embodiment. The process illustrated in FIG. 18 is another example of an implementation for operation 1602 in FIG. 16.

The process controls a power of a laser beam in the set of laser beams to reach an optical breakdown level at an intersecting point to cause the optical breakdowns that generate the radio frequency noise signals encoding the data (operation 1800). The process terminates thereafter.

Figure 19:
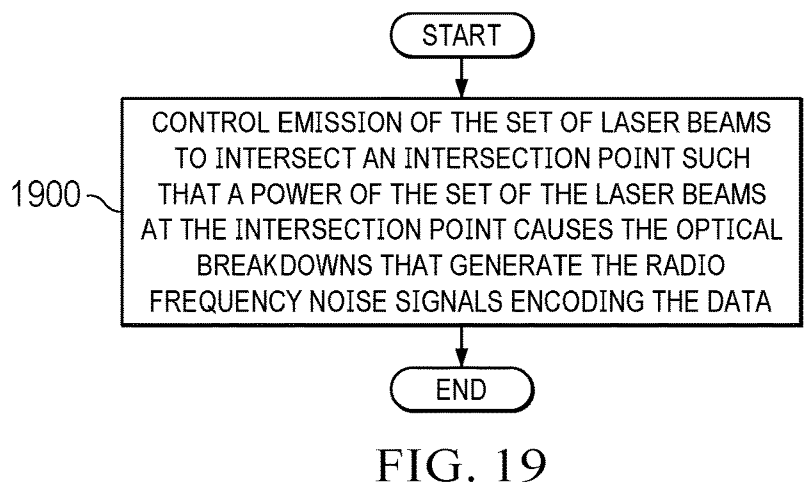
FIG. 19 is an illustration of a flowchart for controlling the emission of laser beams in points in accordance with an illustrative embodiment.

In FIG. 19, an illustration of a flowchart for controlling the emission of laser beams is depicted in points with an illustrative embodiment. The process illustrated in FIG. 19 is yet another example of an implementation for operation 1602 in FIG. 16.

The process controls emission of the set of laser beams to intersect an intersection point such that a power of the set of the laser beams at the intersection point causes the optical breakdowns that generate the radio frequency noise signals encoding the data (operation 1900). The process terminates thereafter.

Figure 20:
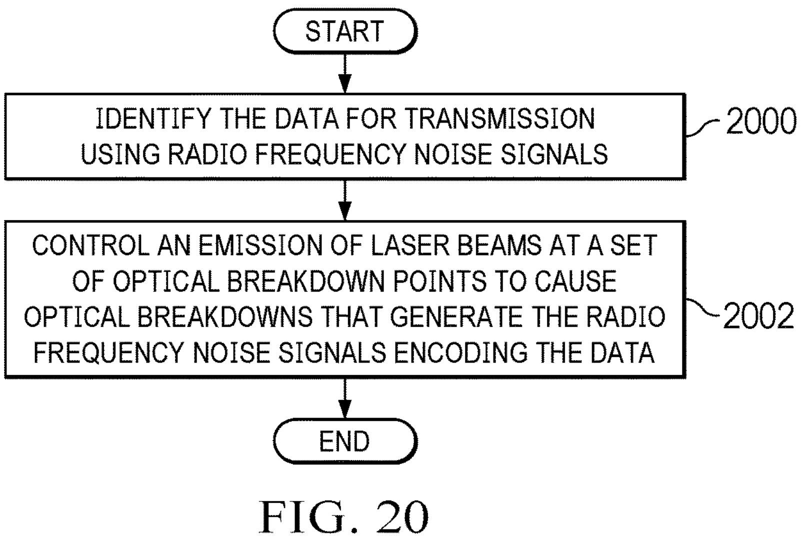
FIG. 20 is an illustration of a flowchart of a process for transmitting data in accordance with an illustrative embodiment.

Turning next to FIG. 20, a flowchart of a process for transmitting data is depicted in accordance with an illustrative embodiment. The process in FIG. 20 can be implemented in hardware, software, or both. When implemented in software, the process can take the form of program instructions that are run by one of more processor units located in one or more hardware devices in one or more computer systems. For example, the process can be implemented in communications manager 212 in computer system 210 in FIG. 2.

The process begins by identifying the data for transmission using radio frequency noise signals (operation 2000). The process controls an emission of laser beams at a set of optical breakdown points to cause optical breakdowns that generate the radio frequency noise signals encoding the data (operation 2002). The process terminates thereafter.

In this example, the set of optical breakdown points can be at different physical locations when more than one optical breakdown point is present in the set of optical breakdown points. In one example, radio frequency transmissions can be transmitted from multiple physical locations when the set of optical breakdowns is caused by the set of lasers being directed at more than one optical breakdown point.

Figure 21:
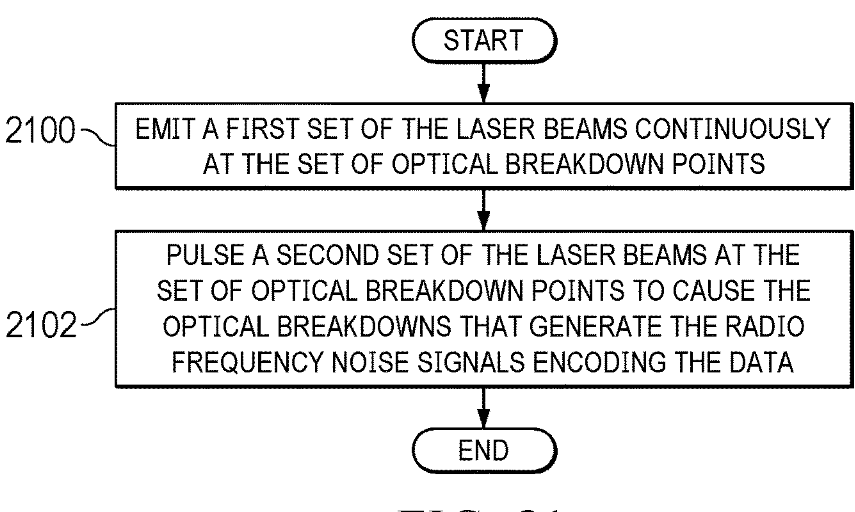
FIG. 21 is an illustration of a flowchart for controlling the emission of laser beams in points in accordance with an illustrative embodiment.

In FIG. 21, an illustration of a flowchart for controlling the emission of laser beams is depicted in points with an illustrative embodiment. The process illustrated in FIG. 21 is yet another example of an implementation for operation 2002 in FIG. 20.

The process begins by emitting a first set of the laser beams continuously at the set of optical breakdown points (operation 2100). The process pulses a second set of the laser beams at the set of optical breakdown points to cause the optical breakdowns that generate the radio frequency noise signals encoding the data (operation 2102). The process terminates thereafter.

In operation 2102, the pulsing can occur by turning the second set of laser beams on and off. In other examples, the pulsing can provide increasing decreasing the power to the second set of laser beams. In this example, the optical breakdowns occur in response to sufficient power in the laser beams at the set of optical breakdown points. In this example, the pulsing can control the timing of when radio frequency noise signals are transmitted.

Further in operation 2102, a power of a laser beam at the optical breakdown point can be controlled at by at least one of a shutter, a lens, a deformable lens, a microelectromechanical systems mirror, an attenuator, a controlling optics, an optical filter, an amplitude modulator in a laser beam generator, or other suitable components.

Figure 22:
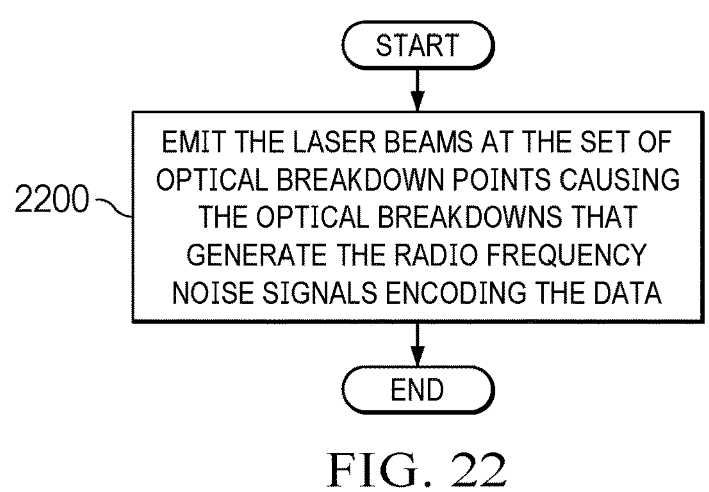
FIG. 22 is an illustration of a flowchart for controlling the emission of the laser beams in points in accordance with an illustrative embodiment.

With reference now to FIG. 22, an illustration of a flowchart for controlling the emission of the laser beams is depicted in points with an illustrative embodiment. The process illustrated in FIG. 21 is yet another example of an implementation for operation 2002 in FIG. 20.

The process emits the laser beams at the set of optical breakdown points causing the optical breakdowns that generate the radio frequency noise signals encoding the data (operation 2200). The process terminates thereafter.

Figure 23:
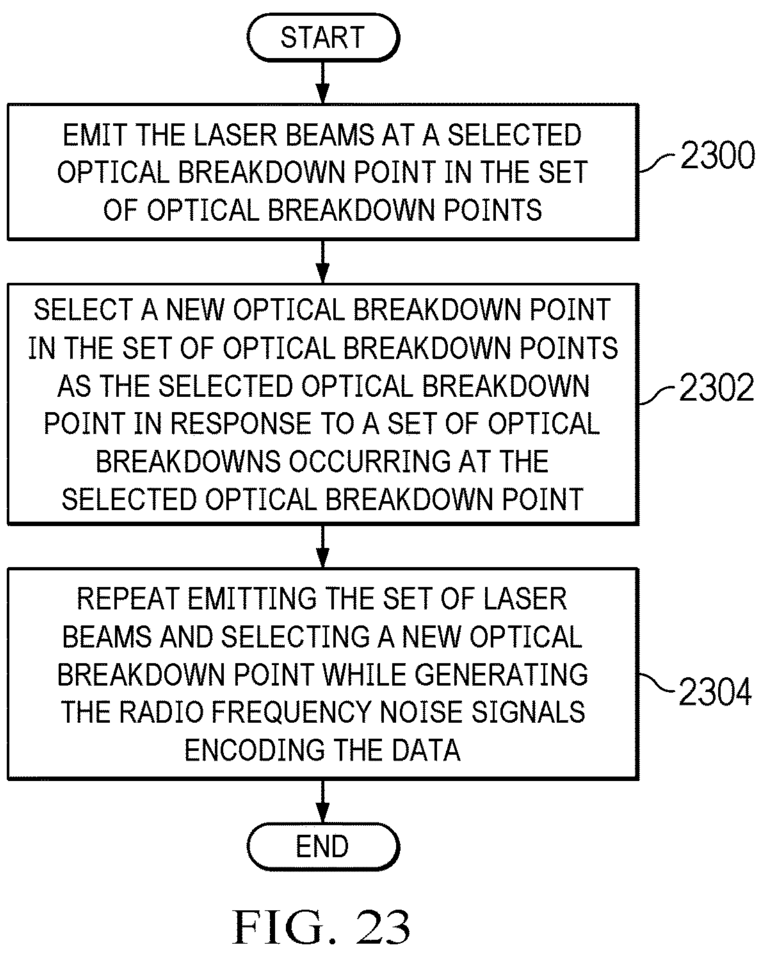
FIG. 23 is an illustration of a flowchart for controlling the emission of laser beams in points in accordance with an illustrative embodiment.

Turning next to FIG. 23, an illustration of a flowchart for controlling the emission of laser beams is depicted in points with an illustrative embodiment. The process illustrated in FIG. 23 is example of an implementation for operation 2200 in FIG. 22.

The process begins by emitting the laser beams at a selected optical breakdown point in the set of optical breakdown points (operation 2300). The process selects a new optical breakdown point in the set of optical breakdown points as the selected optical breakdown point in response to a set of optical breakdowns occurring at the selected optical breakdown point (operation 2302).

The process repeats emitting the set of laser beams and selecting a new optical breakdown point while generating the radio frequency noise signals encoding the data (operation 2304) the process terminates thereafter. In operation 2304, the process repeats operations 2300 and operation 2302 any number of times while transmitting the radio frequency noise signals. Operation at 2304 enables transmitting the radio frequency signals from different physical locations through the selection of different optical breakdown points. As result, identifying the origination of the radio frequency signals can be made more difficult.

With reference next to FIG. 24, an illustration of a flowchart for controlling the emission of laser beams is depicted in points with an illustrative embodiment. The process illustrated in FIG. 24 is another example of an implementation for operation 2002 in FIG. 20.

The process begins by emitting a subset of the laser beams at the set of optical breakdown points to cause the optical breakdowns that generate the radio frequency noise signals encoding the data (operation 2400). The process selects a new subset of laser beams as the subset of the laser beams (operation 2402).

The process repeats emitting the subset of laser beams and selecting a new subset of laser beams while transmitting the radio frequency noise signals encoding the data (operation 2404). The process terminates thereafter. By using different subsets of the laser beams, identifying a physical location from which the laser beams originate can be made more difficult when the laser beams are emitted from different physical locations.

In FIG. 25, an illustration of a flowchart for controlling the emission of laser beams is depicted in points with an illustrative embodiment. The process illustrated in FIG. 25 is an example of an implementation for operation 2002 in FIG. 20.

The process emits the set of laser beams from different physical locations at an optical breakdown point, wherein a portion of the set of laser beams intersect at the optical breakdown point such that a power from the portion of the laser beams is sufficient to cause the optical breakdowns at the intersection point that generate the radio frequency noise signals encoding the data (operation 2500). The process terminates thereafter.

Figure 26:
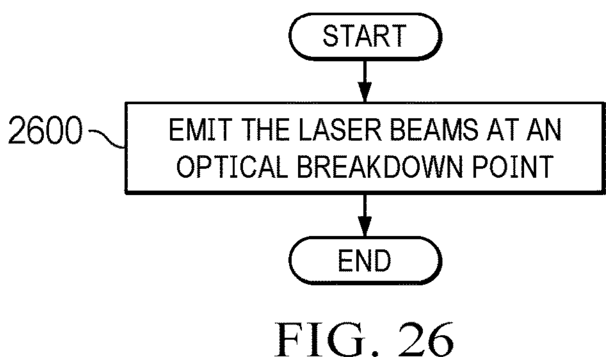
FIG. 26 is an illustration of a flowchart for controlling the emission of laser beams in points in accordance with an illustrative embodiment.

With reference to FIG. 26, an illustration of a flowchart for controlling the emission of laser beams is depicted in points with an illustrative embodiment. The process illustrated in FIG. 26 is an example of an implementation for operation 2002 in FIG. 20.

The process emits the laser beams at an optical breakdown point (operation 2600). The process terminates thereafter. In operation 2600, the optical breakdowns occur in response to all of the laser beams intersecting at the optical breakdown point.

Figure 27:
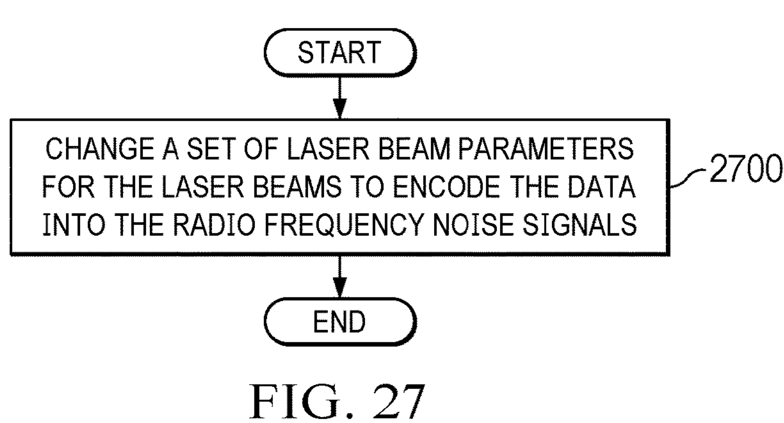
FIG. 27 is an illustration of a flowchart for controlling laser beams in accordance with an illustrative embodiment.

With reference now to FIG. 27, an illustration a flowchart for controlling laser beams is depicted in accordance with an illustrative embodiment. The process illustrated in this figure is an example of an additional operation that can be performed with the operations in FIG. 20.

The process changes a set of laser beam parameters for the laser beams to encode the data into the radio frequency noise signals (operation 2700). The process terminates thereafter. In operation of 2700, changing the set of laser beam parameters changes a set of radio frequency characteristics for the radio frequency noise signals. The set of radio frequency characteristics is selected from at least one of a timing, an optical breakdown point, an amplitude of the radio frequency noise signals, or other characteristics of the radio frequency noise signals.

Figure 28:
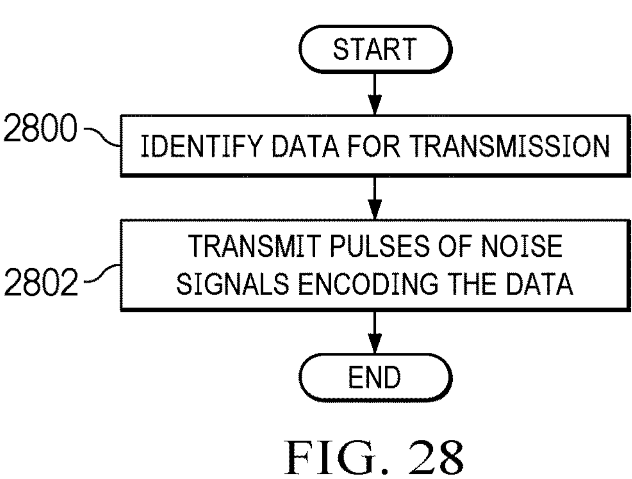
FIG. 28 is an illustration of a flowchart for communicating data in accordance with an illustrative embodiment.

In this illustrative example, FIGS. 28-35 are flowcharts illustrating operations that can be performed to encode data in noise signals. Turning first to FIG. 28, an illustration of a flowchart for communicating data is depicted in accordance with an illustrative embodiment. The process in FIG. 28 can be implemented in hardware, software, or both. When implemented in software, the process can take the form of program instructions that are run by one of more processor units located in one or more hardware devices in one or more computer systems. For example, the process can be implemented in communications manager 912 in computer system 910 in FIG. 9.

The process begins by identifying data for transmission (operation 2800). The process transmits pulses of noise signals encoding the data (operation 2802). The process terminates thereafter. The pulses of noise signals can be selected from at least one of electromagnetic frequency signals, radio frequency signals, microwave frequency signals, audio frequency signals, ultrasonic frequency signals, ultra-low frequency signals, very low frequency signals, underwater frequency signals, or optical frequency signals.

In operation 2802, the pulses of radio frequency noise signals can be transmitted in a number of different ways. For example, these pulses of noise signals can be radio frequency noise signals transmitted from a physical antenna. In another illustrative example, the pulses of noise signals can be transmitted using optical breakdowns generated by laser beams. The optical breakdowns can be controlled to generate pulses of noise signals in the form of radio frequency noise signals.

The noise signals can be generated using at least one of a laser generation system that emits lasers to cause optical breakdown that generates the noise signal or an electric noise generator. The noise in the noise signal can be selected from at least one of nondeterministic noise or pseudo random noise.

Figure 29:
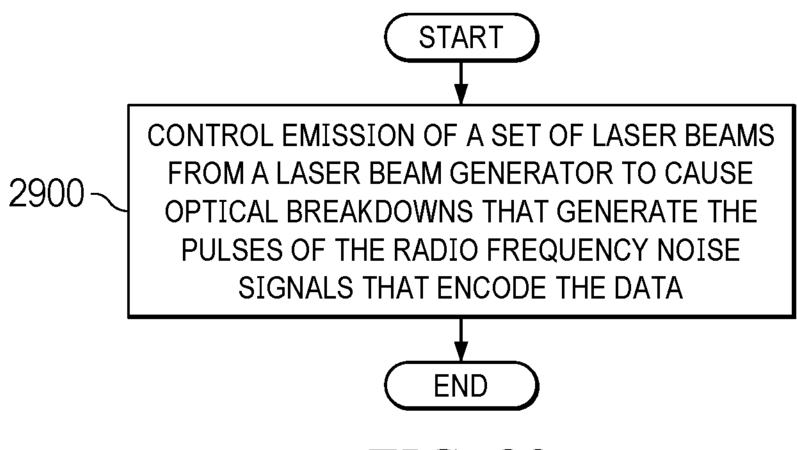
FIG. 29 is an illustration of a flowchart for transmitting pulses of noise signals in accordance with an illustrative embodiment.

Turning to FIG. 29, an illustration of a flowchart for transmitting pulses of noise signals is depicted in accordance with an illustrative embodiment. This flowchart is an example of an implementation for operation 2802 in FIG. 28. In this example, the pulses of noise signals can be pulses of radio frequency noise signals.

The process controls emission of a set of laser beams from a laser beam generator to cause optical breakdowns that generate the pulses of the radio frequency noise signals that encode the data (operation 2900). The process terminates thereafter.

Figure 30:
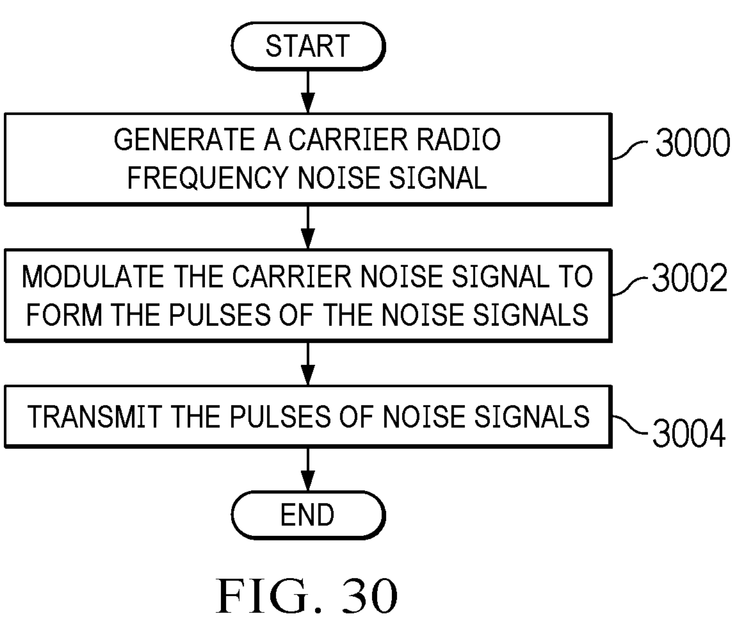
FIG. 30 is another illustration of a flowchart for transmitting pulses of noise signals in accordance with an illustrative embodiment.

With reference next to FIG. 30, another illustration of a flowchart for transmitting pulses of noise signals is depicted in accordance with an illustrative embodiment. This flowchart is an example of an implementation for operation 2802 in FIG. 28.

The process begins by generating a carrier radio frequency noise signal (operation 3000). The process modulates or digitally "shift keys" the carrier noise signal to form the pulses of the noise signals (operation 3002). In operation 3002, the pulses encode the data.

The process transmits the pulses of noise signals (operation 3004). The process terminates thereafter.

Figure 31:
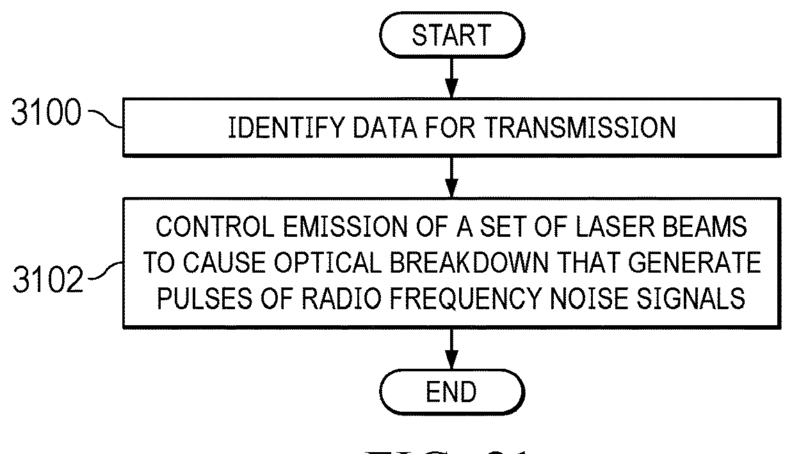
FIG. 31 is an illustration of a flowchart for communicating data in accordance with an illustrative embodiment.

Turning now to FIG. 31, an illustration of a flowchart for communicating data is depicted in accordance with an illustrative embodiment. The process in FIG. 31 can be implemented in hardware, software, or both. When implemented in software, the process can take the form of program instructions that are run by one of more processor units located in one or more hardware devices in one or more computer systems. For example, the process can be implemented in communications manager 912 in computer system 910 in FIG. 9.

The process begins by identifying data for transmission (operation 3100). The process controls emission of a set of laser beams to cause optical breakdown that generate pulses of radio frequency noise signals (operation 3102). The process terminates thereafter. In operation 3100, the data can be encoded in the pulses of the radio frequency noise signals.

Figure 32:
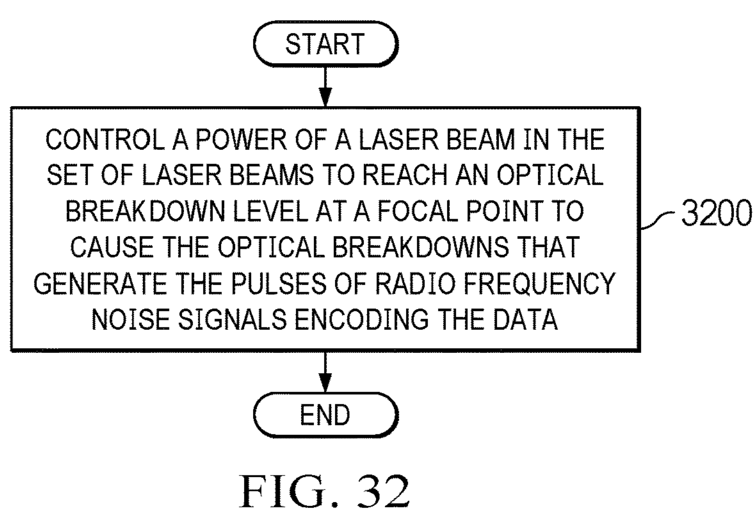
FIG. 32 is an illustration of a flowchart of a process for controlling the emission of a set of one or more beams in accordance with an illustrative embodiment.

With reference to FIG. 32, an illustration of a flowchart of a process for controlling the emission of a set of laser beams is depicted in accordance with an illustrative embodiment. The process in this flowchart is an example of an implementation for operation 3102 in FIG. 31.

The process controls a power of a laser beam in the set of laser beams to reach an optical breakdown level at a focal point to cause the optical breakdowns that generate the pulses of radio frequency noise signals encoding the data (operation 3200). The process terminates thereafter.

Figure 33:
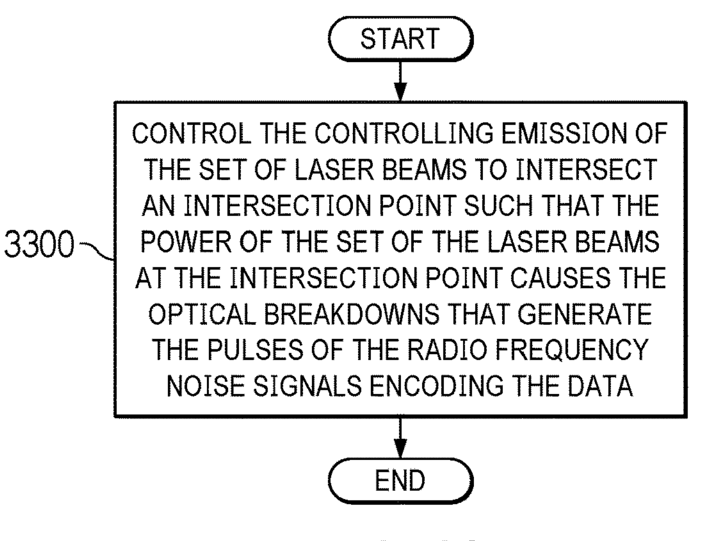
FIG. 33 is an illustration of a flowchart of a process for controlling the emission of a set of one or more beams in accordance with an illustrative embodiment.

Turning next to FIG. 33, an illustration of a flowchart of a process for controlling the emission of a set of laser beams is depicted in accordance with an illustrative embodiment. The process in this flowchart is an example of an implementation for operation 3102 in FIG. 31.

The process controls the controlling emission of the set of laser beams to intersect an intersection point such that the power of the set of the laser beams at the intersection point causes the optical breakdowns that generate the pulses of the radio frequency noise signals encoding the data (operation 3300). The process terminates thereafter.

Figure 34:
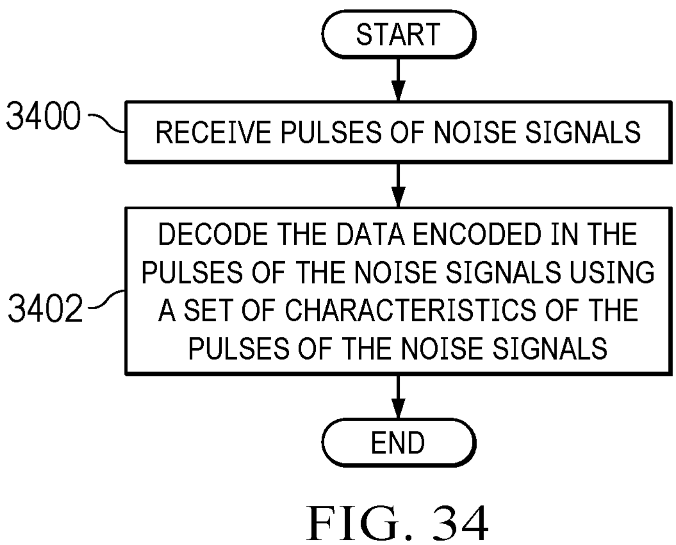
FIG. 34 is an illustration of a flowchart for communicating data in accordance with an illustrative embodiment.

In FIG. 34, an illustration of a flowchart for communicating data is depicted in accordance with an illustrative embodiment. The process in FIG. 34 can be implemented in hardware, software, or both. When implemented in software, the process can take the form of program instructions that are run by one of more processor units located in one or more hardware devices in one or more computer systems. For example, the process can be implemented in communications manager 912 in computer system 910 in FIG. 9.

The process begins by receiving pulses of noise signals (operation 3400). In operation 3400, data is encoded in the pulses of noise signals.

The process decodes the data encoded in the pulses of the noise signals using a set of characteristics of the pulses of the noise signals (operation 3402). The process terminates thereafter. In operation 3402, the set of characteristics comprises at least one of a timing of the pulses of noise, an amplitude of the pulses of noise, a duration of the pulses of noise, or some other characteristic.

Figure 35:
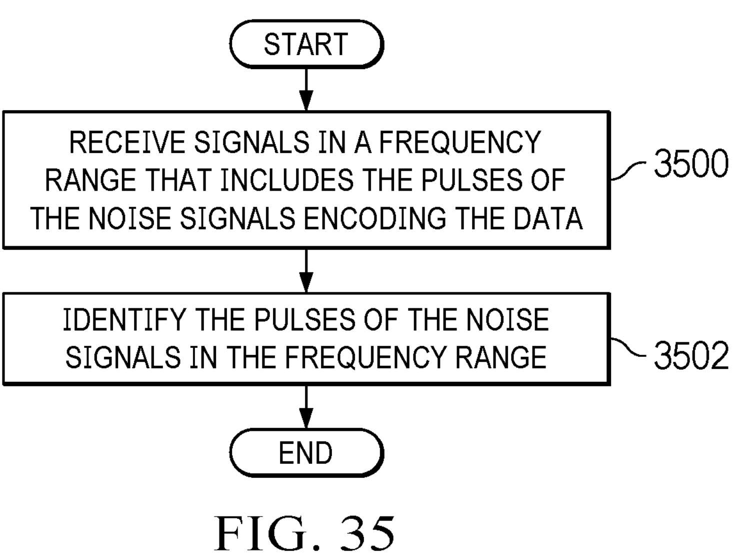
FIG. 35 is an illustration of a flowchart for decoding data in accordance with an illustrative embodiment.

With reference now to FIG. 35, an illustration of a flowchart for decoding data is depicted in accordance with an illustrative embodiment. The process depicted in this flowchart is an example of an implementation for operation 3402 in FIG. 34.

The process begins by receiving signals in a frequency range that includes the pulses of the noise signals encoding the data (operation 3500). In operation 3500, the signals in the frequency range can be received using at least one of a bandpass filter, a notch filter, a band reject filter, a low-pass filter, or a high-pass filter.

The process identifies the pulses of the noise signals in the frequency range (operation 3502). The process terminates thereafter. In operation 3502, the pulses of the noise signals in the frequency range can be identified using an envelope detector.

The flowcharts and block diagrams in the different depicted embodiments illustrate the architecture, functionality, and operation of some possible implementations of apparatuses and methods in an illustrative embodiment. In this regard, each block in the flowcharts or block diagrams can represent at least one of a module, a segment, a function, or a portion of an operation or step. For example, one or more of the blocks can be implemented as program instructions, hardware, or a combination of the program instructions and hardware. When implemented in hardware, the hardware can, for example, take the form of integrated circuits that are manufactured or configured to perform one or more operations in the flowcharts or block diagrams. When implemented as a combination of program instructions and hardware, the implementation may take the form of firmware. Each block in the flowcharts or the block diagrams can be implemented using special purpose hardware systems that perform the different operations or combinations of special purpose hardware and program instructions run by the special purpose hardware.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

Thus, the illustrative examples provide a method, apparatus, and system for transmitting radio frequency signals using a transmission system in which a physical antenna is absent. Optical breakdowns are generated by laser beams in which the optical breakdowns create plasma. The plasma results in radio frequency noise signals. The optical breakdowns can be controlled to encode data in the radio frequency noise signals. The physical locations of these optical breakdowns are radio frequency source emitters in the depicted examples.

Further, these radio frequency source emitters can be moved to different physical locations by repositioning the laser beams such that the laser beams point at different optical breakdown points. Attacks at these physical locations are in essence attacks at the optical breakdown points where the plasma is generated.

As a result, kinetic attacks against these physical locations are useless because no physical infrastructure is present at the physical locations. Further, the laser modulation sources are remote from the physical locations of these radio frequency source emitters. These optical breakdowns can occur at a physical location that is remote from the laser source.

Further, the illustrative examples can encode data using noise signals. The use of noise signals is in contrast to the use of sinusoidal signals as a carrier signal to encode data. With the encoding of data in pulses of noise signals, issues with detection and interference in transmitting data encoded using sinusoidal carriers can be reduced. These noise signals can be considered to be baseband noise signals or noise signals that are carrier signals themselves (i.e., noise carrier signals or noise carriers) as opposed to sinusoidal or other periodic carriers or carrier signals.

The following figures provide examples of some types of noise modulation that can be performed in accordance with one or more illustrative examples. Some examples of noise modulation that can be performed include digital amplitude noise shift keying, digital frequency noise shift keying, digital simultaneous multi-frequency center point noise-band shift keying, digital multi-frequency-amplitude/band shift keying, digital doppler noise shift keying, and digital phase-differential noise shift keying.

Figure 36:
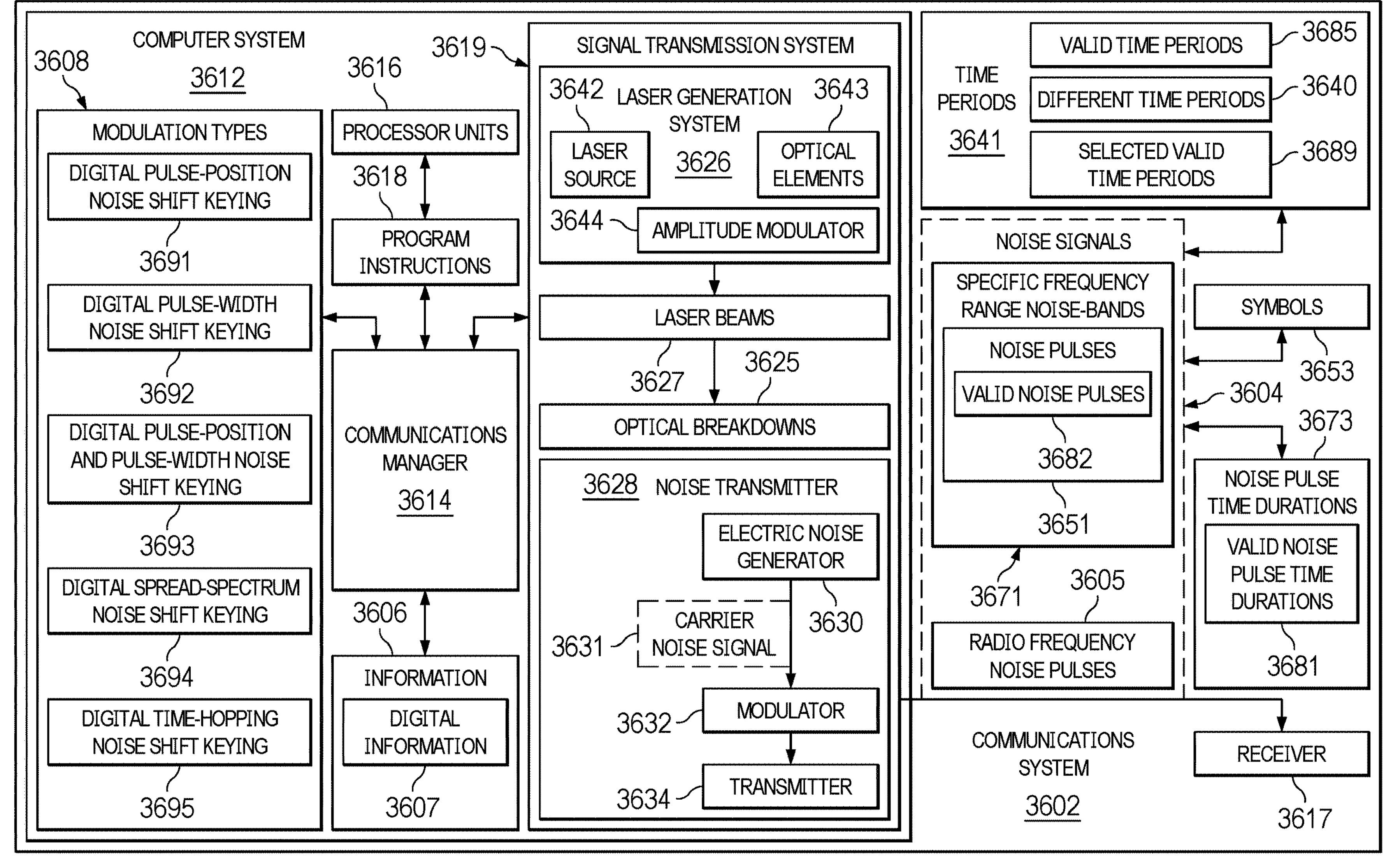
FIG. 36 is an illustration of a block diagram of a communication system in accordance with an illustrative embodiment.

With reference next to FIG. 36, an illustration of a block diagram of a communication system is depicted in accordance with an illustrative embodiment. In this illustrative example, communications system 3602 operates to modulate noise signals 3604 to correspond to information 3606. Noise signals 3604 are selected from at least one of electromagnetic frequency noise signals, radio frequency noise signals, microwave frequency noise signals, audio frequency noise signals, ultrasonic frequency noise signals, ultra-low frequency noise signals, very low frequency noise signals, underwater frequency noise signals, or optical frequency noise signals including at least one of visible or non-visible light.

The modulation performed by communications system 3602 can be selected from a set of modulation types 3608. In this illustrative example, modulation types 3608, for example, include digital pulse-position noise shift keying 3691, digital pulse-width noise shift keying 3692, digital pulse-position and pulse-width noise shift keying 3693, digital spread-spectrum noise shift keying 3694, and digital time-hopping noise shift keying 3695.

In these examples, digital pulse-position noise shift keying 3691 can also be referred to as digital time period between noise pulses noise shift keying. Digital pulse-width noise shift keying 3692 can be referred to as noise pulse time durations noise shift keying. Further in this example, digital pulse-position and pulse-width noise shift keying 3693 can be referred to as noise pulse time durations noise shift keying, a combination of digital pulse-position and pulse-width noise shift keying. Also, digital spread-spectrum noise shift keying 3694 can be referred to as digital frequency-hopping noise shift keying, and digital time-hopping noise shift keying 3695 can be referred to as digital frequency and time-hopping noise shift keying.

As depicted, communications system 3602 comprises computer system 3612, communications manager 3614, and signal transmission system 3619.

In the illustrative example, communications manager 3614 can be implemented in software, hardware, firmware, or a combination thereof. When software is used, the operations performed by communications manager 3614 can be implemented in program instructions configured to run on hardware, such as a processor unit. When firmware is used, the operations performed by communications manager 3614 can be implemented in program instructions and data and stored in persistent memory to run on a processor unit.

When hardware is employed, the hardware may include circuits that operate to perform the operations in communications manager 3614. The circuits used to implement communications manager 3614 can take other forms in addition to or in place of a processor unit.

Computer system 3612 is a physical hardware system and includes one or more data processing systems. When more than one data processing system is present in computer system 3612, those data processing systems are in communication with each other using a communications medium. The communications medium can be a network. The data processing systems can be selected from at least one of a computer, a server computer, a tablet computer, or some other suitable data processing system.

As depicted, computer system 3612 includes a number of processor units 3616 that are capable of executing program instructions 3618 implementing processes in the illustrative examples. In other words, program instructions 3618 are computer-readable program instructions.

As used herein, a processor unit in the number of processor units 3616 is a hardware device and is comprised of hardware circuits such as those on an integrated circuit that respond to and process instructions and program code that operate a computer. When the number of processor units 3616 executes program instructions 3618 for a process, the number of processor units 3616 can be one or more processor units that are in the same computer or in different computers. In other words, the process can be distributed between processor units 3616 on the same or different computers in computer system 3612.

Further, the number of processor units 3616 can be of the same type or different type of processor units. For example, the number of processor units 3616 can be selected from at least one of a single core processor, a dual-core processor, a multi-processor core, a general-purpose central processing unit (CPU), a graphics processing unit (GPU), a digital signal processor (DSP), or some other type of processor unit.

In this example, noise signals 3604 can be transmitted to receiver 3617 from signal transmission system 3619. In this illustrative example, noise signals 3604 are received by receiver 3617. Receiver 3617 is also depicted as part of communications system 3602. In yet other illustrative examples, receiver 3617 may be a separate component from communications system 3602.

Receiver 3617 is a hardware system and can include processes implemented in hardware or software that recover information 3606 from noise signals 3604.

In this illustrative example, signal transmission system 3619 can take a number of different forms. For example, signal transmission system 3619 can be implemented using at least one of laser generation system 3626 or noise transmitter 3628. Laser generation system 3626 can be implemented using laser generation systems as depicted in FIGS. 2-7. With laser generation system 3626, noise signals 3604 take the form of radio frequency noise pulses 3605.

As depicted, noise transmitter 3628 can include electric noise generator 3630, modulator 3632, and transmitter 3634. In one illustrative example, noise transmitter 3628 can be implemented using a noise transmitter such as radio frequency transmitter 1002 as depicted in FIG. 10 and FIG. 11. In other illustrative examples, other types of noise transmitters can be used to transmit other types of noise signals 3604.

In the illustrative examples, the noise generator can be implemented to generate electrical noise and other forms other than radio frequency noise signals. As result, noise signals 3604 can take different forms and can be selected from at least one of electromagnetic frequency noise signals, radio frequency noise signals, microwave frequency noise signals, audio frequency noise signals, ultrasonic frequency noise signals, ultra-low frequency noise signals, very low frequency noise signals, underwater frequency noise signals, or optical frequency noise signals including at least one of visible or non-visible light.

When using digital pulse-position noise shift keying 3691, communications manager 3614 identifies information 3606 in the form of digital information 3607 for transmission. Communications manager 3614 transmits noise signals 3604 in form of noise pulses 3651 having different time periods 3640 between noise pulses 3651. In this example, different time periods 3640 correspond to symbols 3653 representing digital information 3607. In this example, noise pulses 3651 are generated from at least one of electromagnetic frequency noise signals, radio frequency noise signals, microwave frequency noise signals, audio frequency noise signals, ultrasonic frequency noise signals, ultra-low frequency noise signals, very low frequency noise signals, underwater frequency noise signals, or optical frequency noise signals including visible or non-visible light.

In this illustrative example, signal transmission system 3619 transmits noise pulses 3651 having different time periods 3640 between noise pulses 3651 within specific frequency range noise-bands 3671. In other words, specific frequency range noise-bands 3671 are multiple frequency range noise-bands that can be used to transmit noise pulses 3651. This use of multiple frequency-range noise-bands can enable sending noise pulses 3651 on different frequencies at substantially the same time.

For example, some noise pulses in noise pulses 3651 can be transmitted within a frequency range noise-band while other noise pulses in noise pulses 3651 can be transmitted in other frequency-range noise-bands. As a result, parallel transmission of noise pulses 3651 can occur within different specific frequency range noise-bands 3671. These different frequency range noise-bands do not overlap with each other in this example.

By using multiple frequency range noise-bands to send noise pulses 3651, increased numbers of symbols 3653 representing digital information 3607 can be sent to receiver 3617 more quickly as compared to sending symbols 3653 using only a single frequency range noise-band. In this example, a symbol in symbols 3653 comprises a number of bits.

In other illustrative examples, noise pulses 3651 can be sent to receiver 3617 within specific frequency range noise-bands 3671 having a first specific frequency range. Noise pulses 3651 can be sent to another receiver in specific frequency range noise-bands 3671 having a second specific frequency range that does not overlap the first specific frequency range.

In one illustrative example, noise pulses 3651 can have noise pulse time durations 3673 with a fixed length. In other illustrative examples, noise pulses 3651 can have noise pulse time durations 3673 with a varying length. This noise pulse time duration can also be referred to as a pulse-width in which the width of the pulse is measured in time. In this example, the pulse-width measurement is of the duration of the noise pulse in time.

A time period in different time periods 3640 is a time period between noise pulses. A time period between noise pulses begins at an end of a noise pulse in noise pulses 3651. The time period between noise pulses ends at a start of a next pulse in noise pulses 3651. In one example, the end of the noise pulse in noise pulses 3651 is a synchronization point or sync point for a receiver to synchronize to the transmitted signal, and an end of the next pulse in noise pulses 3651 is a resync point for a receiver to resynchronize its timing to the transmitted signal.

In one illustrative example, noise pulses 3651 in noise signals 3604 take the form of radio frequency noise pulses 3605. With this example, laser generation system 3626 is configured to emit a set of one or more laser beams 3627. As result, in transmitting noise signals 3604 in the form of noise pulses 3651, communications manager 3614 controls an emission of the set of one or more laser beams 3627 from laser generation system 3626 to control optical breakdowns 3625 that generate radio frequency noise pulses 3605 having different time periods 3640 between radio frequency noise pulses 3605 that correspond to symbols 3653 representing digital information 3607. In other words, digital information 3607 is at least one of encoded, transferred, transformed, or modulated into radio frequency noise pulses 3605 based on different time periods 3640 for radio frequency noise pulses 3605.

Communications manager 3614 can control the emission of the set of one or more laser beams 3627 to control the generation of optical breakdowns 3625 by using at least one of laser source 3642, amplitude modulator 3644, or optical elements 3643 in laser generation system 3626. In this example, amplitude modulator 3644 can modulate the amplitude, power, or intensity of the set of one or more laser beams 3627 emitted by laser source 3642.

In another illustrative example, communications manager 3614 can transmit digital information 3607 using noise transmitter 3628 in signal transmission system 3619. With this example, electric noise generator 3630 is configured to generate a carrier noise signal 3631.

With this example, in generating noise signals 3604, communications manager 3614 generates carrier noise signal 3631 using electric noise generator 3630. Communications manager 3614 modulates carrier noise signal 3631 using modulator 3632 to generate noise pulses 3651 having different time periods 3640 between noise pulses 3651 that correspond to symbols 3653 representing digital information 3607. Communications manager 3614 transmits noise pulses 3651 with different time periods 3640 using transmitter 3634.

In this illustrative example, receiver 3617 is configured to receive noise signals 3604, in which digital information 3607 is modulated in noise signals 3604 using different time periods 3640. Receiver 3617 is configured to demodulate digital information 3607 modulated in noise signals 3604 based on different time periods 3640 between noise pulses 3651 in noise signals 3604.

In this illustrative example, receiver 3617 can perform error correction using at least one of noise pulse time durations 3673 or pulse-width time durations, or time periods 3641 between noise pulses 3651. For example, receiver 3617, in determining time periods 3641 between noise pulses 3651, receiver 3617 determines valid noise pulse time durations 3681 between valid noise pulses 3682 in noise pulses 3651. In this example, valid noise pulse time durations 3681 between noise pulses 3651 are identified from noise pulse time durations 3673 for noise pulses 3651. With this example, in identifying symbols 3653, receiver 3617 identifies symbols 3653 representing digital information 3607 by using selected valid time periods 3689 between valid noise pulses 3682.

In another illustrative example, in determining time periods 3641, receiver 3617 determines valid noise pulse time durations 3681 for valid noise pulses 3682. Further, receiver 3617 determines valid time periods 3685 between valid noise pulses 3682. In this example, valid time periods 3685 are identified from time periods 3641 for noise pulses 3651. With this example, in identifying symbols 3653, receiver 3617 identifies symbols 3653 representing digital information 3607 by using time periods 3641 between noise pulses 3651 that are valid time periods 3685 between valid noise pulses 3682.

Figure 37:
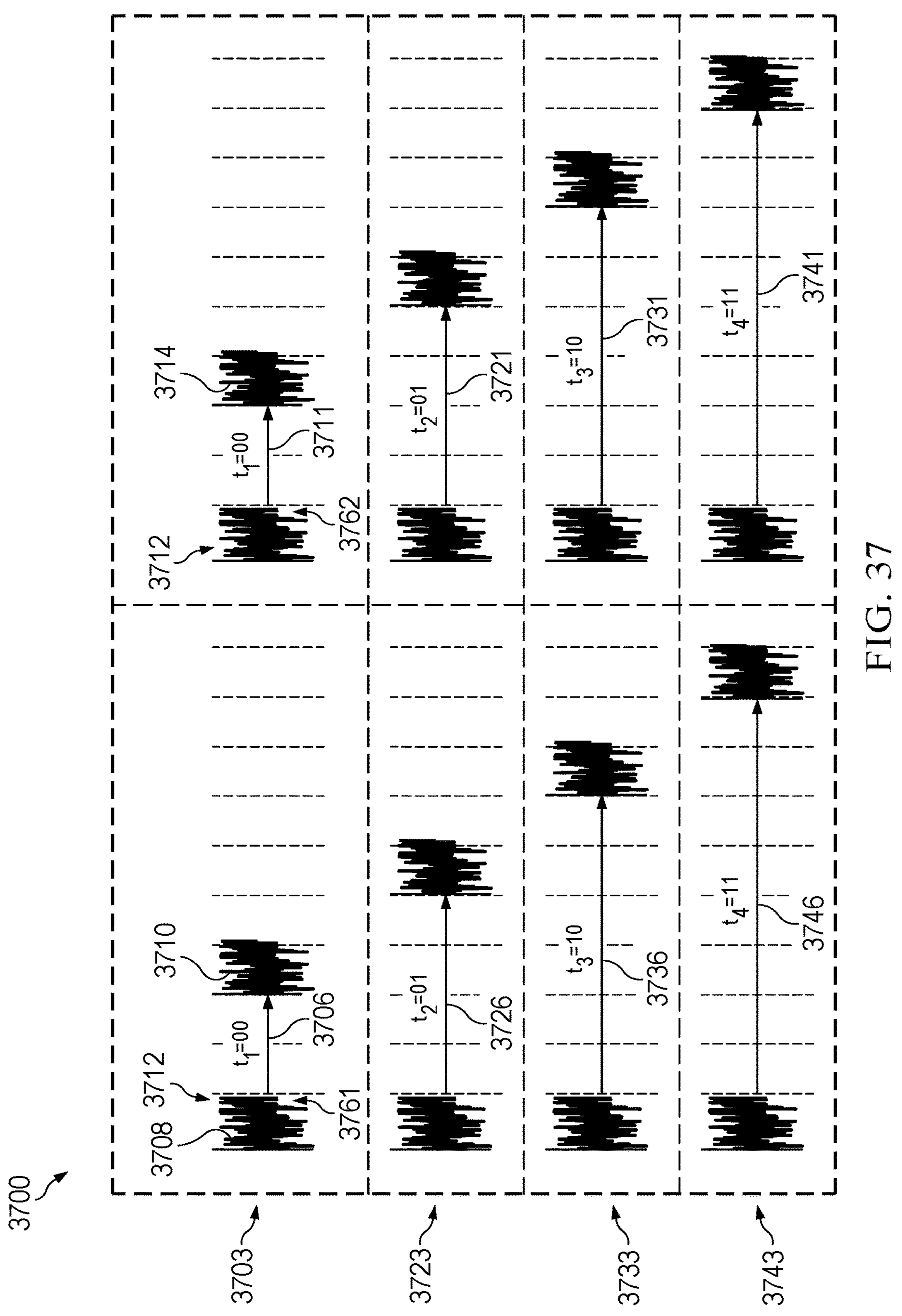
FIG. 37 is an illustration of noise pulses generated using digital pulse-position noise shift keying in accordance with an illustrative embodiment.

Turning now to FIG. 37, an illustration of noise pulses generated using digital pulse-position noise shift keying is depicted in accordance with an illustrative embodiment. In this example, noise pulses 3700 are generated by communications system 3602 using digital pulse-position noise shift keying 3691.

In this example, digital information is transmitted using symbols that represent the digital information. As depicted, groups of noise pulses 3700 that correspond to symbols are transmitted using time periods between groups of noise pulses 3700. In this example, the groups of noise pulses 3700 comprise first group 3703, second group 3723, third group 3733, and fourth group 3743.

The symbols are based on and correlated to the amount of time in the time periods between noise pulses 3700. As depicted, a time period begins at an end of a noise pulse in noise pulses 3700 and this time period ends at a start of a next pulse in noise pulses 3700. Further, the time periods are defined by different pairs of noise pulses. In other words, a time pulse that marks the end of a time period is not used to mark, synchronize, or sync the beginning of the next time period. This type of digital pulse-position noise shift keying is referred to as synced digital pulse-position noise shift keying. The time periods between noise pulses 3700 is an example of pulse positioning.

The different time periods correspond to symbols. In this example the time period and symbol correspondence are as follows: t1 is symbol 00, t2 is symbol 01, t3 is symbol 10, and t4 is symbol 11. Thus, the different time periods t1, t2, t3, and t4 correspond to different symbols.

In this example, t1, t2, t3, and t4 represent different time intervals or time periods between noise pulses. For example, if a timeslot has a value of one millisecond (ms), then t1=1 ms, t2=2 ms, t3=3 ms, and t4=4 ms. In this example, t2 is 2 times t1, t3 is 3 times t1, and t4 is 4 times t1. In other examples, a timeslot can be of any time duration or length such as 2 microseconds, 0.5 seconds, or some other time value.

For example, in first group 3703 of noise pulses 3700, time period 3706 between noise pulses begins at the end of first noise pulse 3708 and ends at the beginning of second noise pulse 3710. Time period 3706 is t1 and corresponds to 00 as a first symbol in first group 3703 in this example. Further in this example, the second symbol is represented by time period 3711. Time period 3711 begins at the end of third noise pulse 3712 and ends at the beginning of fourth noise pulse 3714. In this example, time period 3711 is t1 and corresponds to 00 for the second symbol in first group 3703 of noise pulses 3700. The digital information in this first group of noise pulses 3700 is 0000.

In this example, first noise pulse 3708 and second noise pulse 3710 are a pair of noise pulses for the first symbol, while third noise pulse 3712 and fourth noise pulse 3714 are a different pair of noise pulses for the second symbol in this first group. In other words, each of these two symbols is defined by a different pair of noise pulses. In other words, second noise pulse 3710 is not the noise pulse that defines the beginning of the time period for a subsequent symbol. Further, in this example, the end of first noise pulse 3708 is sync point 3761. Additionally, the end of third noise pulse 3712 is resync point 3762. This point can also be referred to as a sync point.

In second group 3723 of noise pulses 3700, time period 3726 is t2, which corresponds to the second symbol 01. Time period 3721 is t2, which corresponds to 01 as the second symbol. The digital information in second group 3723 of noise pulses 3700 is 0101.

Next in third group 3733 of noise pulses 3700, time period 3736 is t3, which corresponds to 10 as the first symbol. Time period 3731 is t3 and corresponds to 10 as the second symbol in third group 3733 of noise pulses 3700. The digital information in third group 3733 of noise pulses 3700 is 1010.

In fourth group 3743 of noise pulses 3700, time period 3746 is t4, which corresponds to 11 for the first symbol. Time period 3741 is t4 and corresponds to 11 as the second symbol in group 3743. The digital information in this fourth group of noise pulses 3700 is 1111.

The illustration of noise pulses with different time periods and symbols corresponding to those time periods for digital information in FIG. 37 is presented as an example and not meant to limit the manner in which other illustrative examples can be implemented. For example, in this example, the time period between noise pulses represents a symbol comprising two bits. In another illustrative example, the different time periods can correspond to symbols in other forms such as one bit, four bits, seven bits, or some other number bits. Further, the times, time periods, noise pulses, and symbols do not have to be linearly correlated. Further, in the illustrative example, a noise pulse can have different noise pulse time durations. In this example, the different time periods between noise pulses correlate to symbols and noise pulse time durations of the noise pulses do not correlate to symbols.

As another example, although each set of symbols for a group of noise pulses 3700 in this example are shown to be the same symbols, different symbols can be present in other illustrative examples. For example, in another illustrative example time period 3706 can be t4, which corresponds to 11 for the first symbol and time period 3711 can be t2, which corresponds to 01 for the second symbol. Further, different groups of noise pulses can have different numbers of noise pulses. For example, a group of noise pulses can have one noise pulse, five noise pulses, 12 noise pulses, or some other number of noise pulses that correspond to symbols representing digital information.

Figure 38:
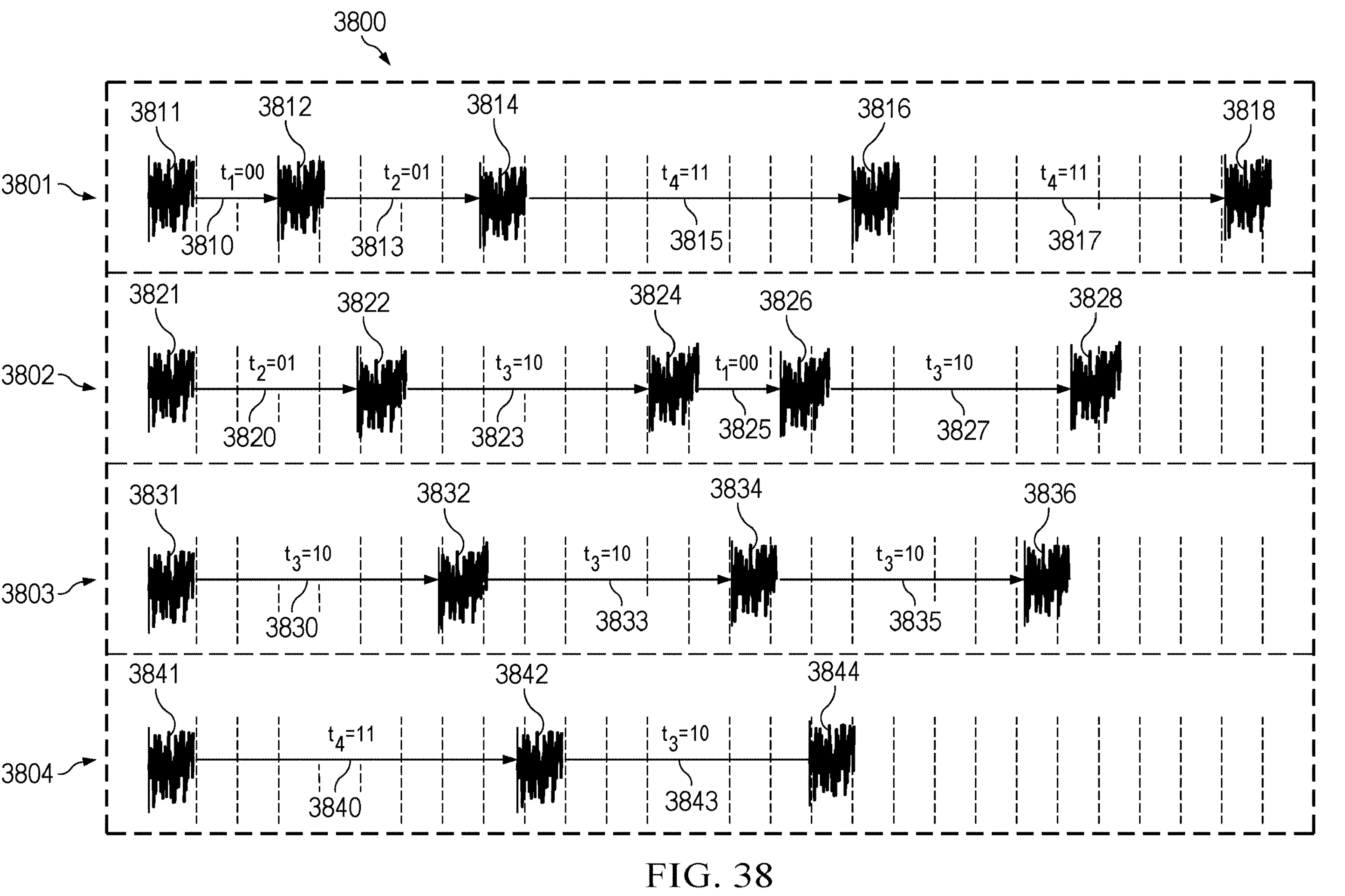
FIG. 38 is an illustration of noise pulses generated using digital pulse-position noise shift keying in accordance with an illustrative embodiment.

Turning now to FIG. 38, an illustration of noise pulses generated using digital pulse-position noise shift keying is depicted in accordance with an illustrative embodiment. In this example, noise pulses 3800 are generated by communications system 3602 using digital pulse-position noise shift keying 3691.

In this example, digital information is transmitted using symbols that represent the digital information. Groups of noise pulses that correspond to symbols are transmitted using time periods between groups of noise pulses 3800. As depicted, these groups are first group 3801, second group 3802, third group 3803, and fourth group 3804 of noise pulses 3800.

As depicted, a time period begins at an end of a noise pulse in noise pulses 3800 and this time period ends at a start of a next pulse in noise pulses 3800. Further in this example, the end of the next pulse also marks, synchronizes, or syncs the time for the next symbol.

In this example in FIG. 38, this type of digital pulse-position noise shift keying is referred to as differential digital pulse-position noise shift keying as opposed to the synced digital pulse-position noise shift keying as shown in FIG. 37. This type of transmission of noise pulses involves different time periods between noise pulses in which the noise pulse that occurs at the end of one time period is the same noise pulse used to indicate the beginning of the next time period.

The different time periods between noise pulses correspond or correlate to symbols. In this example, t1 corresponds to symbol 00, t2 corresponds to symbol 01, t3 corresponds to symbol 10, and t4 corresponds to symbol 11. For example, in first group 3801 of noise pulses 3800, time period 3810 begins at the end of first noise pulse 3811 and ends at the beginning of second noise pulse 3812. Time period 3810 is t1 and corresponds to symbol 00 in this example. Further in this example, time period 3813 begins at the end of second noise pulse 3812 and ends at beginning of third pulse 3814. In this example, time period 3813 is t2 and corresponds to 01 as the symbol.

Additionally, time period 3815 begins at the end of third pulse 3814 and ends at the beginning of fourth pulse 3816. Time period 3815 is t4 and corresponds to the symbol 11. Further in this example, time period 3817 begins at the end of fourth pulse 3816 and ends at the beginning of fifth pulse 3818. Time period 3817 is t4 and corresponds to 11 as the symbol for this time period. The digital information in this first group 3801 of noise pulses 3800 is 00011111.

Next in second group 3802 of noise pulses 3800, time period 3820 begins at the end of first noise pulse 3821 and ends at the beginning of second noise pulse 3822. Time period 3820 is t2 and corresponds to the symbol 01 in this example. Further in this example, time period 3823 begins at the end of second noise pulse 3822 and ends at the beginning of third pulse 3824. In this example, time period 3823 is t3 and corresponds to the symbol 10. Additionally, time period 3825 begins at the end of third pulse 3824 and ends at the beginning of fourth pulse 3826. Time period 3825 is t1 and corresponds to the symbol 00. Further in this example, time period 3827 begins at the end of fourth pulse 3826 and ends at the beginning of fifth pulse 3828. Time period 3827 is t3 and corresponds to 10 as the symbol for this time period. The digital information in this second group 3802 of noise pulses 3800 is 01100010.

In third group 3803 of noise pulses 3800, time period 3830 begins at the end of first noise pulse 3831 and ends at the beginning of second noise pulse 3832. Time period 3830 is t3 and corresponds to symbol 10 in this example. Further in this example, time period 3833 begins at the end of second noise pulse 3832 and ends at beginning of third noise pulse 3834. In this example, time period 3833 is t3 and corresponds to the symbol 10. Additionally, time period 3835 begins at the end of third noise pulse 3834 and ends at the beginning of fourth noise pulse 3836. Time period 3835 is t3 and corresponds to the symbol 10. The digital information in third group 3803 of noise pulses 3800 is 101010.

Next, fourth group 3804 of noise pulses 3800, time period 3840 begins at the end of first noise pulse 3841 and ends at the beginning of second noise pulse 3842. Time period 3840 is t4 and corresponds to symbol 11. Further in this example, time period 3843 begins at the end of second noise pulse 3842 and ends at the beginning of third noise pulse 3844. In this example, time period 3843 is t3 and corresponds to the symbol 10. The digital information in this third group of noise pulses 3800 is 1110.

This type of transmission of noise pulses with different time periods between pulses with syncing or beginning time periods at the ending of the previous noise pulse can increase the rate in which data is transmitted as compared to the example in FIG. 37.

The illustration of noise pulses with different time periods between noise pulses and symbols corresponding to those time periods between noise pulses for digital information in FIG. 38 is presented as an example and not meant to limit the manner in which other illustrative examples can be implemented. For example, in this example, the time period between noise pulses represents a symbol comprising two bits. In another illustrative example, the different time periods can correspond to symbols in other forms such as three bits, four bits, nine bits, or some other number bits. Further, the times, time periods, noise pulses, and symbols do not have to be linearly correlated. Further, in the illustrative example, a noise pulse can have different pulse widths. In this example, the different time periods correlate to symbols and pulse widths of the noise pulses do not correlate to symbols.

As another example, although each group of symbols in this example are shown to be the same symbols, different symbols can be present in other illustrative examples. For example, in another illustrative example time period 3810 can be t4, which corresponds to 11 for the first symbol and time period 3815 can be t2, which corresponds to 01 for the third symbol. In other examples, a group of noise pulses can include other numbers of time periods between noise pulses that correspond to different symbols than shown in FIG. 38. For example, one time period, six time periods, nine time periods, or some other number of time periods can be present that correspond to different symbols. Also, different numbers of bits may correspond to different symbols in these examples.

Figure 39:
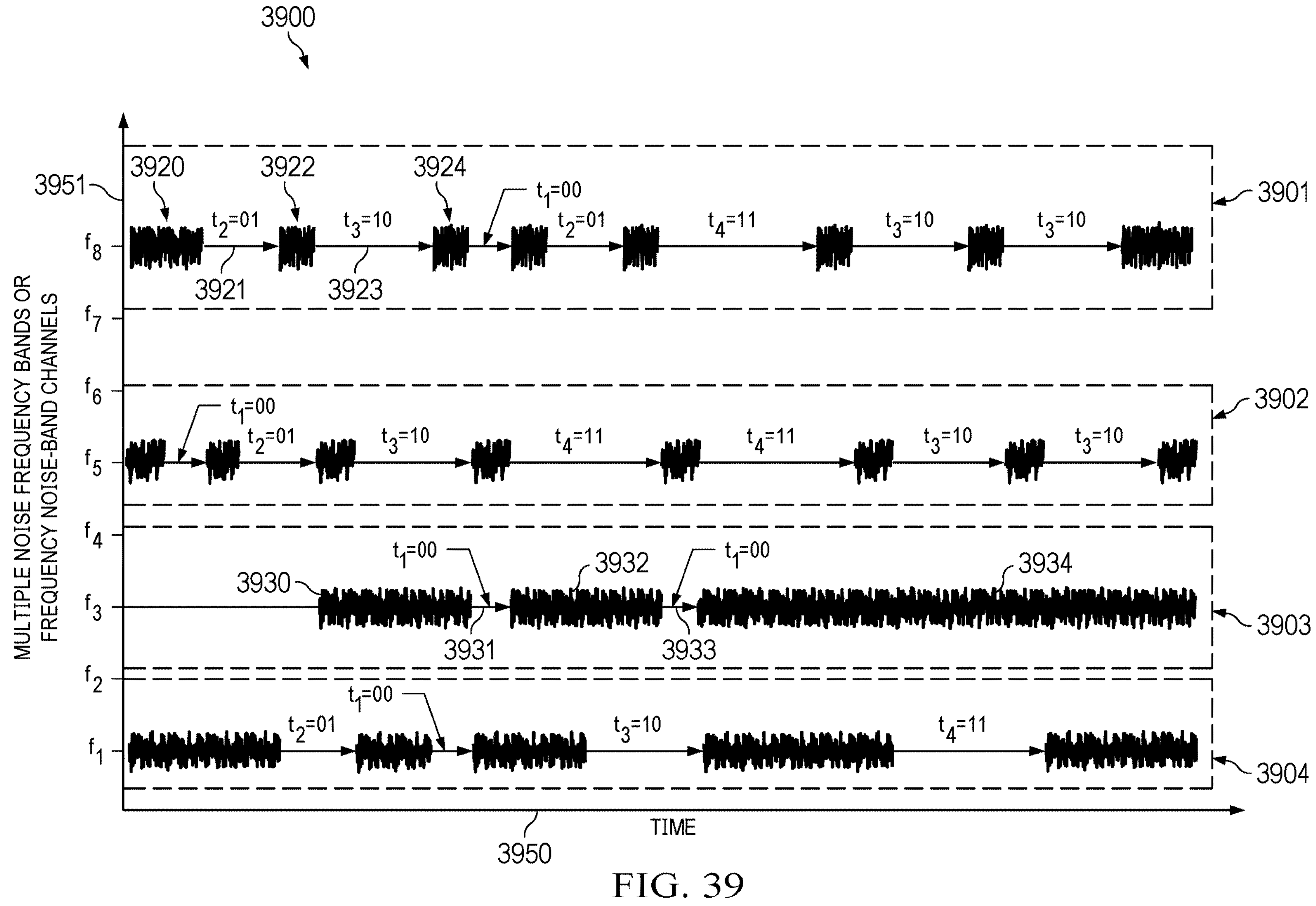
FIG. 39 is an illustration of noise pulses generated using digital pulse-position noise shift keying in accordance with an illustrative embodiment.

Turning to FIG. 39, an illustration of noise pulses generated using digital pulse-position noise shift keying is depicted in accordance with an illustrative embodiment. In this example, noise pulses 3900 are generated by communications system 3602 using digital pulse-position noise shift keying 3691. In this example, the noise pulses are transmitted within multiple specific frequency-range noise-bands.

In this example, digital information is transmitted using symbols that represent the digital information. As depicted, groups of noise pulses 3900 that correspond to symbols are transmitted at the same or similar times using multiple noise frequency bands f1, f3, f5, and f8. These multiple noise frequency bands can also be referred to as different frequency range noise-bands.

In this example, x-axis 3950 represents time and y-axis 3951 represents discrete or different frequency-range noise-bands. Groups of noise pulses 3900 are depicted as being transmitted at substantially the same time over different frequency-range noise-bands. Different symbols representing digital information can be sent in parallel to the same receiver over these different frequency range noise-bands. In other examples, these symbols can be sent to different receivers over the different frequency range noise-bands.

As depicted by the dashed line boxes, first group 3901, second group 3902, third group 3903, and fourth group 3904 are shown transmitted over time at different frequency-range noise-bands or different frequency noise-band channels. For example, first group 3901 is transmitted using frequency-range noise-band f8, second group 3902 is transmitted using frequency-range noise-band f5, third group 3903 is transmitted using frequency-range noise-band f3, and fourth group 3904 is transmitted using frequency-range noise-band f1.

As with the example in FIG. 38, the end of a first noise pulse determines, indicates, or marks the start of a time period between noise pulses. The beginning of the next noise pulse determines, indicates, or marks the end of that time period between noise pulses. As depicted in this example, the noise pulses can have different noise pulse time durations. These different noise pulse time durations do not change the symbol that correlates to the time period between the noise pulses. The length of this time period between noise pulses corresponds to a symbol. The different time periods correspond to different symbols. In this example, t1 corresponds to symbol 00, t2 corresponds to symbol 01, t3 corresponds to symbol 10, and t4 corresponds to symbol 11.

For example, the noise pulses in first group 3901 of noise pulses 3900 are transmitted using frequency-range noise-band f8. In this example, the end of noise pulse 3920 marks the beginning of time period 3921. The beginning of the subsequent noise pulse, noise pulse 3922, marks the end of time period 3921. In this example, time period 3921 is t2 and the symbol for t2 is 01.

In this example, the end of noise pulse 3922 also marks the beginning of the next time period, time period 3923. The beginning of noise pulse 3924 marks the end of time period 3923. In this example, time period 3923 is t3, which corresponds to the symbol 10. As can be seen in this example, noise pulse 3920 has a different noise pulse time duration from noise pulse 3922 and noise pulse 3924. In this illustrative example, this difference in noise pulse time durations does not change or affect the symbols, which are correlated to the length of time periods between noise pulses.

As a further example, third group 3903 in noise pulses 3900 are transmitted using frequency-range noise-band f3. In this example, the end of noise pulse 3930 marks the beginning of time period 3931 and the beginning of noise pulse 3932 marks the end of time period 3931. As depicted, time period 3931 is t1, which correlates to the symbol 00. Time period 3933 begins when noise pulse 3932 ends. Time period 3933 ends at the beginning of noise pulse 3934. As shown in this example, noise pulse 3930 has a different pulse width from noise pulse 3932 and noise pulse 3934. In this example, time periods between noise pulses are used to determine the symbols and noise pulse time durations are not used for this purpose.

Thus, the symbols for the different time periods between noise pulses in the first group 3901 of noise pulses 3900 correspond to 01100001111010. The symbols for the different time periods between noise pulses in the second group 3902 of noise pulses 3900 correspond to 00011011111010. Further in this example, the symbols that correspond to the different time periods between noise pulses in third group 3903 of noise pulses 3900 correspond to 0000. Also in this example, the symbols that correspond to the different time periods between noise pulses in the fourth group 3904 of noise pulses 3900 are 01001011.

The illustration of noise pulses with different time periods and symbols corresponding to those time periods for digital information in FIG. 39 is presented as an example and not meant to limit the manner in which other illustrative examples can be implemented. For example, in this example, the time period between noise pulses represents a symbol comprising two bits. In another illustrative example, the different time periods can correspond to symbols in other forms such as three bits, four bits, nine bits, or some other number bits. Further, the times, time periods, noise pulses, and symbols do not have to be linearly correlated.

Further, other numbers of frequency-range noise-bands can be used in addition to those shown in this example. In other illustrative examples, symbols representing digital information can be sent over one frequency-range noise-band, two frequency-range noise-bands, five frequency-range noise-bands, 10 frequency-range noise-bands, or some other number of frequency-range noise-bands.

Figure 40:
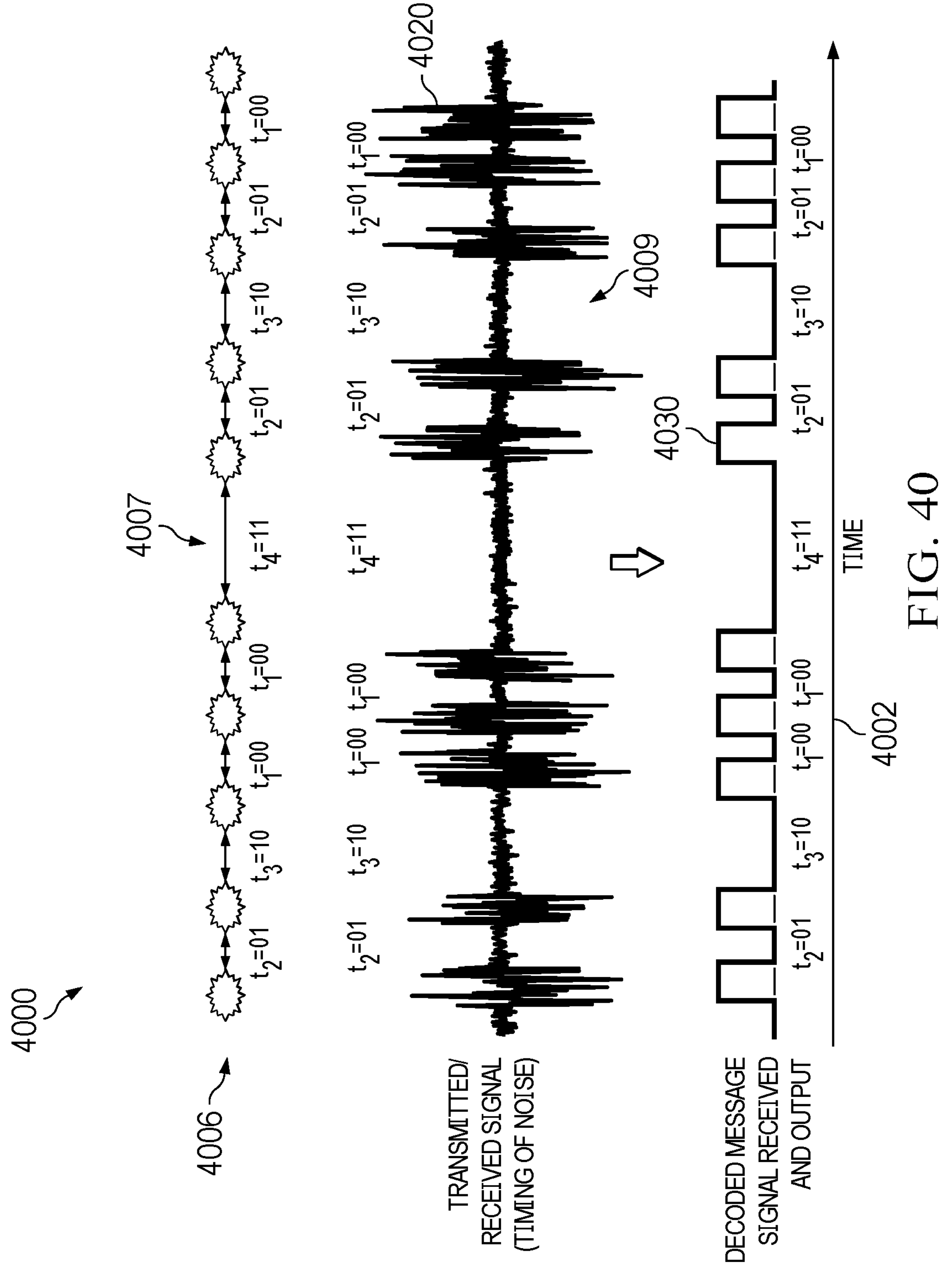
FIG. 40 is an illustration of a diagram of information flow for transmitting digital information with digital pulse-position noise shift keying using a laser generation system in accordance with an illustrative embodiment.

Turning next to FIG. 40, an illustration of a diagram of information flow for transmitting digital information with digital pulse-position noise shift keying using a laser generation system is depicted in accordance with an illustrative embodiment. In this example, information flow 4000 can be implemented using laser generation system 3626 in signal transmission system 3619 for communications system 3602 in FIG. 36. In this example in FIG. 40, axis 4002 represents time for optical breakdowns, noise signals, and digital signals in information flow 4000.

As depicted, optical breakdowns 4006 are generated with time periods 4007 between optical breakdowns 4006. These time periods 4007 between optical breakdowns 4006 correspond to symbols representing digital information. In this example, the different time periods correspond to different symbols. As previously described, these optical breakdowns are plasma generated using laser generation system 3626. Each optical breakdown in optical breakdowns 4006 is a plasma event generated by the set of one or more laser beams 3627 emitted by laser generation system 3626 in FIG. 36.

The result of these optical breakdowns are radio frequency noise pulses 4020 which are an example of radio frequency noise pulses 3605 depicted in FIG. 36. As depicted, each radio frequency noise pulse in radio frequency noise pulses 4020 corresponds to an optical breakdown in optical breakdowns 4006. The duration of radio frequency noise pulses 4020 correlates to the duration of optical breakdowns 4006. In other words, the pulse widths of radio frequency noise pulses 4020 are correlated to the duration of optical breakdowns 4006. These pulse widths of radio frequency noise pulses 4020 are also referred to as noise pulse time durations.

Further, different time periods 4009 between radio frequency noise pulses 4020 also correspond to the time periods 4007 between optical breakdowns 4006. As a result, causing or controlling the time periods 4007 between optical breakdowns 4006 results in radio frequency noise pulses 4020 having different time periods 4009 between radio frequency noise pulses 4020 that correspond to symbols representing the digital information being transmitted.

As depicted in this example, the time periods are t1, t2, t3, and t4. In this example, t1 corresponds to symbol 00, t2 corresponds to symbol 01, t3 corresponds to symbol 10, and t4 corresponds to symbol 11. Thus, different time periods in time periods 4007 between optical breakdowns 4006 correspond to different symbols representing the digital information.

Radio frequency noise pulses 4020 can be received and decoded by receiver, such as receiver 3617 in FIG. 36. Digital signals 4030 can be recovered in response to receiver 3617 receiving radio frequency noise pulses 4020. Thus, laser generation system 3626 is an example of one manner in which signal transmission system 3619 can transmit digital information 3607 in noise signals comprising radio frequency noise pulses with different time periods between the radio frequency noise pulses.

In this example, the timing of optical breakdowns 4006 can be controlled based on at least one of a strength of the set of laser beams or positioning of the set of laser beams. Thus, the laser beams can cause or control optical breakdowns 4006 which results in time periods 4007 between optical breakdowns 4006 that correspond to symbols representing digital information that is being transmitted. Further, the positioning of the laser beams can be performed to cause intersections at desired time intervals to cause or control optical breakdowns 4006 with the desired time periods 4007 between optical breakdowns 4006 to correlate to symbols representing the digital information being transmitted. In these examples, the control can be performed using at least one of a mirror orientation, a deformable mirror position, a lens position, lens, a deformable lens position or some other element that can be positioned in a manner that changes an optical path length (OPL) for the set of one or more laser beams 3627. In this example, the path length change can be both the optical path length and/or the physical path length. Another input parameter that can be changed in this example is the index of refraction (IoR). The optical path length is inversely proportional to the index of refraction. These and other parameters can be used to control the timing of optical breakdowns 4006 to have different time periods between optical breakdowns 4006 that result in radio frequency noise pulses 4020 having different time periods 4009 that correspond to symbols representing the digital information. This timing of optical breakdowns 4006 results in the generation of radio frequency noise pulses 4020 having the different time periods between radio frequency noise pulses 4020 that correspond to symbols.

Figure 41:
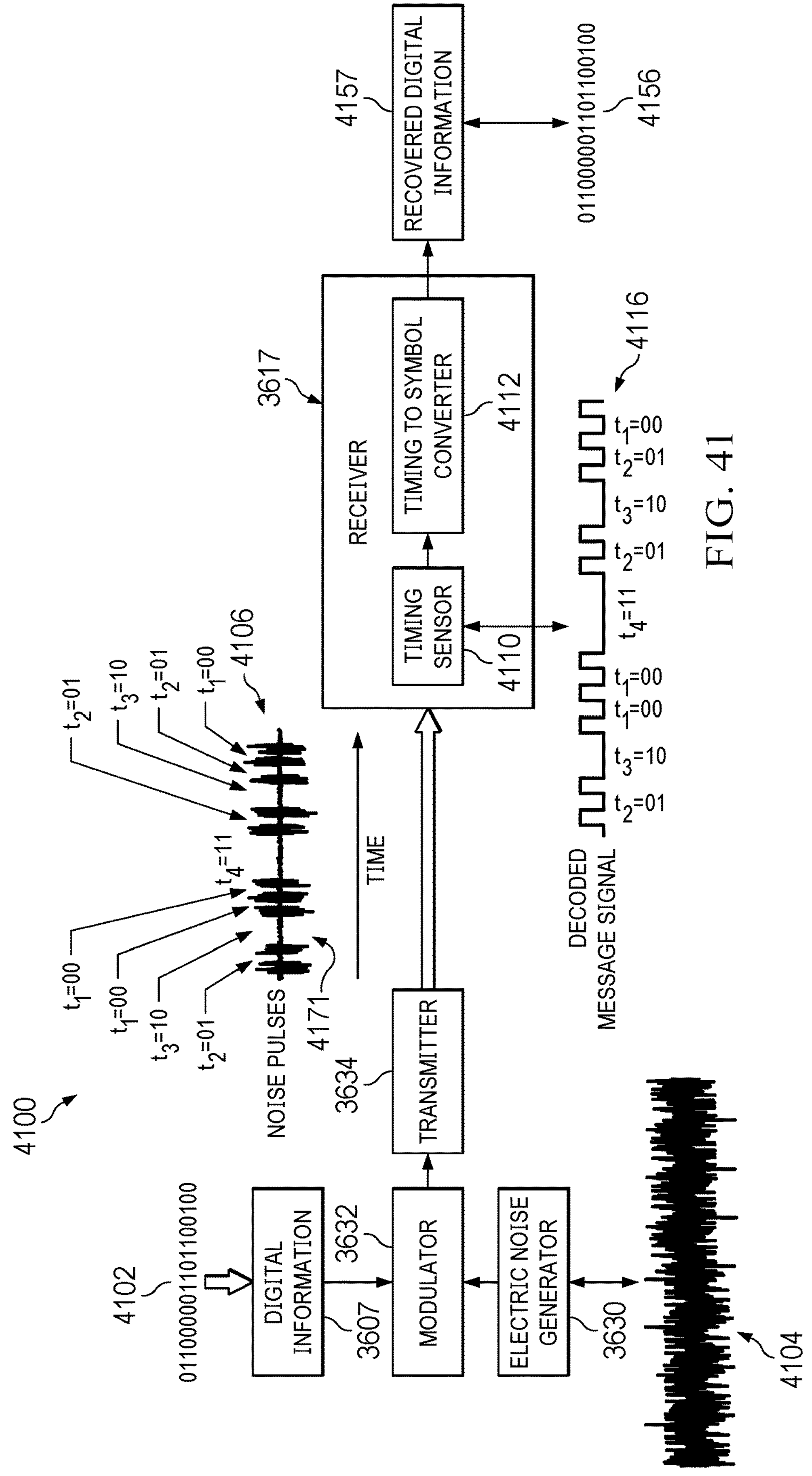
FIG. 41 is an illustration of information flow for transmitting digital information in the form of digital pulses with different time periods between noise pulses using a noise transmitter in accordance with an illustrative embodiment.

Turning next to FIG. 41, an illustration information flow for transmitting digital information in the form of digital noise pulses with different time periods between noise pulses using a noise transmitter is depicted in accordance with an illustrative embodiment. In this example, information flow 4100 can be implemented using noise transmitter 3628 in signal transmission system 3619 for communications system 3602 in FIG. 36.

As depicted in this example, symbols 4102 is an example of digital information 3607 that is to be transmitted using digital pulse-position noise shift keying. In this example, electric noise generator 3630 generates carrier noise signal 4104. In this example, modulator 3632 is a symbol-to-timing modulator that modulates carrier noise signal 4104 into noise pulses 4106 using symbols 4102. This modulation causes carrier noise signal 4104 to form noise pulses 4106 with time periods 4171 between noise pulses 4106 that correspond to symbols 4102 with these noise pulses being transmitted by transmitter 3634. Different time periods 4171 between noise pulses 4106 correspond to symbols 4102. The length of each time period between noise pulses corresponds to a symbol. In this example, the different time periods between noise pulses in time periods 4171 correspond to different symbols in symbols 4102. In this example, t1 corresponds to symbol 00, t2 corresponds to symbol 01, t3 corresponds to symbol 10, and t4 corresponds to symbol 11.

As depicted, receiver 3617 includes timing sensor 4110 and timing to symbol converter 4112. Timing sensor 4110 is a hardware device that is configured to receive and process noise signals across a wide range of frequencies to detect noise pulses in the noise signals. Noise pulses can be detected when the noise signals have a selected amplitude. In this example, timing sensor 4110 receives noise pulses 4106 with time periods 4171 between noise pulses that can be used to generate decoded message signal 4116. As can be seen, decoded message signal 4116 contains pulses with time periods between the pulses.

Timing to symbol converter 4112 is a hardware component that converts signals into symbols based on time periods between pulses. In this example, timing to symbol converter 4112 generates recovered digital information 4157 in the form of output symbols 4156. Output symbols 4156 are identified based on the lengths of time periods between pulses in decoded message signal 4116. In this example, output symbols 4156 are the same as symbols 4102.

Figure 42:
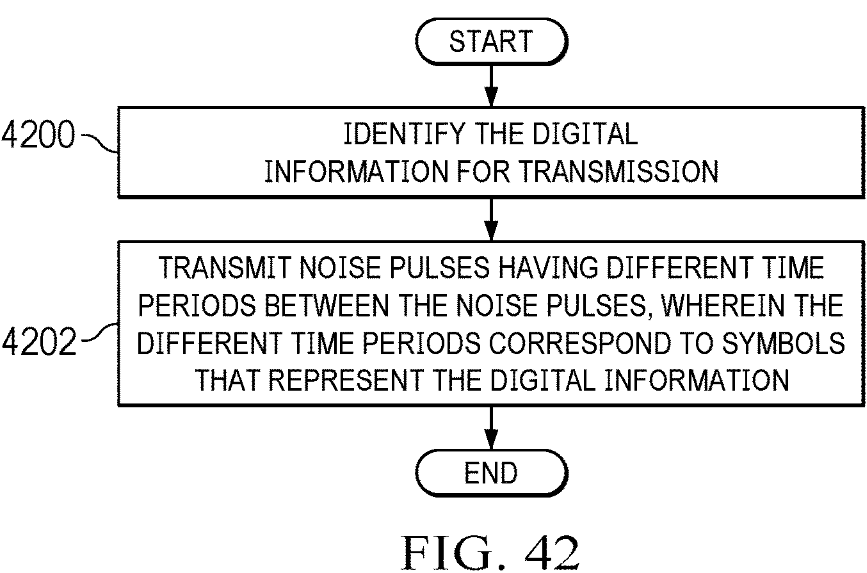
FIG. 42 is an illustration of a flowchart of a process for communicating digital information in accordance with an illustrative embodiment.

Turning now to FIG. 42, an illustration of a flowchart for communicating digital information is depicted in accordance with an illustrative embodiment. The process in FIG. 42 can be implemented in hardware, software, or both. When implemented in software, the process can take the form of program instructions that are run by one of more processor units located in one or more hardware devices in one or more computer systems. For example, the process can be implemented in communications manager 3614 in computer system 3612 in FIG. 36. In this example, the digital information is communicated using digital pulse-position noise shift keying 3691 in FIG. 36.

The process begins by identifying the digital information for transmission (operation 4200). The process transmits noise pulses having different time periods between the noise pulses, wherein the different time periods correspond to symbols that represent the digital information (operation 4202). The process terminates thereafter.

In this example, the noise pulses can be transmitted within a specific frequency-range noise-band. By transmitting noise pulses in a specific frequency range noise-band, other noise pulses corresponding to other symbols can be transmitted in other frequency range noise-bands. In this manner, increased amounts of digital information can be transmitted within the same period of time.

Further in this example, the noise pulses having the different time periods between the noise pulses can have noise pulse time durations with a fixed length. In another example, the noise pulses having the different time periods between the noise pulses have noise pulse time durations with a varying length.

Also, a time period in the time periods begins at an end of a noise pulse in the noise pulses and the time period ends at a start of a next noise pulse in the noise pulses.

Figure 43:
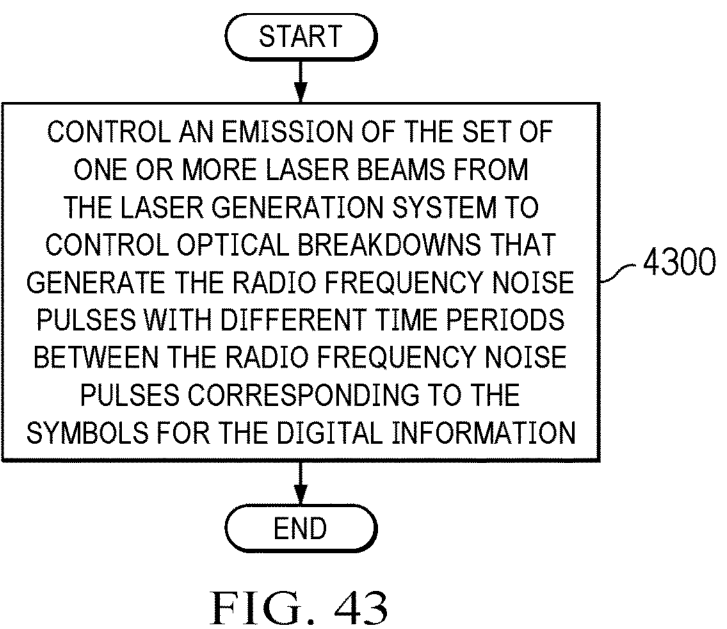
FIG. 43 is an illustration of transmitting noise pulses with different time periods between noise pulses or digital pulse-position noise shift keying using laser generation system in accordance with an illustrative embodiment.

With reference next to FIG. 43, an illustration of a flowchart for transmitting noise pulses with different time periods using a laser generation system is depicted in accordance with an illustrative embodiment. The process in this figure is an example of an implementation for operation 4202 in FIG. 42. In this example, the noise pulses are radio frequency noise pulses. In this example, this process can be implemented in laser generation system 3626 in FIG. 36. With this example, a set of one or more laser beams are emitted from laser generation system 3626.

The process controls an emission of the set of one or more laser beams from the laser generation system to control optical breakdowns that generate the radio frequency noise pulses with different time periods between the radio frequency noise pulses corresponding to the symbols for the digital information (operation 4300). The process terminates thereafter.

Figure 44:
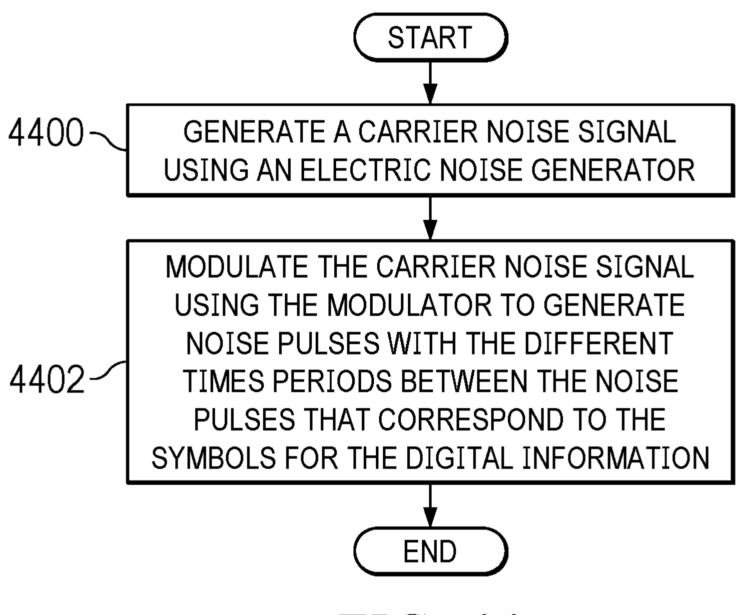
FIG. 44 is an illustration of transmitting noise pulses with different time periods between noise pulses or digital pulse-position noise shift keying using a noise transmitter in accordance with an illustrative embodiment.

In FIG. 44, an illustration of a flowchart for transmitting noise pulses with different time periods using a noise transmitter is depicted in accordance with an illustrative embodiment. The process in this figure is an example of an implementation for operation 4202 in FIG. 42. This process can be implemented in noise transmitter 3628 in FIG. 36.

The process generates a carrier noise signal using an electric noise generator (operation 4400). The process modulates the carrier noise signal using the modulator to generate noise pulses with the different times periods between the noise pulses that correspond to the symbols for the digital information (operation 4402). The process terminates thereafter.

Figure 45:
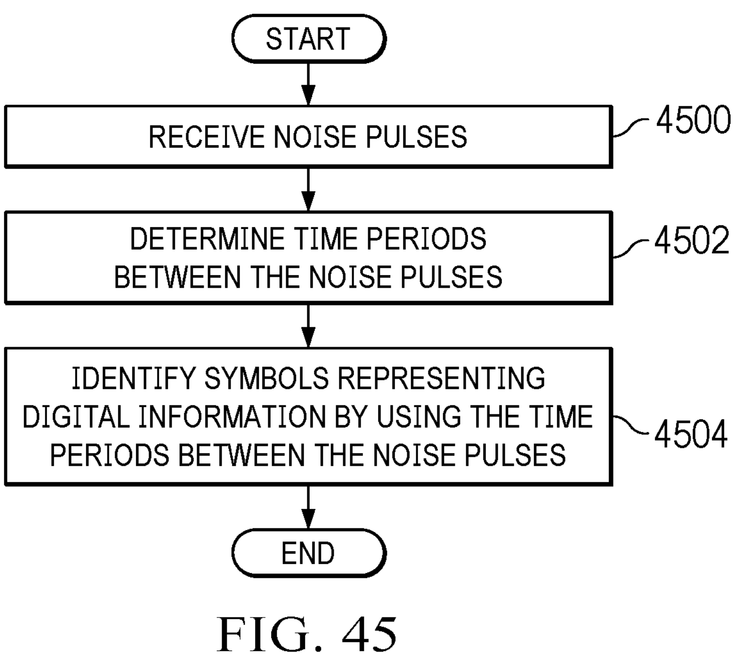
FIG. 45 is an illustration of a flowchart of a process for communicating digital information in accordance with an illustrative embodiment.

Turning now to FIG. 45, an illustration of a flowchart for communicating digital information is depicted in accordance with an illustrative embodiment. The process in FIG. 45 can be implemented in hardware, software, or both. When implemented in software, the process can take the form of program instructions that are run by one of more processor units located in one or more hardware devices in one or more computer systems. In this example, the process can be implemented in receiver 3617 in FIG. 36.

The process receives noise pulses (operation 4500). The process determines time periods between the noise pulses (operation 4502).

The process identifies symbols representing digital information by using the corresponding time periods between the noise pulses (operation 4504). The process terminates thereafter.

Figure 46:
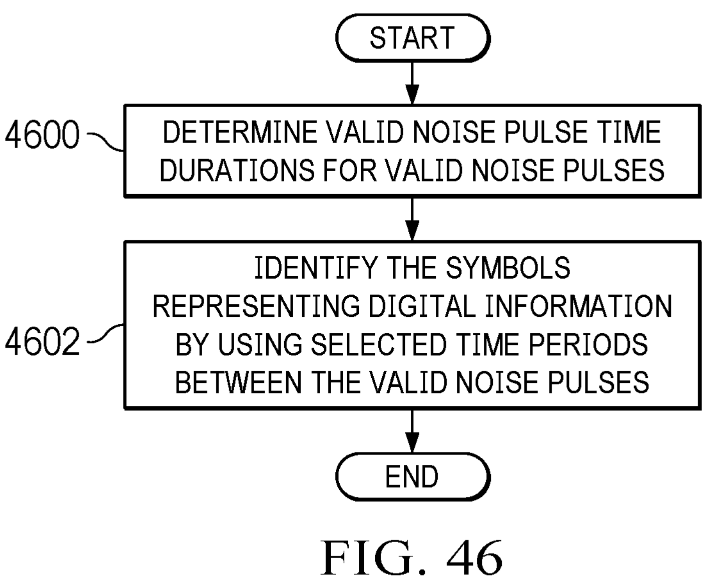
FIG. 46 is an illustration of a flowchart of a process for determining time periods between valid noise pulses with an illustrative embodiment.

Next in FIG. 46, an illustration of a flowchart of a process for determining time periods is depicted in points with an illustrative embodiment. The process in this flowchart is an example of an implementation for operation 4502 and operation 4504 in FIG. 45.

The process determines valid noise pulse time durations for valid noise pulses (operation 4600). The process identifies the symbols representing digital information by using selected time periods between the valid noise pulses (operation 4602). The process terminates thereafter.

Figure 47:
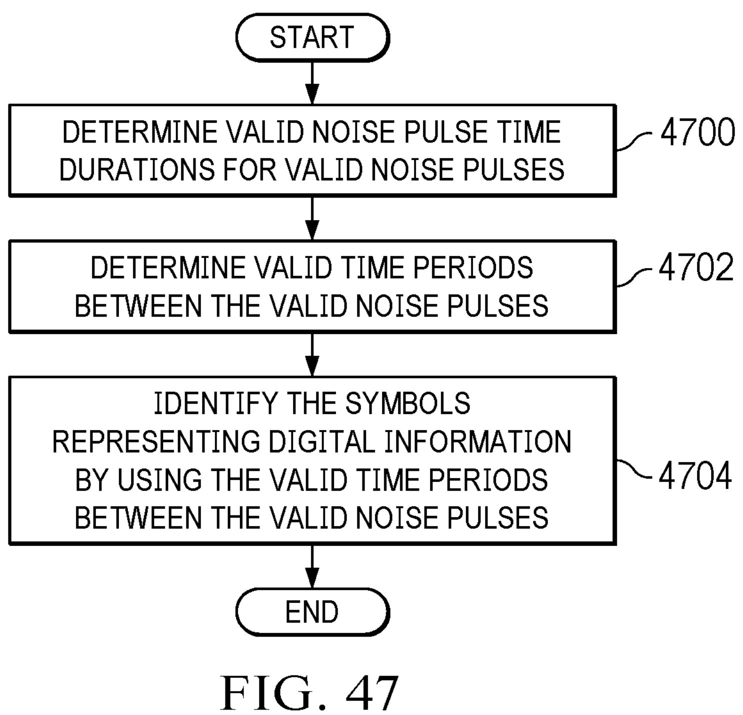
FIG. 47 is an illustration of a flowchart of a process for determining time periods between valid noise pulses with an illustrative embodiment.

With reference to FIG. 47, an illustration of a flowchart of a process for determining time periods is depicted in accordance with an illustrative embodiment. The process in this flowchart is an example of an implementation for operation 4502 and operation 4504 in FIG. 45.

The process determines valid noise pulse time durations for valid noise pulses (operation 4700). The process determines valid time periods between the valid noise pulses (operation 4702).

The process identifies the symbols representing digital information by using the valid time periods between the valid noise pulses (operation 4704). The process terminates thereafter.

Some features of the illustrative examples for modulating digital information 3607 using digital pulse-position noise shift keying 3691 in communications system 3602 are described in the following clauses. These clauses are examples of features and are not intended to limit other illustrative examples.

Clause 1. A communications system comprising:

a computer system; and a communications manager in the computer system, wherein the communications manager is configured to:

identify digital information for transmission; and transmit noise pulses having different time periods between the noise pulses, wherein the different time periods correspond to symbols representing the digital information.

Clause 2. The communications system of clause 1, wherein the noise pulses having different time periods between the noise pulses are transmitted within specific frequency range noise-bands.

Clause 3. The communications system of clause 1, wherein the noise pulses having different time periods between the noise pulses have noise pulse time durations with a fixed length.

Clause 4. The communications system of clause 1, wherein the noise pulses having different time periods between the noise pulses have noise pulse time durations with a varying length.

Clause 5. The communications system of clause 1, wherein a time period in the different time periods begins at an end of a noise pulse in the noise pulses and the time period ends at a start of a next pulse in the noise pulses.

Clause 6. The communications system of clause 5, wherein the end of the noise pulse in the noise pulses having different time periods between the noise pulses is a sync point and an end of the next pulse in the noise pulses having different time periods between the noise pulses is a resync point.

Clause 7. The communications system of clause 1, wherein a symbol in the symbols comprises a number of bits.

Clause 8. The communications system of clause 1, wherein the noise pulses having different time periods between the noise pulses are radio frequency noise pulses, and further comprising:

a laser generation system configured to emit a set of one or more laser beams, wherein in transmitting the noise pulses having different time periods between the noise pulses the communications manager is configured to:

control an emission of the set of one or more laser beams from the laser generation system to control optical breakdowns that generate the radio frequency noise pulses having different time periods between the radio frequency noise pulses that correspond to the symbols representing the digital information.

Clause 9. The communications system of clause 1, further comprising:

an electric noise generator configured to generate a carrier noise signal;

a modulator; and a transmitter, wherein in generating the noise pulses having different time periods between the noise pulses, the communications manager is configured to:

generate the carrier noise signal using the electric noise generator; and modulate the carrier noise signal using the modulator to generate noise pulses having different time periods between the noise pulses, wherein the different time periods between the noise pulses corresponds to the symbols representing the digital information.

Clause 10. The communications system of clause 1, wherein the noise pulses are generated from at least one of electromagnetic frequency noise signals, radio frequency noise signals, microwave frequency noise signals, audio frequency noise signals, ultrasonic frequency noise signals, ultra-low frequency noise signals, very low frequency noise signals, underwater frequency noise signals, or optical frequency noise signals including visible or non-visible light.

Clause 11. A communications system comprising:

a receiver configured to:

receive noise pulses;

determine time periods between the noise pulses; and identify symbols representing digital information by using the time periods between the noise pulses.

Clause 12. The communications system of clause 11, wherein in determining the time periods, the receiver is configured to:

determine valid noise pulse time durations for valid noise pulses; and in identifying the symbols, the receiver is configured to:

identify the symbols representing digital information by using selected time periods between the valid noise pulses.

Clause 13. The communications system of clause 11, wherein in determining the time periods, the receiver is configured to:

determine valid noise pulse time durations for valid noise pulses;

determine valid time periods between the valid noise pulses; and in identifying the symbols, the receiver is configured to:

identify the symbols representing digital information by using the valid time periods between the valid noise pulses.

Clause 14. A method for communicating digital information, the method comprising:

identifying the digital information for transmission; and transmitting noise pulses having different time periods between the noise pulses, wherein the different time periods correspond to symbols that represent the digital information.

Clause 15. The method of clause 14, wherein noise pulses having the different time periods between the noise pulses are transmitted within a specific frequency-range noise-band.

Clause 16. The method of clause 14, wherein the noise pulses having the different time periods between the noise pulses have noise pulse time durations with a fixed length.

Clause 17. The method of clause 14, wherein the noise pulses having the different time periods between the noise pulses have noise pulse time durations with a varying length.

Clause 18. The method of clause 14, wherein a time period in the time periods begins at an end of a noise pulse in the noise pulses and the time period ends at a start of a next pulse in the noise pulses.

Clause 19. The method of clause 18, wherein the end of the noise pulse in the noise pulses is a sync point and an end of the next pulse is a resync point.

Clause 20. The method of clause 14, wherein a symbol in the symbols comprises a number of bits.

Clause 21. The method of clause 14, wherein the noise pulses having the different time periods between the noise pulses are radio frequency noise pulses having the different time periods between the noise pulses, and further comprising:

emitting a set of one or more laser beams from a laser generation system; and wherein said transmitting the noise pulse comprises:

controlling an emission of the set of one or more laser beams from the laser generation system to control optical breakdowns that generate the radio frequency noise pulses with different times periods between the radio frequency noise pulses corresponding to the symbols for the digital information.

Clause 22. The method of clause 14, wherein said transmitting the noise pulses comprises:

generating a carrier noise signal using an electric noise generator; and modulating the carrier noise signal using the modulator to generate noise pulses with the different times periods between the noise pulses that correspond to the symbols for the digital information.

Clause 23. The method of clause 14, wherein the noise pulses are generated from at least one of electromagnetic frequency noise signals, radio frequency noise signals, microwave frequency noise signals, audio frequency noise signals, ultrasonic frequency noise signals, ultra-low frequency noise signals, very low frequency noise signals, underwater frequency noise signals, or optical frequency noise signals including visible or non-visible light.

Clause 24. A method for communicating digital information comprising:

receiving noise pulses;

determining time periods between the noise pulses; and identifying symbols representing digital information by using the time periods between the noise pulses.

Clause 25 The method of clause 21, wherein said determining the time periods comprises:

determining valid noise pulse time durations for valid noise pulses; and wherein said identifying the symbols comprises:

identifying the symbols representing digital information by using selected time periods between the valid noise pulses.

Clause 26. The method of clause 24, wherein said determining the time periods comprises:

determining valid noise pulse time durations for valid noise pulses; and determining valid time periods between the valid noise pulses; and wherein said identifying the symbols comprises:

identifying the symbols representing digital information by using the valid time periods between the valid noise pulses.

Figure 48:
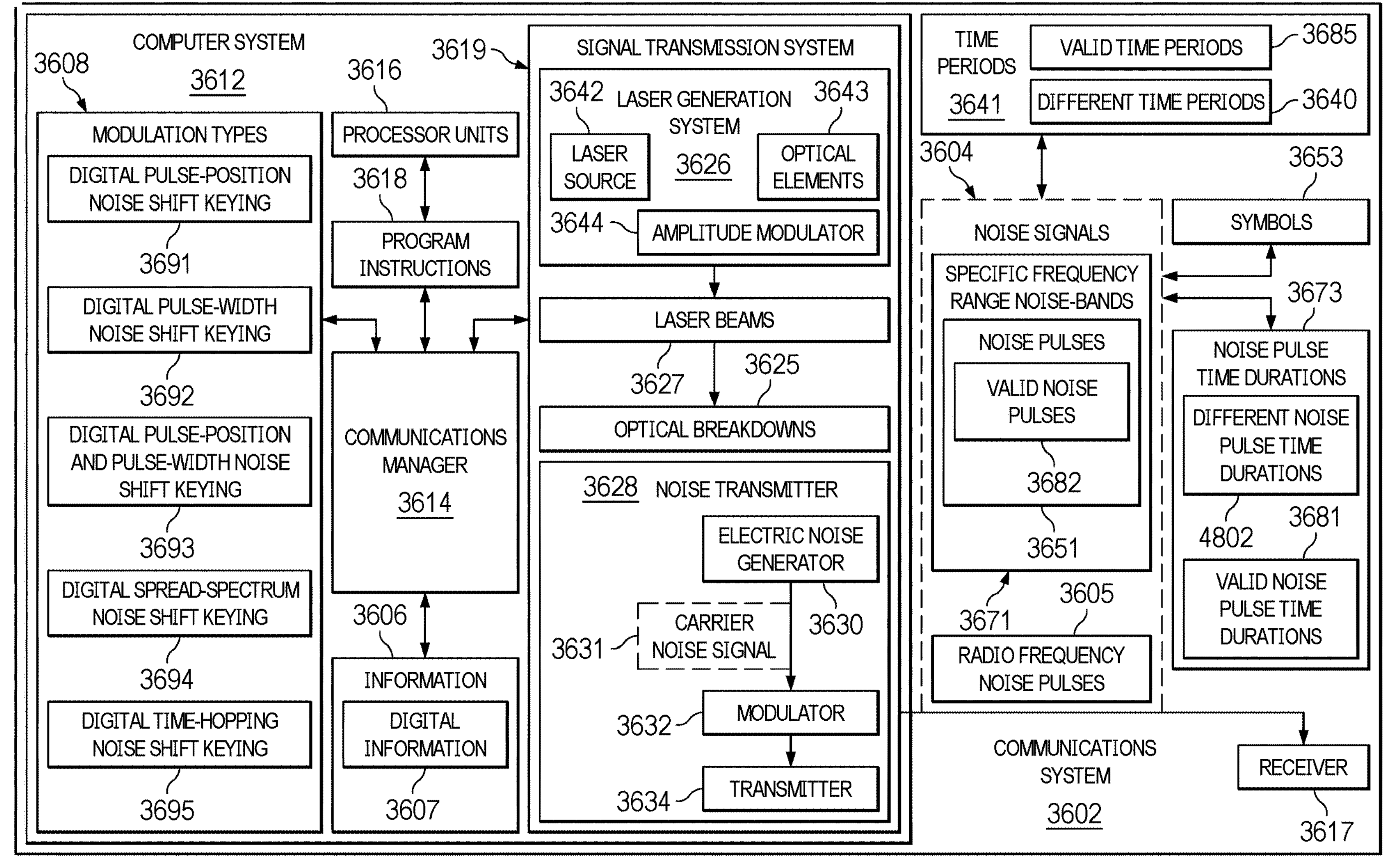
FIG. 48 is an illustration of a block diagram of a communication system in accordance with an illustrative embodiment.

With reference next to FIG. 48, an illustration of a block diagram of a communication system is depicted in accordance with an illustrative embodiment. In this illustrative example, communications system 3602 operates to modulate noise signals 3604 to correspond to information 3606. Noise signals 3604 are selected from at least one of electromagnetic frequency noise signals, radio frequency noise signals, microwave frequency noise signals, audio frequency noise signals, ultrasonic frequency noise signals, ultra-low frequency noise signals, very low frequency noise signals, underwater frequency noise signals, or optical frequency noise signals including at least one of visible or non-visible light.

In this example, digital pulse-width noise shift keying 3692 in modulation types 3608 is used to transmit noise signals 3604 in the form of noise pulses 3651. This type of modulation involves modulating noise signals 3604 to form noise pulses 3651 with noise pulse time durations 3673. In this example, noise pulse time durations 3673 include different noise pulse time durations 4802 that are selected to correspond to symbols 3653.

Communications manager 3614 identifies digital information 3607 for transmission. Communications manager 3614 transmits noise signals 3604 in the form of noise pulses 3651 with different noise pulse time durations 4802 or different pulse-widths that correspond to symbols 3653 representing digital information 3607. In other words, the width, pulse width, duration, or pulse time duration of noise pulses correspond to a symbol in symbols 3653. As a result, noise signals 3604 can be modulated to form noise pulses 3651 with different noise pulse time durations 4802 that correspond to symbols 3653 representing digital information 3607.

In this example, noise pulses 3651 can be transmitted within specific frequency range noise-bands 3671. In other words, noise pulses 3651 can be transmitted in one or more of the specific frequency range noise-bands 3671. A noise pulse can be transmitted anywhere within one of these frequency range points bands in the illustrative example.

In this example, specific frequency range noise-bands 3671 are multiple frequency range noise-bands. These different frequency range noise-bands can be used to transmit different noise pulses 3651. This use of multiple frequency-range noise-bands can enable sending different noise pulses 3651 at substantially the same or similar times. In these examples, no overlap is present between specific frequency range noise-bands 3671.

In one example, time periods 3641 between the noise pulses 3651 are fixed. In another example, time periods 3641 between noise pulses 3651 have a varying length.

In yet another illustrative example, time periods 3641 between noise pulses 3651 can be used to represent symbols 3653 in addition to noise pulse time durations 3673 of noise pulses 3651. These noise pulse time durations can also be referred to as pulse-widths. In this example, communications manager 3614 can control signal transmission system 3619 to transmit noise pulses 3651 with different noise pulse time durations 4802 in noise pulse time durations 3673 and different time periods 3640 between noise pulses 3651. With this example, different noise pulse time durations 4802 and different time periods 3640 between noise pulses 3651 both correspond to symbols 3653 representing digital information 3607. In other words, both noise pulse time durations 3673 and time periods 3641 between noise pulses 3651 can correspond to symbols 3653. This combination of both noise pulse time durations 3673 and time periods 3641 between noise pulses 3651 representing symbols 3653 can be referred to as digital pulse-position and pulse-width noise shift keying 3693. In this example, a symbol in symbols 3653 represents a number of bits.

In one illustrative example, communications manager 3614 can control laser generation system 3626 in signal transmission system 3619 to transmit noise pulses 3651. In this example, communications manager 3614 can control an emission of the set of one or more laser beams 3627 from laser generation system 3626 to control optical breakdowns 3625 that generate radio frequency noise pulses 3605 with different noise pulse time durations 4802 that correspond to symbols 3653 representing digital information 3607.

In another illustrative example, communications manager 3614 can use noise transmitter 3628 in signal transmission system 3619 to transmit noise pulses 3651. In this example, communications manager generates carrier noise signal 3631 using electric noise generator 3630. Communications manager 3614 modulates carrier noise signal 3631 using modulator 3632. In this example, carrier noise signal 3631 is modulated to generate the different noise pulse time durations 3673 for noise pulses 3651 that correspond to symbols 3653 representing digital information 3607. This modulation can also include generating time periods 3641 between noise pulses in which different time periods 3640 between noise pulses are present. These noise pulses that are generated from modulating carrier noise signal 3631 are transmitted by transmitter 3634.

In this illustrative example, receiver 3617 receives noise pulses 3651 in noise signals 3604 and processes noise pulses 3651 to recover digital information 3607. For example, receiver 3617 receives noise pulses 3651 and determines different noise pulse time durations 4802 in noise pulses 3651. These noise pulse time durations can also be referred to as pulse-widths. Receiver 3617 identifies symbols 3653 that represent digital information 3607 by using different noise pulse time durations 4802 in noise pulses 3651.

In this illustrative example, error correction can be performed. For example, in determining different noise pulse time durations 4802 in noise pulses 3651, receiver 3617 can determine valid noise pulse time durations 3681 for valid noise pulses 3682. In other words, noise pulses 3651 that are considered valid for identifying symbols 3653 can be noise pulses 3651 that have selected valid durations. These durations are selected as durations for noise pulses 3651 that are considered valid for use in identifying symbols 3653. Noise pulses 3651 with noise pulse time durations 3673 that are not valid noise pulse time durations 3681 are not valid noise pulses 3682 and are consequently not processed to identify symbols 3653 in this example. Thus, in this example, receiver 3617 identifies symbols 3653 representing digital information 3607 by using valid noise pulses 3682 with valid noise pulse time durations 3681.

In another illustrative example, in determining different noise pulse time durations 4802, receiver 3617 determines valid noise pulse time durations 3681 for valid noise pulses 3682 and determines valid time periods 3685 between valid noise pulses 3682. In this example, both noise pulse time durations 3673 or pulse-widths, and time periods 3641 between noise pulses are examined to determine whether noise pulses 3651 are valid noise pulses 3682.

As part of identifying symbols 3653, receiver 3617 identifies symbols 3653 representing digital information 3607 by using valid noise pulses 3682 with the valid time periods 3685 between noise pulses. As a result, the use of both time periods 3641 and noise pulse time durations 3673 can be used for error correction.

Figure 49:
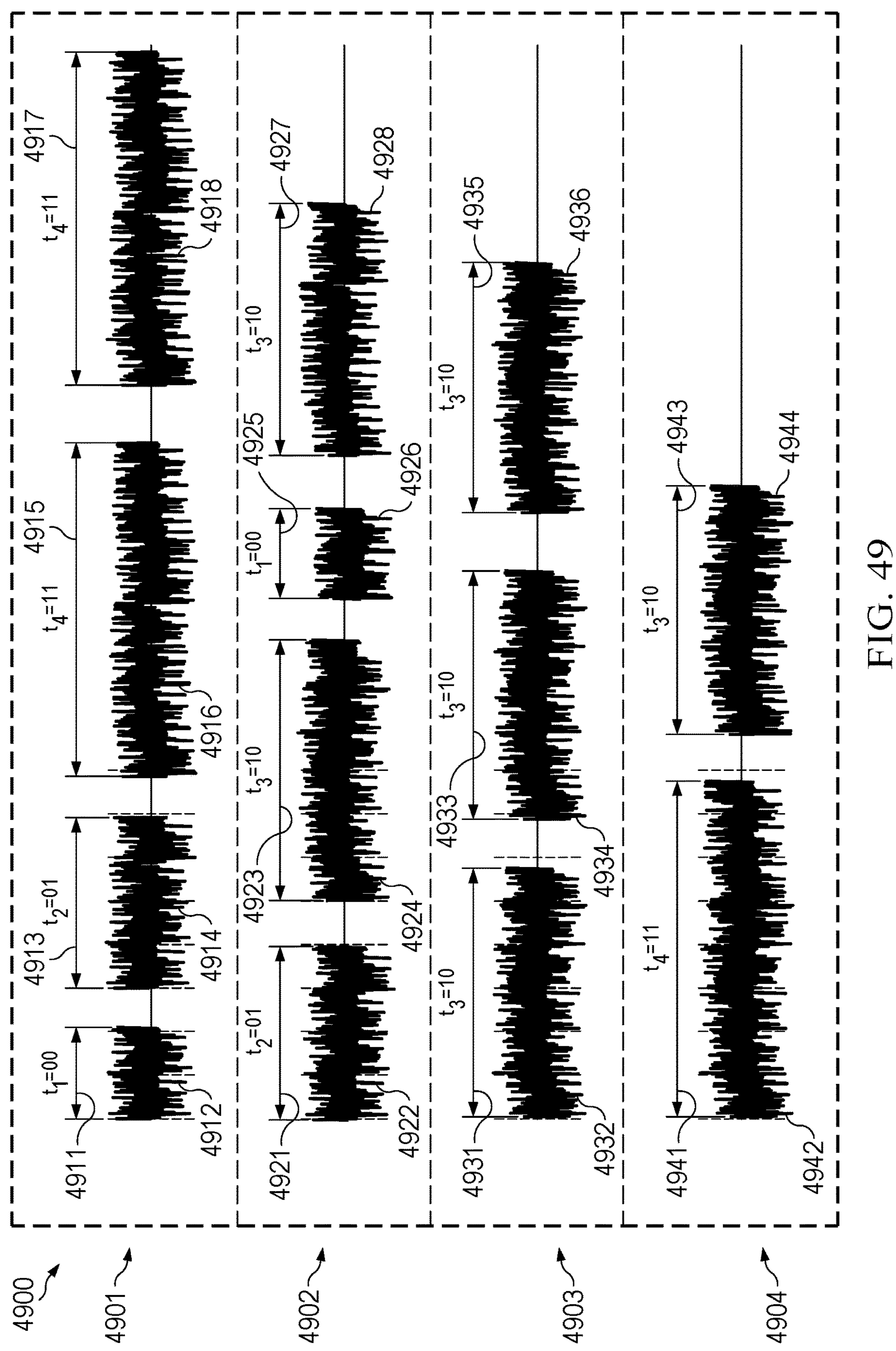
FIG. 49 is an illustration of noise pulses generated using digital pulse-width noise shift keying in accordance with an illustrative embodiment.

Turning now to FIG. 49, an illustration of noise pulses generated using digital pulse-width noise shift keying is depicted in accordance with an illustrative embodiment. In this example, noise pulses 4900 are generated by communications system 3602 using digital pulse-width noise shift keying 3692.

In this example, digital information is transmitted using symbols that represent the digital information. As depicted, groups of noise pulses 4900 that correspond to symbols are transmitted using noise pulse time durations for noise pulses 4900. In this example, the groups of noise pulses 4900 comprise first group 4901, second group 4902, third group 4903, and fourth group 4904. In this example, symbols are present in each of the set of noise pulses 4900 that are based on noise pulse time durations 3673 of noise pulses 4900.

These durations are referred to as noise pulse time durations 3673. These durations can also be referred to as pulse-widths. As depicted, a noise pulse time duration for a noise pulse starts at the beginning of a particular noise pulse in noise pulses 4900 and this noise pulse time duration ends at the end of that particular noise pulse. The different noise pulse time durations correspond to different symbols. In this example, the noise pulse time duration and symbol correspondence are as follows: t1 corresponds to symbol 00, t2 corresponds to symbol 01, t3 corresponds to symbol 10, and t4 corresponds to symbol 11. Thus, the different noise pulse time durations t1, t2, t3, and t4 correspond to different symbols.

In this example, t1, t2, t3, and t4 represent different time intervals. For example, if a timeslot has a value of one millisecond (ms), t1=1 ms, t2=2 ms, t3=3 ms, and t4=4 ms. In this example, t2 is two times the duration of t1, t3 is three times the duration of t1, and t4 is four times the duration of t1. In other examples, a timeslot can be of a different time length or time duration such as 2 microseconds, 0.5 seconds, or some other value.

For example, in first group 4901 of noise pulses 4900, noise pulse time duration 4911 begins at the beginning of noise pulse 4912 and ends at the end of noise pulse 4912. In this example, noise pulse time duration 4911 is t1 and corresponds to 00 for the first symbol in first group 4901 of noise pulses 4900. As another example, the second symbol in the first group 4901 of noise pulses 4900 is represented by noise pulse time duration 4913 of noise pulse 4914. Noise pulse time duration 4913 begins at the beginning of noise pulse 4914 and ends at the end of noise pulse 4914. In this example, noise pulse time duration 4913 is t2 and corresponds to 01 for the second symbol in the first group 4901 of noise pulses 4900.

Further, in first group 4901 of noise pulses 4900, noise pulse 4916 has a noise pulse time duration 4915. This noise pulse time duration is t4, which corresponds to 11 for the symbol. Next, noise pulse 4918 has noise pulse time duration 4917 in first group 4901. Noise pulse time duration 4917 is t4, which also corresponds to 11 for the symbol. As a result, the symbols in first group 4901 of noise pulses 4900 for the different noise pulses are 00011111 that represent the digital information carried by this group of noise pulses 4900.

In second group 4902 of noise pulses 4900, four noise pulses are present that have different noise pulse time durations that correspond to symbols representing digital information. In this example, noise pulse 4922 has noise pulse time duration 4921. In this example, noise pulse time duration 4922 has time length t2, which corresponds to symbol 01. Noise pulse 4924 has noise pulse time duration 4923 with time length or time duration of t3, which corresponds to 10 as the symbol. Noise pulse 4926 has noise pulse time duration 4925 with time length of t1, which corresponds to 00 as the symbol. Noise pulse 4928 has noise pulse time duration 4927. In this example, noise pulse time duration 4927 has time length of t3, which corresponds to 10. In this example, the different noise pulse time durations correspond to 01100010 as being symbols that represent the digital information transmitted in second group 4902 of noise pulses 4900.

In third group 4903 of noise pulses 4900, noise pulse 4932 has noise pulse time duration 4931, which has a time length of t3. In this example, t3 corresponds to the symbol 10. Noise pulse 4934 has noise pulse time duration 4933. In this example, this noise pulse time duration 4933 has a time length of t3, which corresponds to 10 for the symbol. Next, noise pulse 4936 in third group 4903 of noise pulses 4900 has noise pulse time duration 4935, which has a time length of t3. As depicted, t3 corresponds to 10 for the symbol. Thus, third group 4903 of noise pulses 4900 comprises 101010 as symbols representing the digital information.

Next in fourth group 4904 of noise pulses 4900, noise pulse 4942 has a noise pulse time duration of 4941, which has a time length of t4. In this example, 11 is the symbol corresponding to this noise pulse time duration. Next, noise pulse 4944 has noise pulse time duration 4943, which has a time length of t3. In this example t3 corresponds to symbol 10 for this noise pulse time duration. The result for these different noise pulses in the fourth group 4904 of noise pulses 4900 are the symbols 1110 that represent the digital information.

The illustration of noise pulses with different noise pulse time durations and symbols corresponding to those noise pulse time durations for digital information in FIG. 49 are presented as an example and not meant to limit the manner in which other illustrative examples can be implemented. For example, in this example, the noise pulse time duration for a noise pulse represents a symbol comprising two bits. In another illustrative example, the different noise pulse time durations can correspond to symbols in other forms such as one bit, four bits, seven bits, or some other number bits. Further, noise pulses are separated by time periods. These time periods can have different lengths that do not correlate to symbols in this example.

Figure 50:
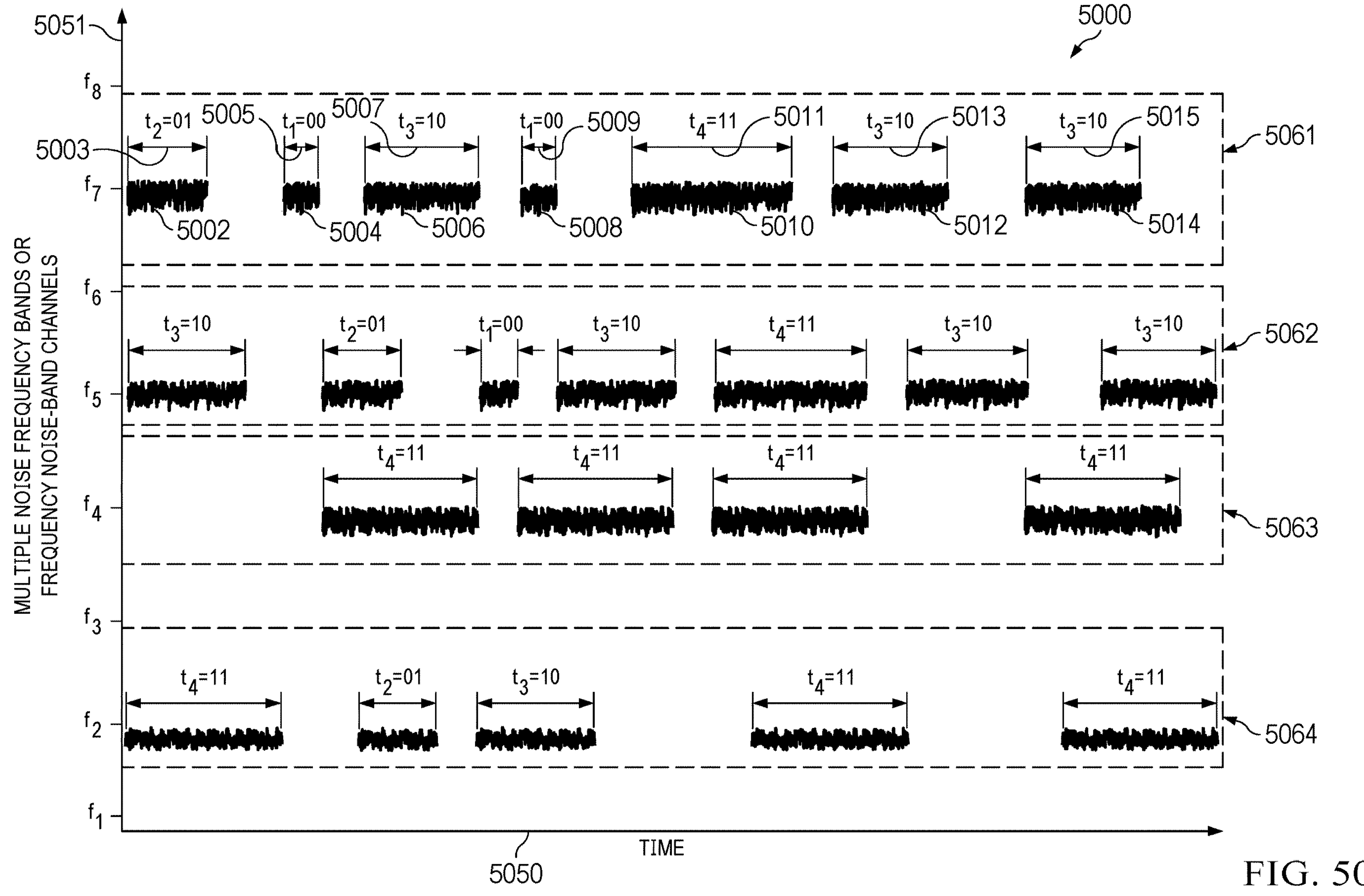
FIG. 50 is an illustration of noise pulses generated using digital pulse-width noise shift keying in accordance with al illustrative embodiment.

Turning next to FIG. 50, an illustration of noise pulses generated using digital pulse-width noise shift keying is depicted in accordance with an illustrative embodiment. In this example, noise pulses 5000 are generated by communications system 3602 using digital pulse-width noise shift keying 3692. Noise pulses 5000 are transmitted in multiple specific frequency range noise-bands in this example.

In this example, digital information is transmitted using symbols that represent the digital information. As depicted, groups of noise pulses 5000 that correspond to symbols are transmitted within different noise frequency-range noise-bands.

In this example, x-axis 5050 represents time and y-axis 5051 represents frequency-range noise-bands. These frequency-range noise-bands can also be referred to as frequency noise-band channels. Groups of noise pulses 5000 are depicted as being transmitted at substantially the same or similar times within specific frequency range noise-bands that are multiple different frequency range noise-bands. Different symbols representing digital information can be sent in parallel to the same receiver over these different frequency range noise-bands. In other examples, these symbols can be sent to different receivers over the different frequency range noise-bands.

As depicted, first group 5061, second group 5062, third group 5063, and fourth group 5064 of noise pulses 5000 are shown transmitted over time at multiple different frequency range noise-bands. For example, first group 5061 of noise pulses 5000 are transmitted using frequency-range noise-band f7, second group 5062 of noise pulses 5000 are transmitted using frequency-range noise-band f5, third group 5063 of noise pulses 5000 are transmitted using frequency-range noise-band f4, and fourth group 5064 of noise pulses 5000 are transmitted using frequency-range noise-band f2.

As with the example in FIG. 49, the beginning of a noise pulse starts a noise pulse duration for that noise pulse. The end of that noise pulse ends the noise pulse duration for that noise pulse. As depicted in this example, different time periods can be present between the noise pulses. In this example, these different time periods between the noise pulses do not change the symbols that correspond to noise pulse durations for the noise pulses. In other words, the noise pulse time duration of a noise pulse corresponds to a symbol for that noise pulse. In this example, different noise pulse time durations correspond to symbols. In this example, the noise pulse time durations can be t1, t2, t3, and t4. With this example, the noise pulse time durations and corresponding symbols are as follows: t1 corresponds to symbol 00, t2 corresponds to symbol 01, t3 corresponds to symbol 10, and t4 corresponds to symbol 11.

For example, the noise pulses in first group 5061 of noise pulses 5000 are transmitted using frequency-range noise-band f7. In this example, noise pulse 5002 has noise pulse time duration 5003 that is t2; noise pulse 5004 has noise pulse time duration 5005 that is t1; noise pulse 5006 has noise pulse time duration 5007 that is t3; noise pulse 5008 has noise pulse time duration 5009 that is t1; noise pulse 5010 has noise pulse time duration 5011 that is t4; noise pulse 5012 has noise pulse time duration 5013 that is t3; and noise pulse 5014 has noise pulse time duration 5015 that is t3. In this example, these different noise pulse time durations result in symbols for noise pulses corresponding to 01001000111010 as in the first group 5061 of noise pulses 5000.

Second group 5062 of noise pulses 5000 is transmitted within frequency range noise-band f5 and has different noise pulse time durations that correspond to 10010010111010 as symbols. In this example, third group 5063 of noise pulses 5000 is transmitted within frequency range noise-band f4 and has different noise pulse time durations that correspond to 11111111 as symbols. Within frequency range noise-band f2, fourth group 5064 of noise pulses 5000 have different noise pulse time durations that correspond to 1101101111 as symbols. Thus, symbols can be transmitted as noise pulses with different noise pulse time durations that are transmitted within specific frequency noise-band ranges to increase the amounts of information that can be sent at the same time as compared to using a single frequency noise-band range or not using a specific frequency noise band range.

Thus, these different symbols for digital information are transmitted in parallel, or at substantially the same or similar times as each other, using different frequency range noise-bands. The different symbols transmitted through the different frequency range noise-bands can be sent to the same receiver or to different receivers.

The illustration of noise pulses with different noise pulse time durations and symbols corresponding to those noise pulse time durations for digital information in FIG. 50 is presented as an example and not meant to limit the manner in which other illustrative examples can be implemented. For example, in this example, the noise pulse time durations represent a symbol comprising two bits. In another illustrative example, the different noise pulse time durations can correspond to symbols in other forms such as three bits, four bits, nine bits, or some other number bits. Further, the times, time periods, noise pulses, and symbols do not have to be linearly correlated.

Further, other numbers of frequency-range noise-bands can be used in addition to those shown in this example. In other illustrative examples, symbols corresponding to digital information can be sent over one frequency-range noise band, two frequency-range noise-bands, five frequency-range noise-bands, 10 frequency-range noise-bands, or some other number of frequency-range noise-bands.

Figure 51:
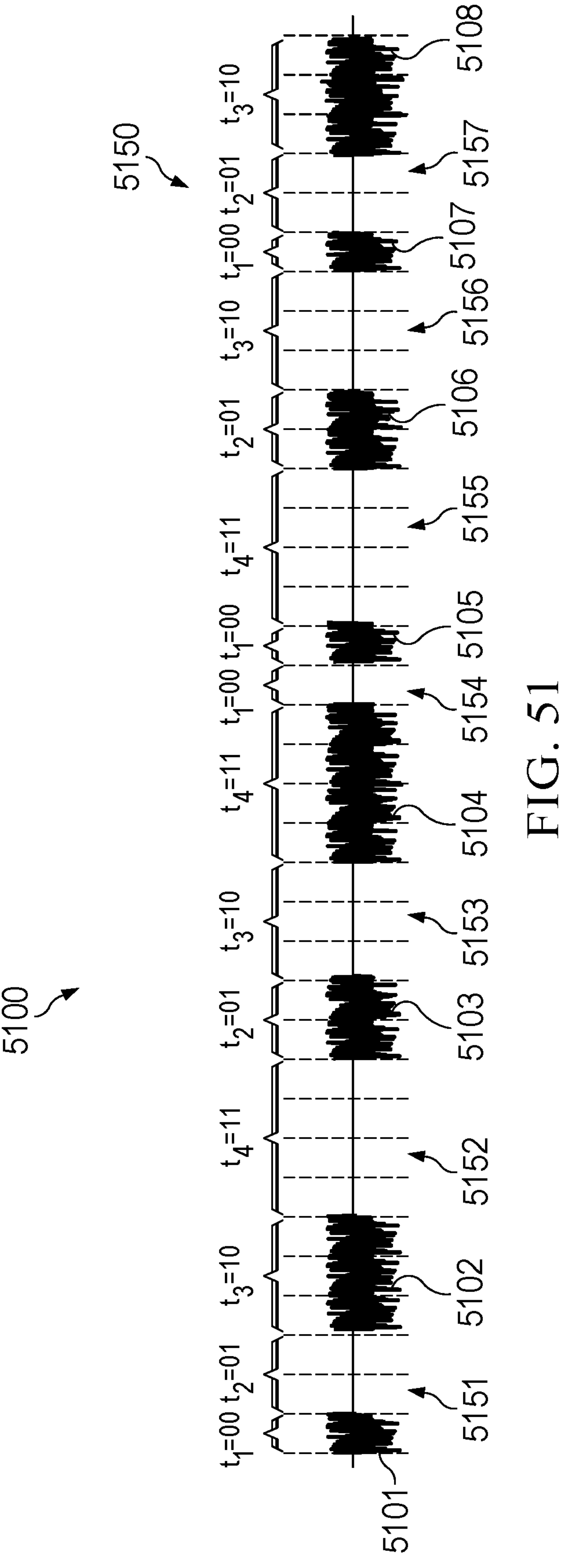
FIG. 51 is an illustration of noise pulses generated using digital pulse-width noise shift keying in accordance with an illustrative embodiment.

With reference now to FIG. 51, an illustration of noise pulses generated using digital pulse-position and pulse-width noise shift keying is depicted in accordance with an illustrative embodiment. In this example, noise pulses 5100 are generated by communications system 3602 using digital pulse-position and pulse-width noise shift keying 3693. In this example, both the noise pulse time durations and the time periods between noise pulses 5100 correspond to symbols that represent digital information. In other words, noise pulse time durations for noise pulses 5100 correspond to symbols, and also time periods between noise pulses 5100 correspond to symbols. This type of modulation of noise pulses 5100 is an example of digital pulse-position and pulse-width noise shift keying 3693, which is a combination of digital pulse-position (time between noise pulses) noise shift keying 3691 and digital pulse-position pulse-width noise shift keying 3692 in FIG. 48.

In this example, both the different noise pulse time durations for noise pulses 5100 and the different time periods between noise pulses 5100 correspond to symbols. In this example, the noise pulse time durations (pulse widths) and time periods between noise pulses (pulse positioning) can be time durations: t1, t2, t3, and t4. With this example, the noise pulse time durations (pulse widths), the time periods between noise pulses (pulse positioning) and the corresponding symbols are: t1 corresponds to symbol 00, t2 corresponds to symbol 01, t3 corresponds to symbol 10, and t4 corresponds to symbol 11.

As depicted, noise pulses 5100 comprises noise pulse 5101, noise pulse 5102, noise pulse 5103, noise pulse 5104, noise pulse 5105, noise pulse 5106, noise pulse 5107, and noise pulse 5108. In this example, these noise pulses have noise pulse time durations that correspond to symbols. As depicted, the time durations for noise pulses 5100 are as follows: noise pulse 5101 is t1, noise pulse 5102 is t3, noise pulse 5103 is t2, noise pulse 5104 is t4, noise pulse 5105 is t1, noise pulse 5106 is t2, noise pulse 5107 is t1, and noise pulse 5108 is t3.

Further, time periods 5150 are located between noise pulses 5100. In this example, time periods 5150 include time period 5151, time period 5152, time period 5153, time period 5154, time period 5155, time period 5156, and time period 5157. In this example, the length or duration of these different time periods between noise pulses are as follows: time period 5151 is t2, time period 5152 is t4, time period 5153 is t3, time period 5154 is t1, time period 5155 is t4, time period 5156 is t3, and time period 5157 is t2.

These different lengths of times for the different noise pulse time durations and different time periods between noise pulses 5100 correspond to symbols that represent digital information. In this example, the noise pulse time durations and time periods between noise pulses 5100 correspond to symbols 000110110110110000110110000110 that represents the digital information.

The illustration of noise pulses with different noise pulse time durations and different times between noise pulses, with symbols corresponding to those noise pulse time durations and different times between noise pulses 5100 for communicating digital information in FIG. 51 is presented as an example and not meant to limit the manner in which other illustrative examples can be implemented. For example, in this example, the noise pulse time duration for a noise pulse or the time between noise pulses 5100 represents a symbol comprising two bits. In another illustrative example, the different noise pulse time durations between noise pulses 5100 can correspond to symbols in other forms such as one bit, four bits, seven bits, or some other number of bits. Further, noise pulse time durations and time periods between noise pulses 5100 do not need to map correspondingly to the same symbols. Certain noise pulse time durations may have different symbols than the same time periods between noise pulses 5100. Further, different numbers of bits per symbol for noise pulse time durations can be present than the number of bits for time periods between noise pulses 5100.

Figure 52:
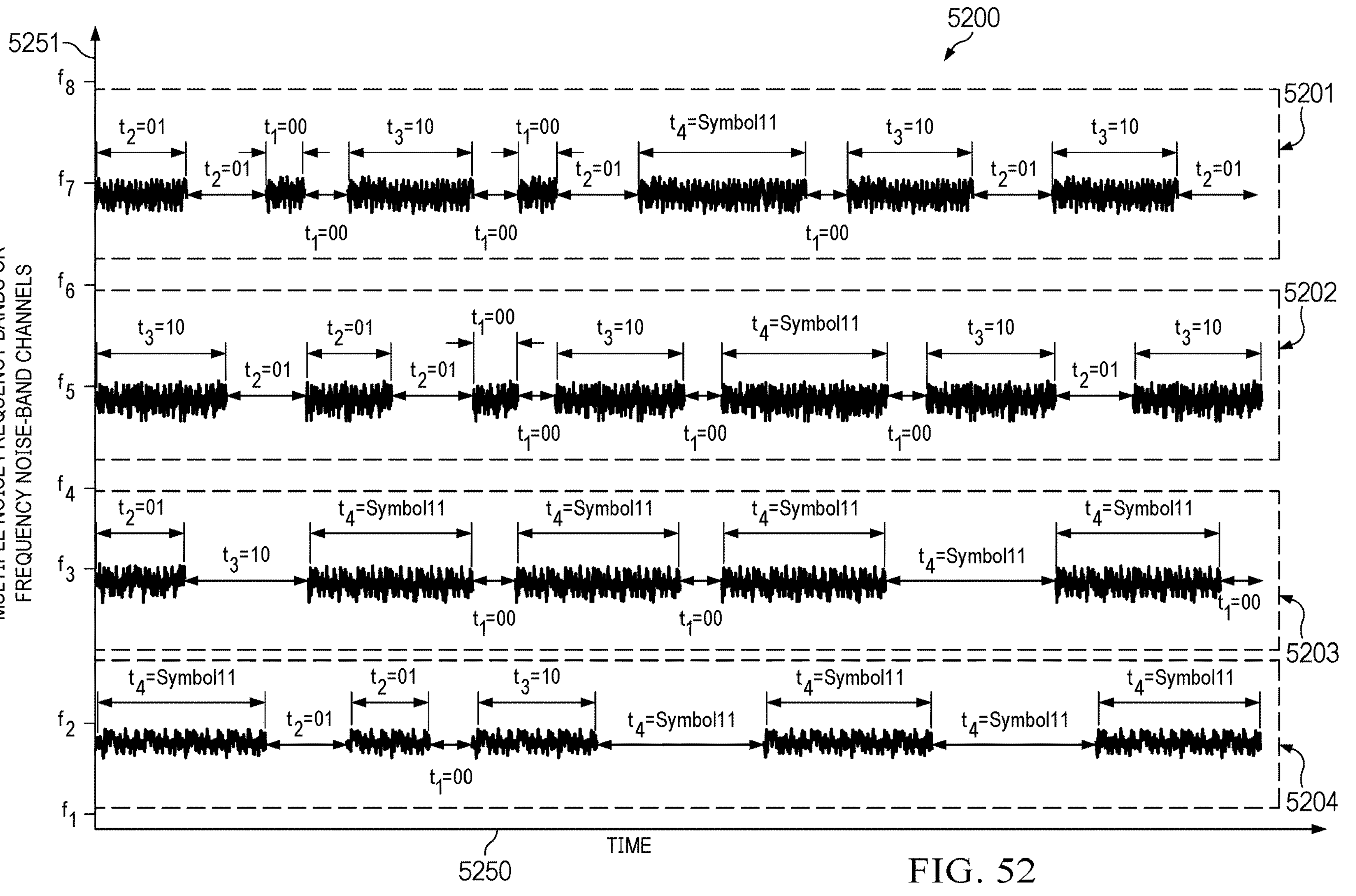
FIG. 52 is an illustration of noise pulses generated using digital pulse-width noise shift keying in accordance with an illustrative embodiment.

Turning next to FIG. 52, an illustration of noise pulses generated using a combination of digital pulse-position noise shift keying and digital pulse-width noise shift keying is depicted in accordance with an illustrative embodiment. In this example, noise pulses 5200 are generated by communications system 3602 using digital pulse-position and pulse-width noise shift keying 3693. However, noise pulses 5200 are transmitted over multiple specific frequency range noise-bands in this example.

In this example, digital information is transmitted using symbols that represent the digital information. As depicted, different noise pulse time durations for noise pulses 5200 and different time periods between noise pulses 5200 in the groups of noise pulses 5200 correspond to symbols. Each of these groups of noise pulses 5200 is transmitted within a different frequency-range noise-band. These frequency-range noise-bands can be referred to as frequency noise-band channels. This type of modulation of noise pulses 5200 is an example of digital pulse-position and pulse-width noise shift keying 3693 in FIG. 48.

In this example, x-axis 5250 represents time and y-axis 5251 represents frequency-range noise-bands. Groups of noise pulses 5200 are depicted as being transmitted at substantially the same or similar times within specific frequency range noise-bands that are multiple different frequency range noise-bands. Different symbols representing digital information can be sent in parallel to the same receiver over these different frequency range noise-bands. In other examples, these symbols can be sent to different receivers over the different frequency range noise-bands.

As depicted in this example, each group of noise pulses 5200 is transmitted in a different frequency range noise-band. As depicted, first group 5201 of noise pulses 5200 is transmitted in the frequency range noise-band f7, second group 5202 of noise pulses 5200 is transmitted in the frequency range noise-band f5, third group 5203 of noise pulses 5200 is transmitted in the frequency range noise-band f3, and fourth group 5204 of noise pulses 5200 is transmitted in the frequency range noise-band f2.

As depicted in this example, the noise pulse time durations (pulse-widths) of noise pulses 5200 and the time periods between the noise pulses (pulse-position) 5200 in first group 5201 of noise pulses 5200 correspond to 01010000100000011100100110 01 as symbols. These noise pulse time durations can also be referred to as pulse-widths, and time periods between noise pulses 5200 can be referred to as pulse-positions.

In the second group 5202 of noise pulses 5200, the noise pulse time durations of noise pulses 5200 and the time periods between the noise pulses 5200 correspond to 1001010100000100011001001 10 as symbols. The noise pulse time durations of noise pulses 5200 and the time periods between the noise pulses 5200 in third group 5203 of noise pulses 5200 correspond to 01101100110011111100 as symbols. The noise pulse time durations of noise pulses 5200 and the time periods between the noise pulses 5200 in fourth group 5204 of noise pulses 5200 correspond to 110101001011111111 as symbols.

Thus, these different symbols for digital information are transmitted in parallel at substantially the same or similar times as each other using different frequency range noise-bands. The different symbols transmitted through the different frequency range noise-bands can be sent to the same receiver or to different receivers.

The illustration of noise pulses with different noise pulse time durations, time periods between the noise pulses 5200, and symbols corresponding to those time periods for communicating digital information in FIG. 52 is presented as an example and not meant to limit the manner in which other illustrative examples can be implemented. For example, in this example, the time period between noise pulses represents a symbol comprising two bits. In another illustrative example, the different time periods can correspond to symbols in other forms such as 3 bits, 4 bits, nine bits, or some other number bits. Further, the times, time periods, noise pulses, and symbols do not have to be linearly correlated.

Further, other numbers of frequency-range noise-bands can be used in addition to those shown in this example. In other illustrative examples, symbols corresponding to digital information can be sent over one frequency-range noise band, two frequency-range noise-bands, five frequency-range noise-bands, 7 frequency-range noise-bands, or some other number a frequency-range noise-bands. Further, noise pulse time durations and time periods between noise pulses do not need to map correspondingly to the same symbols. Certain noise pulse time durations may have different symbols than the same time periods between noise pulses. Also, different numbers of bits per symbol for noise pulse time durations can be present as than the number of bits per symbol for time periods between noise pulses.

Figure 53:
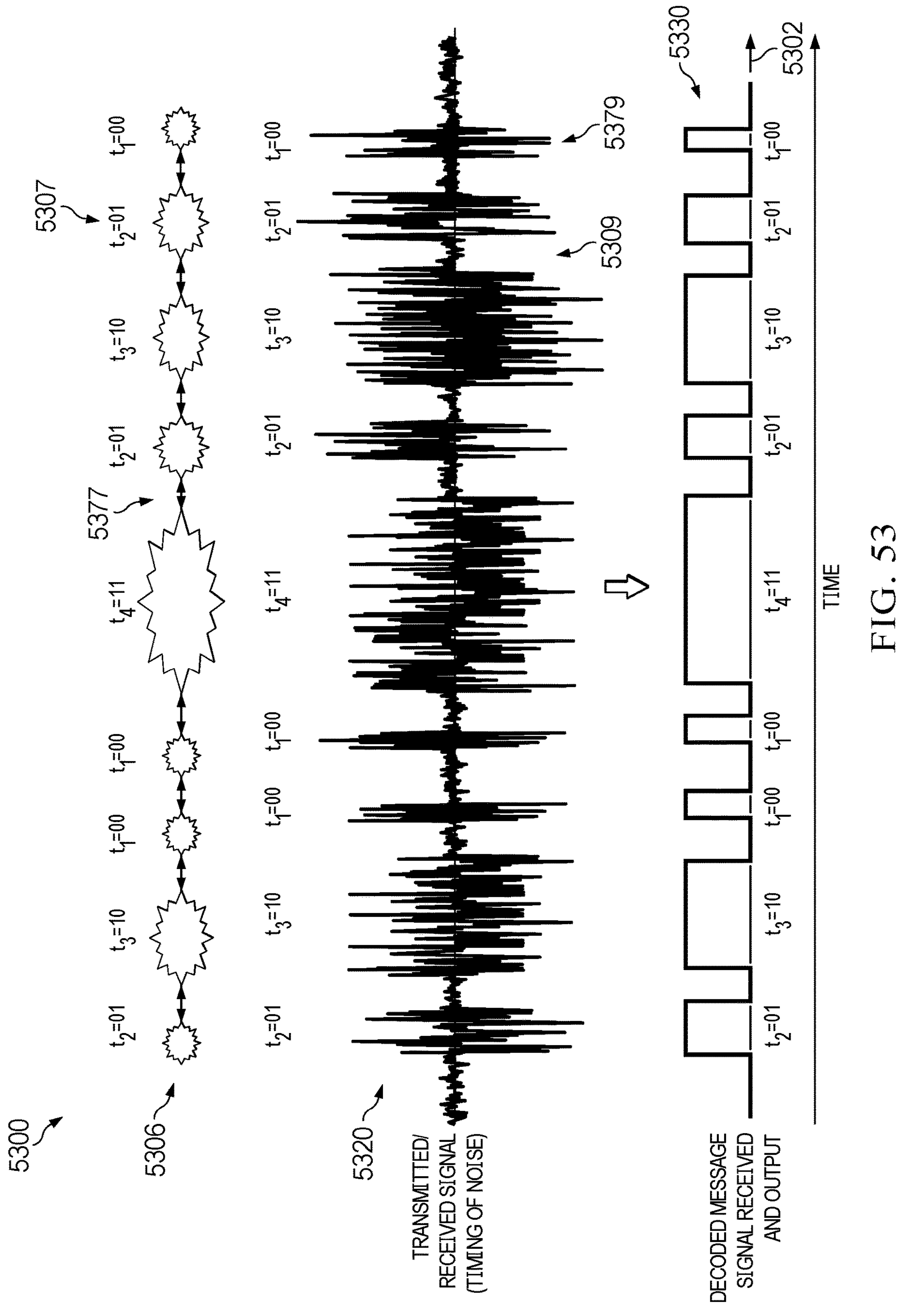
FIG. 53 is an illustration of information flow for transmitting digital information with digital pulse-width noise shift keying using a laser generation system in accordance with an illustrative embodiment.

Turning next to FIG. 53, an illustration of information flow for transmitting digital information with digital pulse-width noise shift keying using a laser generation system is depicted in accordance with an illustrative embodiment. In this example, information flow 5300 can be implemented using laser generation system 3626 in signal transmission system 3619 for communications system 3602 in FIG. 48. In this example, axis 5302 represents time for the entire FIG. 48 for optical breakdowns, noise signals, and digital signals in information flow 5300.

As depicted, optical breakdowns 5306 are generated with time durations 5307 for optical breakdowns 5306. As previously described, these optical breakdowns are plasma generated using laser generation system 3626. Each optical breakdown in optical breakdowns 5306 is a plasma event generated by the set of one or more laser beams 3627 emitted by laser generation system 3626 in FIG. 48.

The result of these optical breakdowns 5306 are radio frequency noise pulses 5320 which are an example of radio frequency noise pulses 3605 depicted in FIG. 48. As depicted, each radio frequency noise pulse in radio frequency noise pulses 5320 corresponds to an optical breakdown in optical breakdowns 5306.

In this example, different noise pulse time durations 5379 of radio frequency noise pulses 5320 correlate to optical breakdown time durations 5307 of optical breakdowns 5306. In other words, the pulse widths of radio frequency noise pulses 5320 are correlated to optical breakdown time durations 5307 of optical breakdowns 5306. These pulse widths are also referred to as noise pulse time durations.

Causing or controlling optical breakdown time durations 5307 of optical breakdowns 5306 results in radio frequency noise pulses 5320 having different noise pulse time durations 5379 that correspond to optical breakdown time durations 5307 and correspond to symbols representing the digital information being transmitted. Thus, digital information can be transmitted using radio frequency noise pulses 5320 through controlling or creating optical breakdowns 5306.

In this example, different noise pulse time durations 5379 for radio frequency noise pulses 5320 resulting from optical breakdowns 5306 correspond to symbols representing digital information. In this example, each noise pulse time duration corresponds to a symbol. As depicted in this example, the noise pulse time durations are t1, t2, t3, and t4. In this example, the correspondence of time durations to the symbols is as follows: t1 corresponds to symbol 00, t2 corresponds to symbol 01, t3 corresponds to symbol 10, and t4 corresponds to symbol 11. Thus, different noise pulse time durations 5379 correspond to different symbols.

Radio frequency noise pulses 5320 can be received and decoded by a receiver, such as receiver 3617 in FIG. 48. As depicted, digital signals 5330 can be recovered in response to receiver 3617 receiving radio frequency noise pulses 5320. Thus, laser generation system 3626 is an example of one manner in which signal transmission system 3619 can transmit digital information 3607 in noise signals comprising radio frequency noise pulses with different time periods 5309 between the radio frequency noise pulses 5320.

In this example, the timing of optical breakdowns 5306 can be controlled based on at least one of a strength of the set of laser beams, or positioning of the set of laser beams to cause or control optical breakdowns 5306 with optical breakdown time durations 5307 that correspond to symbols representing digital information that is being transmitted. The positioning of the laser beams can be performed to cause intersections at desired time intervals to cause or control optical breakdowns 5306 with the desired optical breakdown time durations correlating to symbols representing digital information being transmitted. In these examples, the control can be performed by using at least one of a mirror orientation, a deformable mirror position, a lens position, lens, a deformable lens position or some other element that can be positioned in a manner that changes an optical path length (OPL) for the set of one or more laser beams 3627. In this example, the path length change can be both the optical path length and/or the physical path length. Another input parameter that can be changed in this example is the index of refraction (IoR). The optical path length is inversely proportional to the index of refraction.

These and other parameters can be used to control the timing of optical breakdowns 5306 to have optical breakdown time durations 5307 that results in radio frequency noise pulses 5320 having different noise pulse time durations 5379 that correspond to symbols representing the digital information. This control of optical breakdowns 5306 results in the generation of radio frequency noise pulses 5320 having different noise pulse time durations 5379 that correspond to symbols.

Further, in this example, time periods 5377 between optical breakdowns 5306 results in radio frequency noise pulses 5320 having different time periods 5309 between radio frequency noise pulses 5320. These time periods between optical breakdowns 5306 can also be controlled generate radio frequency noise pulses 5320 having different time periods 5309 between noise pulses that have a correlation to symbols representing digital information in addition to the correlation of the different noise pulse time durations 5379 to symbols. As result, both different noise pulse time durations 5379 for radio frequency noise pulses 5320 and different time periods 5309 between radio frequency noise pulses 5320 can be used to represent correlations to symbols that represent digital information. This type of modulation is an example of digital pulse-position and pulse-width noise shift keying 3693.

Figure 54:
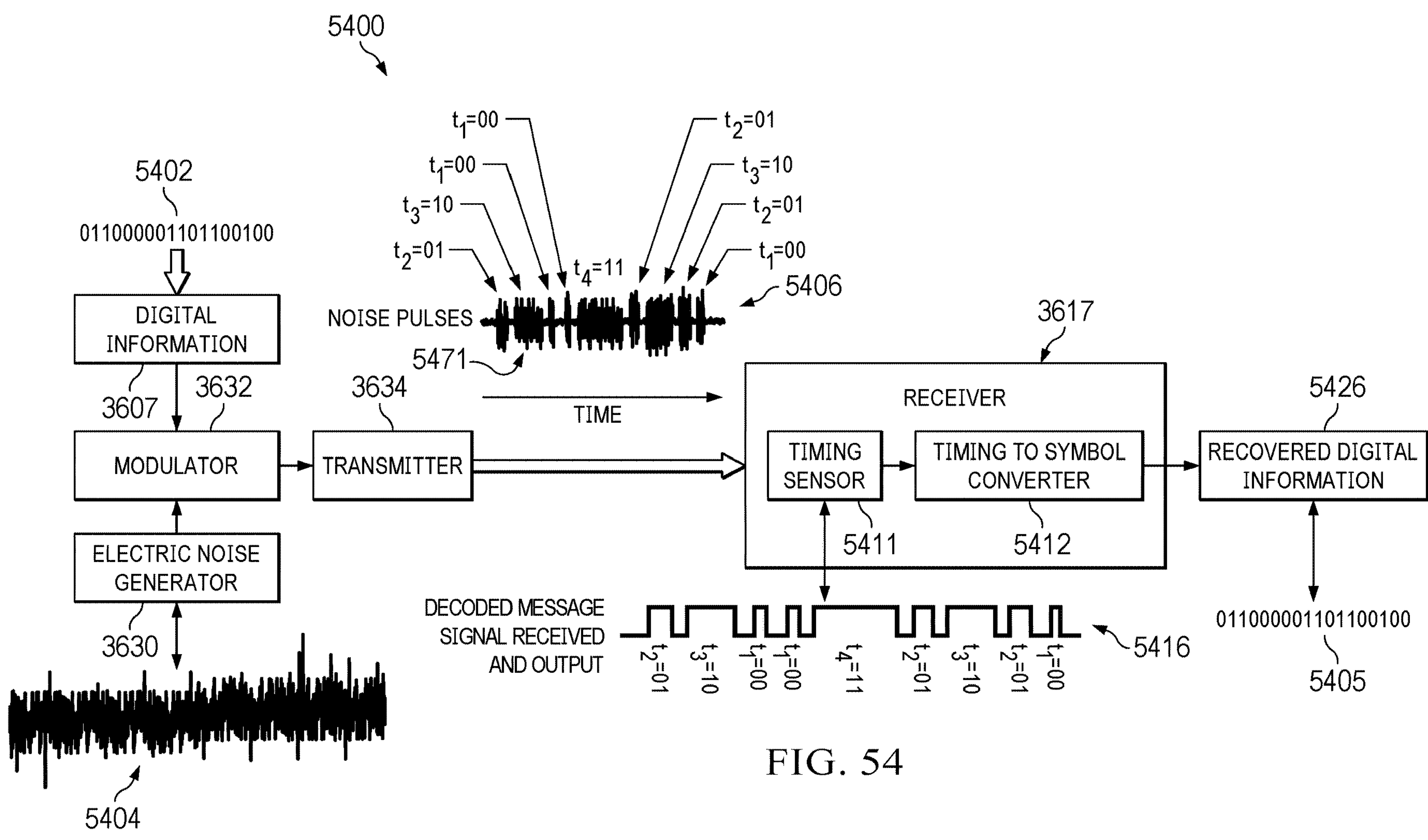
FIG. 54 is an illustration of information flow for transmitting digital information in the form of digital noise pulse-widths using a noise transmitter in accordance with an illustrative embodiment.

Turning next to FIG. 54, an illustration information flow for transmitting digital information in the form of digital pulses using a noise transmitter is depicted in accordance with an illustrative embodiment. In this example, information flow 5400 can be implemented using noise transmitter 3628 in signal transmission system 3619 for communications system 3602 in FIG. 48.

As depicted in this example, symbols 5402 is an example of digital information 3607 that is to be transmitted using digital pulse-width noise shift keying. In this example, electric noise generator 3630 generates carrier noise signal 5404. Modulator 3632 is a symbol-to-timing modulator that modulates carrier noise signal 5404 into noise pulses 5406 using symbols 5402. This modulation causes carrier noise signal 5404 to form noise pulses 5406 with different noise pulse time durations 5471 for noise pulses 5406 that correspond to symbols 5402. These noise pulses are transmitted by transmitter 3634. Different noise pulse time durations 5471 for noise pulses 5406 correspond to symbols 5402. The length of each noise time pulse duration for a noise pulse corresponds to a symbol. In this example, the different noise pulse time durations 5471 in noise pulses 5406 correspond to different symbols in symbols 5402. In this example, these noise pulse time durations t1, t2, t3, and t4 correspond to symbols as follows: t1 corresponds to symbol 00, t2 corresponds to symbol 01, t3 corresponds to symbol 10, and t4 corresponds to symbol 11.

As depicted, receiver 3617 includes timing sensor 5411 and timing to symbol converter 5412. Timing sensor 5411 is a hardware device that is configured to receive and process noise signals across a wide range of frequencies to detect noise pulses in the noise signals. Noise pulses can be detected when the noise signals have a selected amplitude. In this example, timing sensor 5411 receives modulated carrier noise pulses 5406 with different noise pulse time durations 5471 that can be used to generate decoded message signal 5416. As can be seen, decoded message signal 5416 contains noise pulses 5406 with different noise pulse time durations 5471.

Timing to symbol converter 5412 is a hardware component that converts signals into symbols based on different noise pulse time durations 5471 for noise pulses 5406. In this example, symbol converter 5412 generates recovered digital information 5426 in the form of output symbols 5405. Output symbols 5405 are identified based on the lengths of different noise pulse time durations 5471 for noise pulses 5406 in decoded message signal 5416. In this example, output symbols 5405 are the same as input symbols 5402.

In another example, modulator 3632 can also control the time periods between noise pulses 5406 in addition to the pulse time duration of these digital pulse such that both pulse time duration and time periods between noise pulses correlate to symbols representing the digital information. This type of modulation is an example of digital pulse-position and pulse-width noise shift keying 3693 in FIG. 48.

Figures 55, 56:
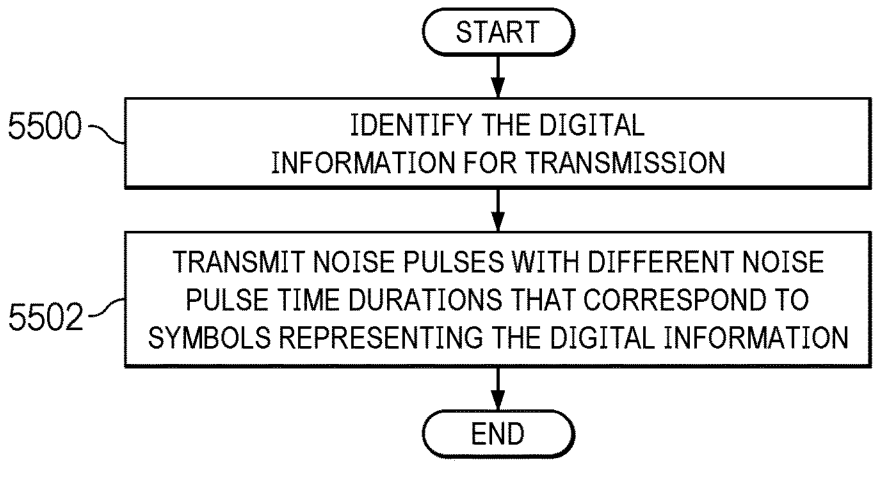
FIG. 55 is an illustration of a flowchart of a process for communicating digital information in accordance with an illustrative embodiment.
FIG. 56 is an illustration of a flowchart of a process for transmitting noise pulses in accordance with an illustrative embodiment.

Turning now to FIG. 55, an illustration of a flowchart of a process for communicating digital information is depicted in accordance with an illustrative embodiment. The process in FIG. 55 can be implemented in hardware, software, or both. When implemented in software, the process can take the form of program instructions that are run by one of more processor units located in one or more hardware devices in one or more computer systems. For example, the process can be implemented in communications manager 3614 in computer system 3612 in FIG. 48. In this example, the digital information is communicated using digital pulse-width noise shift keying 3692 in FIG. 48.

The process begins by identifying the digital information for transmission (operation 5500). The process transmits noise pulses with different noise pulse time durations that correspond to symbols representing the digital information (operation 5502). The process terminates thereafter.

In this example, the time periods between the noise pulses can be fixed. In another example, the time periods between the noise pulses can have a varying length.

With reference next to FIG. 56, an illustration of a flowchart of a process for transmitting noise pulses is depicted in accordance with an illustrative embodiment. In this figure is an example of an implementation for operation 5502 in FIG. 55.

The process transmits noise pulses with the different noise pulse time durations and different time periods between the noise pulses, wherein the different noise pulse time durations and different time periods between noise pulses correspond to the symbols representing the digital information (operation 5600). The process terminates thereafter.

In this example, both the noise pulse time durations for noise pulses and time periods between noise pulses correlate to symbols. As a result, the amount of information that can be transmitted is increased as compared to using just noise pulse time durations or time periods between noise pulses.

Figure 57:
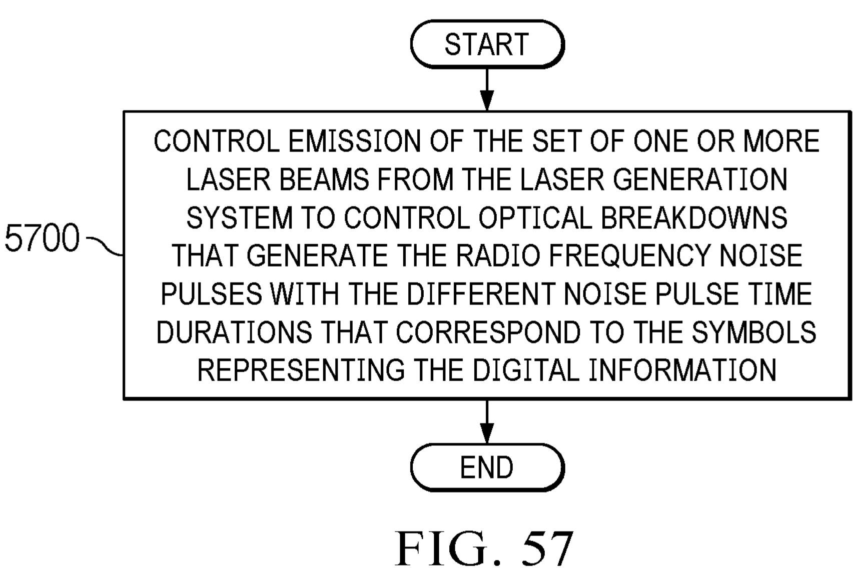
FIG. 57 is an illustration of a flowchart of a process for transmitting noise pulses with different time periods or noise pulse-widths using laser generation system in accordance with an illustrative embodiment.

With reference next to FIG. 57, an illustration of a flowchart of a process for transmitting noise pulses with different time periods using laser generation system is depicted in accordance with an illustrative embodiment. The process in this figure is an example of an implementation for operation 4202 in FIG. 42. In this example, the noise pulses are radio frequency noise pulses. In this example, this process can be implemented in laser generation system 3626 in FIG. 48. With this example, a set of one or more laser beams are emitted from laser generation system 3626.

The process controls emission of the set of one or more laser beams from the laser generation system to control optical breakdowns that generate the radio frequency noise pulses with the different noise pulse time durations that correspond to the symbols representing the digital information (operation 5700). The process terminates thereafter.

Figure 58:
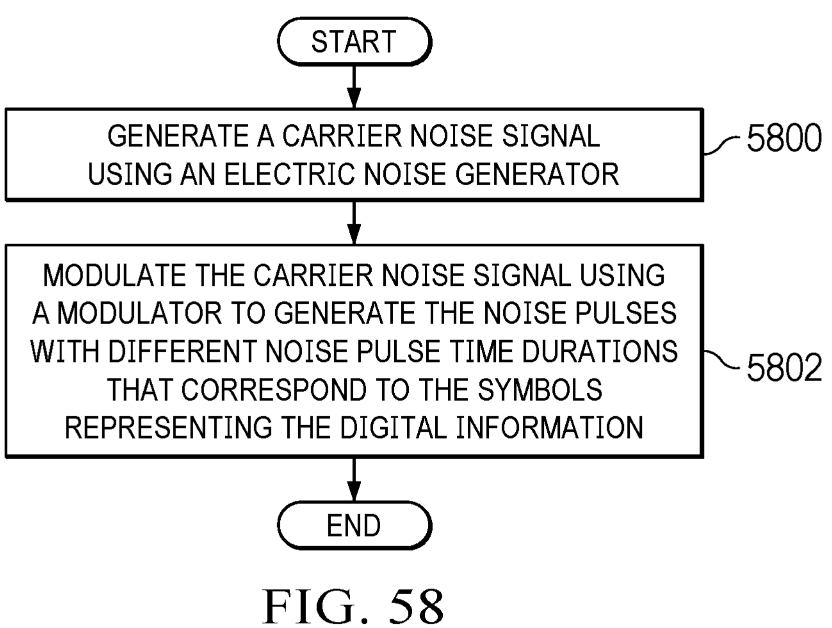
FIG. 58 is an illustration of a flowchart of a process for transmitting noise pulses with different time periods or noise pulse-widths using a noise transmitter in accordance with an illustrative embodiment.

In FIG. 58, an illustration of a flowchart of a process for transmitting noise pulses with different time periods using a noise transmitter is depicted in accordance with an illustrative embodiment. The process in this figure is an example of an implementation for operation 5502 in FIG. 55. This process can be implemented in noise transmitter 3628 in FIG. 48.

The process generates a carrier noise signal using an electric noise generator (operation 5800). The process modulates the carrier noise signal using a modulator to generate the noise pulses with different noise pulse time durations that correspond to the symbols representing the digital information (operation 5802). The process terminates thereafter.

Figure 59:
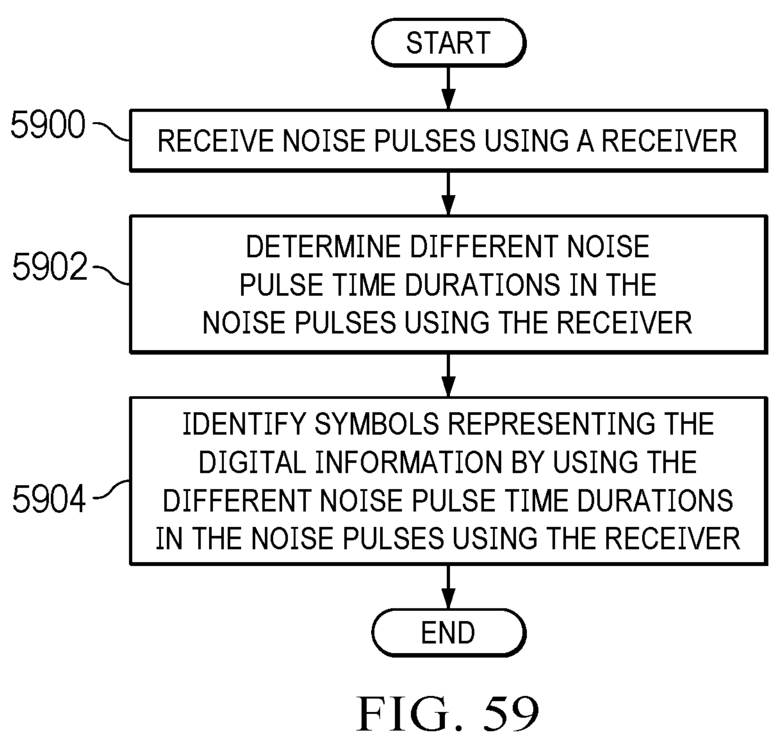
FIG. 59 is an illustration of a flowchart of a process for communicating digital information in accordance with an illustrative embodiment.

Turning now to FIG. 59, an illustration of a flowchart of a process for communicating digital information is depicted in accordance with an illustrative embodiment. The process in FIG. 59 can be implemented in hardware, software, or both. When implemented in software, the process can take the form of program instructions that are run by one of more processor units located in one or more hardware devices in one or more computer systems. In this example, the process can be implemented in receiver 3617 in FIG. 48.

The process receives noise pulses using a receiver (operation 5900). The process determines different noise pulse time durations in the noise pulses using the receiver (operation 5902).

The process identifies symbols representing the digital information by using the different noise pulse time durations in the noise pulses using the receiver (5904). The process terminates thereafter.

Figure 60:
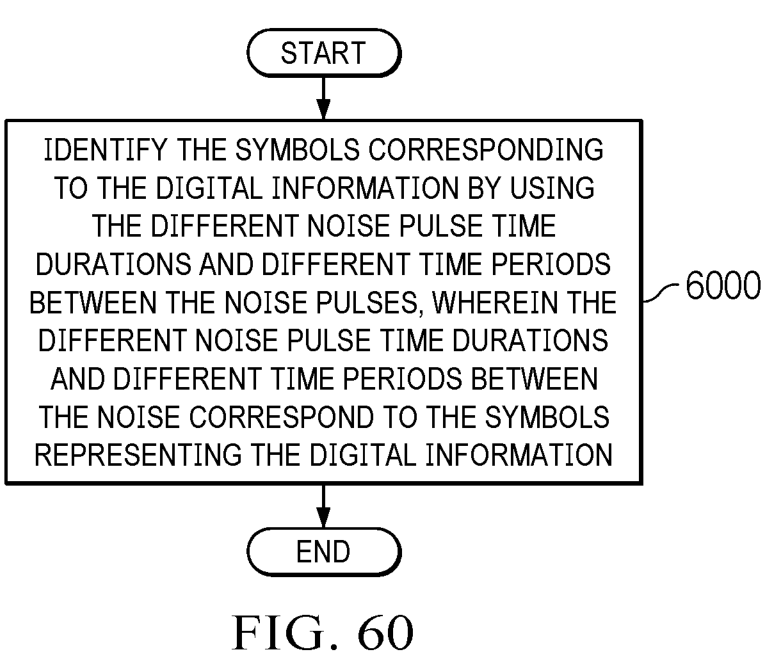
FIG. 60 is an illustration of a flowchart of a process for identifying symbols in accordance with an illustrative embodiment.

In FIG. 60, an illustration of a flowchart for a process for identifying symbols is depicted in accordance with an illustrative embodiment. The process in this figure is an example of an implementation for operation 5904 in FIG. 59.

The process identifies the symbols corresponding to the digital information by using the different noise pulse time durations and different time periods between the noise pulses, wherein the different noise pulse time durations and different time periods between the noise pulses correspond to the symbols representing the digital information (operation 6000). The process terminates thereafter.

Figure 61:
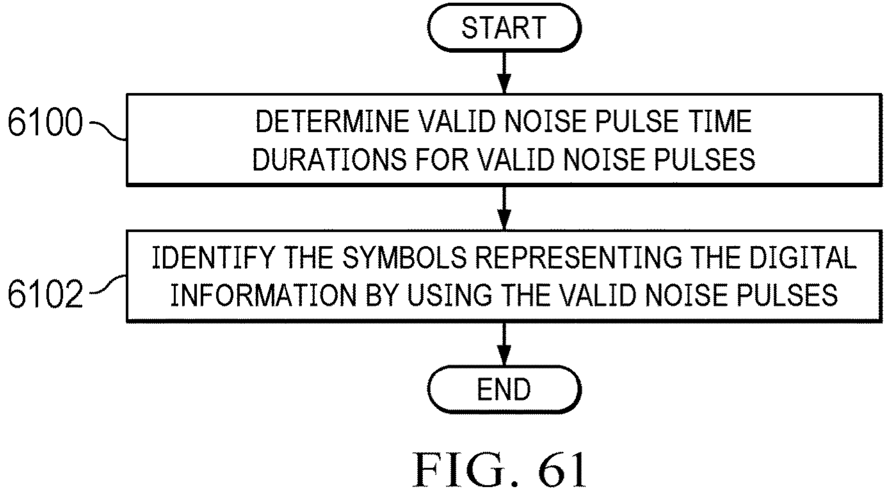
FIG. 61 is an illustration of a flowchart of a process for identifying symbols in accordance with an illustrative embodiment.

With reference now to FIG. 61, an illustration of a flowchart of a process for identifying symbols is depicted in accordance with an illustrative embodiment. The process in this figure is an example of an implementation for operation 5902 and operation 5904 in FIG. 59.

The process determines valid noise pulse time durations for valid noise pulses (operation 6100). This operation is an example of an implementation for operation 5902 in FIG. 59. These valid noise pulse time durations can also be referred to as valid noise pulse widths.

The process identifies the symbols representing the digital information by using the valid noise pulses (operation 6102). The process terminates thereafter. This operation is an example of an implementation for operation 5904 in FIG. 59.

Figure 62:
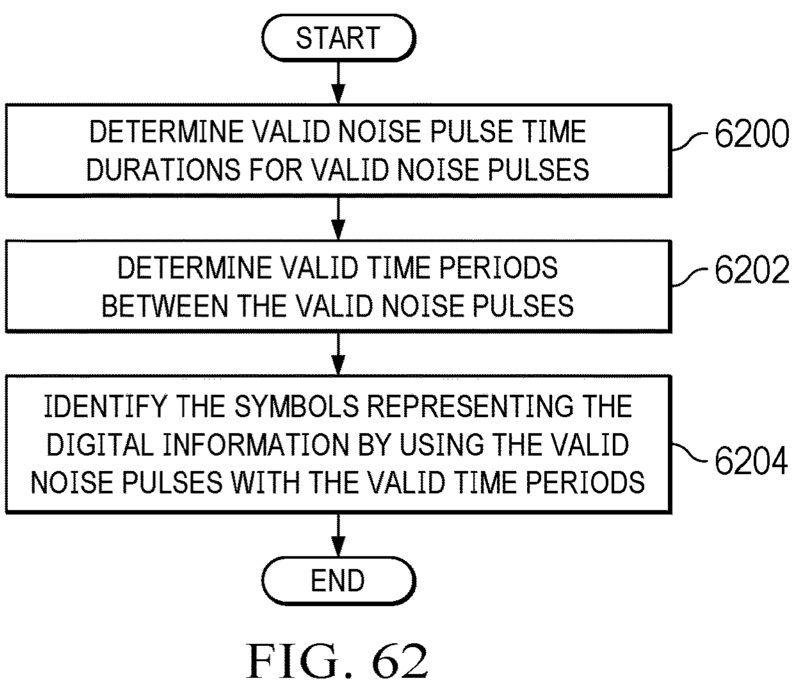
FIG. 62 is an illustration of a flowchart of a process for identifying symbols in accordance with an illustrative embodiment.

With reference now to FIG. 62, an illustration of a flowchart of a process for identifying symbols is depicted in accordance with an illustrative embodiment. The process in this figure is an example of an implementation for operation 5902 and operation 5904 in FIG. 59.

The process determines valid noise pulse time durations for valid noise pulses (operation 6200). The process determines valid time periods between the valid noise pulses (operation 6202). In this example, operation 6200 and operation 6202 are example of an implementation for operation 5902 in FIG. 59.

The process identifies the symbols representing the digital information by using the valid noise pulses with the valid time periods (operation 6204). The process terminates thereafter. Operation 6204 is an example of an implementation for operation 5904 in FIG. 59.

Some features of the illustrative examples for modulating digital information 3607 using digital pulse-width noise shift keying 3692 and digital pulse-position and pulse-width noise shift keying 3693 in communications system 3602 are described in the following clauses. These clauses are examples of features and are not intended to limit other illustrative examples.

Clause 1. A communications system comprising:

a computer system; and a communications manager in the computer system, wherein the communications manager is configured to:

identify digital information for transmission; and transmit noise pulses with different noise pulse time durations that correspond to symbols representing the digital information.

Clause 2. The communications system of clause 1, wherein the noise pulses are transmitted within specific frequency-range noise-bands.

Clause 3. The communications system of clause 1, wherein time periods between the noise pulses are fixed.

Clause 4. The communications system of clause 1, wherein time periods between the noise pulses have a varying length.

Clause 5. The communications system of clause 1, wherein in transmitting the noise pulses, the communications manager is configured to:

transmit noise pulses with the different noise pulse time durations and different time periods between the noise pulses, wherein the different noise pulse time durations and different time periods correspond to the symbols representing the digital information.

Clause 6. The communications system of clause 1, wherein a symbol in the symbols comprises a number of bits.

Clause 7. The communications system of clause 1, wherein the noise pulses are radio frequency noise pulses, and further comprising:

a laser generation system configured to emit a set of one or more laser beams, wherein in transmitting the noise pulses, the communications manager is configured to:

control an emission of the set of one or more laser beams from the laser generation system to control optical breakdowns that generate the radio frequency noise pulses with the different noise pulse time durations that correspond to the symbols representing the digital information.

Clause 8. The communications system of clause 1, further comprising:

an electric noise generator configured to generate a carrier noise signal;

a modulator; and a transmitter, wherein in generating the noise pulses, the communications manager is configured to:

generate the carrier noise signal using the electric noise generator; and modulate the carrier noise signal using the modulator to generate noise pulses with different noise pulse time durations that correspond to the symbols representing the digital information.

Clause 9. The communications system of clause 1, wherein the noise pulses are generated from at least one of electromagnetic frequency noise signals, radio frequency noise signals, microwave frequency noise signals, audio frequency noise signals, ultrasonic frequency noise signals, ultra-low frequency noise signals, very low frequency noise signals, underwater frequency noise signals, or optical frequency noise signals including visible or non-visible light.

Clause 10. A communications system comprising:

a receiver configured to:

receive noise pulses;

determine different noise pulse time durations in the noise pulses; and identify symbols corresponding to digital information by using the different noise pulse time durations in the noise pulses.

Clause 11. The communications system of clause 10, wherein in determining the different noise pulse time durations in the noise pulses, the receiver is configured to:

determine valid noise pulse time durations for valid noise pulses; and wherein in identifying the symbols, the receiver is configured to:

identify the symbols representing the digital information by using the valid noise pulses.

Clause 12. The communications system of clause 10, wherein in determining the different noise pulse time durations in the noise pulses, the receiver is configured to:

determine valid noise pulse time durations for valid noise pulses;

determine valid time periods between the valid noise pulses; and wherein in identifying the symbols, the receiver is configured to:

identify the symbols representing the digital information by using the valid noise pulses with the valid time periods.

Clause 13. A method for communicating digital information, the method comprising:

identifying the digital information for transmission; and transmitting noise pulses with different noise pulse time durations that correspond to symbols representing the digital information.

Clause 14. The method of clause 13, wherein time periods between the noise pulses are fixed.

Clause 15. The method of clause 13, wherein time periods between the noise pulses have a varying length.

Clause 16. The method of clause 13, wherein said transmitting the noise pulses comprises:

transmitting noise pulses with the different noise pulse time durations and different time periods between the noise pulses, wherein the different noise pulse time durations and different time periods correspond to the symbols representing the digital information.

Clause 17. The method of clause 13, wherein a symbol in the symbols comprises a number of bits.

Clause 18. The method of clause 13, wherein the noise pulses are radio frequency noise pulses, and further comprising:

emitting a set of one or more laser beams from a laser generation system; and wherein said transmitting the noise pulses comprises:

controlling emission of the set of one or more laser beams from the laser generation system to control optical breakdowns that generate the radio frequency noise pulses with the different noise pulse time durations that correspond to the symbols representing the digital information.

Clause 19. The method of clause 13, wherein said transmitting the noise pulses comprises:

generating a carrier noise signal using an electric noise generator; and modulating the carrier noise signal using a modulator to generate the noise pulses with different noise pulse time durations that correspond to the symbols representing the digital information.

Clause 20. The method of clause 13, wherein the noise pulses are generated from at least one of electromagnetic frequency noise signals, radio frequency noise signals, microwave frequency noise signals, audio frequency noise signals, ultrasonic frequency noise signals, ultra-low frequency noise signals, very low frequency noise signals, underwater frequency noise signals, or optical frequency noise signals including visible or non-visible light.

Clause 21. A method for communicating digital information, the method comprising:

receiving noise pulses using a receiver;

determining different noise pulse time durations in the noise pulses using the receiver; and identifying symbols representing the digital information by using the different noise pulse time durations in the noise pulses using the receiver.

Clause 22. The method of clause 21, wherein said identifying the symbols comprises:

identifying the symbols representing the digital information by using the different noise pulse time durations and different time periods between the noise pulses, wherein the different noise pulse time durations and different time periods correspond to the symbols representing the digital information.

Clause 23. The method of clause 21, wherein said determining the different noise pulse time durations in the noise pulses comprises:

determining valid noise pulse time durations for valid noise pulses; and wherein said identifying the symbols representing the digital information comprises:

identifying the symbols representing the digital information by using the valid noise pulses.

Clause 24. The method of clause 21, wherein said determining the different noise pulse time durations in the noise pulses comprises:

determining valid noise pulse time durations for valid noise pulses;

determining valid time periods between the valid noise pulses; and wherein said identifying the symbols corresponding to the digital information comprises:

identifying the symbols representing the digital information by using the valid noise pulses with the valid time periods.

Figure 63:
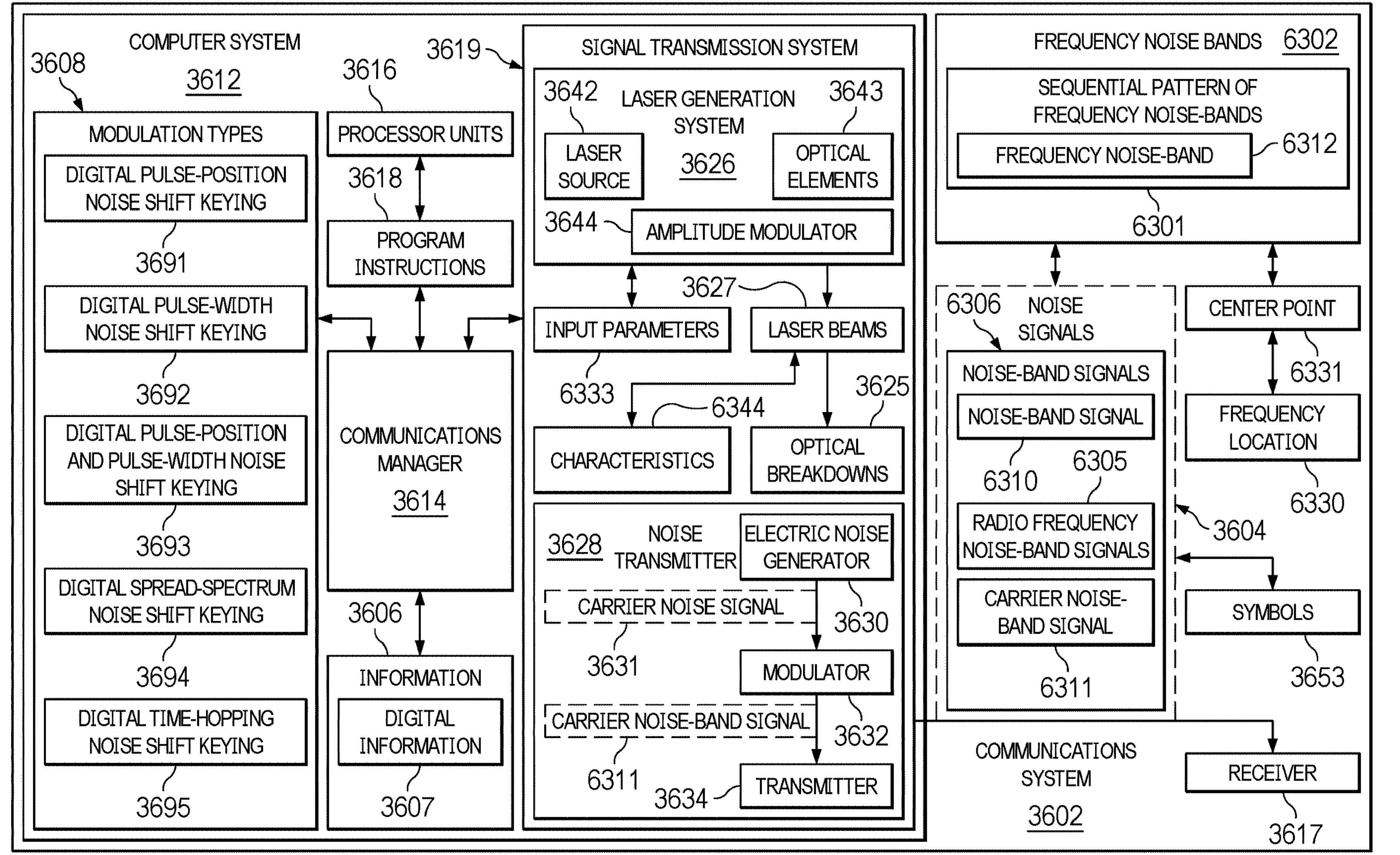
FIG. 63 is an illustration of a block diagram of a communication system in accordance with an illustrative embodiment.

With reference next to FIG. 63, an illustration of a block diagram of a communication system is depicted in accordance with an illustrative embodiment. In this illustrative example, communications system 3602 operates to modulate noise signals 3604 to correspond to information 3606. Noise signals 3604 are selected from at least one of electromagnetic frequency noise signals, radio frequency noise signals, microwave frequency noise signals, audio frequency noise signals, ultrasonic frequency noise signals, ultra-low frequency noise signals, very low frequency noise signals, underwater frequency noise signals, or optical frequency noise signals including at least one of visible or non-visible light.

In this example, digital spread-spectrum noise shift keying 3694 in modulation types 3608 is used to transmit noise signals 3604. This type of modulation involves selectively transmitting noise signals 3604 that correspond to digital information 3607. In this example, noise signals 3604 are transmitted in some of frequency noise-bands 6302 in a manner that the transmission corresponds to digital information 3607. Noise signals 3604 that are modulated or selected for a particular frequency noise-band are noise-band signals 6306 in this example.

Communications manager 3614 identifies digital information 3607 for transmission. Communications manager 3614 determines sequential pattern of frequency noise-bands 6301 and frequency noise-bands 6302 for transmitting digital information 3607. Sequential pattern of frequency noise-bands 6301 are a selection of frequency noise-bands 6302 for use in transmitting noise-band signals 6306 in which different frequency noise-bands 6302 are used to selectively transmit noise-band signals 6306 to correspond to digital information 3607.

Communications manager 3614 selectively transmits noise-band signals 6306 in sequential pattern of frequency noise-bands 6301 corresponding to the digital information 3607. The correspondence in selectively transmitting noise-band signals 6306 can be based on whether noise-band signal 6310 is present at each of frequency noise-bands 6302 and sequential pattern of frequency noise-bands 6301.

For example, a presence of noise-band signal 6310 at frequency noise-band 6312 in sequential pattern of frequency noise-bands 6301 corresponds to a logic 1 and an absence of the noise signal corresponds to a logic 0.

In another example, the presence of noise-band signal 6310 at frequency noise-band 6312 in sequential pattern of frequency noise-bands 6301 corresponds to a logic 0 and an absence of the noise-band signal corresponds to a logic 1. Thus, in selectively transmitting noise signals 3604, the presence or absence of noise-band signal 6310 can correspond to digital information 3607.

In one illustrative example, communications manager 3614 can control laser generation system 3626 in signal transmission system 3619 to selectively transmit noise-band signals 6306. In this example, laser generation system 3626 generates radio frequency noise-band signals 6305. These radio frequency noise-band signals are noise signals 3604 that are generated for a particular frequency noise-band in frequency noise-bands 6302. In this example, communications manager 3614 can control an emission of the set of one or more laser beams 3627 from laser generation system 3626 to control optical breakdowns 3625 that generate radio frequency noise-band signals 6305 in a manner that represents representing digital information 3607.

For example, communications manager 3614 can control an emission of the set of one or more laser beams 3627 from laser generation system 3626 to control optical breakdowns that selectively generate radio frequency noise-band signals 6305 in sequential pattern of frequency noise-bands 6301. A presence or an absence of a radio frequency noise-band signal at each frequency noise-band in sequential pattern of frequency noise-bands 6301 corresponds to digital information 3607.

For example, communications manager 3614 can control the emission of the set of one or more laser beams 3627 from laser generation system 3626 to control optical breakdowns 3625 that selectively generate radio frequency noise-band signals 6305 by varying frequency location 6330 of center point 6331 of frequency noise-band 6312 in selected frequency noise-bands in sequential pattern of frequency noise-bands 6301 which correspond to digital information 3607.

For example, if the first frequency noise-band in sequential pattern of frequency noise-bands 6301 is f1, frequency location 6330 of center point 6331 is the center of frequency noise-band f1. If the next frequency noise-band in sequential pattern of frequency noise-bands 6301 is f6, frequency location 6330 of center point 6331 is the center of frequency noise-band f6. And if the next frequency noise-band in sequential pattern of frequency noise-bands 6301 is f2, frequency location 6330 of center point 6331 is the center of frequency noise-band f2. In this example, an optical breakdown can be selectively generated at the center points of each of these frequency noise-bands.

For example, suppose digital information 3607 is 011 and sequential pattern of frequency noise-bands 6301 is f1, f6, f2. Further, a presence of noise-band signal 6310 is a logic 1 and absence of noise-band signal 6310 is a logic 0. In this example, optical breakdowns 3625 are generated in locations for center points of frequency noise-bands f6 and f2 at the appropriate times in the sequential pattern of frequency noise bands, and not for frequency noise-band f1. In this manner, noise-band signals 6306 is not present for frequency noise-band f1 and is present for frequency noise-bands f6 and f2 at the appropriate times in the sequential pattern of frequency noise bands. In this manner, noise-band signals 6306 selectively generate sequential pattern of frequency noise-bands 6301 that correspond to digital information 3607.

In other words, optical breakdowns 3625 are generated to cause the presence of radio frequency noise-band signals 6305 for selected frequency noise-bands in sequential pattern of frequency noise-bands 6301.

In this example, varying the frequency location 6330 of center point 6331 of frequency noise-band 6312 can be used to determine which frequency noise-bands in sequential pattern of frequency noise-bands 6301 will have a presence of radio frequency noise-band signals 6305. As result, whether frequency noise-bands in sequential pattern of frequency noise-bands 6301 has radio frequency noise-band signals 6305 can be used to represent digital information 3607. For example, the presence or absence of radio frequency noise-band signal in frequency noise-band 6312 can correlate to a bit value that corresponds to digital information 3607.

As another example, communications manager 3614 can control a set of one or more input parameters 6333 to laser generation system 3626 for the emission of a set of one or more of laser beams 3627 from laser generation system 3626 to control optical breakdowns 3625 that generate radio frequency noise-band signals 6305 by varying frequency noise-bands 6302 to have sequential pattern of frequency noise-bands 6301 that thereby modulates the radio frequency noise-band signals 6305 to correspond to digital information 3607.

In this example, these input parameters can change frequency location 6330 for center point 6331 in frequency noise-bands 6302. In this example, example, frequency location 6330 for center point 6331 of frequency noise-band 6312 can be changed by changing a set of characteristics 6344 for the set of one or more laser beams 3627. The set of characteristics 6344 can be at least one of polarization or an energy level, or other characteristics for the set of one or more laser beams 3627 characteristics. In this example, the set of characteristics 3654 can be changed in a manner that creates or controls optical breakdowns 3625 that results in noise-band signals 6306 having desired frequency noise-bands such as sequential pattern of frequency noise-bands 6301.

In this example, input parameters 6333 can include control of at least one of a mirror orientation, a deformable mirror position, a lens position, lens, a deformable lens position or some other element that can be positioned in a manner that changes an optical path length (OPL) for the set of one or more laser beams 3627. In this example, the path length change can be at least one of the optical path length or the physical path length. Another input parameter that can be changed in this example is the index of refraction (IoR). The optical path length is inversely proportional to the index of refraction.

In another illustrative example, communications manager 3614 can use noise transmitter 3628 in signal transmission system 3619 to selectively transmit noise signals 3604. In this example, communications manager 3614 generates carrier noise signal 3631 using electric noise generator 3630. Carrier noise signal 3631 can be generated to have different frequency noise-bands. In this example, carrier noise-band signal 6311 is generated to have sequential pattern of frequency noise-bands 6301. In other words, carrier noise signal 3631 has frequency noise-bands following the pattern for sequential pattern of frequency noise-bands 6301.

Communications manager 3614 modulates carrier noise signal 3631 using modulator 3632 to change frequency noise-bands 6302 for carrier noise signal 3631 to form carrier noise-band signal 6311 that follows the pattern of sequential pattern of frequency noise-bands 6301 that thereby modulates the carrier noise signal 3631 to correspond to the digital information 3607. In this example, carrier noise-band signal 6311 is the modulated form of carrier noise signal 3631 that corresponds to digital information 3607. In this example, modulation can be performed to selectively tune carrier noise-band signal 6311 within sequential pattern of frequency noise-bands 6301 for carrier noise signal 3631 to form carrier noise-band signal 6311.

Communications manager 3614 controls transmitter 3634 which transmits carrier noise-band signal 6311 with frequency noise-bands 6302 for carrier noise-band signal 6311 that follows sequential pattern of frequency noise-bands 6301 that thereby modulates the carrier noise-band signal 6311 to correspond to digital information 3607. In this example, carrier noise-band signal 6311 is an example of noise-band signals 6306 that can be transmitted from signal transmission system 3619 by transmitter 3634 in noise transmitter 3628.

In this example, frequency noise-bands 6302 for carrier noise-band signal 6311 may be present for only some of frequency noise-bands 6302 in sequential pattern of frequency noise-bands 6301. For example, the presence or absence of carrier noise-band signal 6311 in sequential pattern of frequency noise-bands 6301 corresponds to digital information 3607. In this example, the absence or presence of carrier noise-band signal 6311 corresponds to bits that represent digital information 3607.

As depicted, receiver 3617 receives noise-band signals 6306 transmitted by signal transmission system 3619. In this example, noise-band signals 6306 can be, for example, radio frequency noise-band signals 6305 or carrier noise-band signal 6311.

Receiver 3617 identifies digital information 3607 in sequential pattern of frequency noise-bands 6301 in the noise-band signals 6306. As part of identifying digital information 3607, receiver 3617 determines whether noise-band signal 6310 is present at each frequency noise-band in sequential pattern of frequency noise-bands 6301. Receiver 3617 identifies digital information 3607 based on whether noise-band signal 6310 is present at each frequency noise-band in sequential pattern of frequency noise-bands 6301. In this example, the presence or absence of noise-band signal 6310 can be used to identify bits that correspond to digital information 3607.

Figure 64:
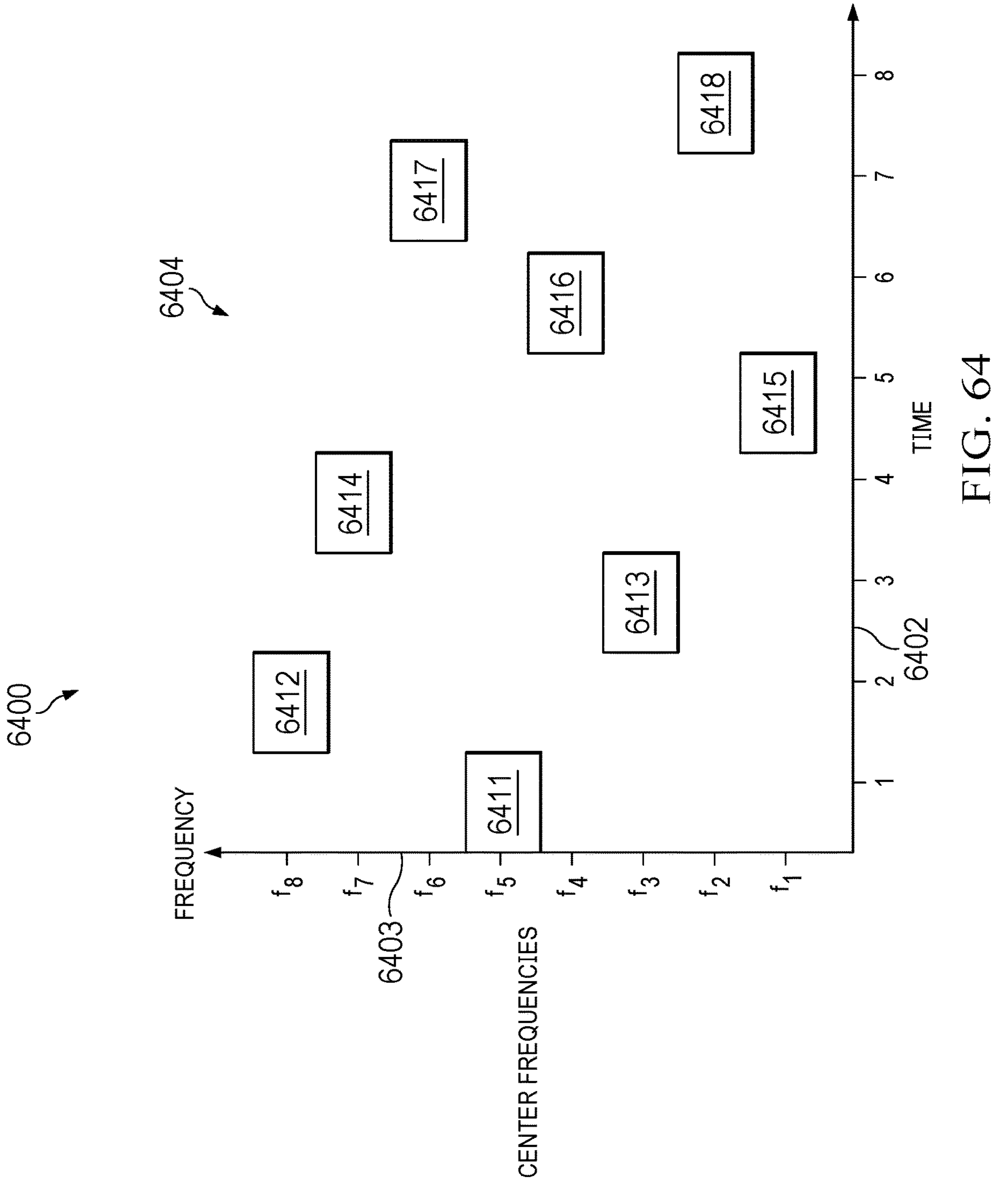
FIG. 64 is an illustration of a sequential pattern of frequency noise-bands used to communicate digital information in points with an illustrative embodiment.

With reference next to FIG. 64, an illustration of a sequential pattern of frequency noise-bands used to communicate digital information is depicted in points with an illustrative embodiment. In this illustrative example, x-axis 6402 in graph 6400 represents time. Y-axis 6403 represents center frequencies for noise frequency bands or frequency noise-bands.

In this illustrative example, the center frequencies are center frequencies for noise-band signals that can be selectively transmitted in sequential pattern of frequency noise-bands 6404, which is an example of sequential pattern of frequency noise-bands 6301.

This sequential pattern of frequency noise-bands includes frequency noise-band 6411, frequency noise-band 6412, frequency noise-band 6413, frequency noise-band 6414, frequency noise-band 6415, frequency noise-band 6416, frequency noise-band 6417, and frequency noise-band 6418.

In this example, the sequential pattern of frequency noise-bands are frequency noise-bands with center points f5, f8, f3, f7, f1, f4, f6, and f2. The center frequencies can be generated by laser generation system 3626 selectively generating optical breakdowns 3625 with center points for frequency noise-bands in the sequential pattern of frequency noise-bands. The center frequencies can be center frequencies of a carrier signal generated by noise transmitter 3628 using a modulator to selectively transmit the carrier signal at different center frequencies in the sequential pattern of frequency noise-bands.

In one example, a logic "1" is a presence of a noise-band signal and a logic "0" is an absence. With this example, digital information 11111100 can be transmitted using a sequential pattern of frequency noise-bands as depicted in graph 6400. With this example, frequency noise-band signals are present in frequency noise-band 6411, frequency noise-band 6412, frequency noise-band 6413, frequency noise-band 6414, frequency noise-band 6415, and frequency noise-band 6416, which indicate digital information 111111. Next, frequency noise-band signals are absent in frequency noise-band 6417 and frequency noise-band 6418, which indicates digital information 00.

The illustration of this sequential pattern of frequency noise-bands is provided as an illustration of one example for sequential pattern of frequency noise-bands 6301 in FIG. 63. This example is not meant to limit the manner in which other sequential patterns of frequency noise-bands can be implemented. In other examples, other numbers of frequency noise-bands can be used. For example, frequency noise-bands may be a single frequency noise-band, 3 frequency noise-bands, 15 frequency noise-bands, 23 frequency noise-bands, or some other number for frequency noise bands used to selectively transmit noise-band signals that correspond to digital information.

Figure 65:
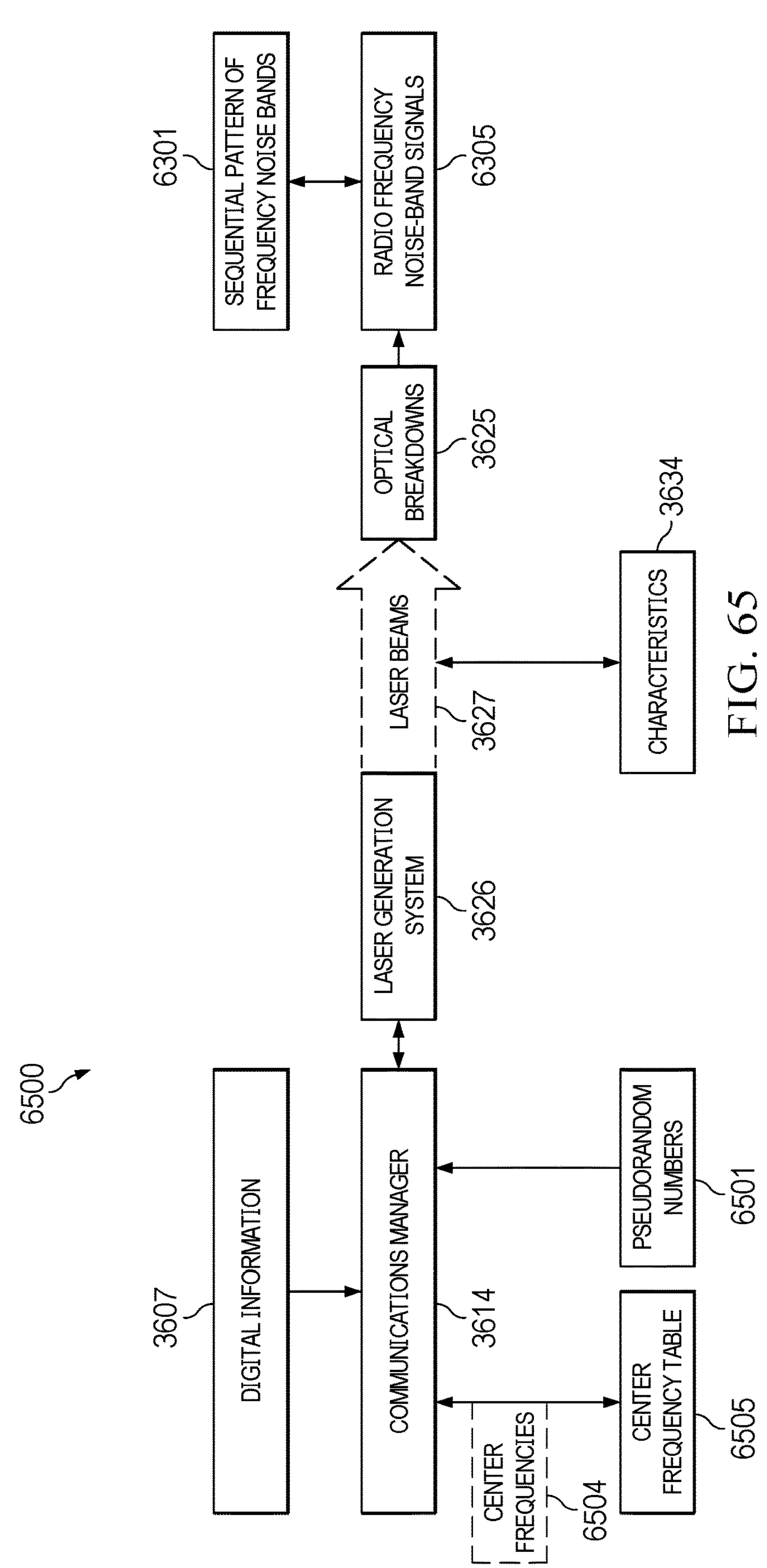
FIG. 65 is an illustration of information flow for transmitting digital information in the form of radio frequency noise-band signals using a laser generation system in accordance with an illustrative embodiment.

With reference next to FIG. 65, an illustration information flow for transmitting digital information in the form of radio frequency noise-band signals using a laser generation system is depicted in accordance with an illustrative embodiment. In this example, information flow 6500 can be implemented using laser generation system 3626 in signal transmission system 3619.

In this illustrative example, communications manager 3614 identifies digital information 3607 for transmission in information flow 6500. Further, communications manager 3614 identifies pseudorandom numbers 6501. These pseudorandom numbers are used to identify a sequential pattern of frequency noise-bands 6301 for use in transmitting digital information 3607.

Pseudorandom numbers 6501 are a sequence of numbers that are not truly random but mimic random behavior. Pseudorandom numbers 6501 can be generated by a pseudo random number generator using a seed. The pseudo random number generator is an algorithm that can generate a sequence of numbers. The seed is an initial value that can be used by a receiving pseudo random number generator to generate the same values for pseudorandom numbers 6501 at the receiver. As result, pseudorandom number generators that use the same algorithm will generate the same values for pseudorandom numbers 6501 when using the same value for the seed.

Communications manager 3614 identifies center frequencies 6504 using pseudorandom numbers 6501 as indexes into center frequency table 6505. This table 6505 contains center frequencies for use in generating radio frequency noise-band signals 6305. In this example, a center frequency in center frequency table 6505 identifies a frequency location 6330 for center point 6331 of a radio frequency noise-band. In this example, pseudorandom numbers 6501 identify a sequential pattern of frequency noise-bands 6301.

Communications manager 3614 controls laser generation system 3236 to emit a set of one or more laser beams 3627 with characteristics 6344 that results in optical breakdowns 3625. In this example, these characteristics are controlled such that optical breakdowns 3625 result in radio frequency noise-band signals 6305 being selectively present within sequential pattern of frequency noise-bands 6301.

In this example, sequential pattern of frequency noise-bands 6301 is based on the pattern of frequency noise-bands generated using center frequencies 6504 identified by using pseudorandom numbers 6501. In other words, pseudorandom numbers 6501 are used to identify center frequencies 6504 for a sequential pattern of frequency noise-bands 6301. In this example, radio frequency noise-band signals 6305 are selectively present within noise-bands in sequential pattern of frequency noise-bands 6301 to transmit digital information 3607. In other words, the presence or absence of the radio frequency noise-band signal corresponds to digital information 3607 in these examples.

Figure 66:
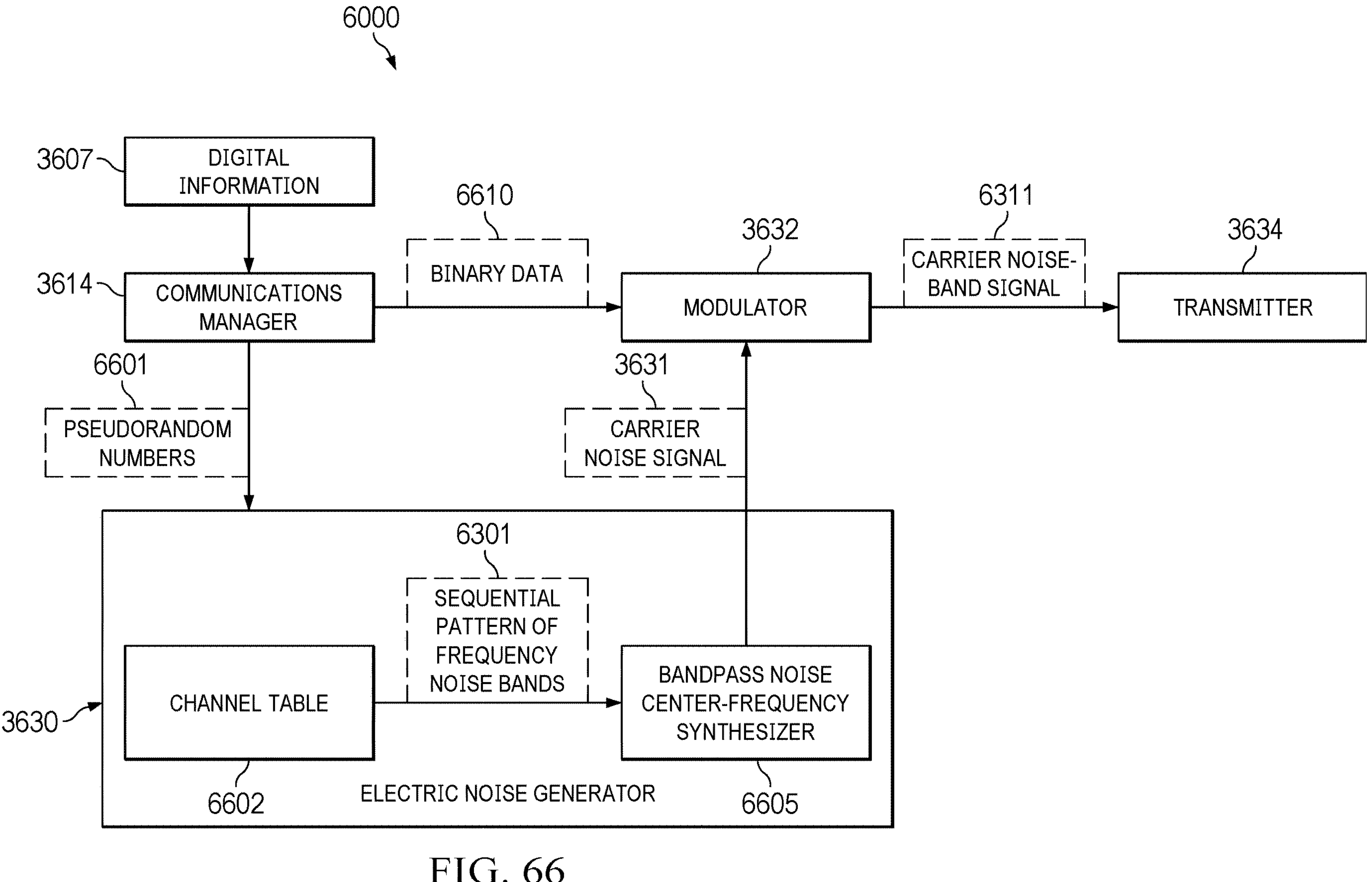
FIG. 66 is an illustration of information flow for transmitting digital information in the form a carrier noise-band signal using a noise transmitter in accordance with an illustrative embodiment.

With reference next to FIG. 66, an illustration information flow for transmitting digital information in the form a carrier noise-band signal using a noise transmitter is depicted in accordance with an illustrative embodiment. In this example, information flow 6600 can be implemented using noise transmitter 3628 in signal transmission system 3619.

In this example, communications manager 3614 identifies digital information 3607 for transmission. Communications manager 3614 sends binary data 6610 to modulator 3632. Communications manager 3614 also accesses pseudorandom numbers 6601 to control electric noise generator 3630. These pseudorandom numbers are used to identify sequential pattern of frequency noise-bands 6301 for use in transmitting digital information 3607.

In this example, pseudorandom numbers 6601 are used as an index into channel table 6602 to identify a sequential pattern of frequency noise-bands 6301. Channel table 6602 contains frequency noise-bands that are indexed to numbers. In this example, center frequencies 6504 identified from pseudorandom numbers 6601 are sent to generate carrier noise signal 3631 with sequential pattern of frequency noise-bands 6301. In this example, bandpass noise center frequency synthesizer 6605 generates carrier noise signal 3631 with sequential pattern of frequency noise-bands 6301. In this example, bandpass noise center frequency synthesizer 6605 is a hardware component that generates noise signals within noise-bands based on center frequencies. A center frequency is used to generate a noise signal within a noise-band. The noise-band has a lower and upper frequency bound in this example. In these examples, the different frequency noise-bands are the same width.

Bandpass noise center frequency synthesizer 6605 sends carrier noise signal 3631 having a sequential pattern of noise-bands 6301 sent to modulator 3632. In this example, modulator 3632 modulates carrier noise signal 3631 using binary data 6610. This modulation results in a presence or absence of a noise signal within carrier noise signal 3631 in each frequency noise-band in sequential pattern of frequency noise-bands 6301. The result of this modulation is carrier noise-band signal 6311, which is transmitted by transmitter 3634.

Figure 67:
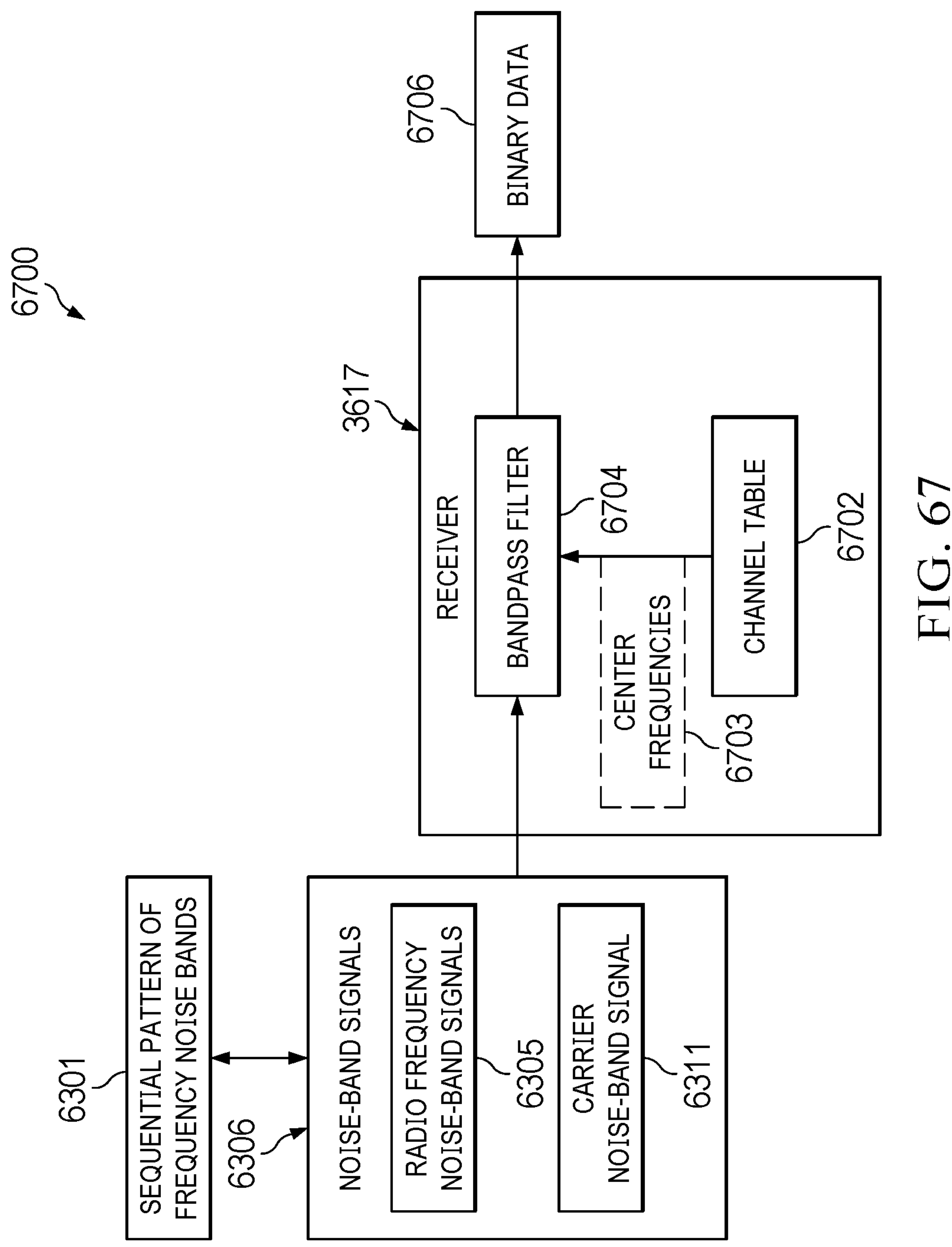
FIG. 67 is an illustration of dataflow in receiving digital information in noise-band signals in accordance with an illustrative embodiment.

Next in FIG. 67, an illustration of dataflow in receiving digital information in noise-band signals is depicted in accordance with an illustrative embodiment. In an example, information flow 6700 can be implemented using receiver 3617 in FIG. 63. As depicted, noise-band signals 6306 are received by receiver 3617. Noise-band signals 6306 can be, for example, radio frequency noise-band signals 6305 transmitted by laser generation system 3626 or carrier noise-band signal 6311 transmitted by noise transmitter 3634 in FIG. 66.

In this example, receiver 3617 monitors for noise-band signals in sequential pattern of frequency noise-bands 6301. In this example, receiver 3617 knows the pattern of frequency noise-bands for sequential pattern of frequency noise-bands 6301. In this illustrative example, receiver 3617 can use the same pseudorandom numbers 6601 from FIG. 66, as an input into channel table 6702 in FIG. 67 to identify center frequencies 6703. In this example, pseudorandom numbers can be generated using the same seed and pseudorandom number generation as the transmitter in these different examples. As a result, pseudorandom numbers in the receiver 3617 are the same as those used by the transmitter.

In this example, center frequencies 6703 are used by bandpass filter 6704 to search for the absence or presence of a noise-band signal in the frequency noise-band following sequential pattern of frequency noise-bands 6301. Bandpass filter 6704 is a hardware or software component that passes noise-band signals 6306 within a particular noise-band. In this example, center frequencies 6703 are used to set the center of the noise-band that bandpass filter 6704 passes. As a result, bandpass filter 6704 outputs binary data 6706, which represents digital information 3607.

In this example, the frequency noise-band change or frequency noise-band hopping occurs after a set period of time. In other words, the transmitter changes frequencies after a known period of time such as 1 millisecond (ms). In similar fashion, receiver 3617 can change frequencies using the same known period of time.

The illustration of the dataflows in FIGS. 65-67 have been provided as example implementations of transmitting digital information. These examples are not meant to limit the manner in which other illustrative examples can be implemented. For example, a channel table is shown as being implemented in electric noise generator 3630 and receiver 3617. In other illustrative examples, these channel tables can be located externally to these components and the sequential pattern of frequency noise bands can be inputs to these components. In another illustrative example, other sequences of numbers other than pseudorandom numbers can be used to identify the sequential pattern of frequency noise-bands. For example, a sequence of 3 numbers, 15 numbers, or 24 numbers can be selected without using a pseudorandom number generator.

Figure 68:
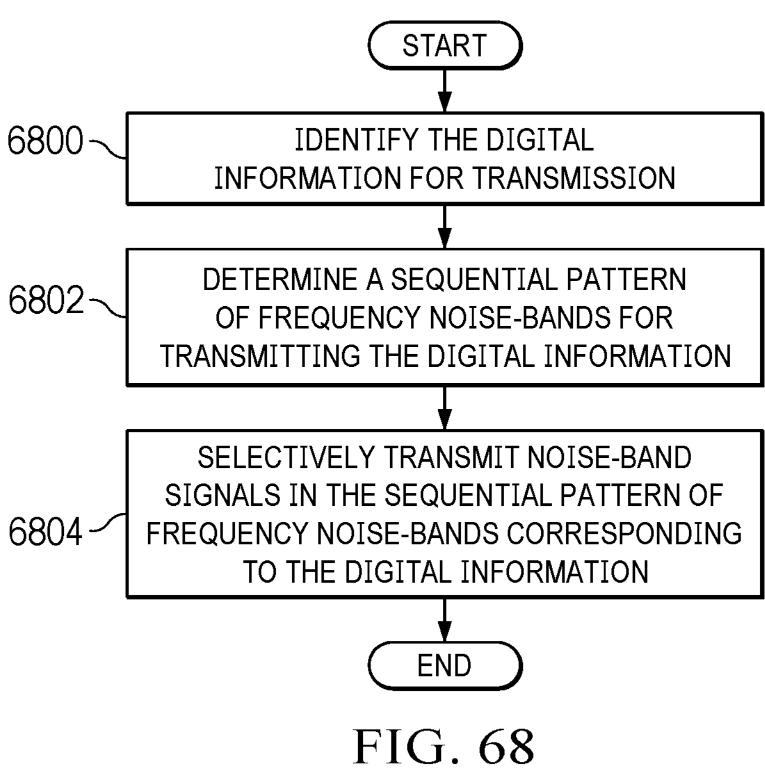
FIG. 68 is an illustration of a flowchart of a process for communicating digital information in accordance with an illustrative embodiment.

Turning now to FIG. 68, an illustration of a flowchart of a process for communicating digital information is depicted in accordance with an illustrative embodiment. The process in FIG. 68 can be implemented in hardware, software, or both. When implemented in software, the process can take the form of program instructions that are run by one of more processor units located in one or more hardware devices in one or more computer systems. For example, the process can be implemented in communications manager 3614 in computer system 3612 in FIG. 63. In this example, the digital information is communicated using digital spread-spectrum noise shift keying 3694 in FIG. 63.

The process identifies the digital information for transmission (operation 6800). The process determines a sequential pattern of frequency noise-bands for transmitting the digital information (operation 6802).

The process selectively transmits noise-band signals in the sequential pattern of frequency noise-bands corresponding to the digital information (operation 6804). The process terminates thereafter.

Figure 69:
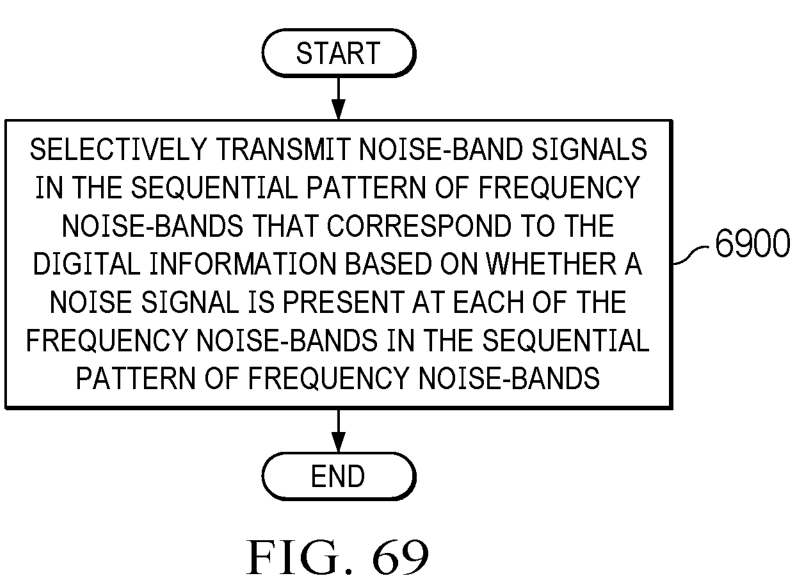
FIG. 69 is an illustration of a flowchart of a process for selectively transmitting noise-band signals in accordance with an illustrative embodiment.

In FIG. 69, an illustration of a flowchart of a process for selectively transmitting noise-band signals is depicted in accordance with an illustrative embodiment. This flowchart is an example of an implementation for operation 6804 in FIG. 68.

The process selectively transmits noise-band signals in the sequential pattern of frequency noise-bands that correspond to the digital information based on whether a noise signal is present at each of the frequency noise-bands in the sequential pattern of frequency noise-bands (operation 6900). The process terminates thereafter.

In this example, a presence of a noise-band signal at a frequency noise-band in the sequential pattern of frequency noise-bands corresponds to a logic 1 and an absence of the noise signal corresponds to a logic 0. In another example, a presence of a noise-band signal at a frequency noise-band in the sequential pattern of frequency noise-bands corresponds to a logic 0 and an absence of the noise-band signal corresponds to a logic 1.

With reference next to FIG. 70, an illustration of a flowchart of a process for selectively transmitting radio frequency noise-band signals is depicted in accordance with an illustrative embodiment. This flowchart is an example of an implementation for operation 6804 in FIG. 68. This process can be implemented using laser generation system 3626 in FIG. 63.

The process controls an emission of the set of one or more laser beams from a laser generation system to control optical breakdowns that selectively generate the radio frequency noise-band signals in the sequential pattern of frequency noise-bands, wherein a presence or an absence of a noise signal at each frequency noise-band in the sequential pattern of frequency noise-bands corresponds to the digital information (operation 7000). The process terminates thereafter.

Turning to FIG. 71, an illustration of a flowchart of a process for controlling emission of a set of one or more laser beams is depicted in accordance with an illustrative embodiment. The process in this figure is an example of an implementation for operation 7000 in FIG. 70.

The process controls the emission of the set of one or more laser beams from the laser generation system to control the optical breakdowns that selectively generate the radio frequency noise-band signals by varying a frequency location of a center point of a frequency noise-band in selected frequency noise-bands in the sequential pattern of frequency noise-bands which correspond to the digital information (operation 7100). The process terminates thereafter.

In this example, the process controls optical breakdowns to generate radio frequency noise-bands that follows the sequential pattern of frequency noise-bands through varying the frequency location of the center point of the frequency noise-band. In these examples, the frequency location of the center point can be varied by changing characteristics of the set of one or more laser beams. These characteristics include, for example, polarization and energy for laser beams in the set of one or more laser beams. In this example, the optical breakdowns are generated for frequency locations of center points where the radio frequency noise-band signal is to be generated. Optical breakdowns are not generated for frequency locations of center points where frequency noise-band signals are not to be generated.

Figure 72:
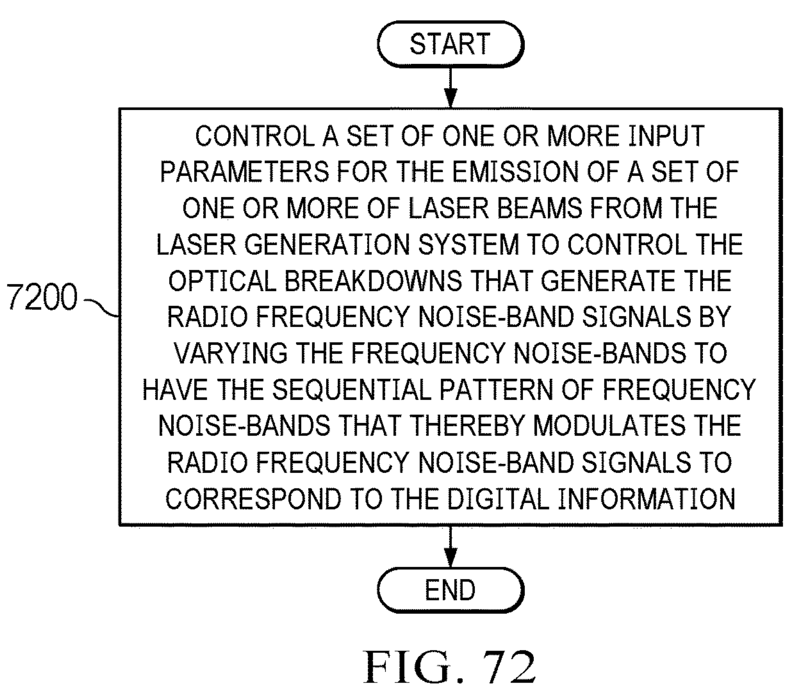
FIG. 72 is an illustration of a flowchart of a process for controlling emission a set of one or more laser beams in accordance with an illustrative embodiment.

With reference next to FIG. 72, an illustration of a flowchart of a process for controlling emission a set of one or more laser beams is depicted in accordance with an illustrative embodiment. The process in this figure is an example of an implementation for operation 7000 in FIG. 70.

The process controls a set of one or more input parameters for the emission of a set of one or more of laser beams from the laser generation system to control the optical breakdowns that generate the radio frequency noise-band signals by varying the frequency noise-bands to have the sequential pattern of frequency noise-bands that thereby modulates the radio frequency noise-band signals to correspond to the digital information (operation 7200). The process terminates thereafter.

In this example, the selection of the input parameters is made to control characteristics of the set of one or more laser beams. This manner, the use of input parameters to the laser generation system can be used to selectively generate radio frequency noise-band signals in the sequential pattern of radio frequency noise-bands that result from selectively generating optical breakdowns. In other words, the input parameters can be used to select which radio frequency noise-bands contain radio frequency noise-band signals.

Figure 73:
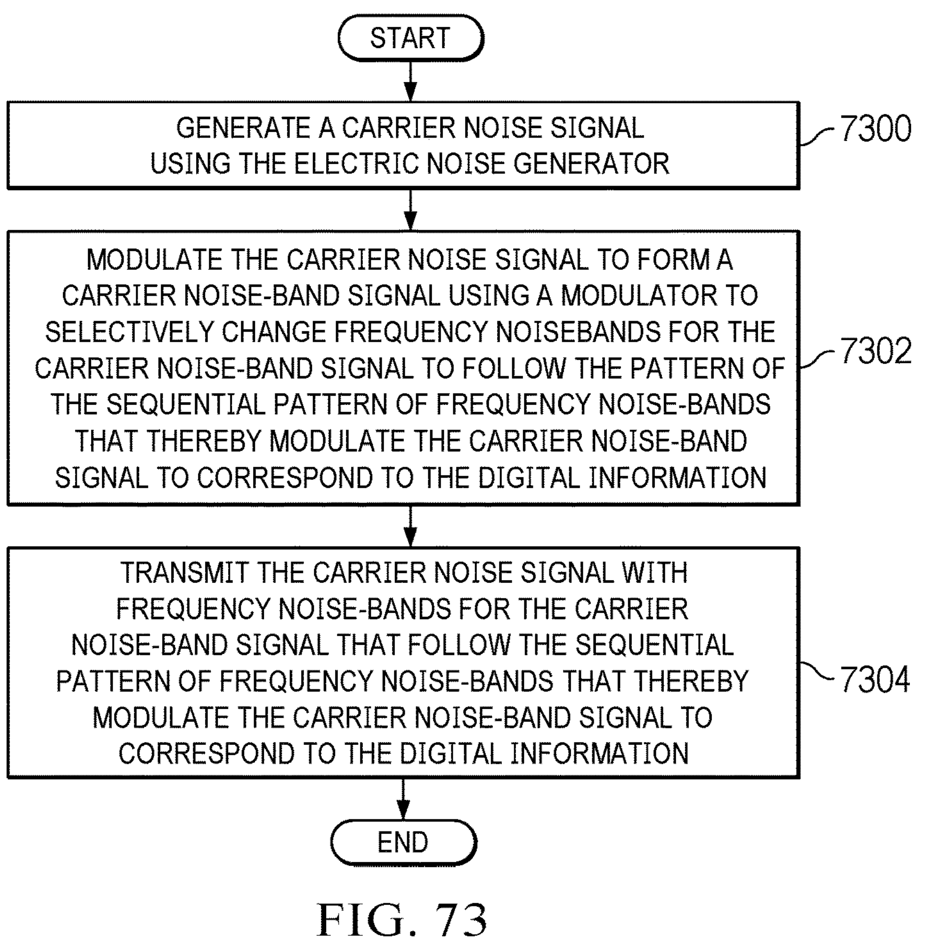
FIG. 73 is an illustration of a flowchart of a process for transmitting noise-band signals in accordance with an illustrative embodiment.

Turning to FIG. 73, an illustration of a flowchart of a process for transmitting noise-band signals is depicted in accordance with an illustrative embodiment. The process in this flowchart is an example of an implementation for operation 6804 in FIG. 68. In this example, this process can be implemented using noise transmitter 3628 in FIG. 63.

The process generates a carrier noise signal using the electric noise generator (operation 7300). The process modulates the carrier noise signal to form a carrier noise-band signal using a modulator to selectively change frequency noise-bands for the carrier noise-band signal to follow the pattern of the sequential pattern of frequency noise-bands that thereby modulate the carrier noise-band signal to correspond to the digital information (operation 7302).

The process transmits the carrier noise signal with frequency noise-bands for the carrier noise-band signal that follow the sequential pattern of frequency noise-bands that thereby modulate the carrier noise-band signal to correspond to the digital information (operation 7304). The process terminates thereafter.

Figure 74:
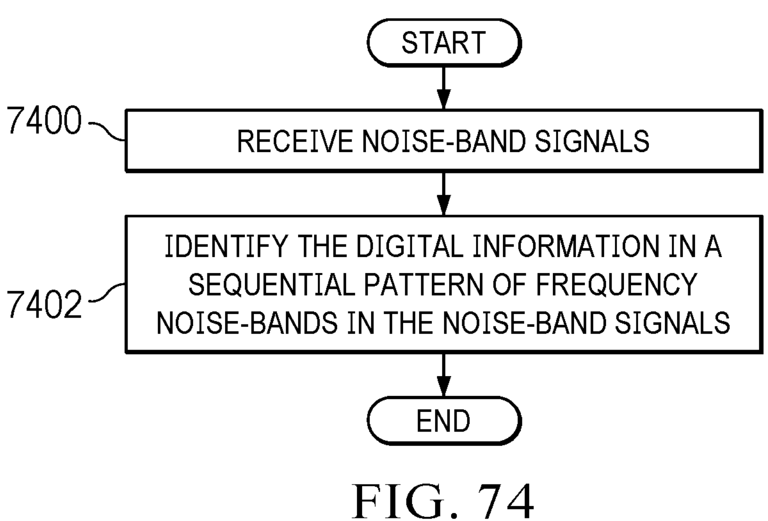
FIG. 74 is an illustration of a flowchart for communicating digital information in accordance with an illustrative embodiment.

Next in FIG. 74, an illustration of a flowchart of a process for communicating digital information is depicted in accordance with an illustrative embodiment. The process depicted in this figure can be implemented in hardware, software, or both. When implemented in software, the process can take the form of program instructions that are run by one of more processor units located in one or more hardware devices in one or more computer systems. For example, the process can be implemented in receiver 3617 in computer system 3612 in FIG. 63. In this example, the digital information is communicated using digital spread-spectrum noise shift keying 3694 in FIG. 63.

The process begins by receiving noise-band signals (operation 7400). The process identifies the digital information in a sequential pattern of frequency noise-bands in the noise-band signals (operation 7402). The process terminates thereafter.

Figure 75:
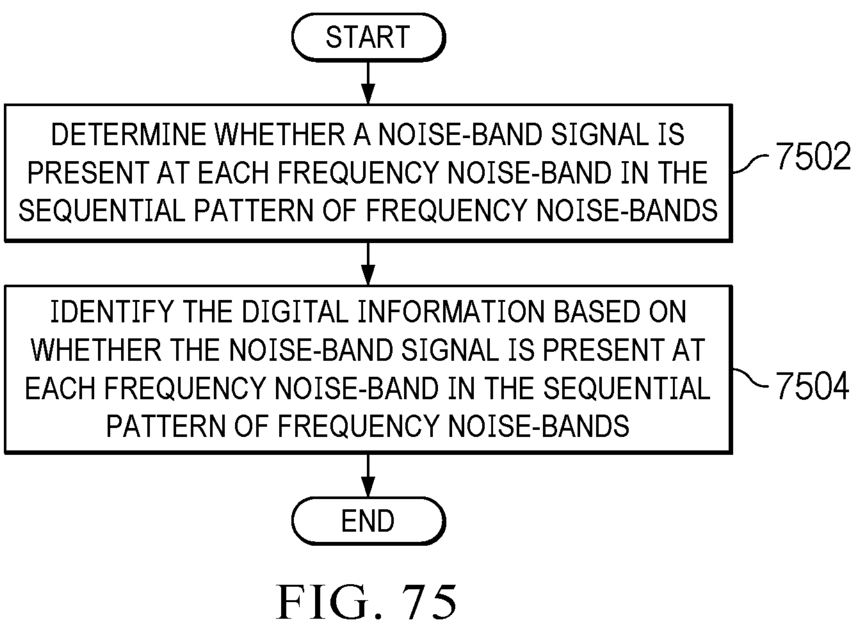
FIG. 75 is an illustration of a flowchart of a process for identifying digital information in accordance with an illustrative embodiment.

Turning now to FIG. 75, an illustration of a flowchart of a process for identifying digital information is depicted in accordance with an illustrative embodiment. The process in FIG. 75 is an example of an implementation for operation 7402 in FIG. 74.

The process determines whether a noise-band signal is present at each frequency noise-band in the sequential pattern of frequency noise-bands (operation 7500). The process identifies the digital information based on whether the noise-band signal is present at each frequency noise-band in the sequential pattern of frequency noise-bands (operation 7502). The process terminates thereafter.

Some features of the illustrative examples for modulating digital information 3607 using digital spread-spectrum noise shift keying 3694 in communications system 3602 are described in the following clauses. These clauses are examples of features and are not intended to limit other illustrative examples.

Clause 1. A communications system comprising:

a computer system; and a communications manager in the computer system, wherein the communications manager is configured to:

identify digital information for transmission;

determine a sequential pattern of frequency noise-bands for transmitting the digital information; and selectively transmit noise-band signals in the sequential pattern of frequency noise-bands corresponding to the digital information.

Clause 2. The communications system of clause 1, wherein in selectively transmitting the noise-band signals in the sequential pattern of frequency noise-bands, the communications manager is configured to:

selectively transmit noise-band signals in the sequential pattern of frequency noise-bands that correspond to the digital information based on whether a noise signal is present at each of the frequency noise-bands in the sequential pattern of frequency noise-bands.

Clause 3. The communications system of clause 2, wherein a presence of a noise signal at a frequency noise-band in the sequential pattern of frequency noise-bands corresponds to a logic 1 and an absence of the noise signal corresponds to a logic 0.

Clause 4. The communications system of clause 2, wherein a presence of a noise signal at a frequency noise-band in the sequential pattern of frequency noise-bands corresponds to a logic 0 and an absence of the noise-band signal corresponds to a logic 1.

Clause 5. The communications system of clause 1, wherein the noise-band signals are radio frequency noise-band signals and further comprising:

a laser generation system configured to emit a set of one or more laser beams, wherein in transmitting the noise-band signals the communications manager is configured to:

control an emission of the set of one or more laser beams from the laser generation system to control optical breakdowns that selectively generate the radio frequency noise-band signals in the sequential pattern of frequency noise-bands, wherein a presence or an absence of a radio frequency noise signal at each frequency noise-band in the sequential pattern of frequency noise-bands corresponds to the digital information.

Clause 6. The communications system of clause 5, wherein in controlling the emission of the set of one or more laser beams, the communications manager is configured to:

control the emission of the set of one or more laser beams from the laser generation system to control the optical breakdowns that selectively generate the radio frequency noise-band signals by varying a frequency location of a center point of a frequency noise-band in selected frequency noise-bands in the sequential pattern of frequency noise-bands which correspond to the digital information.

Clause 7. The communications system of clause 5, wherein in controlling the emission of the set of one or more laser beams, the communications manager is configured to:

control the emission of the set of one or more laser beams from the laser generation system to control the optical breakdowns that selectively generate the radio frequency noise-band signals by varying a width of selected frequency noise-bands to have the sequential pattern of frequency noise-bands that thereby modulates the radio frequency noise-band signals to correspond to the digital information.

Clause 8. The communications system of clause 5, wherein in controlling the emission of the laser beams, the communications manager is configured to:

control a set of one or more input parameters for the emission of a set of one or more of laser beams from the laser generation system to control the optical breakdowns that generate the radio frequency noise-band signals by varying the frequency noise-bands to have the sequential pattern of frequency noise-bands that thereby modulates the radio frequency noise-band signals to correspond to the digital information.

Clause 9. The communications system of clause 1 further comprising:

an electric noise generator configured to generate a carrier noise signal;

a modulator; and a transmitter, wherein in transmitting the noise-band signals, the communications manager is configured to:

generate the carrier noise signal using the electric noise generator;

modulate the carrier noise signal to form a carrier noise-band signal using the modulator to selectively change frequency noise-bands for the carrier noise signal to follow the pattern of the sequential pattern of frequency noise-bands that thereby modulate the carrier noise signal to correspond to the digital information; and transmit the carrier noise-band signal with frequency noise-bands for the carrier noise-band signal that follow the pattern of the sequential pattern of frequency noise-bands that thereby modulate the carrier noise signal to correspond to the digital information using the transmitter.

Clause 10. A communications system comprising:

a receiver configured to:

receive noise-band signals; and identify digital information in a sequential pattern of frequency noise-bands in the noise-band signals.

Clause 11. The communications system of clause 10, wherein in identifying the digital information, the receiver is configured to:

determine whether a noise-band signal is present at each frequency noise-band in the sequential pattern of frequency noise-bands; and identify the digital information based on whether the noise-band signal is present at each frequency noise-band in the sequential pattern of frequency noise-bands.

Clause 12. A method for communicating digital information, the method comprising:

identifying the digital information for transmission;

determining a sequential pattern of frequency noise-bands for transmitting the digital information; and selectively transmitting noise-band signals in the sequential pattern of frequency noise-bands corresponding to the digital information.

Clause 13. The method of clause 12, wherein said selectively transmitting the noise-band signals comprises:

selectively transmitting noise-band signals in the sequential pattern of frequency noise-bands that correspond to the digital information based on whether a noise signal is present at each of the frequency noise-bands in the sequential pattern of frequency noise-bands.

Clause 14. The method of clause 13, wherein a presence of a noise-band signal at a frequency noise-band in the sequential pattern of frequency noise-bands corresponds to a logic 1 and an absence of the noise signal corresponds to a logic 0.

Clause 15. The method of clause 13, wherein a presence of a noise-band signal at a frequency noise-band in the sequential pattern of frequency noise-bands corresponds to a logic 0 and an absence of the noise-band signal corresponds to a logic 1.

Clause 16. The method of clause 12, wherein the noise-band signals are radio frequency noise-band signals and, wherein said selectively transmitting noise-band signals comprises:

controlling an emission of the set of one or more laser beams from a laser generation system to control optical breakdowns that selectively generate the radio frequency noise-band signals in the sequential pattern of frequency noise-bands, wherein a presence or an absence of a noise signal at each frequency noise-band in the sequential pattern of frequency noise-bands corresponds to the digital information.

Clause 17. The method of clause 16, wherein said controlling the emission of the set of one or more laser beams comprises:

controlling the emission of the set of one or more laser beams from the laser generation system to control the optical breakdowns that selectively generate the radio frequency noise-band signals by varying a frequency location of a center point of a frequency noise-band in selected frequency noise-bands in the sequential pattern of frequency noise-bands which correspond to the digital information.

Clause 18. The method of clause 16, wherein said controlling the emission of the set of one or more laser beams comprises:

controlling a set of one or more input parameters for the emission of a set of one or more of laser beams from the laser generation system to control the optical breakdowns that generate the radio frequency noise-band signals by varying the frequency noise-bands to have the sequential pattern of frequency noise-bands that thereby modulates the radio frequency noise-band signals to correspond to the digital information.

Clause 19. The method of clause 12, wherein said transmitting the noise-band signals comprises:

generating a carrier noise signal using an electric noise generator;

modulating the carrier noise signal to form a carrier noise-band signal using a modulator to selectively change frequency noise-bands for the carrier noise-band signal to follow the pattern of the sequential pattern of frequency noise-bands that thereby modulate the carrier noise-band signal to correspond to the digital information; and transmitting the carrier noise-band signal with frequency noise-bands for the carrier noise-band signal that follow the sequential pattern of frequency noise-bands that thereby modulate the carrier noise-band signal to correspond to the digital information.

Clause 20. A method for communicating digital information, the method comprising:

receiving noise-band signals; and identifying the digital information in a sequential pattern of frequency noise-bands in the noise-band signals.

Clause 21. The method of clause 20, wherein said identifying the digital information comprises:

determining whether a noise-band signal is present at each frequency noise-band in the sequential pattern of frequency noise-bands; and identifying the digital information based on whether the noise-band signal is present at each frequency noise-band in the sequential pattern of frequency noise-bands.

Figure 76:
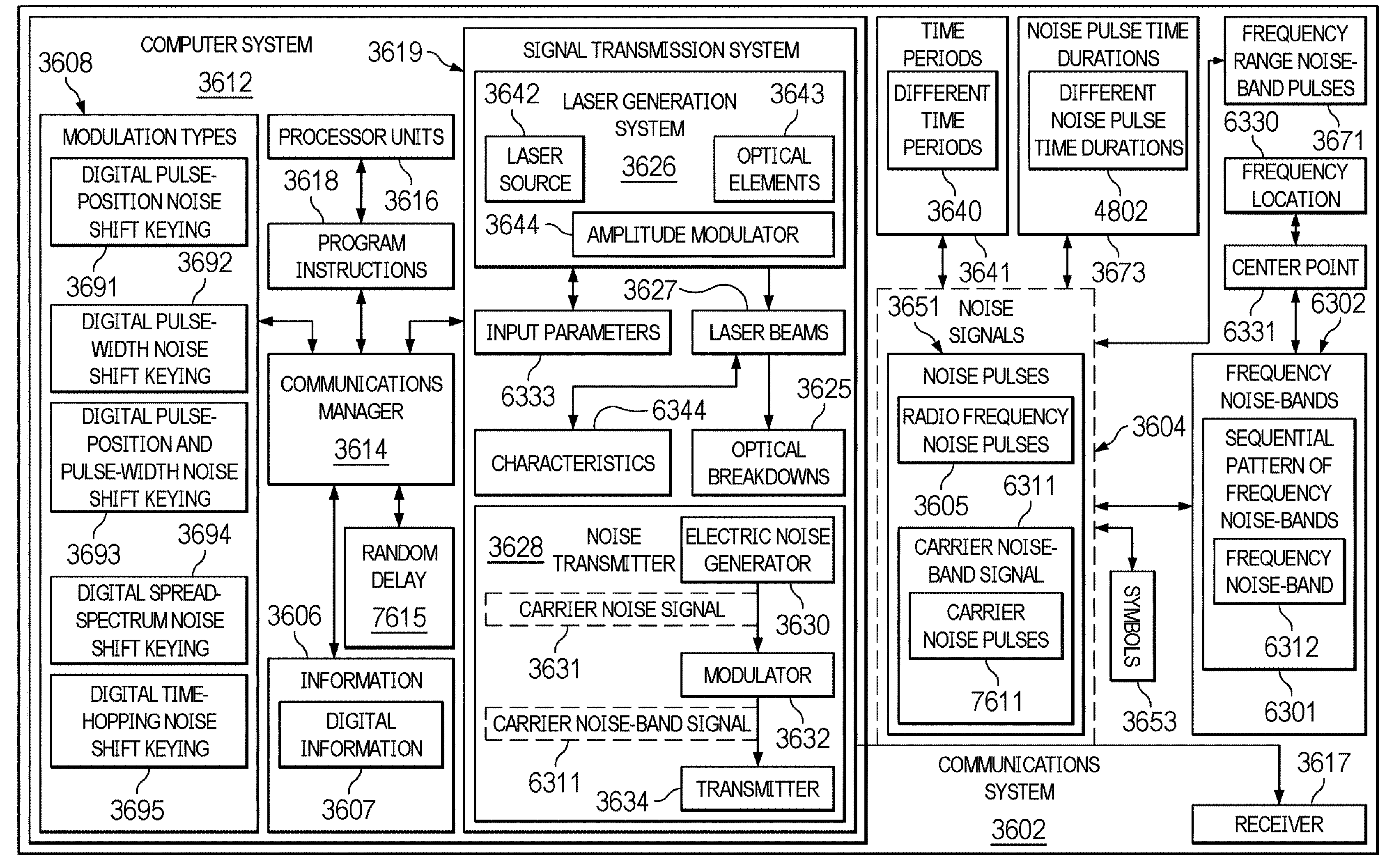
FIG. 76 is an illustration of a block diagram of a communication system in accordance with an illustrative embodiment.

With reference next to FIG. 76, an illustration of a block diagram of a communication system is depicted in accordance with an illustrative embodiment. In this illustrative example, communications system 3602 operates to modulate noise signals 3604 to correspond to information 3606. Noise signals 3604 are selected from at least one of electromagnetic frequency noise signals, radio frequency noise signals, microwave frequency noise signals, audio frequency noise signals, ultrasonic frequency noise signals, ultra-low frequency noise signals, very low frequency noise signals, underwater frequency noise signals, or optical frequency noise signals including at least one of visible or non-visible light.

In this example, digital time-hopping noise shift keying 3695 or digital frequency and time-hopping noise shift keying in modulation types 3608 is used to transmit noise signals 3604. This type of modulation involves transmitting noise signals 3604 that correspond to digital information 3607. In this example, noise signals 3604 are transmitted in frequency noise-bands 6302 in a manner that the transmission corresponds to digital information 3607. In this example, noise signals 3604 are transmitted in frequency noise-bands 6302 in which noise signals 3604 are modulated to correspond to symbols 3653 in this example.

Communications manager 3614 identifies digital information 3607 for transmission. Communications manager 3614 determines a sequential pattern of frequency noise-bands 6301 in frequency noise-bands 6302 for transmitting digital information 3607. Sequential pattern of frequency noise-bands 6301 are a selection of frequency noise-bands 6302 for use in transmitting noise signals 3604.

In this example, communications manager 3614 uses signal transmission system 3619 to transmit noise signals 3604 in the form of noise pulses 3651. Signal transmission system 3619 transmits noise pulses 3651 in a sequential pattern of frequency noise-bands 6301 that correspond to symbols 3653 representing digital information 3607. In this example, one or more noise pulses are transmitted in each frequency noise-band in a sequential pattern of frequency noise-bands 6301. Also, each noise pulse in noise pulses 3651 corresponds to a symbol in symbols 3653.

In one illustrative example, noise pulses 3651 have time periods 3641 and these time periods can be different time periods 3640 between noise pulses 3651 that correspond to symbols 3653 representing digital information 3607. In another example, noise pulses 3651 have different noise pulse time durations 4802 that correspond to symbols 3653 representing digital information 3607. In yet another illustrative example, both noise pulses 3651 have different time periods 3640 between noise pulses 3651 and different noise pulse time durations 4802 that correspond to symbols 3653 representing digital information 3607.

In transmitting noise pulses 3651, communications manager 3614 transmits noise pulses 3651 in sequential pattern of frequency noise-bands 6301 that correspond to symbols 3653 representing digital information 3607 with random delay 7615 before transmitting noise pulses 3651 in another noise-band in sequential pattern of frequency noise-bands 6301. In this example, noise pulses 3651 have at least one of different time periods 3640 between noise pulses 3651 or different noise pulse time durations 4802 that correspond to symbols 3653 representing digital information 3607.

In this example, receiver 3617 waits at each frequency noise-band in sequential pattern of frequency noise-bands 6301 to detect one or more noise pulses 3651. With this type of monitoring, opportunities for the desired interception of noise signals 3604 containing digital information 3607 can be reduced.

In another illustrative example, communications manager 3614 controls the laser generation system 3626 to transmit noise pulses 3651 in the form of radio frequency noise pulses 3605. With this example, communications manager 3614 controls an emission of the set of one or more laser beams 3627 from laser generation system 3626 to control optical breakdowns 3625 that generate radio frequency noise pulses 3605 in a sequential pattern of frequency noise-bands 6301 that correspond to symbols 3653 representing digital information 3607. In this example, radio frequency noise pulses 3605 have at least one of different time periods 3640 between radio frequency noise pulses 3605 or different noise pulse time durations 4802 that correspond to symbols 3653 representing digital information 3607.

In controlling the emission of a set of one or more laser beams 3627, communications manager 3614 can control the emission of the set of one or more laser beams 3627 from laser generation system 3626 to control optical breakdowns 3625 that generate radio frequency noise pulses 3605 by varying frequency location 6330 of center point 6331 of frequency noise-band 6312 in frequency noise-bands 6302 correlating to sequential pattern of frequency noise-bands 6301 which correspond to digital information 3607. In this example, radio frequency noise pulses 3605 have at least one of different time periods 3640 between radio frequency noise pulses 3605 or different noise pulse time durations 4802 that correspond to symbols 3653 representing digital information 3607.

The change in frequency location 6330 of center point 6331 of frequency noise-band 6312 can be performed to set frequency noise-band 6312 in a sequential pattern of frequency noise-bands 6301. In other words, frequency location 6330 of center point 6331 is a center frequency that is the center frequency within frequency noise-band 6312.

For example, communications manager 3614 can control a set of one or more input parameters 6333 to laser generation system 3626 for the emission of a set of one or more of laser beams 3627 from laser generation system 3626 to control optical breakdowns 3625 that generate radio frequency noise pulses 3605 in sequential pattern of frequency noise-bands 6301.

In this example, these input parameters can change frequency location 6330 for center point 6331 in frequency noise-bands 6302. In this example, frequency location 6330 for center point 6331 of frequency noise-bands 6302 can be changed by changing a set of characteristics 6344 for the set of one or more laser beams 3627. The set of characteristics 6344 can be at least one of polarization or an energy level, or other characteristics for the set of one or more laser beams 3627 characteristics. In this example, the set of characteristics 6344 can be changed in a manner that creates or controls optical breakdowns 3625 that results in noise-band signals 6306 having desired frequency noise-bands in sequential pattern of frequency noise-bands 6301.

In this example, input parameters 6333 can include at least one of a mirror orientation, a deformable mirror position, a lens position, lens, a deformable lens position or some other element that can be positioned in a manner that changes an optical path length (OPL) for the set of one or more laser beams 3627. In this example, the path length change can be at least one of the optical path length or the physical path length. Another input parameter that can be changed in this example is the index of refraction (IoR). The optical path length is inversely proportional to the index of refraction.

In another illustrative example, communications manager 3614 can use noise transmitter 3628 in signal transmission system 3619 to generate noise pulses 3651 in sequential pattern of frequency noise-bands 6301. In this example, communications manager 3614 generates carrier noise signal 3631 using electric noise generator 3630. Carrier noise signal 3631 can be generated to have different frequency noise-bands in a sequential pattern of frequency noise-bands 6301. In other words, carrier noise signal 3631 has frequency noise-bands 6302 following sequential pattern of frequency noise-bands 6301.

Communications manager 3614 modulates the carrier noise signal 3631 to form carrier noise-band signal 6311 using modulator 3632 to change frequency noise-bands 6302 for carrier noise-band signal 6311 to follow sequential pattern of frequency noise-bands 6301 and to generate carrier noise pulses 7611 in carrier noise-band signal 6311 in frequency noise-bands 6302 that have at least one of different time periods 3640 between carrier noise pulses 7611 or different noise pulse time durations 4802 for carrier noise pulses 7611 that correspond to symbols 3653 representing digital information 3607.

In this example, communications manager 3614 transmits carrier noise-band signal 6311 with carrier noise pulses 7611 in frequency noise-bands 6302 that follow a sequential pattern of frequency noise-bands 6301 using transmitter 3634. In this example, carrier noise pulses 7611 have at least one of different time periods 3640 between the carrier noise pulses 7611 or different noise pulse time durations 4802 for carrier noise pulses 7611 that correspond to symbols 3653 representing digital information 3607.

In this illustrative example, receiver 3617 receives noise signals 3604 containing noise pulses 3651 and sequential pattern of frequency noise-bands 6301. Receiver 3617 identifies symbols 3653 representing digital information 3607 by using noise pulses 3651 in sequential pattern of frequency noise-bands 6301.

In one illustrative example, receiver 3617 waits at each frequency noise-band in sequential pattern of frequency noise-bands 6301 to detect noise pulses 3651. In some examples, two or more noise pulses are expected at each frequency noise-band in sequential pattern of frequency noise-bands 6301. In other examples, only one noise pulse is expected at each frequency noise-band in sequential pattern of frequency noise-bands 6301.

For example, receiver 3617 can identify symbols 3653 from different time periods 3640 between noise pulses 3651 in each of sequential pattern of frequency noise-bands 6301. In this example, noise pulses 3651 in a frequency noise-band in a sequential pattern of frequency noise-bands 6301 can include one or more symbols.

In another example, receiver 3617 identifies symbols 3653 from different noise pulse time durations 4802 of noise pulses 3651 in each of sequential pattern of frequency noise-bands 6301. In still another illustrative example, receiver 3617 identifies symbols 3653 from different time periods 3640 between noise pulses 3651 in each of sequential pattern of frequency noise-bands 6301 and from different noise pulse time durations 4802 of noise pulses 3651 in each of sequential pattern of frequency noise-bands 6301.

In one illustrative example, receiver 3617 identifies frequency noise-band 6312 in sequential pattern of frequency noise-bands 6301 in which noise pulses 3651 are expected to be received. Receiver 3617 monitors a frequency noise-band for noise pulses 3651. Further in this example, receiver 3617 determines symbols 3653 in frequency noise-band 6312 in response to detecting noise pulses 3651 in frequency noise-band 6312. In other words, receiver 3617 waits at frequency noise-band 6312 in the next frequency noise-band of sequential pattern of frequency noise-bands 6301 to detect noise pulses 3651.

In this example, receiver 3617 waits at frequency noise-band 6312 for noises pulses 3651, which takes into account the random time between transmissions of noise pulses 3651 that can be caused by random delay 7615 and transmitting noise pulses 3651.

Figure 77:
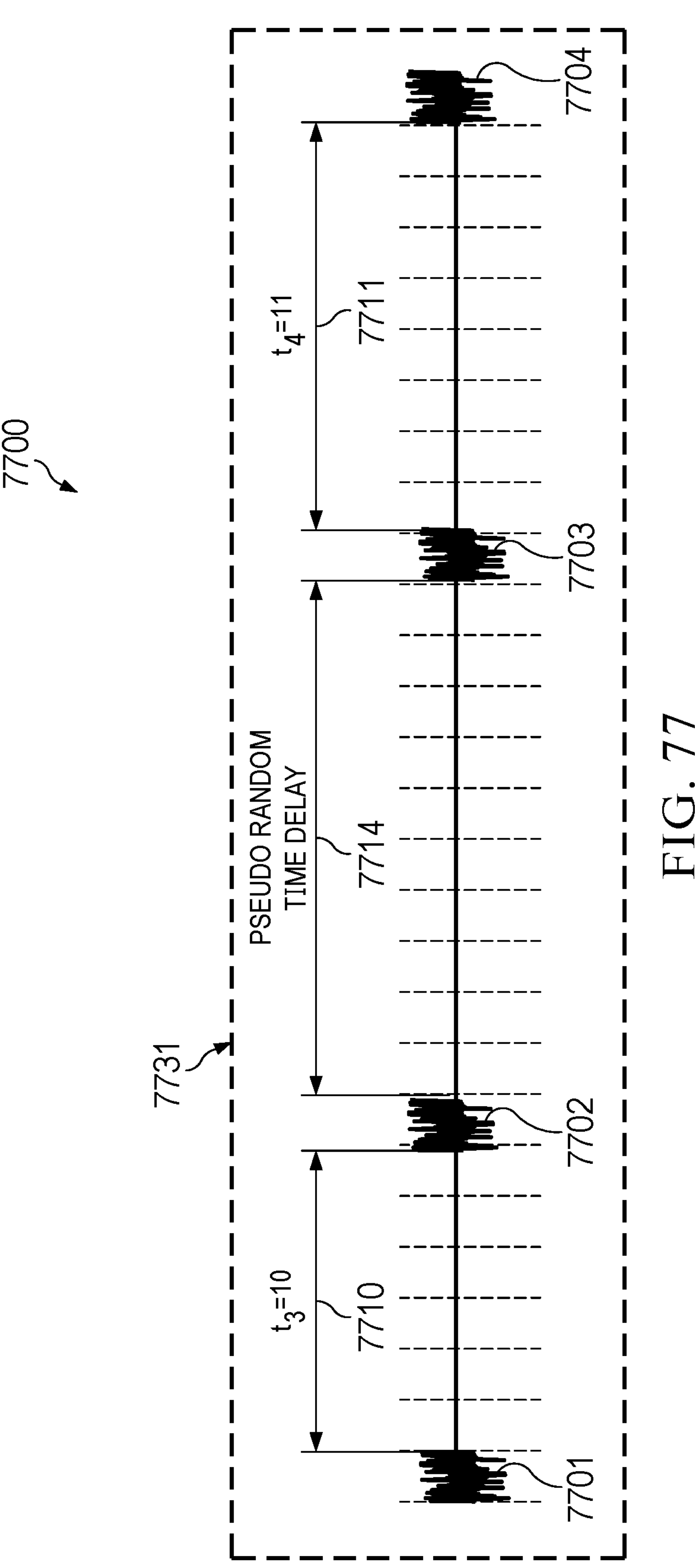
FIG. 77 is an illustration of noise pulses generated using digital time-hopping noise shift keying in accordance with an illustrative embodiment.

Turning now to FIG. 77, an illustration of noise pulses generated using digital time-hopping noise shift keying is depicted in accordance with an illustrative embodiment. In this example, noise pulses 7700 are generated by communications system 3602 using digital time-hopping noise shift keying 3695. In this example, pulses 7700 are transmitted in frequency noise-band 7731 in a sequential pattern of frequency noise-bands. The symbols correspond to time periods between noise pulses 7700. In this example, the symbols are based on time periods between pairs of noise pulses 7700.

As depicted in this example, noise pulses 7700 include noise pulse 7701, noise pulse 7702, noise pulse 7703, and noise pulse 7704. Noise pulse 7701 and noise pulse 7702 are a pair of noise pulses with time period 7710 between these noise pulses. Another pair of noise pulses comprises noise pulse 7703 and noise pulse 7704 with time period 7711 between these noise pulses.

In this example, time period 7710 has a time duration of t3, which corresponds to the symbol 10. Time period 7711 has a time duration of t4. In this example, t4 corresponds to the symbol 11.

In another illustrative example, pseudo random time delay 7714 is present between the pairs of noise pulses. This pseudo random time delay is known by both the sender and receiver. This pseudo random time delay may be used for error correction. For example, if pseudo random time delay 7714 is not present and a different delay is present, an error is considered to be present in the transmission of symbols using noise pulses 7700.

Figure 78:
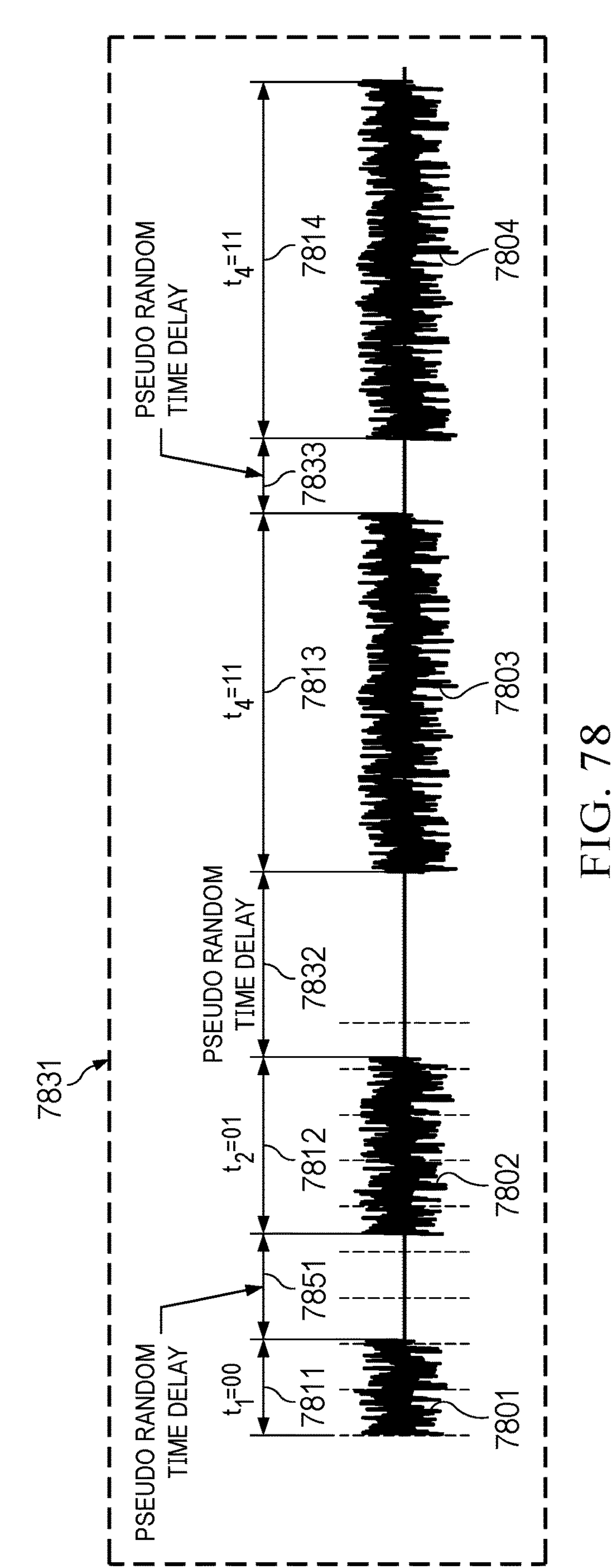
FIG. 78 is an illustration of noise pulses generated using digital time-hopping noise shift keying in accordance with an illustrative embodiment.

With reference to FIG. 78, an illustration of noise pulses generated using digital time-hopping noise shift keying is depicted in accordance with an illustrative embodiment. In this example, noise pulses 7800 are generated by communications system 3602 using digital time-hopping noise shift keying 3695. In this example, pulses 7800 are transmitted in frequency noise-band 7831 in a sequential pattern of frequency noise-bands. The symbols correspond to pulse time durations for noise pulses 7800.

As depicted in this example, noise pulses 7800 include noise pulse 7801, noise pulse 7802, noise pulse 7803, and noise pulse 7804. In this example, noise pulse 7801 has pulse time duration 7811. This pulse time durations is t1, which corresponds to symbol 00. Noise pulse 7802 has pulse time duration 7812 which is t2. In this example, t2 corresponds to symbol 01. Noise pulse 7803 has pulse time duration 7813. This pulse time duration is t4, which corresponds to symbol 11. Next, noise pulse 7804 has pulse time duration 7814 which is t4. This value for pulse time duration 7814 corresponds to symbol 11.

Additionally in this example, pseudo random time delays are present between each of noise pulses 7800. As depicted, pseudo random time delay 7851 is present between noise pulse 7801 and noise pulse 7802; pseudo random time delay 7832 is present between noise pulse 7802 and noise pulse 7803; and pseudo random time delay 7833 is present between noise pulse 7803 and noise pulse 7804. The pseudo random time delays can be different for each time delay. Further, the pseudo random time delays are known by both the transmitter and receiver of noise pulses 7800. These pseudo random time delays can be used for detecting errors and used to perform error correction.

Figure 79:
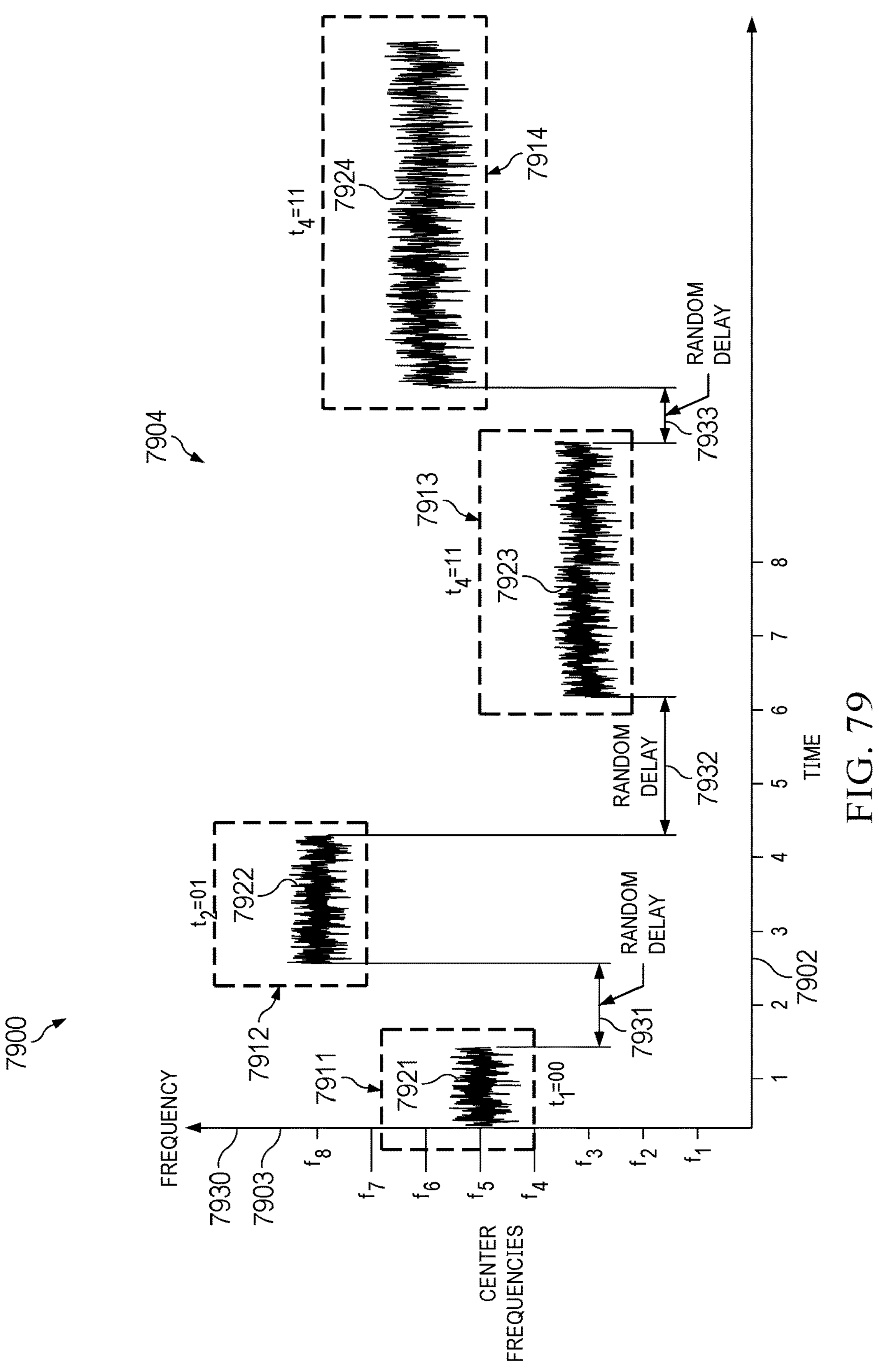
FIG. 79 is an illustration of noise pulses in a sequential pattern of frequency noise-bands in accordance with an illustrative embodiment.

Turning next to FIG. 79, an illustration of noise pulses in a sequential pattern of frequency noise-bands is depicted in accordance with an illustrative embodiment. In this example, noise pulses are generated by communications system 3602 using digital time-hopping noise shift keying 3695 or digital frequency and time-hopping noise shift keying. In graph 7930, noise pulses 7900 are transmitted over multiple frequency range noise-bands that follow a sequential pattern of frequency noise-bands. In this example the symbols correspond to different time pulse durations.

In this illustrative example, x-axis 7902 in the graph 7930 represents time. Y-axis 7903 represents center frequencies for frequency noise-bands in a sequential pattern of frequency noise-bands 7904. In this example, the sequential pattern of frequency noise-bands 7904 comprise frequency noise-band signal 7911, frequency noise-band signal 7912, frequency noise-band signal 7913, and frequency noise-band signal 7914. In this example, frequency noise-band signal 7911 has a center frequency of f5, frequency noise-band signal 7912 has a center frequency of f8, frequency noise-band signal 7913 has a center frequency of f3, and frequency noise-band signal 7914 has a center frequency of f6.

As depicted, noise pulse 7921 as frequency noise-band signal 7911 with center point f5 has a time pulse duration of t1, which corresponds to symbol 00. Noise pulse 7922 as frequency noise-band signal 7912 has a time pulse duration of t2, which corresponds to symbol 01. Noise pulse 7923 as frequency noise-band signal 7913 has a time pulse duration of t4, which corresponds to symbol 11. Noise pulse 7924 as frequency noise-band signal 7914 has a time pulse duration of t4, which corresponds to symbol 11. As a result, the digital information transmitted using noise pulses 7900 in the sequential pattern of frequency noise-bands 7904 is 00011111.

Further, in this example, random time delays, random delay 7931, random delay 7932, and random delay 7933 are present. These random delays are present at the end of a last pulse in the frequency noise-bands, except for frequency noise-band signal 7914. A random time delay is not used for frequency noise-band signal 7914 because this frequency noise-band signal is the last frequency noise-band signal in the sequential pattern of frequency noise-bands 7904.

In this example, the random delay does not need to be known to the receiver. The receiver waits and monitors the sequential pattern of frequency noise-bands and listens at the next frequency noise-band for a noise pulse. Once that noise pulse is received, the receiver measures the duration of the received noise pulse and captures the symbol. Then the receiver tunes to the next frequency noise-band in the sequential pattern of frequency noise-bands. The receiver waits and monitors this next frequency noise-band until a noise pulse is received. The receiver measures the duration of the received noise pulse and captures the symbol. Then the receiver tunes to the next frequency noise-band in the sequential pattern of frequency noise-bands. In this manner, the receiver does not need to know the random delay before the next pulse.

Figure 80:
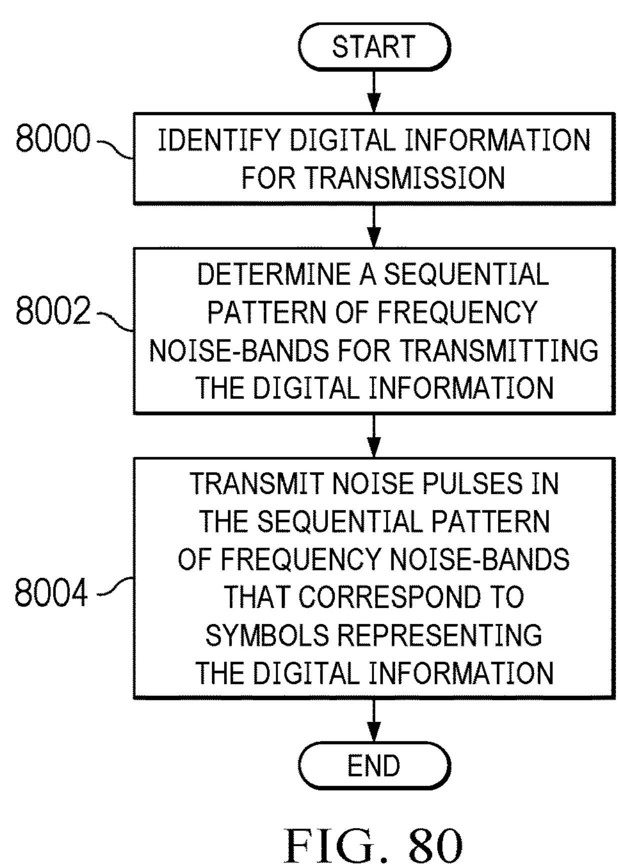
FIG. 80 is an illustration of a flowchart of a process for communicating digital information in accordance with an illustrative embodiment.

Turning now to FIG. 80, an illustration of a flowchart of a process for communicating digital information is depicted in accordance with an illustrative embodiment. The process in FIG. 80 can be implemented in hardware, software, or both. When implemented in software, the process can take the form of program instructions that are run by one of more processor units located in one or more hardware devices in one or more computer systems. For example, the process can be implemented in communications manager 3614 in computer system 3612 in FIG. 76. In this example, the digital information is communicated using digital time-hopping noise shift keying 3695 in FIG. 76.

The process begins by identifying digital information for transmission (operation 8000). The process determines a sequential pattern of frequency noise-bands for transmitting the digital information (operation 8002).

The process transmits noise pulses in the sequential pattern of frequency noise-bands that correspond to symbols representing the digital information (operation 8004). The process terminates thereafter.

In one illustrative example, the noise pulses have different time periods between the noise pulses that correspond to the symbols representing the digital information. In another illustrative example, the noise pulses have different pulse time durations that correspond to the symbols representing the digital information. In yet another illustrative example, the noise pulses have different time periods between the noise pulses and different pulse time durations that correspond to the symbols representing the digital information.

Figure 81:
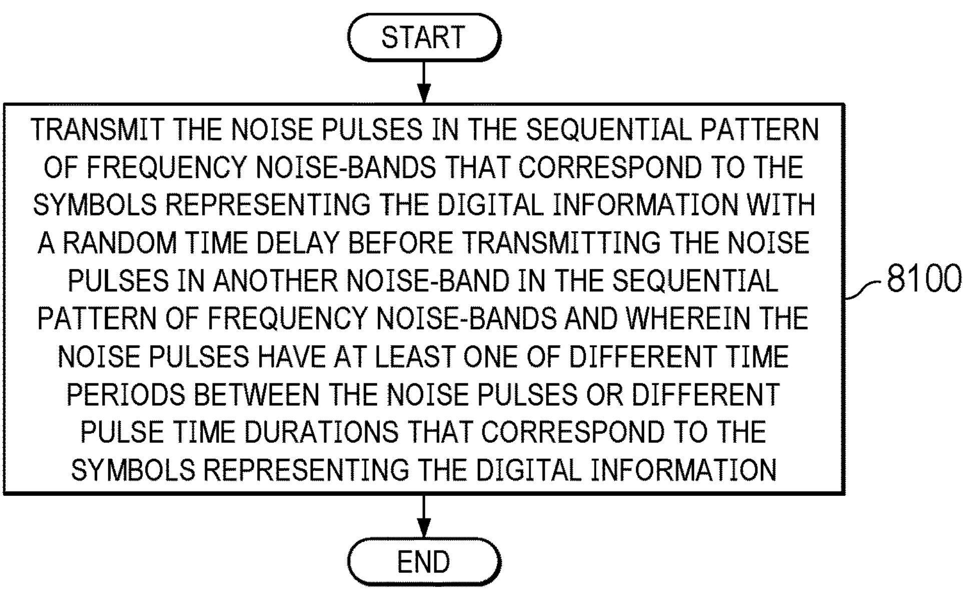
FIG. 81 is an illustration of a flowchart of a process for transmitting noise pulses in accordance with an illustrative embodiment.

Turning next to FIG. 81, an illustration of a flowchart of a process for transmitting noise pulses is depicted in accordance with an illustrative embodiment. The process in this figure is an example of an implementation for operation 8004 in FIG. 80.

The process transmits the noise pulses in the sequential pattern of frequency noise-bands that correspond to the symbols representing the digital information with a random time delay before transmitting the noise pulses in another noise-band in the sequential pattern of frequency noise-bands and wherein the noise pulses have at least one of different time periods between the noise pulses or different pulse time durations that correspond to the symbols representing the digital information (operation 8100). The process terminates thereafter.

Next in FIG. 82, an illustration of a flowchart of a process for transmitting radio frequency noise pulses is depicted in accordance with an illustrative embodiment. The process in this figure is an example of an implementation for operation 8004 in FIG. 80. In this example, noise pulses in the form of radio frequency noise pulses can be transmitted using laser generation system 3626 in FIG. 76.

The process controls an emission of a set of one or more laser beams from a laser generation system to control optical breakdowns that generate the radio frequency noise pulses in the sequential pattern of frequency noise-bands that correspond to the symbols representing the digital information, wherein the radio frequency noise pulses have at least one of different time periods between the radio frequency noise pulses or different pulse time durations that correspond to the symbols representing the digital information (operation 8200). The process terminates thereafter.

With reference now to FIG. 83, an illustration of a flowchart of a process for controlling emission of the set of one or more laser is depicted in accordance with an illustrative embodiment. The process in this figure is an example of an implementation for operation 8200 in FIG. 82.

The process controls the emission of the set of one or more laser beams from the laser generation system to control the optical breakdowns that generate the radio frequency noise pulses by varying a frequency location of a center point of a frequency noise-band in selected frequency noise-bands correlating to the sequential pattern of frequency noise-bands which correspond to the digital information, wherein the radio frequency noise pulses have at least one of different time periods between the radio frequency noise pulses or different pulse time durations that correspond to the symbols representing the digital information (operation 8300). The process terminates thereafter.

Figure 84:
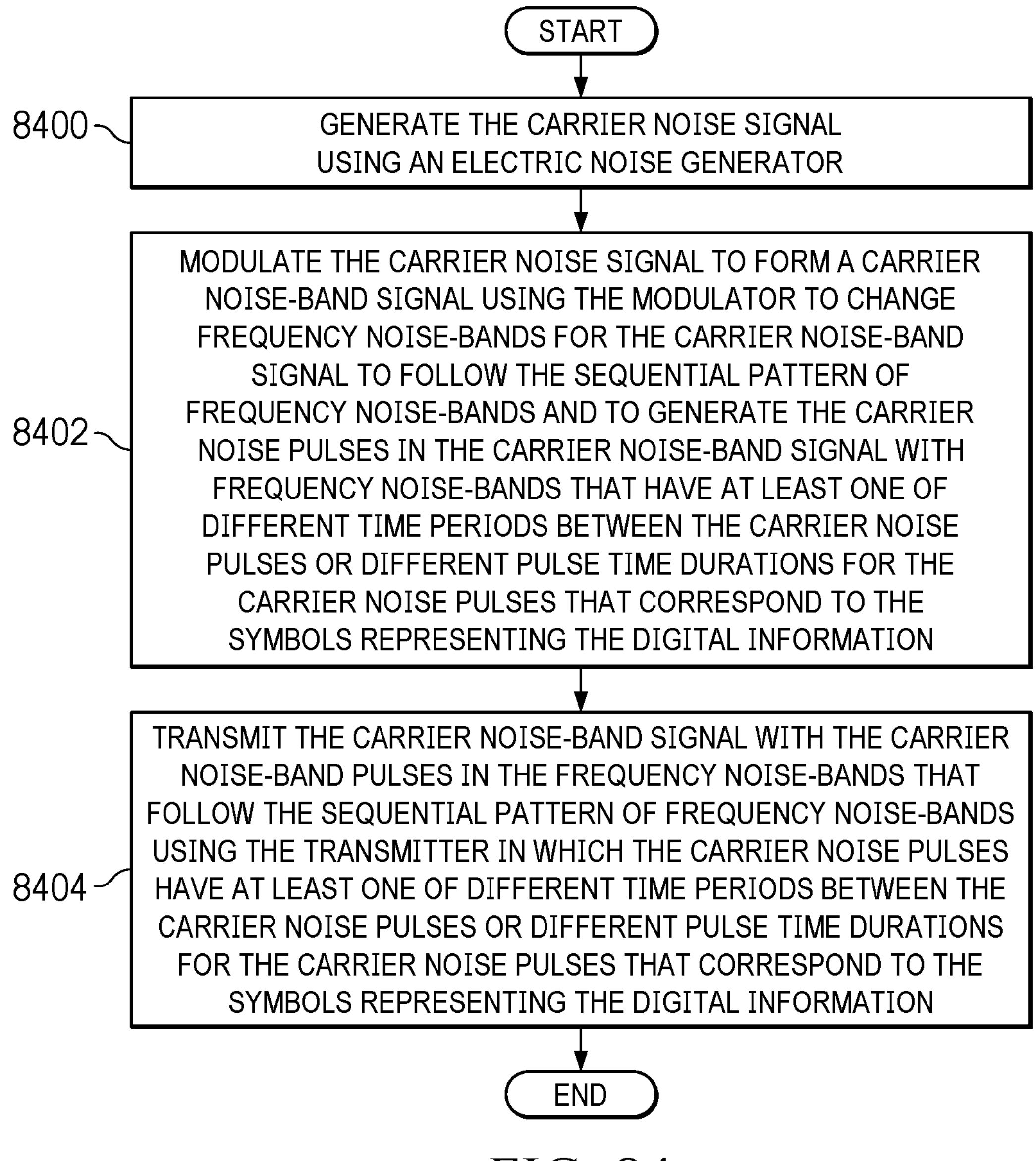
FIG. 84 is an illustration of a flowchart of a process for transmitting noise pulses in accordance with an illustrative embodiment.

Next in FIG. 84, an illustration of a flowchart of a process for transmitting noise pulses is depicted in accordance with an illustrative embodiment. The process in this figure is an example of an implementation for operation 8004 in FIG. 80. In this example, noise pulses can be transmitted using noise transmitter 3628 in FIG. 76.

The process begins by generating the carrier noise signal using an electric noise generator (operation 8400). The process modulates the carrier noise signal to form a carrier noise-band signal using the modulator to change frequency noise-bands for the carrier noise-band signal to follow the sequential pattern of frequency noise-bands and to generate the carrier noise pulses in the carrier noise-band signal with frequency noise-bands that have at least one of different time periods between the carrier noise pulses or different pulse time durations for the carrier noise pulses that correspond to the symbols representing the digital information (operation 8402).

The process transmits the carrier noise-band signal with the carrier noise-band pulses in the frequency noise-bands that follow the sequential pattern of frequency noise-bands using the transmitter in which the carrier noise pulses have at least one of different time periods between the carrier noise pulses or different pulse time durations for the carrier noise pulses that correspond to the symbols representing the digital information (operation 8404). The process terminates thereafter.

Figure 85:
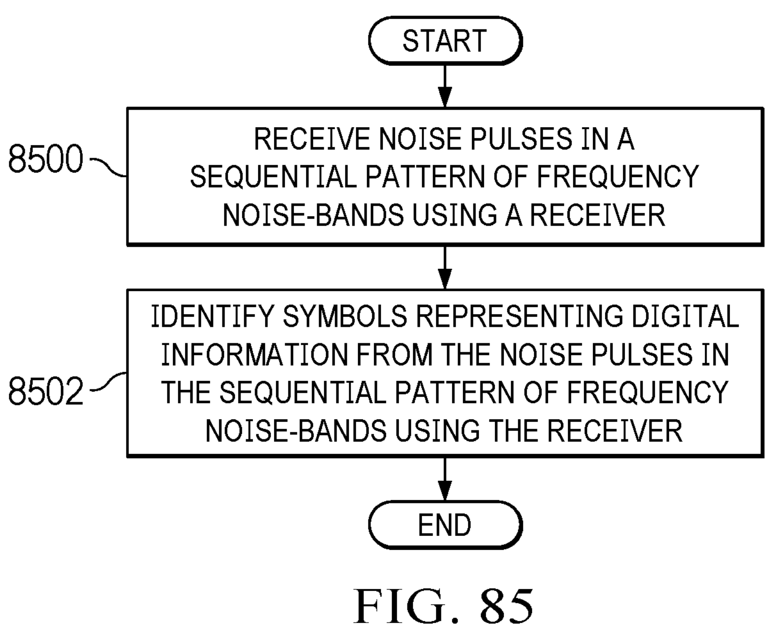
FIG. 85 is an illustration of a flowchart of a process for communicating digital information in accordance with an illustrative embodiment.

Turning now to FIG. 85, an illustration of a flowchart of a process for communicating digital information is depicted in accordance with an illustrative embodiment. The process in FIG. 85 can be implemented in hardware, software, or both. When implemented in software, the process can take the form of program instructions that are run by one of more processor units located in one or more hardware devices in one or more computer systems. For example, the process can be implemented in receiver 3617 in computer system 3612 in FIG. 76.

The process receives noise pulses in a sequential pattern of frequency noise-bands using a receiver (operation 8500). The process identifies symbols representing digital information from the noise pulses in the sequential pattern of frequency noise-bands using the receiver (operation 8502). The process terminates thereafter.

Figure 86:
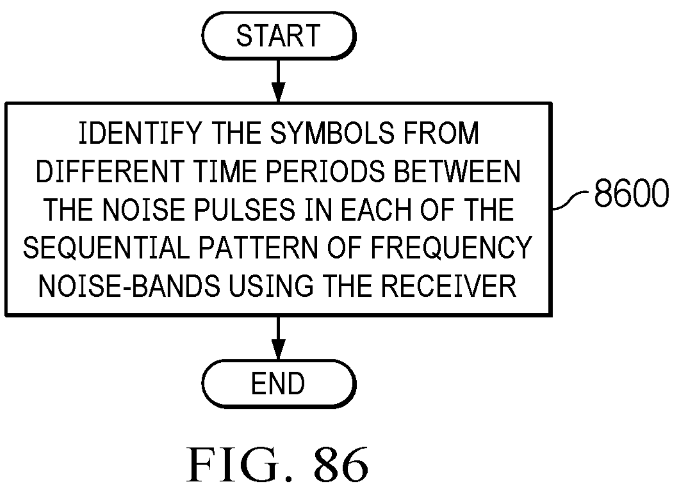
FIG. 86 is an illustration of a flowchart of a process for identifying symbols in accordance with an illustrative embodiment.

In FIG. 86, an illustration of a flowchart of a process for identifying symbols is depicted in accordance with an illustrative embodiment. The process in this figure is an example of an implementation for operation 8502 in FIG. 85.

The process identifies the symbols from different time periods between the noise pulses in each of the sequential pattern of frequency noise-bands using the receiver (operation 8600). The process terminates thereafter.

Figure 87:
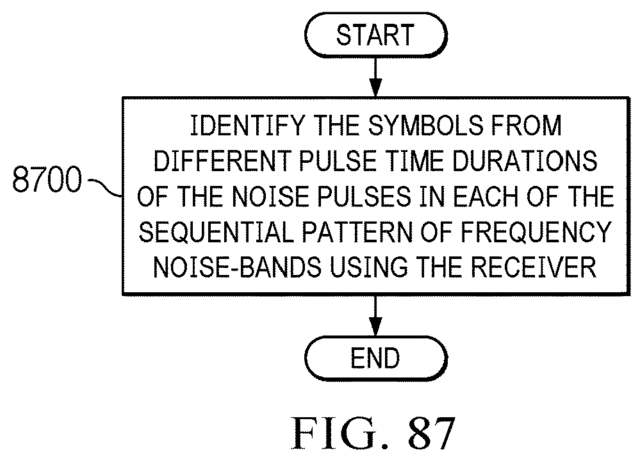
FIG. 87 is an illustration of a flowchart of a process for identifying symbols in accordance with an illustrative embodiment.

With reference to FIG. 87, an illustration of a flowchart of a process for identifying symbols is depicted in accordance with an illustrative embodiment. The process in this flowchart is an example of an implementation for operation implementation for operation 8502 in FIG. 85.

The process identifies the symbols from different pulse time durations of the noise pulses in each of the sequential patterns of frequency noise-bands using the receiver (operation 8700). The process terminates thereafter.

Figure 88:
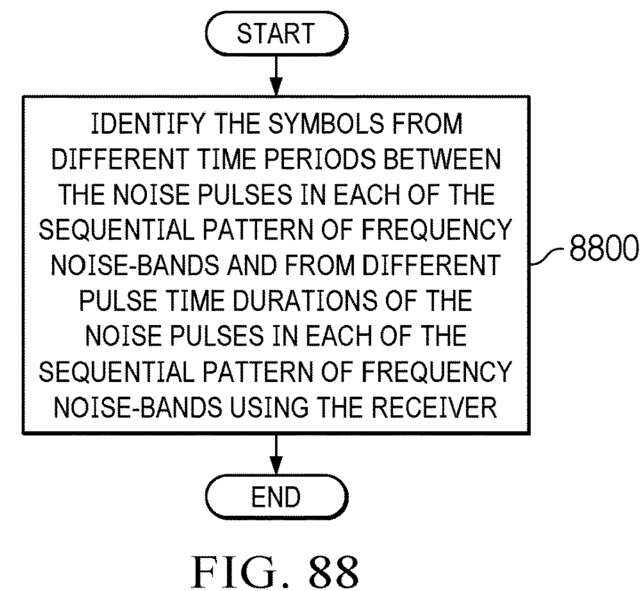
FIG. 88 is an illustration of a flowchart of a process for identifying symbols in accordance with an illustrative embodiment.

Next in FIG. 88, an illustration of a flowchart of a process for identifying symbols is depicted in accordance with an illustrative embodiment. The process in this flowchart is an example of an implementation for operation 8502 in FIG. 85.

The process identifies the symbols from different time periods between the noise pulses in each of the sequential patterns of frequency noise-bands and from different pulse time durations of the noise pulses in each of the sequential patterns of frequency noise-bands using the receiver (operation 8800). The process terminates thereafter.

Figure 89:
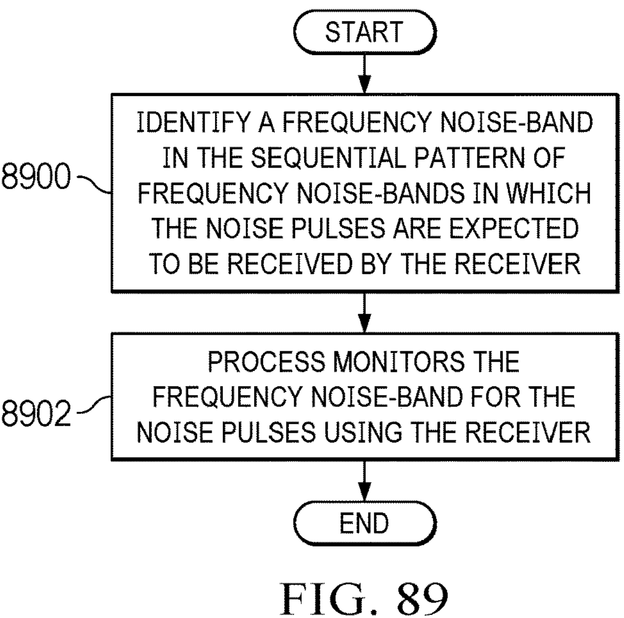
FIG. 89 is an illustration of a flowchart of a process for identifying symbols in accordance with an illustrative embodiment.

Turning now to FIG. 89, an illustration of a flowchart of a process for identifying symbols is depicted in accordance with an illustrative embodiment. The process in this flowchart is an example of an implementation for operation implementation for operation 8502 in FIG. 85.

The process identifies a frequency noise-band in the sequential pattern of frequency noise-bands in which the noise pulses are expected to be received by the receiver (operation 8900). The process monitors the frequency noise-band for the noise pulses using the receiver (operation 8902).

The process determines symbols in the frequency noise-band in response to detecting the noise pulses in the frequency noise-band using the receiver (operation 8904). The process terminates thereafter. This process can be repeated for each frequency noise-band in the sequential pattern of frequency noise-bands.

Some features of the illustrative examples for modulating digital information 3607 using digital time-hopping noise shift keying 3695 in communications system 3602 are described in the following clauses. These clauses are examples of features and are not intended to limit other illustrative examples.

Clause 1. A communications system comprising:

a computer system; and a communications manager in the computer system, wherein the communications manager is configured to:

identify digital information for transmission;

determine a sequential pattern of frequency noise-bands for transmitting the digital information; and transmit noise pulses in the sequential pattern of frequency noise-bands that correspond to symbols representing the digital information.

Clause 2. The communications system of clause 1, wherein the noise pulses have different time periods between the noise pulses that correspond to the symbols representing the digital information.

Clause 3. The communications system of clause 1, wherein the noise pulses have different pulse time durations that correspond to the symbols representing the digital information.

Clause 4. The communications system of clause 1, wherein the noise pulses have different time periods between the noise pulses and different pulse time durations that correspond to the symbols representing the digital information.

Clause 5. The communications system of clause 1, wherein in transmitting the noise pulses, the communications manager is configured to:

transmit the noise pulses in the sequential pattern of frequency noise-bands that correspond to the symbols representing the digital information with a random time delay before transmitting noise pulses in another noise-band in the sequential pattern of frequency noise-bands and wherein the noise pulses have at least one of different time periods between the noise pulses or different pulse time durations that correspond to the symbols representing the digital information.

Clause 6. The communications system of clause 1, wherein the noise pulses are radio frequency noise pulses signals and further comprising:

a laser generation system configured to emit a set of one or more laser beams, wherein in transmitting the noise pulses, the communications manager is configured to:

control an emission of the set of one or more laser beams from the laser generation system to control optical breakdowns that generate the radio frequency noise pulses in the sequential pattern of frequency noise-bands that correspond to the symbols representing the digital information, wherein the radio frequency noise pulses have at least one of different time periods between the radio frequency noise pulses or different pulse time durations that correspond to the symbols representing the digital information.

Clause 7. The communications system of clause 6, wherein in controlling the emission of the set of one or more laser beams, the communications manager is configured to:

control the emission of the set of one or more laser beams from the laser generation system to control the optical breakdowns that generate the radio frequency noise pulses by varying a frequency location of a center point of a frequency noise-band in frequency noise-bands correlating to the sequential pattern of frequency noise-bands which correspond to the digital information, wherein the radio frequency noise pulses have at least one of different time periods between the radio frequency noise pulses or the different pulse time durations that correspond to the symbols representing the digital information.

Clause 8. The communications system of clause 1 further comprising:

an electric noise generator configured to generate a carrier noise signal;

a modulator; and a transmitter, wherein in transmitting the noise pulses, the communications manager is configured to:

generate the carrier noise signal using the electric noise generator;

modulate the carrier noise signal to form a carrier noise-band signal using the modulator to change frequency noise-bands for the carrier noise-band signal to follow the sequential pattern of frequency noise-bands and to generate carrier noise pulses in the carrier noise-band signal with frequency noise-bands that have at least one of different time periods between the carrier noise pulses or different pulse time durations for the carrier noise pulses that correspond to the symbols representing the digital information; and transmit the carrier noise-band signal with the carrier noise-band pulses in the frequency noise-bands that follow the sequential pattern of frequency noise-bands using the transmitter in which the carrier noise pulses have at least one of different time periods between the carrier noise pulses or the different pulse time durations for the carrier noise pulses that correspond to the symbols representing the digital information.

Clause 9. A communications system comprising:

a receiver configured to:

receive noise pulses in a sequential pattern of frequency noise-bands; and identify symbols representing digital information by using the noise pulses in the sequential pattern of frequency noise-bands.

Clause 10. The communications system of clause 9, wherein in identifying the symbols, the receiver is configured to:

identify the symbols from different time periods between the noise pulses in each of the sequential pattern of frequency noise-bands.

Clause 11. The communications system of clause 9, wherein in identifying the symbols, the receiver is configured to:

identify the symbols from different pulse time durations of the noise pulses in each of the sequential pattern of frequency noise-bands.

Clause 12. The communications system of clause 9, wherein in identifying the symbols, the receiver is configured to:

identify the symbols from different time periods between the noise pulses in each of the sequential pattern of frequency noise-bands and from different pulse time durations of the noise pulses in each of the sequential pattern of frequency noise-bands.

Clause 13. The communications system of clause 9, wherein in identifying the digital information, the receiver is configured to:

identify a frequency noise-band in the sequential pattern of frequency noise-bands in which the noise pulses are expected to be received;

monitor the frequency noise-band for the noise pulses; and determine the symbols in the frequency noise-band in response to detecting the noise pulses in the frequency noise-band.

Clause 14. A method for communicating digital information, the method comprising:

identifying the digital information for transmission;

determining a sequential pattern of frequency noise-bands for transmitting the digital information; and transmitting noise pulses in the sequential pattern of frequency noise-bands that correspond to symbols representing the digital information.

Clause 15. The method of clause 14, wherein the noise pulses have different time periods between the noise pulses that correspond to the symbols representing the digital information.

Clause 16. The method of clause 14, wherein the noise pulses have different pulse time durations that correspond to the symbols representing the digital information.

Clause 17. The method of clause 14, wherein the noise pulses have different time periods between the noise pulses and different pulse time durations that correspond to the symbols representing the digital information.

Clause 18. The method of clause 14, wherein said transmitting the noise pulses comprises:

transmitting the noise pulses in the sequential pattern of frequency noise-bands that correspond to the symbols representing the digital information with a random time delay before transmitting the noise pulses in another noise-band in the sequential pattern of frequency noise-bands and wherein the noise pulses have at least one of different time periods between the noise pulses or different pulse time durations that correspond to the symbols representing the digital information.

Clause 19. The method of clause 14, wherein the noise pulses are radio frequency noise pulses and wherein said transmitting the noise pulses comprises:

controlling an emission of a set of one or more laser beams from a laser generation system to control optical breakdowns that generate the radio frequency noise pulses in the sequential pattern of frequency noise-bands that correspond to the symbols representing the digital information, wherein the radio frequency noise pulses have at least one of different time periods between the radio frequency noise pulses or different pulse time durations that correspond to the symbols representing the digital information.

Clause 20. The method of clause 19, wherein said controlling the emission of the set of one or more laser beams comprises:

controlling the emission of the set of one or more laser beams from the laser generation system to control the optical breakdowns that generate the radio frequency noise pulses by varying a frequency location of a center point of a frequency noise-band in selected frequency noise-bands correlating to the sequential pattern of frequency noise-bands which correspond to the digital information, wherein the radio frequency noise pulses have at least one of different time periods between the radio frequency noise pulses or different pulse time durations that correspond to the symbols representing the digital information.

Clause 21. The method of clause 14, wherein said transmitting the noise pulses comprises:

generating a carrier noise signal using an electric noise generator;

modulating the carrier noise signal to form a carrier noise-band signal using the modulator to change frequency noise-bands for the carrier noise-band signal to follow the sequential pattern of frequency noise-bands and to generate carrier noise pulses in the carrier noise-band signal with frequency noise-bands that have at least one of different time periods between the carrier noise pulses or different pulse time durations for the carrier noise pulses that correspond to the symbols representing the digital information; and transmitting the carrier noise-band signal with the carrier noise-band pulses in the frequency noise-bands that follow the sequential pattern of frequency noise-bands using the transmitter in which the carrier noise pulses have at least one of different time periods between the carrier noise pulses or different pulse time durations for the carrier noise pulses that correspond to the symbols representing the digital information.

Clause 22. A method of communicating digital information comprising:

receiving noise pulses in a sequential pattern of frequency noise-bands using a receiver; and identifying symbols representing the digital information from the noise pulses in the sequential pattern of frequency noise-bands using the receiver.

Clause 23. The method of clause 22, wherein said identifying the symbols comprises:

identifying the symbols from different time periods between the noise pulses in each of the sequential pattern of frequency noise-bands using the receiver.

Clause 24. The method of clause 22, wherein said identifying the symbols comprises:

identifying the symbols from different pulse time durations of the noise pulses in each of the sequential pattern of frequency noise-bands using the receiver.

Clause 25. The method of clause 22, wherein said identifying the symbols comprises:

identifying the symbols from different time periods between the noise pulses in each of the sequential pattern of frequency noise-bands and from different pulse time durations of the noise pulses in each of the sequential pattern of frequency noise-bands using the receiver.

Clause 26. The method of clause 22, wherein said identifying the symbols comprises:

identifying a frequency noise-band in the sequential pattern of frequency noise-bands in which the noise pulses are expected to be received by the receiver;

monitor the frequency noise-band for the noise pulses using the receiver; and determining the symbols in the frequency noise-band in response to detecting the noise pulses in the frequency noise-band using the receiver.

The description of the illustrative embodiments has been presented for purposes of illustration and description and is not intended to be exhaustive or limited to the embodiments in the form disclosed. The different illustrative examples describe components that perform actions or operations. In an illustrative embodiment, a component can be configured to perform the action or operation described. For example, the component can have a configuration or design for a structure that provides the component an ability to perform the action or operation that is described in the illustrative examples as being performed by the component. Further, to the extent that terms "includes," "including," "has," "contains," and variants thereof are used herein, such terms are intended to be inclusive in a manner similar to the term "comprises" as an open transition word without precluding any additional or other elements.

Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A communications system comprising:

a computer system; and a communications manager in the computer system, wherein the communications manager is configured to:

identify digital information for transmission; and transmit noise pulses having different time periods between the noise pulses, wherein the different time periods correspond to symbols representing the digital information, wherein the noise pulses having different time periods between the noise pulses are transmitted within specific frequency range noise-bands.

2. The communications system of claim 1, wherein the noise pulses having different time periods between the noise pulses have noise pulse time durations with a fixed length.

3. The communications system of claim 1, wherein the noise pulses having different time periods between the noise pulses have noise pulse time durations with a varying length.

4. The communications system of claim 1, wherein a time period in the different time periods begins at an end of a noise pulse in the noise pulses and the time period ends at a start of a next pulse in the noise pulses.

5. The communications system of claim 4, wherein the end of the noise pulse in the noise pulses having different time periods between the noise pulses is a sync point and an end of the next pulse in the noise pulses having different time periods between the noise pulses is a resync point.

6. The communications system of claim 1, wherein a symbol in the symbols comprises a number of bits.

7. The communications system of claim 1, wherein the noise pulses having different time periods between the noise pulses are radio frequency noise pulses, and further comprising:

a laser generation system configured to emit a set of one or more laser beams, wherein in transmitting the noise pulses having different time periods between the noise pulses, the communications manager is configured to:

control an emission of the set of one or more laser beams from the laser generation system to control optical breakdowns that generate the radio frequency noise pulses having different time periods between the radio frequency noise pulses that correspond to the symbols representing the digital information.

8. The communications system of claim 1, further comprising:

an electric noise generator configured to generate a carrier noise signal;

a modulator; and a transmitter, wherein in generating the noise pulses having different time periods between the noise pulses, the communications manager is configured to:

generate the carrier noise signal using the electric noise generator; and modulate the carrier noise signal using the modulator to generate noise pulses having different time periods between the noise pulses, wherein the different time periods between the noise pulses corresponds to the symbols representing the digital information.

9. The communications system of claim 1, wherein the noise pulses are generated from at least one of electromagnetic frequency noise signals, radio frequency noise signals, microwave frequency noise signals, audio frequency noise signals, ultrasonic frequency noise signals, ultra-low frequency noise signals, very low frequency noise signals, underwater frequency noise signals, or optical frequency noise signals including visible or non-visible light.

10. A method for communicating digital information, the method comprising:

identifying the digital information for transmission; and transmitting noise pulses having different time periods between the noise pulses, wherein the different time periods correspond to symbols that represent the digital information, wherein noise pulses having the different time periods between the noise pulses are transmitted within a specific frequency-range noise-band.

11. The method of claim 10, wherein the noise pulses having the different time periods between the noise pulses have noise pulse time durations with a fixed length.

12. The method of claim 10, wherein the noise pulses having the different time periods between the noise pulses have noise pulse time durations with a varying length.

13. The method of claim 10, wherein a time period in the time periods begins at an end of a noise pulse in the noise pulses and the time period ends at a start of a next pulse in the noise pulses.

14. The method of claim 13, wherein the end of the noise pulse in the noise pulses is a sync point and an end of the next pulse is a resync point.

15. The method of claim 10, wherein a symbol in the symbols comprises a number of bits.

16. The method of claim 10, wherein the noise pulses having the different time periods between the noise pulses are radio frequency noise pulses having the different time periods between the noise pulses, and further comprising:

emitting a set of one or more laser beams from a laser generation system; and wherein transmitting noise pulses comprises:

controlling an emission of the set of one or more laser beams from the laser generation system to control optical breakdowns that generate the radio frequency noise pulses with different times periods between the radio frequency noise pulses corresponding to the symbols for the digital information.

17. The method of claim 10, wherein transmitting noise pulses comprises:

generating a carrier noise signal using an electric noise generator; and modulating the carrier noise signal using the modulator to generate noise pulses with the different times periods between the noise pulses that correspond to the symbols for the digital information.

18. The method of claim 10, wherein the noise pulses are generated from at least one of electromagnetic frequency noise signals, radio frequency noise signals, microwave frequency noise signals, audio frequency noise signals, ultrasonic frequency noise signals, ultra-low frequency noise signals, very low frequency noise signals, underwater frequency noise signals, or optical frequency noise signals including visible or non-visible light.

19. A communications system comprising:

a computer system; and a communications manager in the computer system, wherein the communications manager is configured to: identify digital information for transmission; and transmit noise pulses having different time periods between the noise pulses, wherein the different time periods correspond to symbols representing the digital information, wherein a time period in the different time periods begins at an end of a noise pulse in the noise pulses and the time period ends at a start of a next pulse in the noise pulses, and wherein the end of the noise pulse in the noise pulses having different time periods between the noise pulses is a sync point and an end of the next pulse in the noise pulses having different time periods between the noise pulses is a resync point.

20. A method for communicating digital information, the method comprising:

identifying the digital information for transmission; and transmitting noise pulses having different time periods between the noise pulses, wherein the different time periods correspond to symbols that represent the digital information, wherein a time period in the time periods begins at an end of a noise pulse in the noise pulses and the time period ends at a start of a next pulse in the noise pulses, and wherein the end of the noise pulse in the noise pulses is a sync point and an end of the next pulse is a resync point.

* * * * *